(12) United States Patent
Wang et al.

(10) Patent No.: US 7,580,576 B2
(45) Date of Patent: Aug. 25, 2009

(54) STROKE LOCALIZATION AND BINDING TO ELECTRONIC DOCUMENT

(75) Inventors: Jian Wang, Beijing (CN); Jiang Wu, San Jose, CA (US); Liyong Chen, Beijing (CN); Qiang Wang, Beijing (CN); Yingnong Dang, Beijing (CN); Youjun Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 11/142,910

(22) Filed: Jun. 2, 2005

(65) Prior Publication Data
US 2006/0274948 A1  Dec. 7, 2006

(51) Int. Cl.
*G06K 9/00* (2006.01)

(52) U.S. Cl. ............... 382/188; 382/187; 382/306; 382/314; 345/179

(58) Field of Classification Search .......... 382/314, 382/315, 186, 181, 187, 188, 202, 203, 306; 345/179–181
See application file for complete search history.

(56) References Cited

U.S. PATENT DOCUMENTS

| | | | |
|---|---|---|---|
| 4,686,329 A | 8/1987 | Joyce | |
| 4,742,558 A | 5/1988 | Ishibashi et al. | |
| 4,745,269 A | 5/1988 | Van Gils et al. | |
| 4,829,583 A | 5/1989 | Monroe et al. | |
| 4,941,124 A | 7/1990 | Skinner, Jr. | |
| 5,032,924 A | 7/1991 | Brown et al. | |
| 5,051,736 A * | 9/1991 | Bennett et al. | 345/180 |
| 5,073,966 A | 12/1991 | Sato et al. | |
| 5,146,552 A | 9/1992 | Cassorla et al. | |
| 5,153,928 A | 10/1992 | Iizuka | |
| 5,181,257 A | 1/1993 | Steiner et al. | |
| 5,196,875 A | 3/1993 | Stuckler | |
| 5,235,654 A | 8/1993 | Anderson et al. | |
| 5,243,149 A | 9/1993 | Comerford et al. | |
| 5,247,137 A | 9/1993 | Epperson | |
| 5,253,336 A | 10/1993 | Yamada | |
| 5,288,986 A | 2/1994 | Pine et al. | |
| 5,294,792 A | 3/1994 | Lewis et al. | |
| 5,335,150 A | 8/1994 | Huang | |
| 5,365,598 A | 11/1994 | Sklarew | |
| 5,394,487 A | 2/1995 | Burger et al. | |

(Continued)

FOREIGN PATENT DOCUMENTS

CN  1303494  7/2001

(Continued)

OTHER PUBLICATIONS

Hecht, D.L.; Printed embedded data graphical user interfaces. Computer vol. 34, Issue 3, Mar. 2001 pp. 47-55.*

(Continued)

*Primary Examiner*—Vikkram Bali
*Assistant Examiner*—Julian D Brooks
(74) *Attorney, Agent, or Firm*—Perkins Coie LLP

(57) ABSTRACT

A method and apparatus for capturing information encoded within a surface, such as location information or document metadata, and associating the information with a document is described. The captured information may be obtained by a camera associated with a pointing or writing device having a camera, such as an image-capturing pen.

16 Claims, 87 Drawing Sheets

U.S. PATENT DOCUMENTS

| | | | |
|---|---|---|---|
| 5,398,082 A | 3/1995 | Henderson et al. |
| 5,414,227 A | 5/1995 | Schubert et al. |
| 5,442,147 A | 8/1995 | Burns et al. |
| 5,448,372 A | 9/1995 | Axman et al. |
| 5,450,603 A | 9/1995 | Davies |
| 5,454,054 A | 9/1995 | Iizuka |
| 5,471,533 A | 11/1995 | Wang et al. |
| 5,477,012 A | 12/1995 | Sekendur |
| 5,511,156 A | 4/1996 | Nagasaka |
| 5,546,515 A | 8/1996 | Mochizuki |
| 5,581,637 A | 12/1996 | Cass et al. |
| 5,581,682 A | 12/1996 | Anderson et al. |
| 5,587,558 A | 12/1996 | Matsushima |
| 5,612,524 A | 3/1997 | Sant'Anselmo et al. |
| 5,626,620 A | 5/1997 | Kieval et al. |
| 5,629,499 A | 5/1997 | Flickinger et al. |
| 5,635,697 A | 6/1997 | Shellhammer et al. |
| 5,644,652 A | 7/1997 | Bellegarda et al. |
| 5,652,412 A | 7/1997 | Lazzouni et al. |
| 5,661,291 A | 8/1997 | Ahearn et al. |
| 5,661,506 A | 8/1997 | Lazzouni et al. |
| 5,670,897 A | 9/1997 | Kean |
| 5,686,718 A | 11/1997 | Iwai et al. |
| 5,692,073 A | 11/1997 | Cass |
| 5,719,884 A | 2/1998 | Roth et al. |
| 5,721,940 A | 2/1998 | Luther et al. |
| 5,726,435 A | 3/1998 | Hara et al. |
| 5,727,098 A | 3/1998 | Jacobson |
| 5,754,280 A | 5/1998 | Kato et al. |
| 5,756,981 A | 5/1998 | Roustaei et al. |
| 5,765,176 A | 6/1998 | Bloomberg |
| 5,774,602 A | 6/1998 | Taguchi et al. |
| 5,817,992 A | 10/1998 | D'Antonio |
| 5,818,436 A | 10/1998 | Imai et al. |
| 5,822,436 A | 10/1998 | Rhoads |
| 5,822,465 A | 10/1998 | Normile et al. |
| 5,825,015 A | 10/1998 | Chan et al. |
| 5,825,892 A | 10/1998 | Braudaway et al. |
| 5,850,058 A * | 12/1998 | Tano et al. ............... 178/18.01 |
| 5,852,434 A | 12/1998 | Sekendur |
| 5,855,483 A | 1/1999 | Collins et al. |
| 5,855,594 A | 1/1999 | Olive et al. |
| 5,875,264 A | 2/1999 | Carlstrom |
| 5,890,177 A | 3/1999 | Moody et al. |
| 5,897,648 A | 4/1999 | Henderson |
| 5,898,166 A | 4/1999 | Fukuda et al. |
| 5,902,968 A | 5/1999 | Sato et al. |
| 5,937,110 A | 8/1999 | Petrie et al. |
| 5,939,703 A | 8/1999 | Hecht et al. |
| 5,960,124 A | 9/1999 | Taguchi et al. |
| 5,961,571 A | 10/1999 | Gorr et al. |
| 5,995,084 A | 11/1999 | Chan et al. |
| 6,000,614 A | 12/1999 | Yang et al. |
| 6,000,621 A | 12/1999 | Hecht et al. |
| 6,000,946 A | 12/1999 | Snyders et al. |
| 6,005,973 A | 12/1999 | Seybold et al. |
| 6,041,335 A | 3/2000 | Merritt et al. |
| 6,044,165 A | 3/2000 | Perona et al. |
| 6,044,301 A | 3/2000 | Hartlaub et al. |
| 6,052,481 A | 4/2000 | Grajski et al. |
| 6,054,990 A | 4/2000 | Tran |
| 6,076,734 A | 6/2000 | Dougherty et al. |
| 6,081,261 A | 6/2000 | Wolff et al. |
| 6,108,453 A | 8/2000 | Acharya |
| 6,141,014 A | 10/2000 | Endo et al. |
| 6,151,424 A | 11/2000 | Hsu |
| 6,157,935 A | 12/2000 | Tran et al. |
| 6,181,329 B1 | 1/2001 | Stork et al. |
| 6,186,405 B1 | 2/2001 | Yoshioka |
| 6,188,392 B1 | 2/2001 | O'Connor et al. |
| 6,192,380 B1 | 2/2001 | Light et al. |
| 6,202,060 B1 | 3/2001 | Tran |
| 6,208,771 B1 | 3/2001 | Jared et al. |
| 6,208,894 B1 | 3/2001 | Schulman et al. |
| 6,219,149 B1 | 4/2001 | Kawata et al. |
| 6,226,636 B1 | 5/2001 | Abdel-Mottaleb et al. |
| 6,230,304 B1 | 5/2001 | Groeneveld et al. |
| 6,243,071 B1 | 6/2001 | Shwarts et al. |
| 6,249,614 B1 | 6/2001 | Kolesnik et al. |
| 6,254,253 B1 | 7/2001 | Daum et al. |
| 6,256,398 B1 | 7/2001 | Chang |
| 6,259,827 B1 | 7/2001 | Nichani |
| 6,278,968 B1 | 8/2001 | Franz et al. |
| 6,294,775 B1 | 9/2001 | Seibel et al. |
| 6,310,988 B1 * | 10/2001 | Flores et al. ................ 382/313 |
| 6,327,395 B1 * | 12/2001 | Hecht et al. ................ 382/306 |
| 6,330,976 B1 | 12/2001 | Dymetman et al. |
| 6,335,727 B1 | 1/2002 | Morishita et al. |
| 6,340,119 B2 | 1/2002 | He et al. |
| 6,396,598 B1 | 5/2002 | Kashiwagi et al. |
| 6,408,330 B1 | 6/2002 | DeLaHuerga |
| 6,441,920 B1 | 8/2002 | Smith |
| 6,479,768 B1 | 11/2002 | How |
| 6,492,981 B1 | 12/2002 | Stork et al. |
| 6,517,266 B2 | 2/2003 | Saund |
| 6,522,928 B2 | 2/2003 | Whitehurst et al. |
| 6,529,638 B1 | 3/2003 | Westerman |
| 6,532,152 B1 | 3/2003 | White et al. |
| 6,538,187 B2 | 3/2003 | Beigi |
| 6,546,136 B1 | 4/2003 | Hull |
| 6,551,357 B1 | 4/2003 | Madduri |
| 6,560,741 B1 | 5/2003 | Gerety et al. |
| 6,570,104 B1 | 5/2003 | Ericson et al. |
| 6,570,997 B2 | 5/2003 | Noguchi |
| 6,573,887 B1 | 6/2003 | O'Donnell, Jr. |
| 6,577,299 B1 | 6/2003 | Schiller et al. |
| 6,580,424 B1 | 6/2003 | Krumm |
| 6,584,052 B1 | 6/2003 | Phillips et al. |
| 6,585,154 B1 | 7/2003 | Ostrover et al. |
| 6,592,039 B1 | 7/2003 | Smith et al. |
| 6,603,464 B1 | 8/2003 | Rabin |
| 6,625,313 B1 | 9/2003 | Morita et al. |
| 6,628,267 B2 | 9/2003 | Karidis et al. |
| 6,650,320 B1 | 11/2003 | Zimmerman |
| 6,655,597 B1 | 12/2003 | Swartz et al. |
| 6,661,920 B1 | 12/2003 | Skinner |
| 6,663,008 B1 | 12/2003 | Pettersson et al. |
| 6,671,386 B1 | 12/2003 | Shimizu et al. |
| 6,674,427 B1 | 1/2004 | Pettersson et al. |
| 6,681,045 B1 | 1/2004 | Lapstun et al. |
| 6,686,910 B2 * | 2/2004 | O'Donnell, Jr. ............ 345/179 |
| 6,689,966 B2 | 2/2004 | Wiebe |
| 6,693,615 B2 | 2/2004 | Hill et al. |
| 6,697,056 B1 | 2/2004 | Bergelson et al. |
| 6,728,000 B1 | 4/2004 | Lapstun et al. |
| 6,729,543 B1 | 5/2004 | Arons et al. |
| 6,731,271 B1 | 5/2004 | Tanaka et al. |
| 6,732,927 B2 | 5/2004 | Olsson et al. |
| 6,738,053 B1 | 5/2004 | Borgstrom et al. |
| 6,744,967 B2 | 6/2004 | Kaminski et al. |
| 6,752,317 B2 | 6/2004 | Dymetman et al. |
| 6,760,009 B2 | 7/2004 | Omura et al. |
| 6,783,069 B1 | 8/2004 | Hecht et al. |
| 6,819,776 B2 | 11/2004 | Chang |
| 6,831,273 B2 | 12/2004 | Jenkins et al. |
| 6,832,724 B2 | 12/2004 | Yavid et al. |
| 6,834,081 B2 | 12/2004 | Kim et al. |
| 6,834,195 B2 | 12/2004 | Brandenberg et al. |
| 6,834,337 B1 | 12/2004 | Mitchell et al. |
| 6,847,356 B1 | 1/2005 | Hasegawa et al. |
| 6,856,712 B2 | 2/2005 | Fauver et al. |
| 6,862,371 B2 | 3/2005 | Mukherjee |
| 6,864,880 B2 | 3/2005 | Hugosson et al. |
| 6,865,325 B2 | 3/2005 | Ide et al. |

| Patent Number | Date | Inventor(s) |
|---|---|---|
| 6,870,966 B1 | 3/2005 | Silverbrook et al. |
| 6,879,731 B2 | 4/2005 | Kang et al. |
| 6,880,124 B1 | 4/2005 | Moore |
| 6,897,854 B2 | 5/2005 | Cho et al. |
| 6,898,297 B2 | 5/2005 | Katsura et al. |
| 6,929,183 B2 | 8/2005 | Pettersson |
| 6,933,933 B2 | 8/2005 | Fleming |
| 6,938,222 B2 | 8/2005 | Hullender et al. |
| 6,956,968 B1 | 10/2005 | O'Dell et al. |
| 6,960,777 B2 | 11/2005 | Soar |
| 6,964,483 B2 | 11/2005 | Wang et al. |
| 6,968,083 B2 | 11/2005 | Williams et al. |
| 6,975,334 B1 | 12/2005 | Barrus |
| 6,976,220 B1 | 12/2005 | Lapstun et al. |
| 6,992,655 B2 * | 1/2006 | Ericson et al. ............... 345/163 |
| 6,999,622 B2 | 2/2006 | Komatsu |
| 7,003,150 B2 | 2/2006 | Trajkovi |
| 7,009,594 B2 | 3/2006 | Wang et al. |
| 7,012,621 B2 | 3/2006 | Crosby et al. |
| 7,024,429 B2 | 4/2006 | Ngo et al. |
| 7,036,938 B2 | 5/2006 | Wang et al. |
| 7,048,198 B2 * | 5/2006 | Ladas et al. .................. 235/494 |
| 7,092,122 B2 | 8/2006 | Iwaki |
| 7,110,604 B2 | 9/2006 | Olsson et al. |
| 7,111,230 B2 * | 9/2006 | Euchner et al. ............. 715/232 |
| 7,116,840 B2 | 10/2006 | Wang et al. |
| 7,119,816 B2 | 10/2006 | Zhang et al. |
| 7,123,742 B2 | 10/2006 | Chang |
| 7,133,031 B2 | 11/2006 | Wang et al. |
| 7,133,563 B2 | 11/2006 | Wang et al. |
| 7,136,054 B2 | 11/2006 | Wang et al. |
| 7,139,740 B2 | 11/2006 | Ayala |
| 7,142,197 B2 * | 11/2006 | Wang et al. .................. 345/179 |
| 7,142,257 B2 | 11/2006 | Callison et al. |
| 7,145,556 B2 | 12/2006 | Pettersson |
| 7,167,164 B2 | 1/2007 | Ericson et al. |
| 7,176,906 B2 | 2/2007 | Williams et al. |
| 7,190,843 B2 | 3/2007 | Wei et al. |
| 7,222,799 B2 | 5/2007 | Silverbrook |
| 7,225,979 B2 | 6/2007 | Silverbook et al. |
| 7,262,764 B2 | 8/2007 | Wang et al. |
| 7,263,224 B2 | 8/2007 | Wang et al. |
| 7,289,103 B2 | 10/2007 | Lapstun et al. |
| 7,292,370 B2 | 11/2007 | Iwaki |
| 7,295,193 B2 | 11/2007 | Fahraeus |
| 7,330,605 B2 | 2/2008 | Wang et al. |
| 7,386,191 B2 | 6/2008 | Wang et al. |
| 7,400,777 B2 | 7/2008 | Wang et al. |
| 7,403,658 B2 | 7/2008 | Lin et al. |
| 7,421,439 B2 | 9/2008 | Wang et al. |
| 7,430,497 B2 | 9/2008 | Wang et al. |
| 7,440,134 B2 | 10/2008 | Natori |
| 7,463,784 B2 | 12/2008 | Kugo |
| 7,486,822 B2 | 2/2009 | Wang et al. |
| 7,486,823 B2 | 2/2009 | Wang et al. |
| 7,502,508 B2 | 3/2009 | Wang et al. |
| 2001/0038383 A1 | 11/2001 | Ericson et al. |
| 2001/0053238 A1 | 12/2001 | Katsura et al. |
| 2002/0028018 A1 | 3/2002 | Hawkins et al. |
| 2002/0031622 A1 | 3/2002 | Ippel et al. |
| 2002/0048404 A1 * | 4/2002 | Fahraeus et al. ............ 382/188 |
| 2002/0050982 A1 | 5/2002 | Ericson |
| 2002/0069220 A1 | 6/2002 | Tran |
| 2002/0163511 A1 | 11/2002 | Sekendur |
| 2002/0179717 A1 | 12/2002 | Cummings et al. |
| 2003/0001020 A1 | 1/2003 | Kardach |
| 2003/0009725 A1 | 1/2003 | Reichenbach |
| 2003/0030638 A1 | 2/2003 | Astrom et al. |
| 2003/0034961 A1 | 2/2003 | Kao |
| 2003/0050803 A1 | 3/2003 | Marchosky |
| 2003/0081000 A1 | 5/2003 | Watanabe et al. |
| 2003/0088781 A1 | 5/2003 | ShamRao |
| 2003/0090475 A1 | 5/2003 | Paul et al. |
| 2003/0105817 A1 * | 6/2003 | Lapstun et al. ............... 709/204 |
| 2003/0117378 A1 | 6/2003 | Carro |
| 2003/0128194 A1 | 7/2003 | Pettersson |
| 2003/0146883 A1 | 8/2003 | Zelitt |
| 2003/0159044 A1 | 8/2003 | Doyle et al. |
| 2003/0179906 A1 | 9/2003 | Baker et al. |
| 2003/0214553 A1 | 11/2003 | Dodge |
| 2003/0214669 A1 | 11/2003 | Saitoh |
| 2004/0032393 A1 | 2/2004 | Brandenberg et al. |
| 2004/0046744 A1 | 3/2004 | Rafii et al. |
| 2004/0085302 A1 | 5/2004 | Wang et al. |
| 2004/0086181 A1 | 5/2004 | Wang et al. |
| 2004/0090429 A1 | 5/2004 | Geaghan et al. |
| 2004/0128264 A1 | 7/2004 | Leung et al. |
| 2004/0153649 A1 | 8/2004 | Rhoads et al. |
| 2004/0212553 A1 | 10/2004 | Wang |
| 2004/0233163 A1 | 11/2004 | Lapstun et al. |
| 2005/0024324 A1 | 2/2005 | Tomasi et al. |
| 2005/0044164 A1 | 2/2005 | O'Farrell et al. |
| 2005/0052700 A1 | 3/2005 | Mackenzie et al. |
| 2005/0104909 A1 | 5/2005 | Okamura et al. |
| 2005/0106365 A1 * | 5/2005 | Palmer et al. ............. 428/195.1 |
| 2005/0146518 A1 | 7/2005 | Wang et al. |
| 2005/0147281 A1 | 7/2005 | Wang et al. |
| 2005/0193292 A1 | 9/2005 | Lin et al. |
| 2005/0201621 A1 * | 9/2005 | Wang et al. .................. 382/188 |
| 2006/0082557 A1 * | 4/2006 | Ericson et al. ............... 345/179 |
| 2006/0109263 A1 | 5/2006 | Wang et al. |
| 2006/0123049 A1 | 6/2006 | Wang et al. |
| 2006/0125805 A1 * | 6/2006 | Marggraff ................... 345/179 |
| 2006/0182309 A1 | 8/2006 | Wang et al. |
| 2006/0182343 A1 | 8/2006 | Lin et al. |
| 2006/0190818 A1 | 8/2006 | Wang et al. |
| 2006/0204101 A1 | 9/2006 | Wang et al. |
| 2006/0215913 A1 | 9/2006 | Wang |
| 2006/0242560 A1 | 10/2006 | Wang et al. |
| 2006/0242562 A1 | 10/2006 | Wang et al. |
| 2006/0242622 A1 | 10/2006 | Wang et al. |
| 2006/0267965 A1 * | 11/2006 | Clary .......................... 345/179 |
| 2006/0269134 A1 * | 11/2006 | Wang et al. .................. 382/181 |
| 2007/0001950 A1 | 1/2007 | Zhang et al. |
| 2007/0003150 A1 | 1/2007 | Xu et al. |
| 2007/0041654 A1 | 2/2007 | Wang et al. |
| 2007/0042165 A1 | 2/2007 | Wang et al. |
| 2008/0025612 A1 | 1/2008 | Wang et al. |

FOREIGN PATENT DOCUMENTS

| | | |
|---|---|---|
| CN | 1352778 | 6/2002 |
| CN | 3143455 | 9/2003 |
| CN | 200610092487 | 9/2003 |
| EP | 0407734 | 1/1991 |
| EP | 0439682 | 8/1991 |
| EP | 0564708 | 10/1993 |
| EP | 0670555 | 9/1995 |
| EP | 0694870 | 1/1996 |
| EP | 0717368 | 6/1996 |
| EP | 0732666 | 9/1996 |
| EP | 0865166 | 9/1998 |
| EP | 1154377 A1 * | 11/2001 |
| EP | 1158456 | 11/2001 |
| EP | 1168231 | 1/2002 |
| EP | 1276073 | 1/2003 |
| EP | 1416435 | 5/2004 |
| GB | 2393149 A * | 3/2004 |
| JP | 63165584 | 7/1988 |
| JP | 04253087 | 9/1992 |
| JP | 06006316 | 1/1994 |
| JP | 06209482 | 7/1994 |
| JP | 06230886 | 8/1994 |
| JP | 07020812 | 1/1995 |
| JP | 07225564 | 8/1995 |
| JP | 10215450 | 8/1998 |

| JP | 11308112 | 11/1999 |
| JP | 2000131640 | 5/2000 |
| JP | 2002529796 | 9/2000 |
| JP | 2002082763 | 3/2002 |
| JP | 2002108551 | 4/2002 |
| WO | WO-9630217 | 10/1996 |
| WO | WO-9960469 | 11/1999 |
| WO | WO-9965568 | 12/1999 |
| WO | WO-0025293 | 5/2000 |
| WO | WO-0072247 | 11/2000 |
| WO | WO-0073983 | 12/2000 |
| WO | WO-0126032 | 4/2001 |
| WO | WO-0148685 | 7/2001 |
| WO | WO-0171654 | 9/2001 |
| WO | WO-02077870 | 10/2002 |
| WO | WO-2005106638 | 11/2005 |

OTHER PUBLICATIONS

Xiaoou Tank; Feng Lin; Jianzhuang Liu; Video-based handwritten Chinese character recognition. Circuits and Systems for Video Technology, IEEE Transactions on Jan. 2005 vol. 15, Issue 1, pp. 167-174.*
van Liere, R.; Mulder, J.D.; Optical tracking using projective invariant marker pattern properties. Virtual Reality, 2003. Proceedings. IEEE, Mar. 22-26, 2003 pp. 191-198.*
Munich, M.E.; Perona, P.; Visual input for pen-based computers. Image Processing, 1996. Proceedings., International Conference on Sep. 16-19, 1996 vol. 1, pp. 173-176.*
U.S. Appl. No. 11/066,800, Wang.
U.S. Appl. No. 11/067,193, Yang.
U.S. Appl. No. 11/142,844, Wang.
U.S. Appl. No. 12/131,810, Wang.
U.S. Appl. No. 12/138,339, Wang.
U.S. Appl. No. 12/180,484, Wang.
U.S. Appl. No. 11/066,800, filed Feb. 25, 2005, Wang et al.
U.S. Appl. No. 12/138,339, filed Jun. 12, 2008, Wang et al.
"VPEN, Revolutionizing Human Interaction With The Digital World™," OTM Technologies, pp. 1-6, Jul. 15, 2002.
Brush, A.J. et al., "Robust Annotation Positioning in Digital Documents," SIGCHI '01, Mar. 31-Apr. 4, 2001, ACM, Seattle, Washington, USA, pp. 285-292.
Cai, Z., "A New Decode Algorithm for Binary Bar Codes," Pattern Recognition Letters 15 (Dec. 1994), pp. 1191-1199.
Champaneria, "PADCAM: A Real-Time, Human-Centric Notetaking System," MIT Laboratory for Computer Science, Mar. 2002.
Clark et al., "Maximal and Near-Maximal Shift Register Sequences: Efficient Event Counters and Easy Discrete Logarithms," IEEE Transactions on Computers vol. 43, No. 5, pp. 560-568, May 1994.
Cotting, D. et al., "Embedding Imperceptible Patterns into Projected Images for Simultaneous Acquisition and Display," Proceedings of the Third IEEE and ACM International Symposium on Mixed and Augmented Reality, Nov. 2-5, 2004, IEEE Computer Society, Washington, DC, pp. 100-109.
Crowley et al., "Thingss That See," Communications of the A.C.M., vol. 43, No. 3, pp. 54-64, Mar. 2000.
Decurtins, C. et al., "Digital Annotation of Printed Documents," Proceedings of the Twelfth International Conference on Information and Knowledge Management Nov. 3-8, New Orleans, Louisiana, United States, CIKM'03. ACM 2003, pp. 552-555.
Dey, et al., "A Fast Algorithm for Computing the Euler Number of an Image and its VLSI Implementation," IEEE; 13th International Conference on VLSI Design, Jan. 2003.
Dumer et al., "Hardness of Approximating the Minimum Distance of a Linear Code," IEEE Symposium of Foundations of Computer Science, pp. 475-485, 1999.
European Search Report for Application No. EP 03021235; Applicant: Microsoft Corporation; Date of Mailing: Jun. 1, 2005 (2 pages).
European Search Report for Application No. EP 03021852; Applicant: Microsoft Corporation; Date of Mailing: Mar. 2, 2004 (3 pages).
European Search Report for Application No. 05000170.0-1527; Applicant: Microsoft Corporation; Date of Mailing: Jan. 6, 2005 (7 pages).
European Search Report for Application No. 03021224.5; Applicant: Microsoft Corporation; Date of Mailing: Jun. 1, 2005 (3 pages).
European Search Report for Application No. 03021236.9; Applicant: Microsoft Corporation; Date of Mailing: Sep. 16, 2005 (5 Pages).
European Search Report for Application No. 03021237.7-1527, Applicant: Microsoft Corporation; Date of Mailing: Jan. 6, 2005 (4 pages).
European Search Report for Application No. EP050000749; Applicant: Microsoft Corporation; Date of Mailing: Apr. 26, 2007 (2 pages).
European Search Report, Application No. 03021238.5-1527; Applicant: Microsoft Corporation; Date of Mailing: Jun. 1, 2005 (6 pages).
Fujieda et al., "Development Of Pen-Shaped Scanners," Nec, vol. 51, No. 10, 1998.
Golovchinsky, G. and Denoue, L., "Moving Markup: Repositioning Freeform Annotations," UIST '02, Oct. 27-30, 2002, Paris, France, vol. 4, Issue 2, pp. 21-24.
Gonzalez, Rafael et al., "Digital Image Processing," Table of Contents and Preface, Second Edition, Prentice Hall, Upper Saddle River, New Jersey, 2002 (13 pages).
Grasso et al., "Augmenting Recommender Systems by Embedding Interfaces into Practices," pp. 267-275, 1999.
Guerrero, J.J. and Sagues, C. "From Lines to Homographies Between Uncalibrated Images," IX Symposium on Pattern Recognition and Image Analysis, VO4, 233-240, 2001.
Haynes, "Wacom PL-500," www.wacom.co.uk, Jul. 15, 2002.
IEEExplore # Search Session History, May 7, 2008, http://ieee.org/search/history.jsp, 1 pages.
International Search Report for Application No. PCT/US2006/032230; Applicant: Microsoft Corporation; Date of Mailing: Jan. 9, 2007 (3 pages).
Internet Print Out: "(Electro-Magnetic Resonance) send and position sensing technology," Wacom, Technology, http://www.wacom-components.com/tech.asp, pp. 1-6, Jul. 15, 2002.
Internet Print Out: "Anoto Pen Bluetooth," Tabletpccorner, http://www.tabletpccorner.net, dated Sep. 5, 2003.
Internet Print Out: "Competitive Technologies' Investee Introduces N-Scribe Pen—Digital Ink Presents Wireless Pen At Demo 2001," Competitive Technologies, http://www.competitivetech, dated Sep. 5, 2003.
Internet Print Out: "Cordless Batteryless Pen," Wacom Penabled, Components, http://www.wacom.com/components/index.cfm, dated Jul. 15, 2002.
Internet Print Out: "DataGlyphs®: Embedding Digital Data," Parc Solutions, http://www.parc.com/solutions/dataglyphs/, dated Jul. 15, 2002.
Internet Print Out: "Digital Pens," http://www.anotofunctionality.com/navigate.asp?PageID=96, pp. 1-70, Sep. 26, 2002.
Internet Print Out: "Jot This—Nscribe Pen," PC Magazine, http://www.pcmag.com/article2/0,4149,316500,00.asp, dated Jul. 15, 2002.
Internet Print Out: "Jot This—Nscribe Pen," PC Magazine, http://ww.pcmag.com/article2/0,4149,316500,00.asp, dated Sep. 5, 2003.
Internet Print Out: "Maxell Digital Pen To Use Anoto System," Gizmo, http://www.gizmo.com.au/, dated Sep. 5, 2003.
Internet Print Out: "Mimio—Products," Mimio, http://www.mimio.com, pp. 1-8, Sep. 5, 2003.
Internet Print Out: "N-Scribe For Digital Writing," Flash Commerce News, http://flashcommerce.com/articles/, dated Sep. 5, 2003.
Internet Print Out: "N-Scribe For Digital Writing," Mobileinfo.com, News issue #2001—15 (Apr. 2001), http://www.mobileinfo.com/News_2001/Issue15/Digital-nscribe.htm, dated Jul. 15, 2002.
Internet Print Out: "Navilite—Optical Opportunities—Bluetooth-enabled optical transition measurement technology paves the way for an untethered stylus that can write on any surface," vol. 8, Issue No. 34, Jul. 5-11, 2002. www.computerworld.com, dated Aug. 15, 2002.
Interent Print Out: "OTM Technologies—V Pen," searched http://www.otmtech.com/vpen3.asp, pp. 1-7, Jul. 15, 2002.
Internet Print Out: "PL-500—15.1 inch Screen Digital LCD Pen Tablet System," Wacom Graphics Tablet Solution, http://ap.wacm.co.jp/products/pl/contents/pl500.html, pp. 1-13, 2002.

Internet Print Out: "Preprocessing in the Npen++ System," http://www.is.cs.cmu.edu/mie/multimodal_npen_preproc.html, dated Aug. 8, 2002.

Internet Print Out: "RF Pen Sends Your Scribbles," Appliance Manufacturing Magazine, http://www.ammagazine.com. Dated Sep. 26, 2002.

Internet Print Out: "SMART Board Interactive Whiteboard," Smarttech, http://www.smarttech.com, pp. 1-26, Sep. 5, 2003.

Internet Print Out: "The Hot New Medium: Paper—How The Oldest Interface In The Book is Redrawing The Map Of The Network World," http://www.wired.com/wired/, dated Sep. 5, 2003.

Internet Print Out: "Anoto functionality," News, dated Jul. 15, 2002.

Internet Print Out: "Anoto functionality," Showroom, dated Jul. 15, 2002.

Internet Print Out: "ChatPen CHA-30," Digital Pens, Anoto Functionality, dated Jul. 15, 2002.

Interent Print Out: "Cintiq18SX—A Powerful New Way To Work Directly On The Screen," Wacom Technology, Cintiq-Interactive Pen Display, dated Sep. 5, 2003.

Internet Print Out: "Communicate Digitally With Ordinary Pen and Paper," Anoto Functionality, dated Jul. 15, 2002.

Interent Print Out: "Creating A Global De Facto Standard," Anoto Functionality, dated Jul. 15, 2002.

Internet Print Out: "Daily News," dated Aug. 15, 2002.

Internet Print Out: "Digital Pens and Technical Data," Anoto Functionality, dated Jul. 15, 2002.

Internet Print Out: "Downloads," Anto Functionality, dated Jul. 15, 2002.

Internet Print Out: "Optical Translation Measurement (OTM™)," Technologies, dated, Jul. 15, 2002.

Internet Print Out: "Partners Supporting Anoto Functionality," Anoto Functionality, dated 15, 2002.

Internet Print Out: "Possibilities," Anoto Functionality, dated Jul. 15, 2002.

Internet Print Out: "Product VPen™," OTM Technologies, dated Jul. 15, 2002.

Internet Print Out: "Products—Get Everyone On The Same Page," Mimio, dated Sep. 5, 2003.

Interent Print Out: "Sensor Board and Pen," Wacom, Product, dated Jul. 15, 2002.

Internet Print Out: "The Solution," Anoto Functionality, dated Jul. 15, 2002.

Internet Print Out: "Vision and Mission," Anoto Functionality, dated Jul. 15, 2002.

Internet Print Out: "Wacom Displays Pressure-Sensitive Pen Sensor for Tablet PCs," Wacom, News, dated Jul. 15, 2002.

Internet Print Out: "Welcome To www.anoto.com," Anoto, dated Jul. 15, 2002.

Internet Printout—http://www.anoto.com: Construction, Sep. 5, 2003.

Internet Printout—http://www.anoto.com: Page template, Sep. 5, 2003.

Internet Printout—http://www.anoto.com: Paper and Printing, Sep. 5, 2003.

Internet Printout—http://www.anoto.com: Paper space, Sep. 5, 2003.

Internet Printout—http://www.anoto.com: Pattern, Sep. 5, 2003.

Internet Printout—http://www.anoto.com: Printers supporting Anoto functionality, Sep. 5, 2003.

Internet printout—http://www.anotofunctionality.com: Anoto Functionality—Anoto pattern & digital paper, Sep. 26, 2002.

Internet Printout—http://www.anotofunctionality.com: Anoto Functionality—Anoto pattern & digital paper, Sep. 5, 2003.

Internet Printout—http://www.anotofunctionality.com: Anoto Functionality—Applications, Sep. 5, 2003.

Internet Printout—http://www.anotofunctionality.com: Anoto Functionality—Corporate applications, Sep. 5, 2003.

Internet Printout—http://www.anotofunctionality.com: Anoto Functionality—Digital notes, Sep. 5, 2003.

Internet Printout—http://www.anotofunctionality.com: Anoto Functionality—Digital paper, Sep. 26, 2002.

Internet Printout—http://www.anotofunctionality.com: Anoto Functionality—Digital paper, Sep. 5, 2003.

Internet Printout—http://www.anotofunctionality.com: Anoto Functionality—Digital pens Use with mobile phones, Sep. 5, 2003.

Internet Printout—http://www.anotofunctionality.com: Anoto Functionality—Digital Pens Use with personal computers, Sep. 26, 2002.

Internet Printout—http://www.anotofunctionality.com: Anoto Functionality—Digital Pens, Sep. 26, 2002.

Internet Printout—http://www.anotofunctionality.com: Anoto Functionality—Digital pens, Sep. 5, 2003.

Internet Printout—http://www.anotofunctionality.com: Anoto Functionality—Digital service, Sep. 26, 2002.

Internet Printout—http://www.anotofunctionality.com: Anoto Functionality—Digital service, Sep. 5, 2003.

Internet Printout—http://www.anotofunctionality.com: Anoto Functionality—E-mail, Sep. 5, 2003.

Internet Printout—http://www.anotofunctionality.com: Anoto Functionality—Fax, Sep. 5, 2003.

Internet Printout—http://www.anotofunctionality.com: Anoto Functionality—Freedom of expression, Sep. 26, 2002.

Internet Printout—http://www.anotofunctionality.com: Anoto Functionality—Graphical SMS, Sep. 5, 2003.

Internet Printout—http://www.anotofunctionality.com: Anoto Functionality—Hints & tips Using your digital paper, Sep. 5, 2003.

Internet Printout—http://www.anotofunctionality.com: Anoto Functionality—Hints & tips Using your digital pen, Sep. 5, 2003.

Internet Printout—http://www.anotofunctionality.com: Anoto Functionality—Hints & tips Using Your Digital Service, Sep. 5, 2003.

Internet Printout—http://www.anotofunctionality.com: Anoto Functionality—Hints & tips, Sep. 5, 2003.

Internet Printout—http://www.anotofunctionality.com: Anoto Functionality—How does it work?, Sep. 26, 2002.

Internet Printout—http://www.anotofunctionality.com: Anoto Functionality—Security, Sep. 5, 2003.

Internet Printout—http://anotofunctionality.com: Anoto Functionality—Software and additionals, Sep. 5, 2003.

Internet Printout—http://www.anotofunctionality.com: Anoto Functionality—What is Anoto functionality?, Sep. 5, 2003.

Internet Printout—http://www.anotofunctionality.com: Anoto Functionality—You to an Organization, Sep. 26, 2002.

Internet Printout—http://www.anotofunctionality.com: Anoto Functionality—You to someone else, Sep. 26, 2002.

Internet printout—http://www.anotofunctionality.com: Anoto Functionality—You to yourself, Sep. 26, 2002.

Internet Printout—http://www.anotofunctionality.com: Anoto® functionality brings digital life to paper products, Sep. 5, 2003.

Internet Printout—http://www.edgereview.com: The Edge—First Look: Digital Ink n-scribe, Sep. 5, 2003.

Internet Printout—http://www.flashcommerce.com: n-scribe For Digital Writing, Sep. 5, 2003.

Internet Printout—http://www.gizmo.com: Maxell Digital Pen to use Anoto system, Sep. 5, 2003.

Internet Printout—http://www.is.cs.cmu.edu: Final input representation, Aug. 8, 2002.

Internet Printout—http://www.is.cs.cmu.edu: Npen++, Aug. 8, 2002.

Internet Printout—http://www.mimio.com: Capture, Save and Share, Sep. 5, 2003.

Internet Printout—http://www.mimio.com: Mimio technology, Sep. 5, 2003.

Internet Printout—http://www.mimio.com: Turn your whiteboard into an Interactive whiteboard, Sep. 5, 2003.

Internet Printout—http://www.pcmag.com: Jot This, Sep. 5, 2003.

Internet Printout—http://www.smarttech.com: Carnegie Mellon research ranks the SMART Board™ interactive whiteboard as fastest, most accurate way to interact with projected information, Sep. 5, 2003.

Internet Printout—http://www.smarttech.com: SMART Board Interactive Whiteboard—Front Projection Features, Sep. 5, 2003.

Internet Printout—http://www.smarttech.com: SMART Board Interactive Whiteboard—Q&A, Sep. 5, 2003.

Internet Printout—http://www.smarttech.com: SMART Board Interactive Whiteboard, Sep. 5, 2003.

Internet Printout—http://www.smarttech.com: SMART Camfire™, whiteboard camera system effortlessly saves dry-erase whiteboard notes, Sep. 5, 2003.

Internet Printout—http://www.smarttech.com: SMART Technologies Inc. awarded another U.S. patent for touch sensitive SMART Board™ technology, Sep. 5, 2003.

Internet Printout—http://www.smarttech.com: SMART Technologies, Inc. Press Releases, Sep. 5, 2003.

Internet Printout—http://www.smarttech.com: SMART Technologies, Inc., New annotation and software functionality on all SMART Board™ Interactive Whiteboards, Sep. 5, 2003.

Internet Printout—http://www.smarttech.com: What's New, Sep. 5, 2003.

Internet Printout—http://www.smarttech.com: Press Releases—SMART launches Research Assistance Program, Sep. 5, 2003.

Internet Printout—http://www.smarttech.com: SMART Board Interactive Whiteboard Profiles—Sep. 5, 2003.

Internet Printout—http://www.smarttech.com: SMART Board Software Features—Sep. 5, 2003.

Internet Printout—http://www.tabletpccorner.com: Anoto Pen Bluetooth, Sep. 5, 2003.

Internet Printout—http://www.techtv.com: Nscribe Pen and Presenter-to-Go, Sep. 5, 2003.

Internet Printout—http://www.wacom.com: Cintiq—Interactive Pen Display, Sep. 5, 2003.

Internet Printout—http://www.wacom.com: Graphire2—Have more fun with digital phones, Sep. 5, 2003.

Internet Printout—http://www.wacom.com: Intuos2—The Professional Tablet, Sep. 5, 2003.

Internet Printout—http://www.wacom.com: intuos2, Sep. 5, 2003.

Internet Printout—http://www.wacom.com: Penabled Wacom, Sep. 5, 2003.

Internet Printout—http://www.wacom.com: tablet PC, Sep. 5, 2003.

Internet Printout—http://www.wired.com: The Hot New Medium: Paper, Sep. 5, 2003.

Jelinek, Frederic, "Statistical Methods for Speech Recognition," The MIT Press, pp. 1-283, 2001.

Ko et al., "Finger Mouse and Gesture Recognition System As A New Human Computer Interface," Computer and Graphics, col. 21, No. 5, pp. 555-561, 1997.

Lau, R., "Adaptive Statistical Language Modeling," Submitted to the Dept. of Electrical Engineering and Computer Science in Partial Fulfillment for the Degree of Master of Science at the MIT, May 1994.

Lee, Kai-Fu, "Automatic Speech Recognition—The Development of the SPHINX System," Kluwer Academic Publishers, pp. 1-207, 1992.

Louderback, Jim, "Nscribe pen And Presenter-To-Go—Infrared Pen And New Springboard Module Make Their Debut At Demo 2001," Edgereview.com,http://www.techtv.com/freshgear.pr, dated Sep. 5, 2003.

Moran, et al., "Design and Technology for Collaborage: Collaborative Collages of Information on Physical Walls," Nov. 1999.

Nathan, K.S. et al., "On-Line Handwriting Recognition Using Continuous Parameter Hidden Markov Models," 1993 IEEE.

Okad, et al. "A Method for Document Digitizer by Real Time Assembling of Mosaic Pictures," Scripta Publishing Co., Systems, Computers, Controls, vol. 13, No. 5, Sep. 1982, pp. 74-80.

Okada et al., "A High-Resoultion Handwriting Character Input Device Using Laser Beams," Department of Instrumentation Engineering, Faculty of Science and Technology, vol. 10.4, No. 11.1, 1981.

Otsu, Nobuyuki, "A Threshold Selection Method From Gray-Level Histogram," IEEE Transactions on Systems, Man, And Cybemetics; Jan. 1979, vol. SMC-9, No. 1, pp. 62-66.

Pursley, M. et al., "Numerical Evaluation of Correlation Parameters for Optimal Phrases of Binar Register Sequences," Communications, IEEE Transactions on Oct. 1979, vol. 27, Issue 10, Part 1, pp. 1597-1604.

Reynaerts, D. et al., "Design of an advanced computer writing tool," Micro Machine and Human Science, 1995, Proceedings of the Sixth International Symposium, Nagoya, Japan, Oct. 4-6, 1995, pp. 229-234.

Sato et al., "Novel device for Inputting Handwriting Trajectory," Ricoh Technical Report No. 27, Nov. 2001, pp. 52-59, http://www.rich.co.jp/rdc/techreport/No27/Ronbun/A2707.pdf.

Sato et al., "Video Tablet—2D Coordinate Input Device With OCD Camera," Osaka University, vol. J67-D, No. 6, Jun. 1984.

Shum, Heung-Yeung, et al., "Panoramic Image Mosaics," Microsoft Research Technical Report MSR-TR-97-23, 1997, 53 pages.

Urbanski, Brian, "Don't Break This Ink Pen," Edgereview.com, http://www.edgereview.com/ataglance.cfm?category=edge&ID=180, dated Jul. 15, 2002.

Urbanski, Brian, "Don't Break This Ink Pen," Edgereview.com, http://www.edgereview.com/ataglance.cfm?category=edge&ID=180, dated Sep. 5, 2003.

* cited by examiner

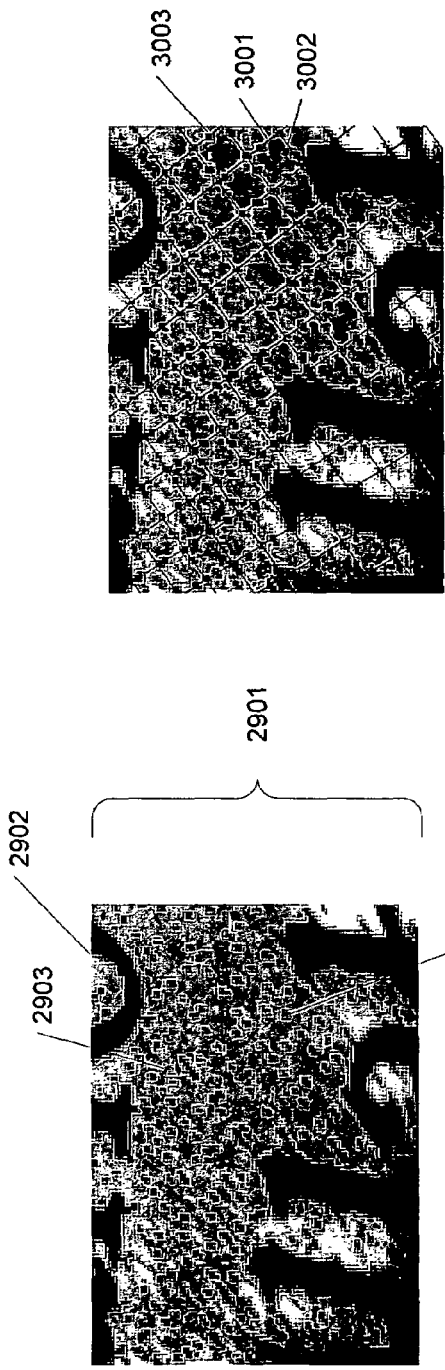
Figure 29
Figure 30
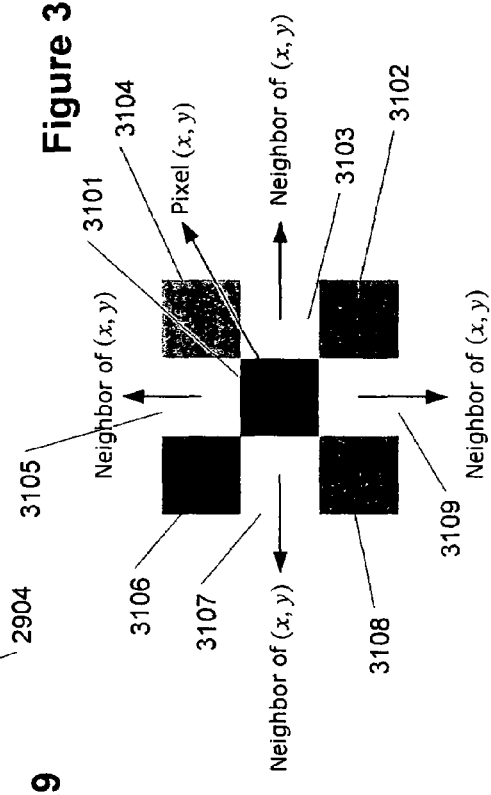
Figure 31

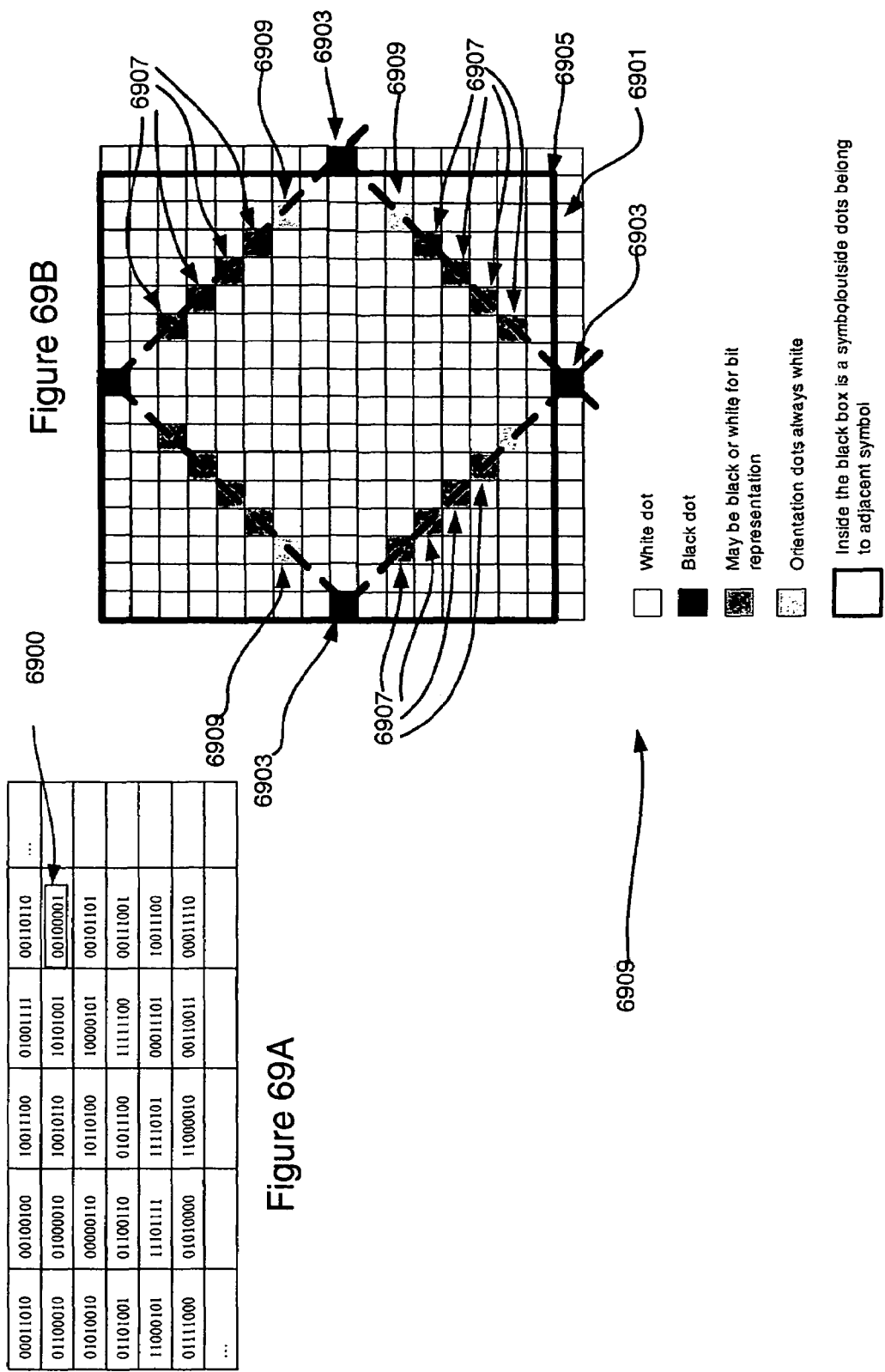

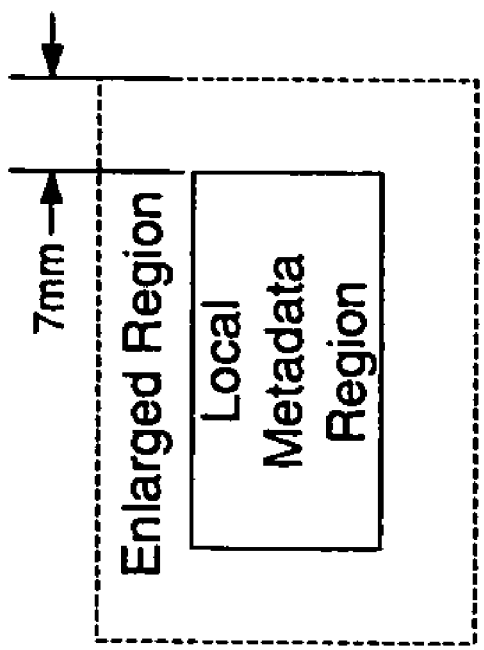
Figure 77

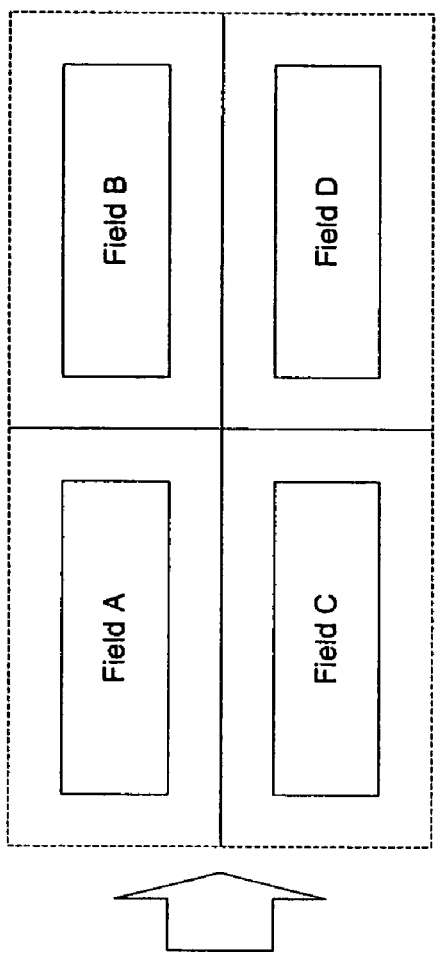
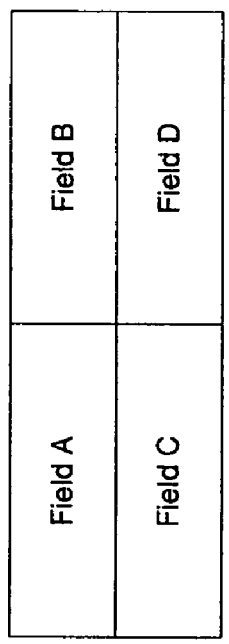
Figure 79

| Maximum Factor | Available m-array Order |
|---|---|
| $<10^2$ | 4,6,8,10,11,12,18,20 |
| $<10^3$ | 14,15,16,21,22,24,28,30,36,48 |
| $<10^4$ | 25,26,29,44,50,52,60 |
| $<10^5$ | 32,40,42,45,72,84 |
| $<10^8$ | 33,34,35,38,39,43,46,47,51,54,55,56,57,58,63 |

Figure 98

STROKE LOCALIZATION AND BINDING TO ELECTRONIC DOCUMENT

BACKGROUND OF THE INVENTION

1. Technical Field

Aspects of the present invention relate to data capturing. More particularly, aspects of the invention relate to capturing information and associating it with a document.

2. Description of Related Art

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user.

One technology that can help users is an image-capturing pen, where the pen attempts to determine the location of the pen's tip based on a captured image. Current systems do not adequately associate a captured stroke with an electronic version of a document.

BRIEF SUMMARY OF THE INVENTION

Aspects of the invention address one or more problems described above, thereby providing an improved association between a captured stroke and an electronic document.

BRIEF DESCRIPTION OF THE DRAWINGS

Aspects of the present invention are illustrated by way of example and not limited in the accompanying figures in which like reference numerals indicate similar elements.

FIG. 29 shows a normalized image with a pattern mask and document content mask applied in accordance with aspects of the present invention.

FIG. 30 shows effective embedded interaction code symbols in accordance with aspects of the present invention.

FIG. 31 shows neighboring pixels in accordance with aspects of the present invention.

FIGS. 77-79 show techniques for storing metadata in accordance with aspects of the present invention.

FIG. 98 is a table that shows available m-array order classification results based on various maximum factors for an m-array of order from 2 to 127.

DETAILED DESCRIPTION OF THE INVENTION

Aspects of the present invention relate to associating (or binding) a stroke performed by a camera-enabled pen with a document.

It is noted that various connections are set forth between elements in the following description. It is noted that these connections in general and, unless specified otherwise, may be direct or indirect and that this specification is not intended to be limiting in this respect.

The following description is divided into sections to assist the reader.

Figure 1:
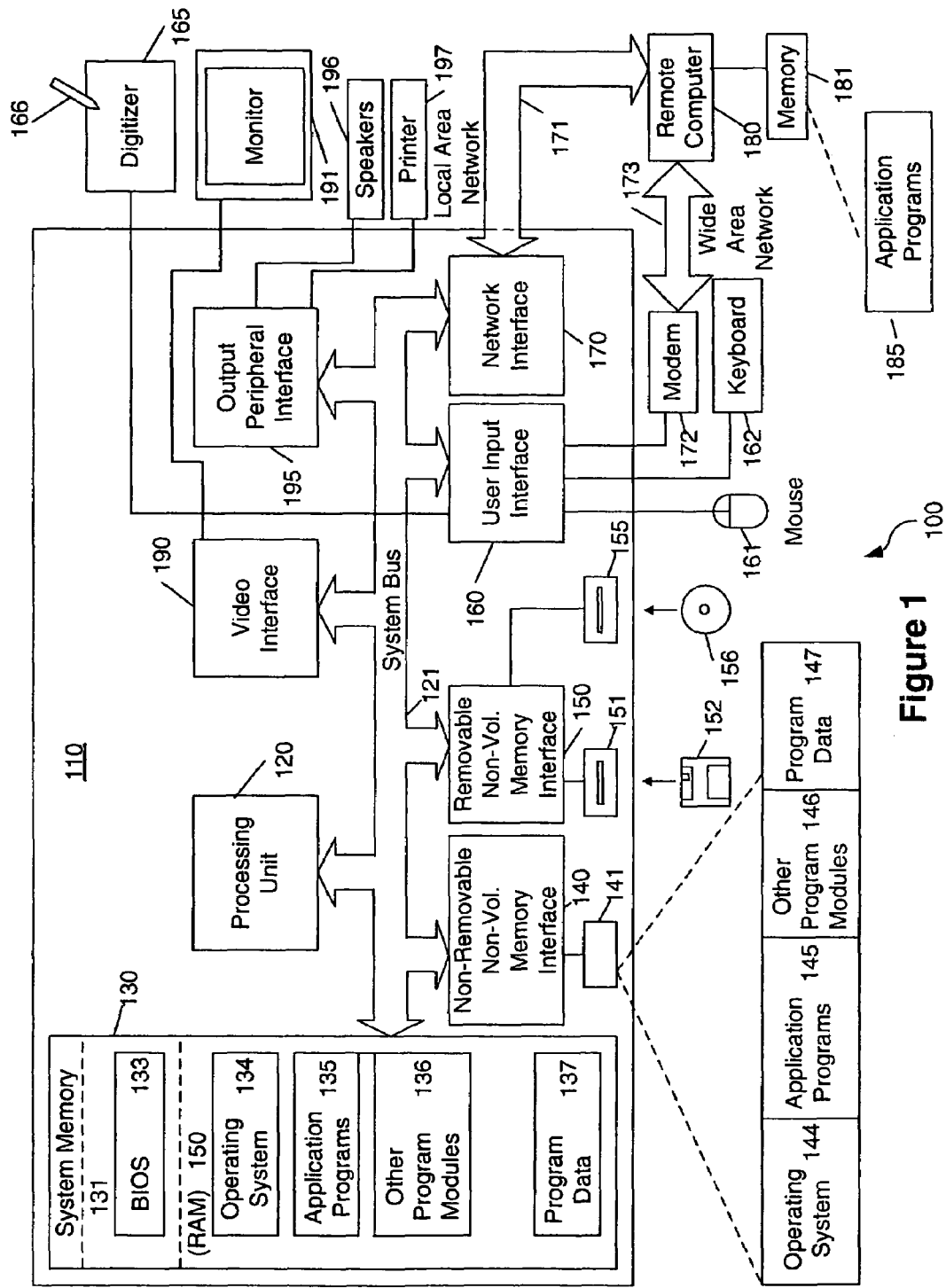
FIG. 1 shows a general-purpose computing environment that may support aspects of the present invention.

Terms
Pen Any writing implement that may or may not include the ability to store ink. In some examples, a stylus with no ink capability may be used as a pen in accordance with embodiments of the present invention Camera An image capture system that may capture an image from paper, a computer display, or any other medium EIC Symbol The EIC symbol array is formed by EIC symbols in place of the bits of Array the m-array representing X, Y position. Represents the physical space covered by the m-array representing X, Y position. EIC symbol array can be allocated to pages of a document Stroke An action made by the pen on a document or surface contain the EIC symbol array, where the array is captured by the camera during the performance of the action Grid The grid is a set of lines formed by EIC dots in EIC symbol array Perspective A perspective transform is a planar transform that is a perspective Transform projection. With a perspective transform, a line is still a line. Parallel lines may not be parallel anymore. Instead, they may appear to converge to a vanishing point Homography A homography matrix is a matrix that defines a spatial transformation Matrix from one space plane to another. EIC pattern analysis obtains a homography matrix describing the perspective transform from grid to image. Input of EIC pattern analysis is normalized image and effective EIC pattern mask. Output is a homography matrix that describes the perspective transform from grid to image. Grid lines in image are obtained. Grid cells thus obtained are referred to as effective EIC symbols General-Purpose Computing Environment FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form. The displayed form may be printed paper (or other physical medium) or may be a display projecting the encoded data stream in conjunction with another image or set of images. For example, the encoded data stream may be represented as a physical encoded image on the paper or an encoded image overlying the displayed image or may be a physical encoded image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing the location of the camera, the system can track movement of the stylus being controlled by the user.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 is 32×32 pixels (where N=32). Accordingly, FIG. 2B shows a field of view of 32 pixels long by 32 pixels wide. The size of N is adjustable based on the degree of image resolution desired. Also, while the field of view of the camera 203 is shown as a square for illustrative purposes here, the field of view may include other shapes as is known in the art.

The input to the pen 201 from the camera 203 may be defined as a sequence of image frames $\{I_i\}$, i=1, 2, ..., A, where Ii is captured by the pen 201 at sampling time ti. The selection of sampling rate is due to the maximum motion frequency of pen tip, which may be the same as the frequency of the hand when one writes. The frequency is known as to be from 0 up to 20 Hz. By the Nyquist-Shannon sampling theorem, the minimum sampling rate should be 40 Hz, typically 100 Hz. In one example, the sampling rate is 110 Hz. The size of the captured image frame may be large or small, depending on the size of the document and the degree of exactness required. Also, the camera image size may be determined based on the size of the document to be searched.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211. Because the transformation from the location of the virtual pen tip 212 (represented by $L_{virtual-pentip}$) to the location of the real pen tip 202 (represented by $L_{pentip}$) one can determine the location of the real pen tip in relation to a captured image 210.

The following transformation $F_{S \to P}$ transforms the image captured by camera to the real image on the paper:

$$L_{paper} = F_{S \to P}(L_{Sensor})$$

During writing, the pen tip and the paper are on the same plane. Accordingly, the transformation from the virtual pen tip to the real pen tip is also $F_{S \to P}$:

$$L_{pentip} = F_{S \to P}(L_{virtual-pentip}).$$

The transformation $F_{S \to P}$ may be referred to as a perspective transformation, which approximates $F_{S \to P}$ as:

$$F'_{S \to P} \begin{Bmatrix} s_x \cos\theta, & s_y \sin\theta, & 0 \\ -s_x \sin\theta, & s_y \cos\theta, & 0 \\ 0, & 0, & 1 \end{Bmatrix},$$

in which $\theta$, $s_x$, and $s_y$ are the rotation and scale of two orientations of the pattern captured at location 204. Further, one can refine $F'_{S \to P}$ to $F_{S \to P}$ by matching the captured image with the corresponding background image on paper. "Refine" means to get a more precise perspective matrix $F_{S \to P}$ (8 parameters) by a kind of optimization algorithm referred to as a recursive method. The recursive method treats the matrix $F'_{S \to P}$ as the initial value. $F_{S \to P}$ describes the transformation between S and P more precisely than $F'_{S \to P}$.

Next, one can determine the location of virtual pen tip by calibration.

One places the pen tip 202 on a known location $L_{pentip}$ on paper. Next, one tilts the pen, allowing the camera 203 to capture a series of images with different pen poses. For each image captured, one may receive the transform $F_{S \to P}$. From this transform, one can obtain the location of the virtual image of pen tip $L_{virtual-pentip}$:

$$L_{virtual-pentip} = F_{P \to S}(L_{pentip}),$$

and, $$F_{P \to S} = [F_{S \to P}]^{-1}.$$

By averaging the $L_{virtual-pentip}$ received from every image, an accurate location of the virtual pen tip $L_{virtual-pentip}$ may be determined.

The location of the virtual pen tip $L_{virtual-pentip}$ is now known. One can also obtain the transformation $F_{S \to P}$ from image captured. Finally, one can use this information to determine the location of the real pen tip $L_{pentip}$:

$$L_{pentip} = F_{S \to P}(L_{virtual-pentip}).$$

Overview

Aspects of the invention relate to an architecture for associating a captured stroke and binding it to an electronic version of a document. While a user performs a stroke (or action) using a pen, a camera on the pen captures a location of the pen in relation to a surface. The surface may include codes that permit a computer to determine where the pen is in relation to the surface. The surface may include a computer monitor, printed document, and the like.

Aspects of the invention include processing a pattern in a captured image, decoding symbols extracted from the captured image and determining a location of a point in the stroke, and transforming the location with other locations to a stroke of information. The stroke is then associated with an electronic document.

Figure 3:
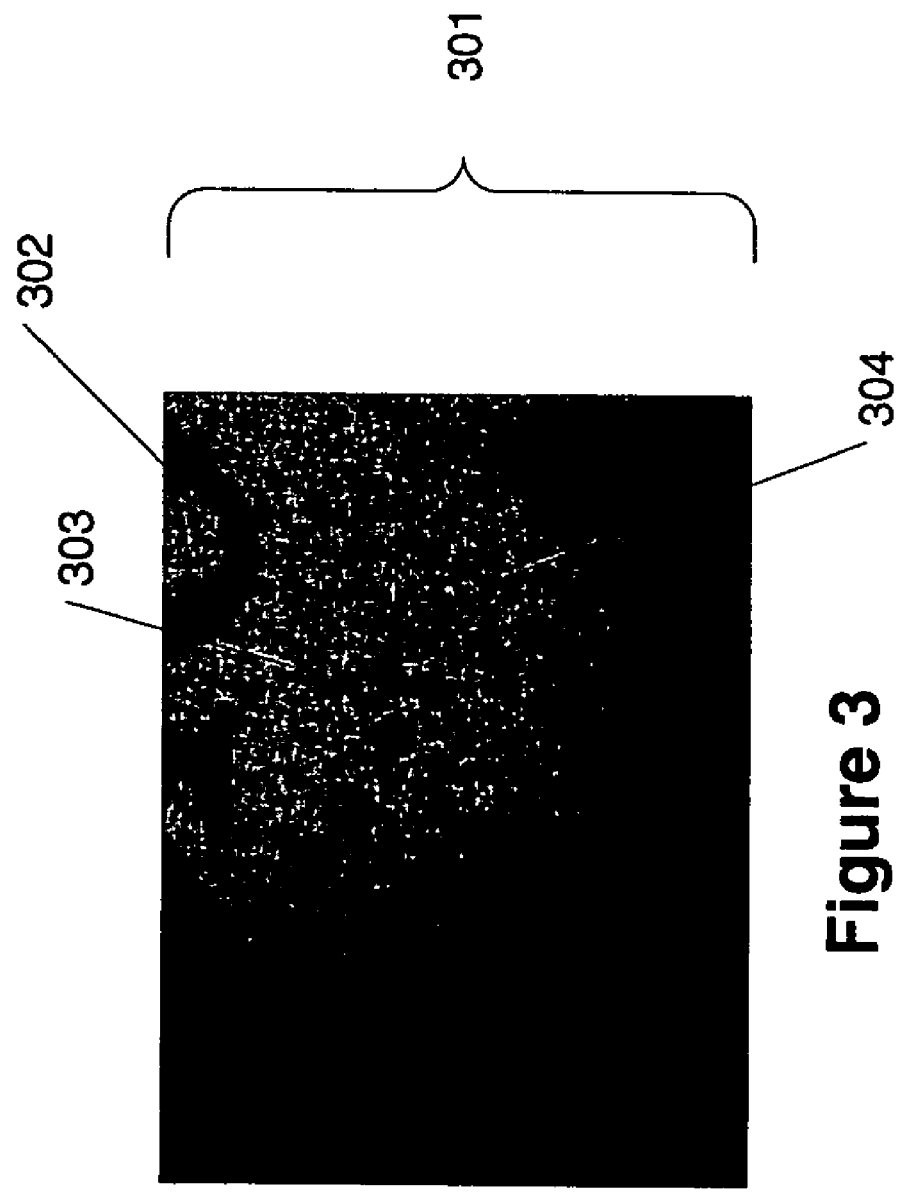
FIG. 3 shows an illustrative image captured by a camera associate with a pen in accordance with aspects of the present invention.

Most pens use ink. Some pens also include a camera to capture an image. The image may be used to determine the location of the pen tip. In accordance with aspects of the present invention, some systems can determine the location of the pen tip based on embedded codes that are captured by the camera. FIG. 3 shows an image 301 captured by a pen.

Different embedded codes may be used. For instance, codes comprising a combination of dots arranged along a grid may be used. Alternatively, a maze of perpendicular lines may form the embedded interaction codes. As shown in FIG. 3, image 301 includes blank areas 303 and EIC dots or lines or other shapes (referred to generally as "elements") 304. The EIC elements may or may not be captured with existing symbols, letters, or other information 302.

Figure 4:
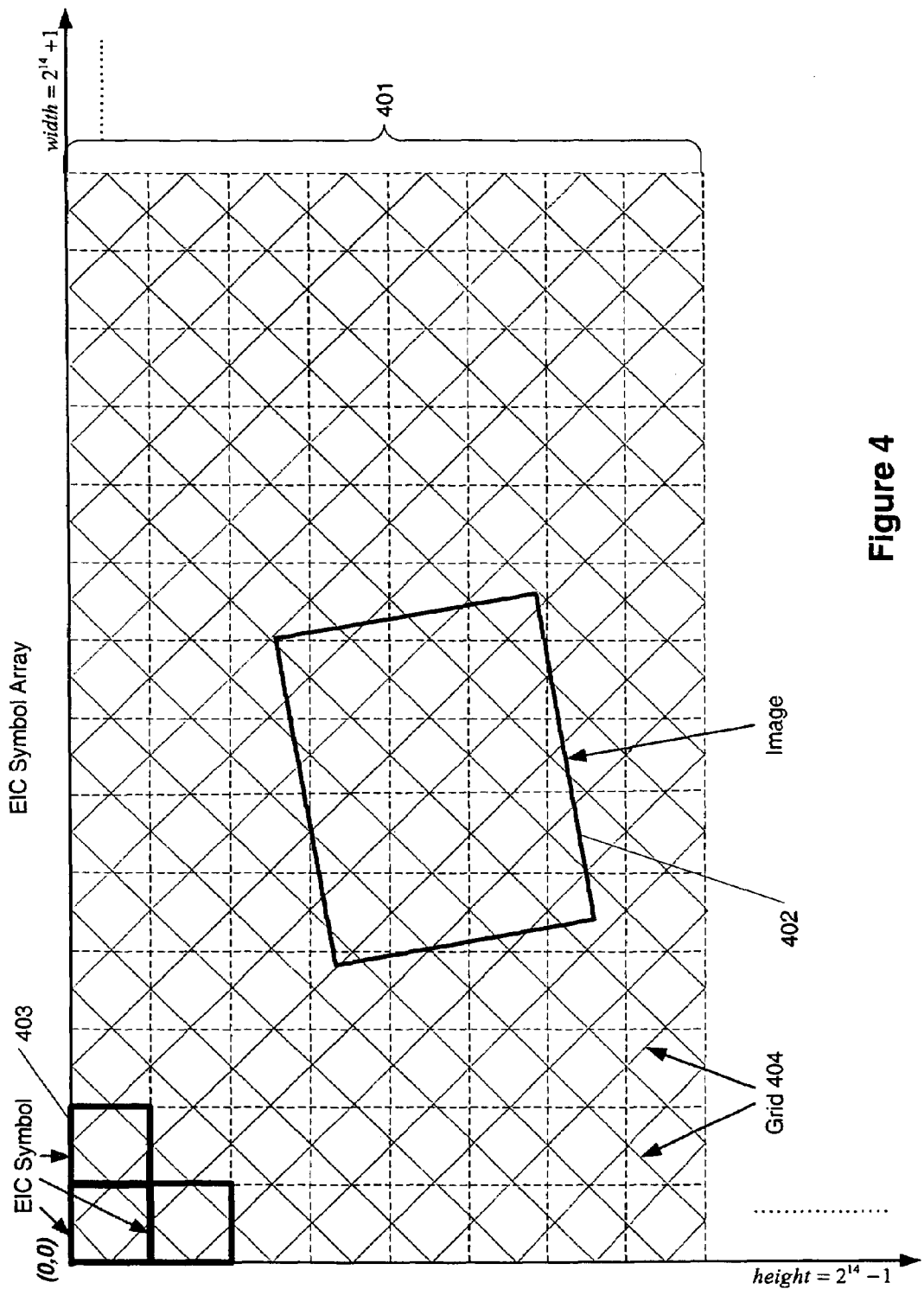
FIGS. 4-6 show arrays of embedded interaction codes in accordance with aspects of the present invention.

In the illustrative examples shown herein, the EIC elements lie on grid lines in EIC symbol array. FIG. 4 shows an array 401 of EIC elements arranged into symbols 403 that have the EIC elements located on gridlines 404. An image 402 is captured by a camera from FIG. 2. The EIC symbols 403 images of EIC dots can be analyzed to find the corresponding grid lines 404 in image 402. If the grid lines 404 in the image 402 are found, the corresponding EIC symbols 403 can be identified and the image 402 located within array 401. Here, array 401 is shown with a height of $2^{14}-1$ and a width of $2^{14}+1$. The size of the array can vary, of course, and the resulting information provided in each EIC symbol 403 (where the smaller the array, the less information needed in EIC symbols to locate the image 402 in the array 401).

An m-array may be used to represent X, Y position in an array and multiple m-arrays may be used to represent metadata. These multiple m-arrays may be encoded in EIC symbols. In each EIC symbol, one bit from each m-array may be encoded. EIC symbols in place of the bits of the m-array representing X, Y position form an EIC symbol array (visually, the tiling of EIC symbols forms the EIC pattern). FIG. 4 shows an EIC symbol array 401 (of EIC symbol 8-a-16, in an m-array with the order of 28).

Figure 2:
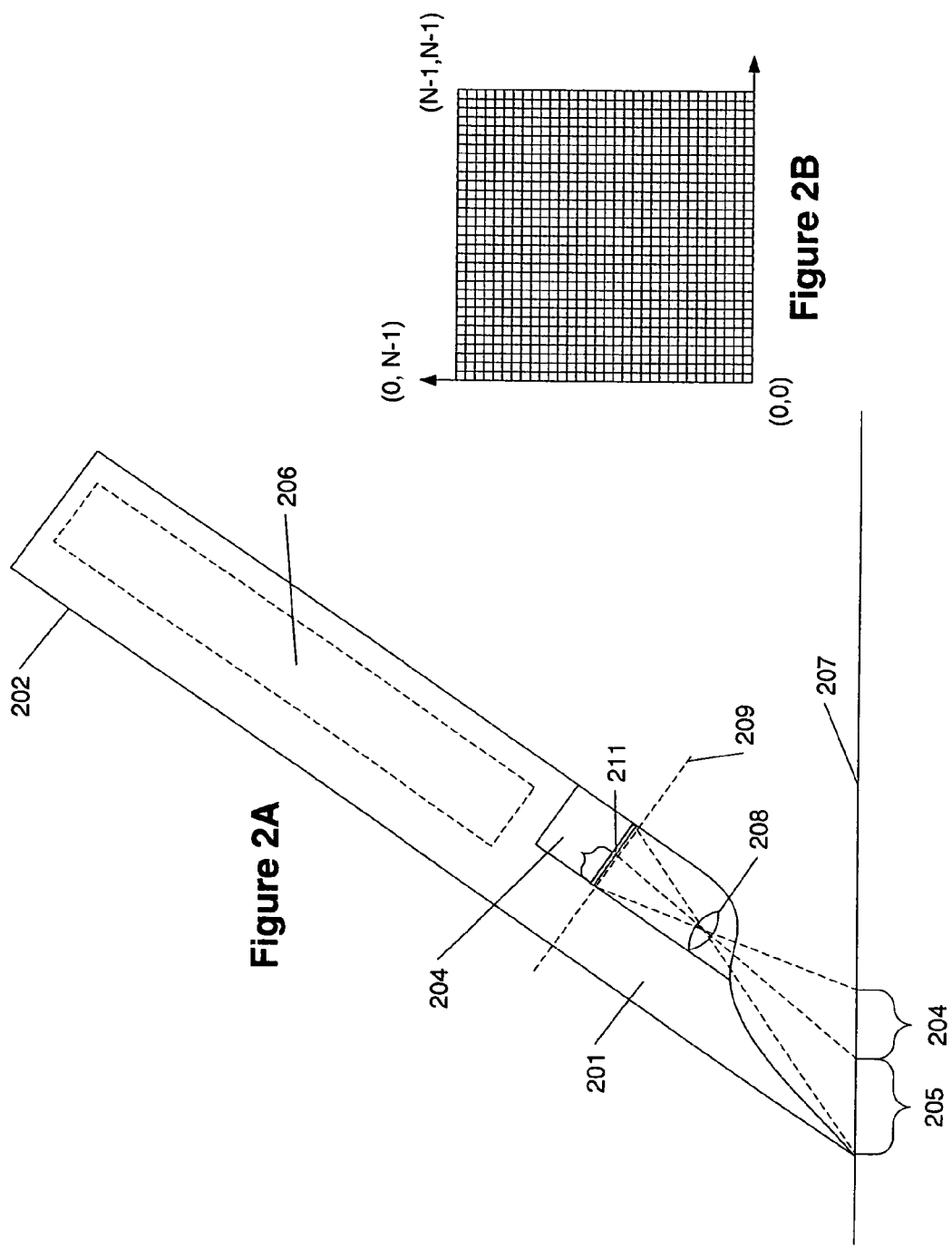
FIGS. 2A and 2B show an image-capturing pen and a grid in accordance with aspects of the present invention.

EIC pattern analysis includes two main steps. First, images may be processed to improve contrast or other preprocessing. Next, features of an effective EIC pattern in the image are analyzed. A digital pen as shown in FIG. 2 may be used. The pen is assumed to capture images from a plane. The spatial transform converts the plane to a resulting image (which is also assumed to be a plane). This transformation may be a perspective transform. Here, an effective EIC pattern in image is expected to lie on grid lines 404 that are a perspective transform of the grid lines in EIC symbol array. The perspective transform is first assumed to be an affine transform (i.e. evenly spaced parallel lines are kept evenly spaced and parallel, but perpendicular lines may not be perpendicular anymore). Rotation, scale and translation of the affine transform are estimated from analyzing effective EIC pattern in image.

The perspective transform can then be obtained by fitting an effective EIC pattern to affine transformed grid lines. A homography matrix that describes the perspective transform from grid lines in EIC symbol array to image, $H_{Grid \rightarrow Image}$, is obtained.

One can consider the EIC symbol array as being a large map, covering all pages of a digital document. When digital pen is used to write on these pages, a small segment of EIC symbol array is captured in an image taken by the pen (such as the image shown in FIG. 4). Locating a position of the pen thus becomes finding the position of the segment (of EIC symbol array) captured in image within EIC symbol array.

This can be done by analyzing each image obtained. FIG. 3 shows an example image captured by digital pen. As can be seen, images of EIC pattern, or more specifically, images of EIC dots are captured. Since EIC dots can lie on grid lines in EIC symbol array (the diagonal lines shown in FIG. 4), images of EIC dots can be analyzed to find the corresponding grid lines in image. If the grid lines in image are found, corresponding EIC symbols can be identified.

As can be seen from FIG. 3, image processing has several challenges, including, for example, uneven illumination, EIC pattern occlusion by document content, rotation and distortion due to pen rotation and tilting, and so on.

Images are therefore can be first normalized for illumination. Then, images of EIC dots, referred to as effective EIC pattern, and images of document content are identified. An effective EIC pattern mask and a document content mask can specify which regions of normalized image are effective EIC pattern and which regions are document content.

Once the grid lines are determined, black dots on the grid lines are identified. Positions of the black dots help to determine which grid cells correspond to EIC symbols and which direction is the correct orientation of EIC symbols.

Figure 5:
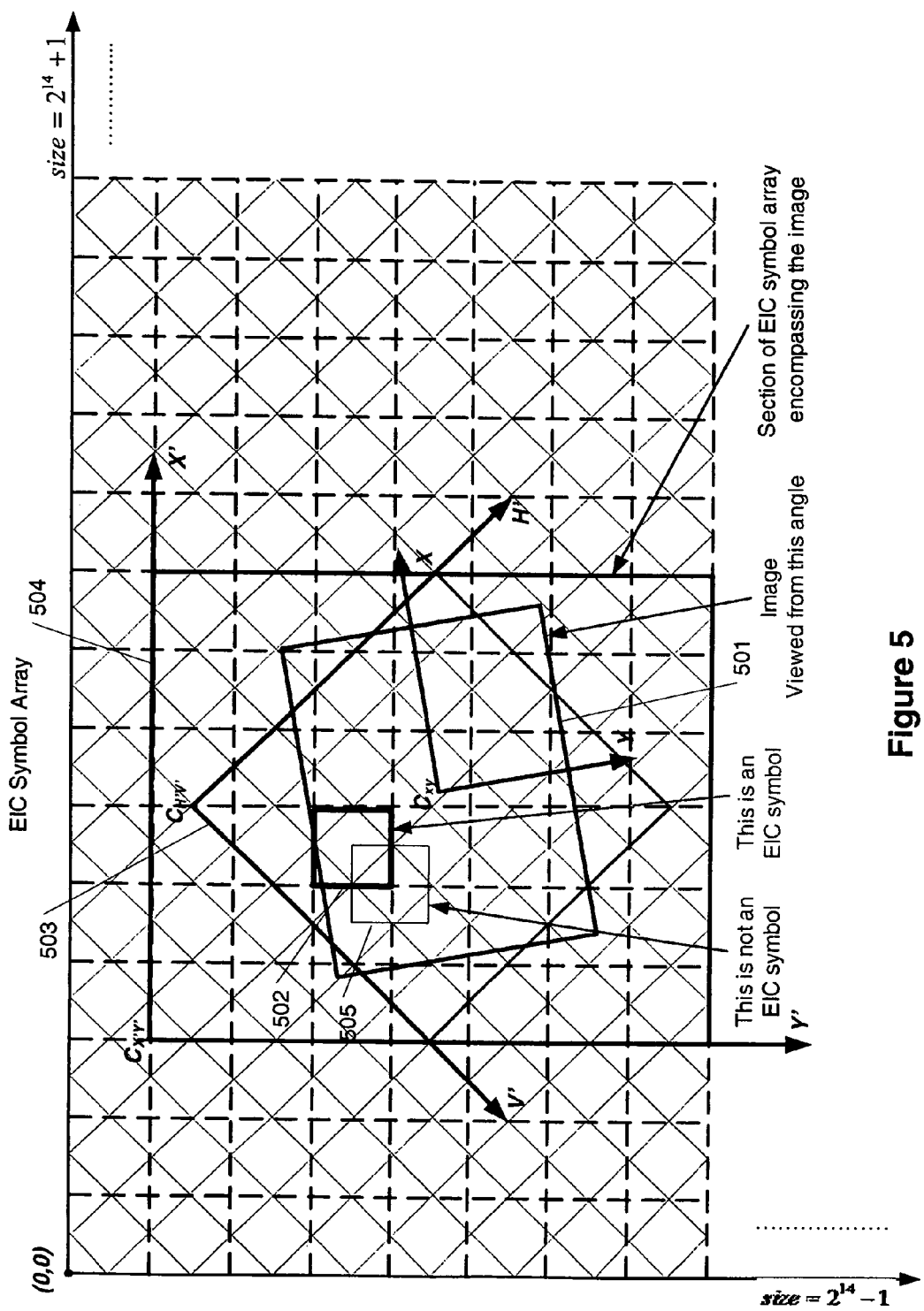

The grid cells formed by grid lines may or may not correspond to EIC symbols. As can be seen in FIG. 4, grid cells within black squares correspond to EIC symbols, whereas grid cells in between rows of symbols do not correspond to EIC symbols. This is more clearly illustrated in FIG. 5. In FIG. 5, the grid cell in the square 502 is a symbol, whereas the grid cell in square 505 is not a symbol. Therefore, which grid cells in image correspond to EIC symbols needs to be determined.

It is also important to determine the correct orientation of EIC symbols. EIC symbols captured in image may be rotated due to pen rotation. Only when EIC symbols are at the correct orientation (i.e. oriented the same as EIC symbols in EIC symbol array), the segment of EIC symbols captured in image can be matched against EIC symbol array, i.e. bits extracted from EIC symbols can be matched against the m-array.

Once one knows which grid cells correspond to EIC symbols and the correct orientation of the symbols, the EIC symbols captured in an image can be recognized. One can then consider a large enough section of the EIC symbol array that encompasses all the grid lines and corresponding EIC symbols of the image. See FIG. 5.

In FIG. 5, X, Y is the coordinate system of the image, with the image center as the origin, and pixels as the unit of measure. The X, Y coordinate system is determined in relation to the image, i.e. facing the image, X is always left to right and Y is always top to bottom.

H', V' is the coordinate system of the grid, with the top (relative to image) intersection point of the farthest grid lines in image, $C_{H'V'}$, as the origin, and grid cells as the unit of measure. The H', V' coordinate system is determined in relation to the image. The rotation angle from X to H' is always smaller than that from X to V', and all intersections of grid lines in image have non-negative coordinates in the H', V' coordinate system.

Note that what is depicted inside the image in FIG. 5 should not be thought of as what a real image may look like. Grid lines are not seen in image. But if one assumes a perspective transform from paper to image, the effective EIC pattern in image may appear to lie on grid lines that are a perspective transform of the grid lines in EIC symbol array (the dark green lines). Therefore, one can draw grid lines in image and the H', V' coordinate system based on a perspective transform of the grid lines in EIC symbol array.

X', Y' is the coordinate system of the section of EIC symbol array encompassing all the grid lines and corresponding EIC symbols of the image, with the top-left corner of the section, $C_{X'Y'}$, as the origin, and EIC symbols as the unit of measure. Note that X', Y' is always in the direction of EIC symbol array, and the origin is always at the top-left corner of a symbol.

Figure 6:
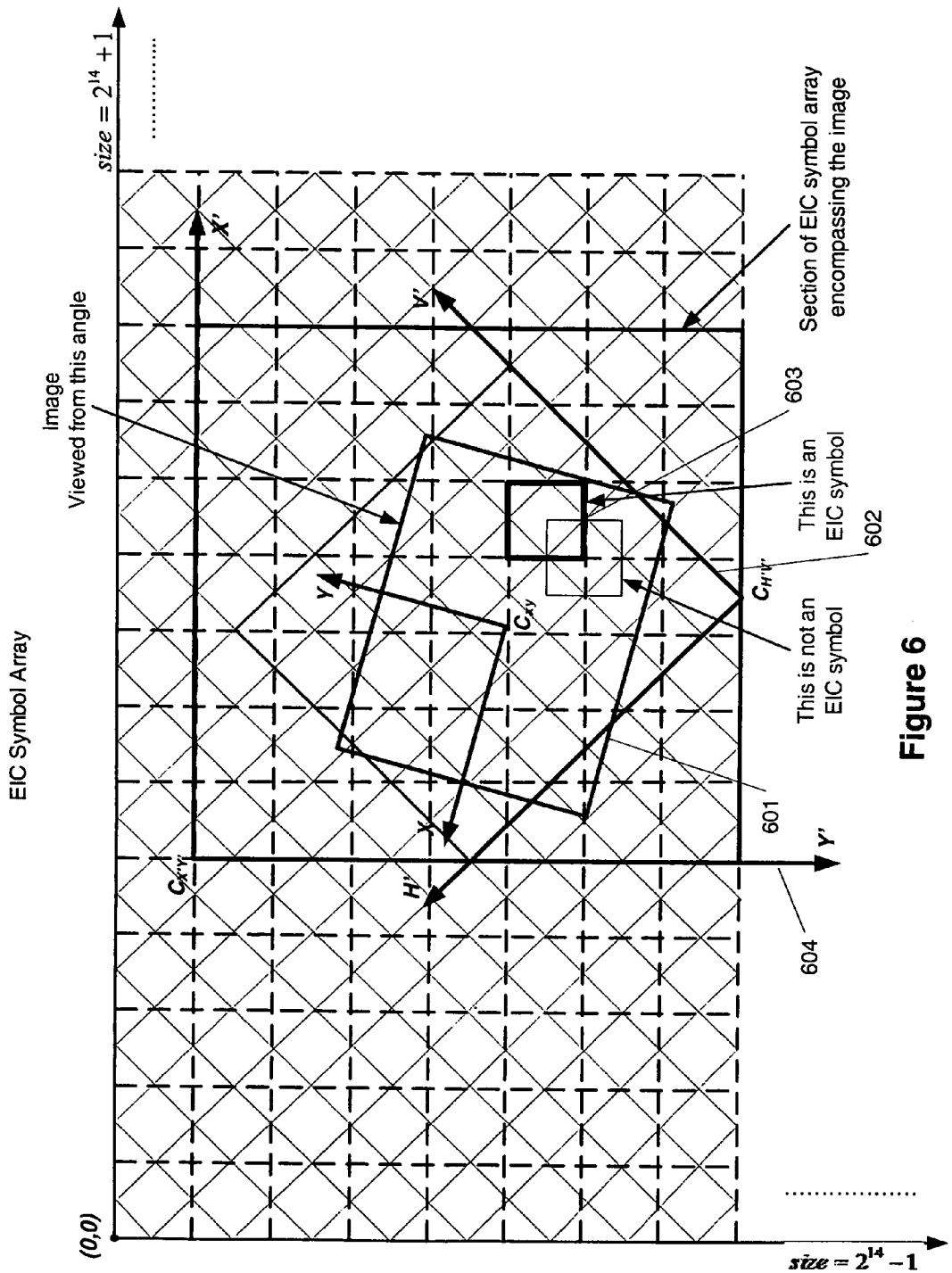

FIG. 6 shows the three coordinate systems of another image (which may be thought of as taken after the pen is moved and rotated) with image capture area 601, the coordinate axes 602 of the H',V' coordinate system, an symbol 603, and the coordinate axes X',Y' 604. The coordinate systems of X, Y and H', V' stay in relation to the image. The coordinate system of X', Y' is in the direction of EIC symbol array. Therefore, the rotation from H', V' to X', Y' now is $$\frac{3\pi}{4},$$

whereas it was $$-\frac{\pi}{4}$$

in FIG. 4.

Given a particular EIC symbol design, and the identified correct orientation of EIC symbols in an image, a transformation from the section of EIC symbol array (that encompasses all the grid lines and corresponding EIC symbols of the image) to grid, i.e. from X', Y' to H', V', can be obtained. For example, with EIC symbol 8-a-16, the scale from the unit of measure in H', V' to that of X', Y' is $\sqrt{2}$, and the rotation from H', V' to X', Y' may be $$-\frac{\pi}{4},$$
$$\frac{\pi}{4},$$
$$\frac{3\pi}{4},$$

or $$\frac{5\pi}{4},$$

depending on the correct orientation of EIC symbols in image (FIG. 3 and FIG. 4 show two of these situations). Let's call the homography matrix describing the transformation from X', Y' to H', V' $H_{Symbol \rightarrow Grid}$.

From a previous step, a homography matrix describing the perspective transform from grid to image, i.e. from H', V' to X, Y, $H_{Grid \rightarrow Image}$, is known.

Thus, a homography matrix, $H_{Symbol \to Image}$, describing the transformation from X', Y' to X, Y can be obtained as:

$$H_{Symbol \to Image} = H_{Grid \to Image} \cdot H_{Symbol \to Grid}$$

The homography matrix $H_{Symbol \to Image}$ specifies the transformation of every point in the section of EIC symbol array encompassing the image to a point in the image coordinate system. The homography matrix $H_{Symbol \to Image}^{-1}$, specifies the transformation of every point in the image coordinate system to a point in the section of EIC symbol array encompassing the image.

From recognized EIC symbols in the section of EIC symbol array encompassing the image, EIC bits are extracted. For each m-array, a stream of bits is extracted. Any bit can be chosen as the bit whose position in m-array is decoded.

For convenience, one can choose the top-left corner of the section of EIC symbol array encompassing the image, $C_{X'Y'}$, as the position to decode. In the bit stream starting from $C_{X'Y'}$, some of the bits are known (bits extracted from recognized symbols), and some are unknown (bits that can't be extracted or EIC symbols are not captured in image). As long as the number of extracted bits is more than the order of the m-array, decoding can be done.

EIC decoding obtains a location vector r by solving $b^t = r^t M$, where b is a vector of extracted bits, and M is a coefficient matrix obtained by cyclically shifting the m-sequence. Note that t in the equation stands for transpose. Location of extracted bits in m-sequence can be obtained from r by discrete logarithm. Position of extracted bits in m-array is then obtained based on how m-array is generated from m-sequence.

The position obtained from an m-array representing metadata is used to calculate the metadata. Metadata is encoded using the same m-array as the one representing X, Y position, but shifted according to the value of the metadata. Therefore, positions obtained from the two m-arrays representing X, Y position and metadata respectively, are different. The difference (or distance) between the two positions, however, is always the same, and is the value of the metadata. If multiple m-arrays are used to encode a global metadata such as a document ID, values of metadata from each of the multiple m-arrays are combined to get the document ID.

The position obtained from the m-array representing X, Y position is the coordinates of $C_{X'Y'}$ in EIC symbol array. For example, in FIG. 5, the coordinates of $C_{X'Y'}$ in EIC symbol array are (3, 1), and in FIG. 6, the coordinates are (5, 1).

To recover ink stroke, one needs to find the position of the pen tip in EIC symbol array. To do this, the "virtual pen tip," which is simply the image of the real pen tip on the image sensor plane, can be used as shown in FIG. 2A. Because the relationship between the real pen tip, lens and image sensor is constant, location of virtual pen tip on the image sensor plane is constant, unless the relationship of the above is changed (for example, when users change the ink cartridge). Location of virtual pen tip on the image sensor plane can be obtained through calibration.

Location of virtual pen tip on the image sensor plane is position of the pen tip in the image coordinate system. Therefore, using the homography matrix $H_{Symbol \to Image}^{-1}$, one can obtain position of the pen tip in X', Y' coordinate system.

Given position of the pen tip in X', Y' coordinate system and coordinates of $C_{X'Y'}$ in EIC symbol array, position of the pen tip in EIC symbol array can be obtained by summing the two. With a series of images captured for an ink stroke, from each image successfully decoded, position of the pen tip in EIC symbol array is obtained. These positions are filtered, interpolated and smoothed to generate the ink stroke.

With the document ID, the corresponding digital document can be found. How EIC symbol array is allocated to each page of the document is known. Therefore, position of the pen tip in a document page can be obtained by subtracting position of the top-left corner of the page in EIC symbol array from position of the pen tip in EIC symbol array. Thus, the ink stroke is bound to a document page.

Ink strokes written with digital pen on printed document are now recovered in the corresponding electronic document.

The above process is implemented in EIC core algorithms. EIC core algorithms include pre-processing, EIC pattern analysis, EIC symbol recognition, EIC decoding and EIC document mapping. FIG. 5 illustrates the workflow of EIC core algorithms.

The input of EIC core algorithms is a series of captured images. For each captured image, pre-processing segments effective EIC pattern. EIC pattern analysis analyzes effective EIC pattern and segments effective EIC symbols. EIC symbol recognition recognizes the EIC symbols and extracts EIC bits. EIC decoding obtains the location of the extracted bits in m-array. After all the images of a stroke are processed, EIC document mapping calculates metadata and generates ink stroke in EIC document.

Figure 7:
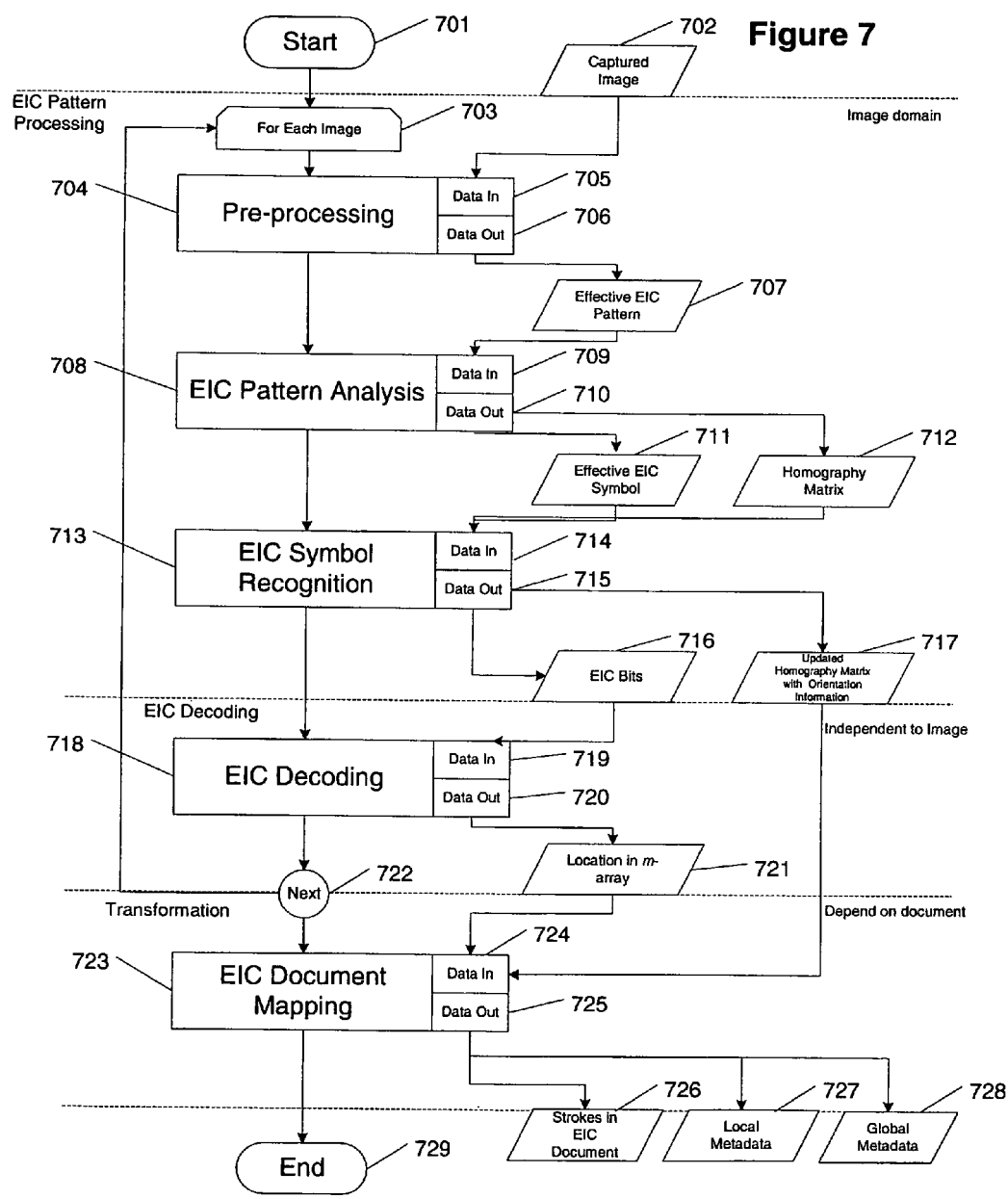
FIG. 7 shows an illustrative example of an overview of image processing and analysis in accordance with aspects of the present invention.

FIG. 7 shows an illustrative example of a process for associating a stroke with a document. The process contains three sections (but the dividing line between sections is amorphous). In step 701, the process starts and proceeds to an EIC pattern processing section. In the pattern processing section, a captured image 702 is processed. For each image 703, a pre-processing step 704, an EIC pattern analysis step 708, and EIC symbol recognition 713.

Pre-processing step 704 receives the captured image 702 in data in 705 and outputs through data out 706 an effective EIC pattern 707. The effective EIC pattern is received through data in 709 at the EIC pattern analysis 708 and output through data out 710 an effective EIC symbol and homography matrix 712, which are both received in data in 714 of EIC symbol recognition 713.

EIC symbol recognition 713 outputs through data out 715 EIC bits and an upgraded homography matrix with orientation information 717.

Next, in the EIC decoding section, EIC decoding is performed in step 718. Here, EIC bits 716 are received in data in 719. The location in an array of bits (m-array) is determined. The output 721 is provided at data out 720.

The process then moves 722 to the next image 703. The combination of images provide Once all images have been captured and processed, the process then transforms the collection of image locations into strokes and associates the strokes with a document in the EIC document mapping step 723. Here, the locations in the m-array 721 are received through data in interface 724 and collected into one or more strokes. The EIC document mapping step 723 outputs through data out 725 the strokes in the EIC document 726, any local metadata 727, and any global metadata 728. Finally, the process ends in step 729.

The following describes the various sections in greater detail.

Pre-Processing

Figure 8:
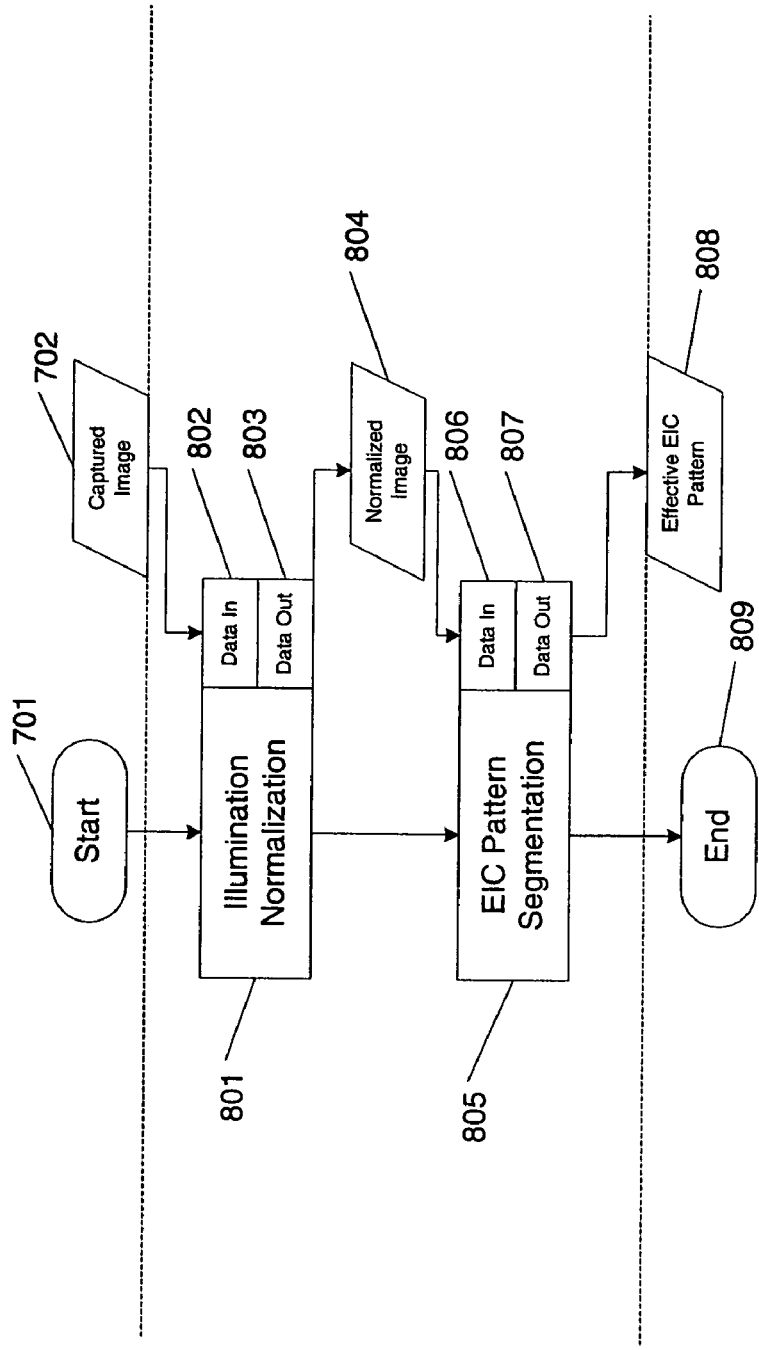
FIG. 8 shows an illustrative example of pre-processing process in accordance with aspects of the present invention.

FIG. 8 shows an illustrative example of the possible content of pre-processing step 704 in accordance with aspects of the present invention. One of the aspects of the pre-processing procedure is to obtain illumination-normalized images and segment an effective EIC pattern.

The process starts in step 701 with captured image 702. In step 801, the illumination of the captured image 702 (from data in 802) is normalized. The normalized image 804 is output from data out 803. The normalized image 804 then segments an EIC pattern 805 having received the normalized image in data in 806. An effective EIC pattern 808 is output from data out 807.

The illumination normalization step 801 is based on the following: illumination in the field of view is typically non-uniform and changes with pen rotation and tilting. This step 801 estimates the illumination distribution of a captured image and normalizes the image for further processing.

The EIC pattern segmentation step 805 performs the following: both EIC pattern and document content are captured in an image. This step 805 segments an EIC pattern from document content by thresholding the image.

Thresholding can be done in two steps (but can be done in more or less steps depending on the implementation). First, high-contrast areas are identified. These are areas that have a large difference in gray levels. Thresholding in these areas identifies a threshold for segmenting document content. After the document content areas are identified, thresholding in non-document content areas segments an effective EIC pattern.

Figure 9:
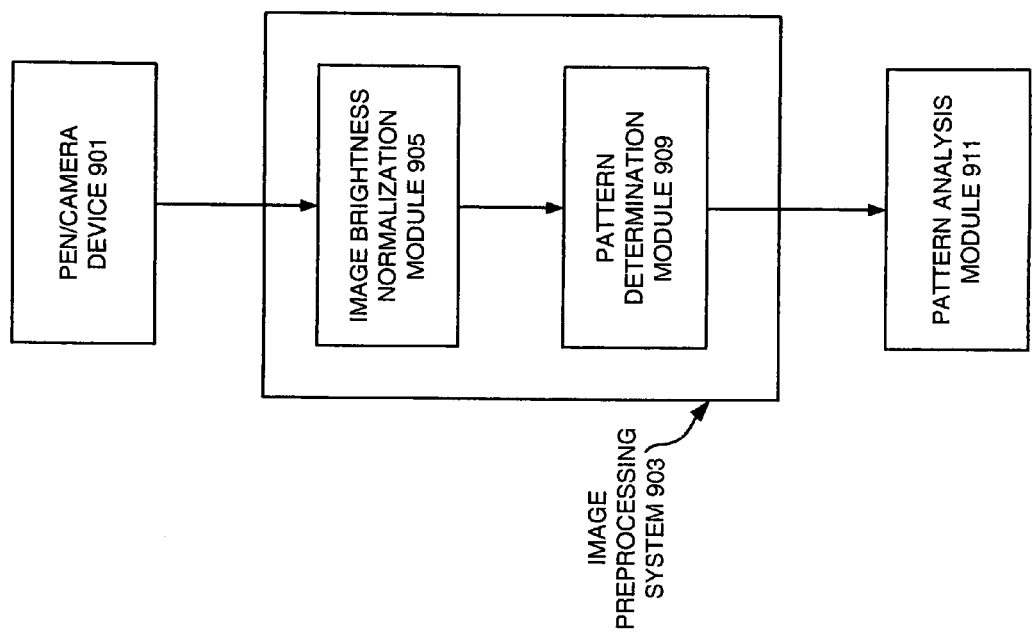
FIG. 9 shows another illustrative example of a pre-processing process in accordance with aspects of the present invention.

FIG. 9 illustrates another example of a preprocessing system that may be implemented according to various examples of the invention. As seen in this figure, a pen/camera device 901 provides a captured image to the image preprocessing system 903. More particularly, the pen/camera device 901 provides a captured image to the image brightness normalization module 905. As will be explained in greater detail below, the image brightness normalization module 905 normalizes the brightness of the different areas in the image, in order to mitigate the affects of inconsistent illumination during the operation of the pen/camera device 901.

Once the brightness of the captured image has been normalized, the image brightness normalization module 905 provides the normalized image to the pattern determination module 909. As will also be described in more detail below, the pattern determination module 909 analyzes the normalized image to identify areas having differences in brightness above a threshold level, in order to distinguish those areas in the normalized image that represent content from those areas in the normalized image that represent the information pattern. In this manner, the information pattern can be more accurately distinguished from the remainder of the captured image. The preprocessed image is then provided to the pattern analysis module 911 for further processing to determine the portion of the information pattern captured in the image, and thus the location of the pen/camera device 901 when the image was obtained.

Figure 10:
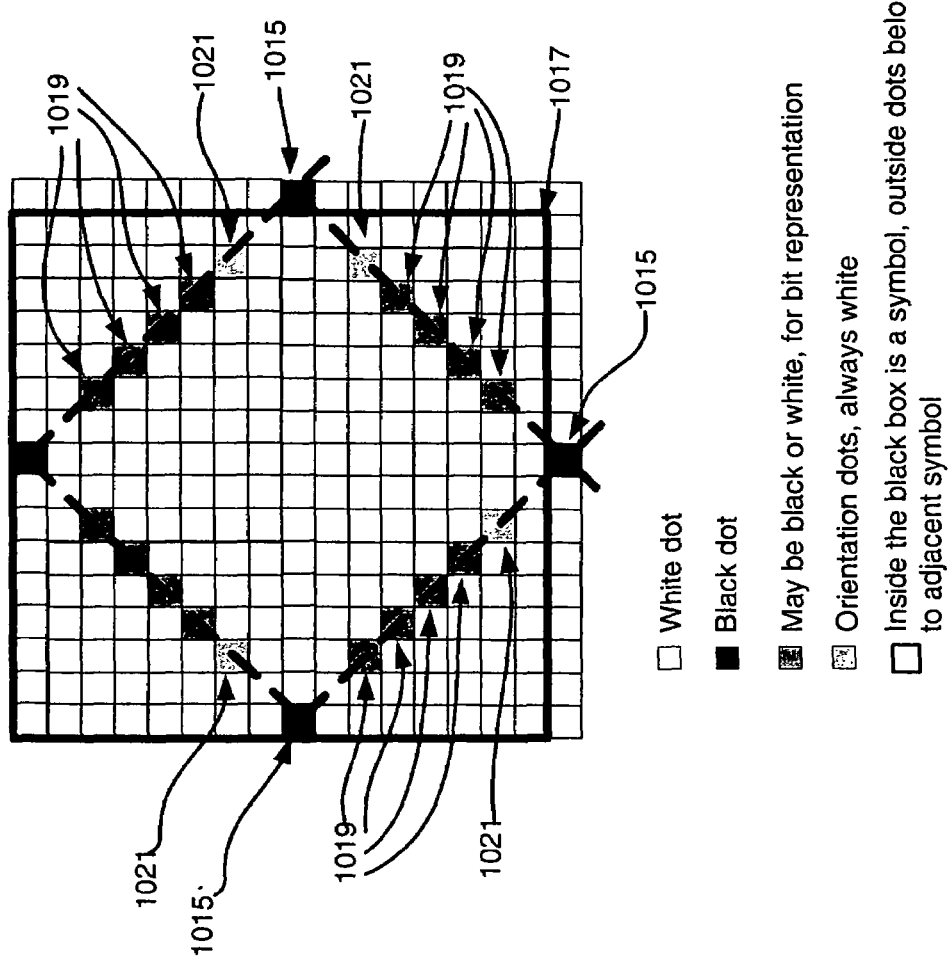
FIG. 10 illustrates an example of a code symbol that can be employed to create an information pattern according to various examples of the invention.

FIG. 10 illustrates an example of a code symbol that can be used to represent one or more bits making up an information pattern. As seen in this figure, the code symbol may have four black dark dots 1015 that represent the border of the symbol 1017. It also includes data dots 1019 that can be either marked black or left white (or blank) to represent data bits. Still further, the illustrated code symbol includes orientation dots 1021 that are always left white (or blank) to allow the decoding process to determine an orientation of the symbol. It is appreciated that a variety of codes may be used including lines, dots, combination of lines and combination of dots to encode and provide information to a system.

As discussed herein, a code symbol may be considered as the smallest unit of visual representation of an information pattern. Generally, a code symbol will include the pattern data represented by the symbol. As shown in the illustrated example, one or more bits may be encoded in one code symbol. Thus, for a code symbol with 1 bit represented, the represented data may be "0" or "1", for a code symbol representing 2 bits, the represented data may be "00", "01", "10" or "1." Thus, a code symbol can represent any desired amount of data for the information pattern. The code symbol also will have a physical size. When the information pattern is, for example, printed on paper, the size of a code symbol can be measured by printed dots. For example, the illustrated code symbol is 16×16 printed dots. With a 600 dpi printer, the diameter of a printed dot will be about 0.04233 mm.

Still further, a code symbol will have a visual representation. For example, if a code symbol represents 2 bits, the visual representation refers to the number and position distribution of the black dots used to represent the data values "00", "01", "10" or "11". Thus, the code symbol illustrated in FIG. 10 may be referred to as a "8-a-16" symbol, since it represents 8 data bits using a 16×16 array of discrete areas. Of course, symbols having a variety of different represented pattern data values, sizes, and visual representation configurations will be apparent to those of ordinary skill in the art upon consideration of this description.

Brightness Normalization

Figure 11:
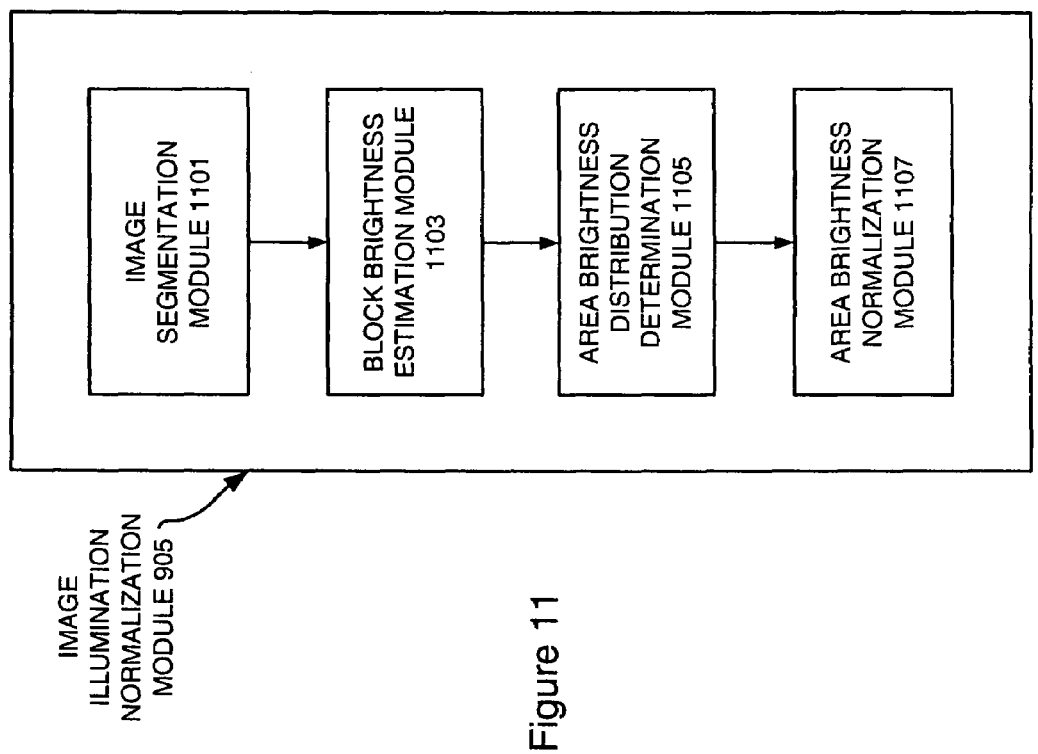
FIG. 11 illustrates an example of an image brightness normalization module that may be employed to normalize the brightness of an image according to various embodiments of the invention.

FIG. 11 illustrates one example of an image brightness normalization tool that may be employed for the image brightness normalization module 905 shown in FIG. 9. The image brightness normalization module 905 includes an image segmentation module 1101 that segments an image into blocks of smaller areas, such as pixels, and a block brightness estimation module 1103 that estimates the brightness of each block. The image brightness normalization module 905 also has an area brightness distribution determination module 1105. This module performs a bilinear fitting of the brightness distribution for each area, as will be explained in more detail below. Still further, the image brightness normalization module 905 includes an area brightness normalization module 1107, which normalizes the brightness of each area in the image. The operation of each of these modules will be discussed in greater detail with reference FIGS. 12A-21.

Figure 12A:
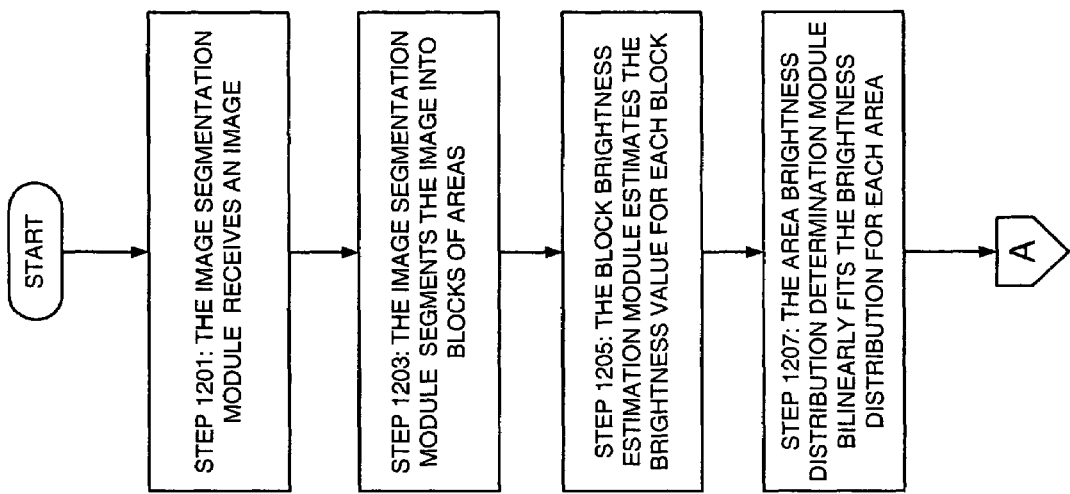
FIGS. 12A and 12B illustrate a flowchart describing the operation of the image brightness normalization module illustrated in FIG. 9.
Figure 12B:
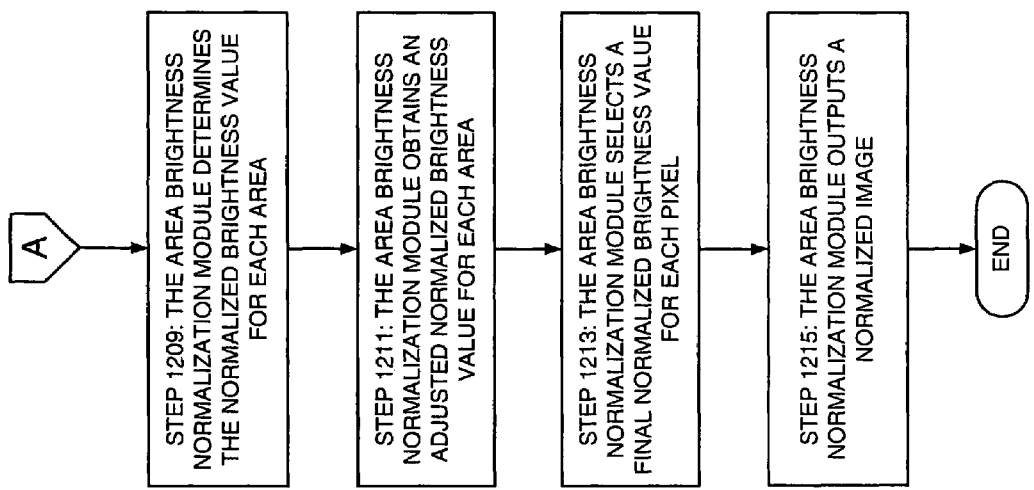
Figure 13:
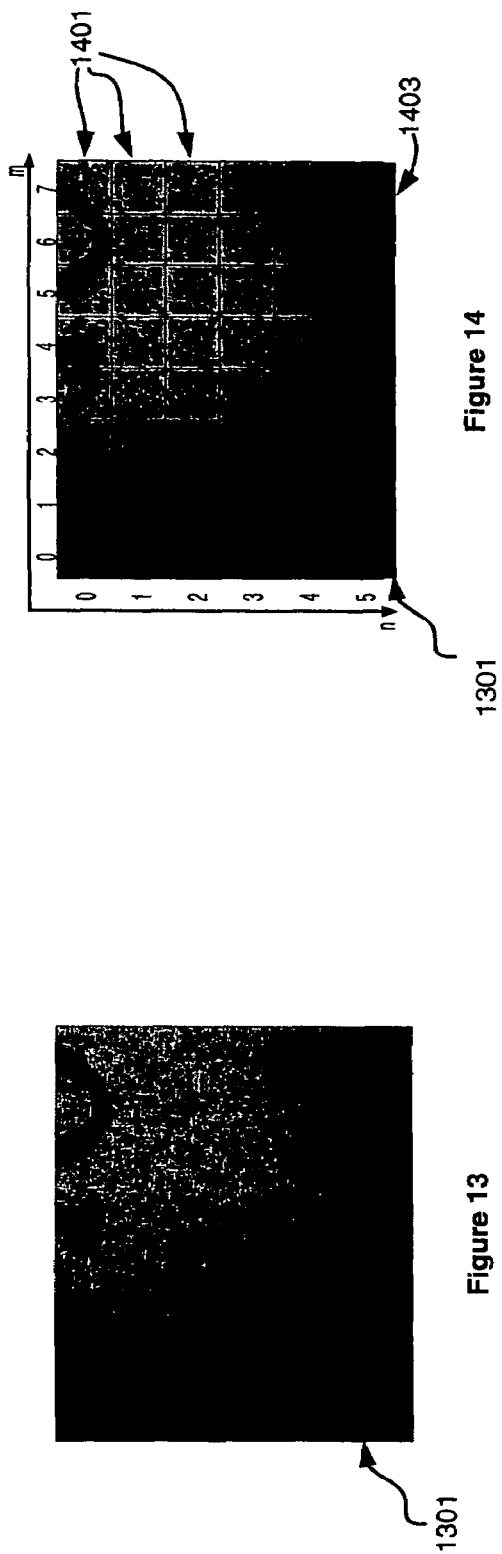
FIG. 13 illustrates an example of an image that might be processed by the image brightness normalization module illustrated in FIG. 9 in accordance with aspects of the present invention.

Turning now to FIG. 12A, in step 1201 the image segmentation module 1101 receives an image from the camera/pen device 901. FIG. 13 illustrates one example of a raw image 1301 that might be received from the camera/pen device 901. As seen in this figure, the image 1301 has regions that are relatively dark and regions that are relatively light, making it difficult to distinguish features in the image. In the illustrated embodiment, the image is 100×128 pixels (i.e., 100 pixels in the vertical direction and 128 pixels in the horizontal direction). It should be appreciated, however, that the image size will be determined by the camera employed by the camera/pen device 901, and various embodiments of the invention may be employed with images of any size.

Next, in step 1203, the image segmentation module 1101 segments the image 1301 into blocks of areas. In the illustrated example, the image brightness normalization module 905 uses pixels as the areas upon which operations are performed. It should be appreciated, however, that alternately embodiments of the invention may use other units for the area. For example, with larger images, some embodiments of the invention may use groups of four adjacent pixels as the areas upon which operations are performed, while still other embodiments of the invention may use groups of six, eight, nine, sixteen, or any other number of pixels as the areas upon which operations are performed.

Figure 14:
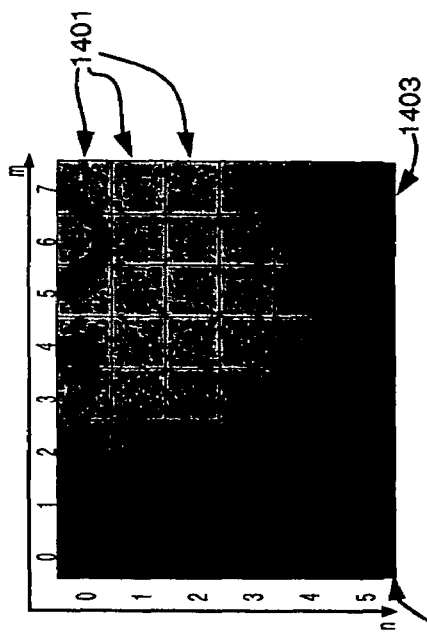
FIG. 14 illustrates the segmentation of the image into blocks starting from the top of the image in accordance with aspects of the present invention.

More particularly, the image segmentation module 1101 segments the image into blocks starting from the top of the image 1201, as shown in FIG. 14. The blocks 1401 may conveniently be identified hereafter by coordinate values on indices m, n, as shown in this figure. In the illustrated embodiment, image segmentation module 1101 segments the image 1301 into blocks 1401 of 16 pixels by 16 pixels. It should be appreciated, however, that alternate embodiments of the invention may form the blocks from smaller or larger groups of pixels as desired.

Figure 15:
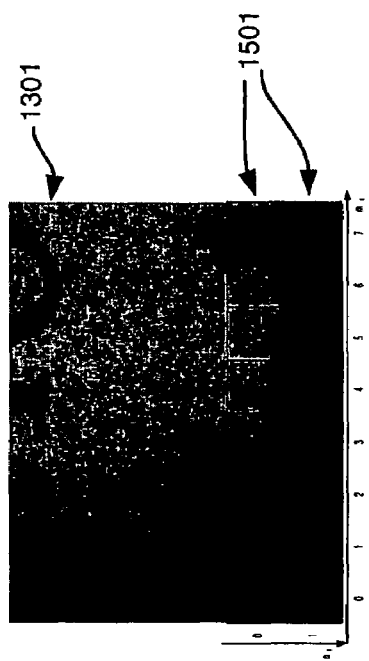
FIG. 15 illustrates the segmentation of the image into blocks starting from the bottom of the image in accordance with aspects of the present invention.

Because the image 1301 in the illustrated example has a height of 100 pixels and the blocks 1401 are formed from 16×16 groups of pixels, there is a small region 1403 at the bottom of the image 1301 in which the pixels are not segmented into blocks 1401. As will be apparent from the detailed explanation provided below, this discrepancy may skew the accuracy of the brightness normalization process. Accordingly, as shown in FIG. 15, the image segmentation module 1101 forms a second segment of blocks 1501 starting from the bottom of the image 1301. The blocks 1501 may conveniently be identified hereafter by coordinate values on indices $m_1$, $n_1$, as shown in FIG. 15. As with blocks 1401, the blocks 1501 are formed from 16×16 groups of pixels.

Next, in step 1205, the block brightness estimation module 1103 estimates the brightness value for each block 1401 and 1501. That is, the block brightness estimation module 1103 estimates an overall representative brightness value for each block 1401 and 1501 based upon the gray level of each individual pixel making up the block. In the illustrated example, the block brightness estimation module 1103 estimates the brightness value of a block 1401 or 1501 by creating a histogram of the number of pixels in the block at each gray-level.

Figure 16:
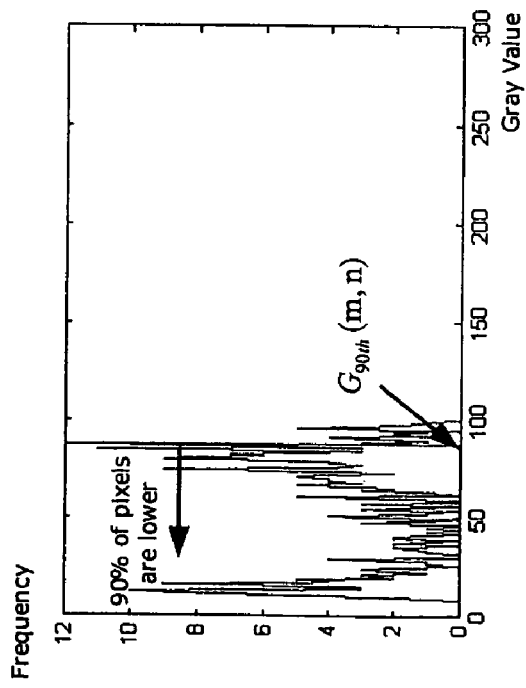
FIG. 16 illustrates one example of a type of histogram that might be employed by various embodiments of the invention to estimate the brightness of a block.
Figure 18:
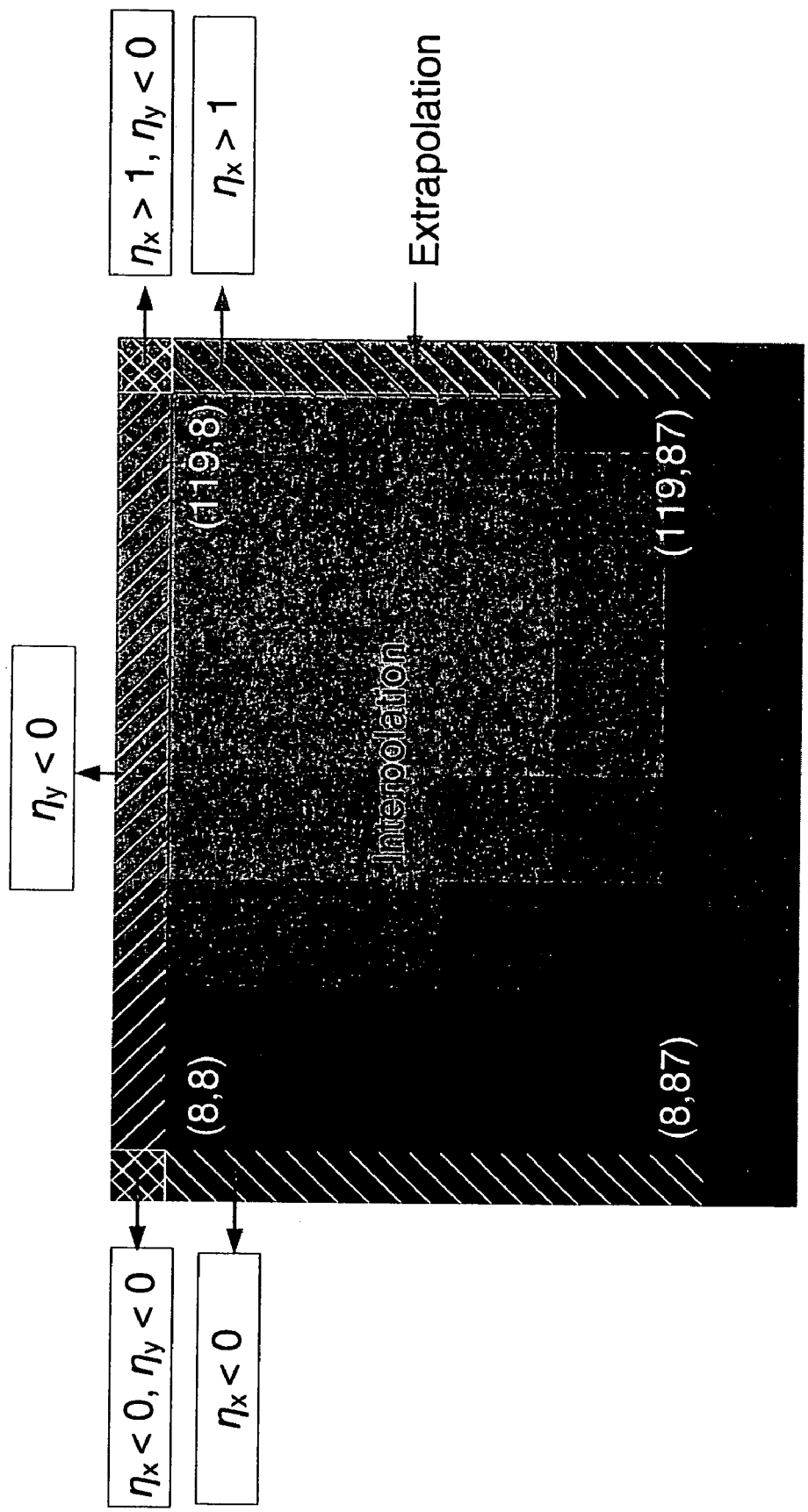
FIGS. 18 and 19 illustrate the different regions for which interpolation is used to determine the brightness value information according to various embodiments of the invention.
Figure 19:
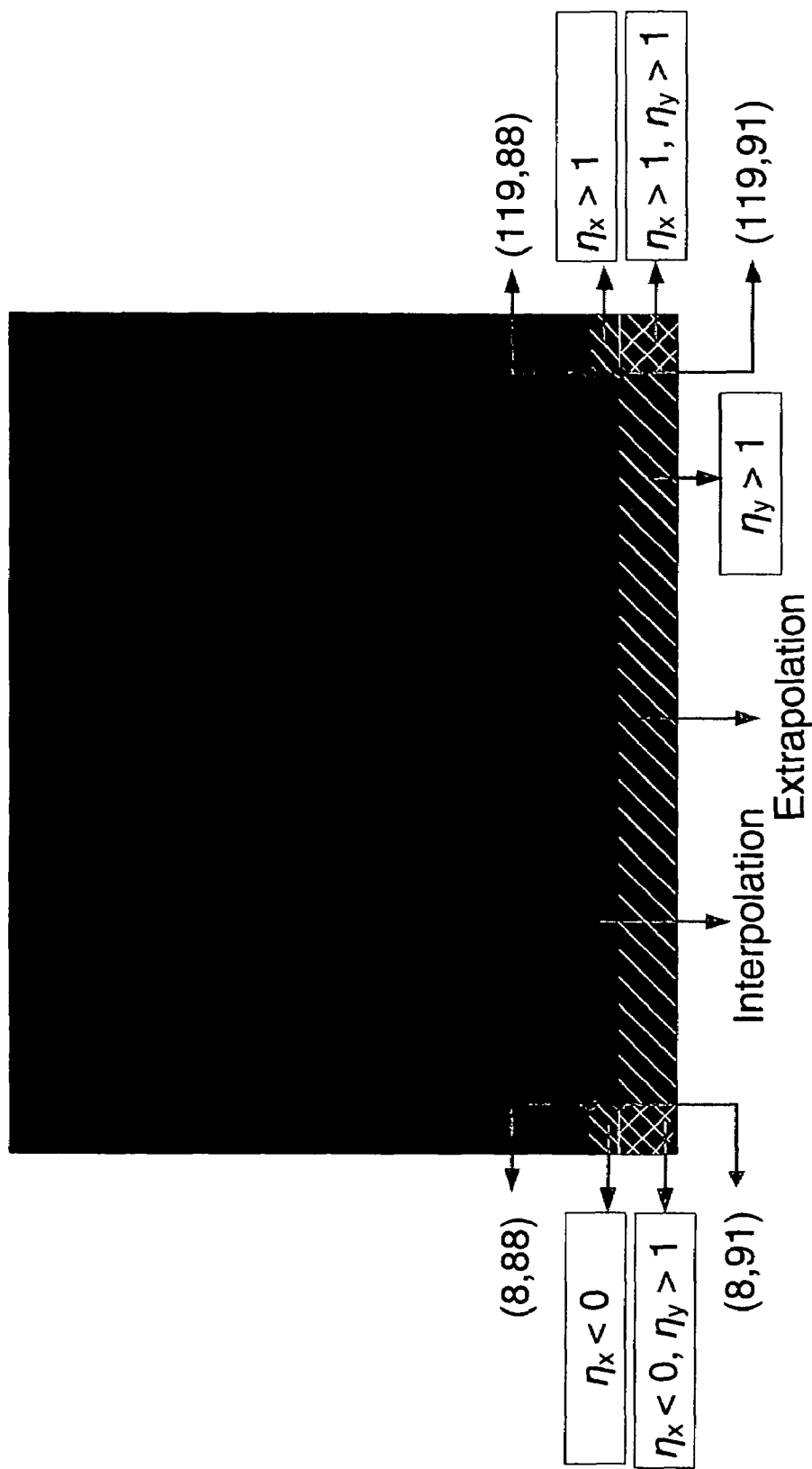
Figure 20:
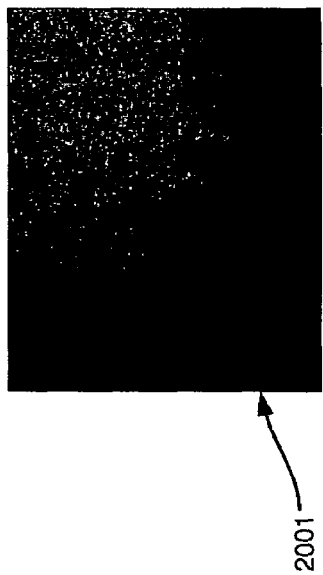
FIG. 20 illustrates the brightness distribution values obtained for the image shown in FIG. 13 using the operation described in FIGS. 12A and 12B.

FIG. 16 illustrates one example of a type of histogram that might be employed by various embodiments of the invention to estimate the brightness of a block 1401 or 1501. As seen in this figure, the X-axis corresponds to the gray levels of the pixels making up the block. The Y-axis then corresponds to the number of pixels that have the gray level. Using this histogram, the block brightness estimation module 1103 estimates a representative brightness value for the block. In the illustrated example, the block brightness estimation module 1103 identifies the 90$^{th}$ percentile gray level to be the estimated brightness value of the block. That is, the block brightness estimation module 1103 identifies the gray level $G_{90th}$ at which 90% of the pixels in the block are darker than $G_{90th}$, and employs this value as the brightness value of the block. Of course, other embodiments of the invention may employ alternate percentile criteria for estimating the brightness value of a block as desired. Still further, some embodiments of the invention may employ alternate techniques for determining the overall brightness of each block.

It also should be noted that the illustrated example relates to a black-and-white image. Accordingly, the brightness level corresponds to a gray scale level. Various embodiments of the invention alternately may be used to process color images. With these embodiments, the block brightness estimation module 1103 will operate based upon the color brightness level of each pixel in the image.

After the block brightness estimation module 1103 has estimated the brightness value for each block 1401 and 1501, the area brightness distribution determination module 1105 performs a bilinear fitting of the brightness distribution for each area in step 1207. As previously noted, there is a region 1403 at the bottom of image 1301 that has not been segmented into any of the blocks 1401. The brightness distribution values for the pixels in these regions thus are determined using the blocks 1501 rather than the blocks 1401. Accordingly, the brightness distribution values are determined in a two-step process. The pixels that are primarily within blocks 1401 (i.e., the pixels having a y coordinate value of 0-87 are determined using the estimated brightness values of the blocks 1401, while the pixels that are primarily within blocks 1501 (i.e., the pixels having a y coordinate value of 88-99) are determined using the estimated brightness values of the blocks 1501.

With the illustrated embodiment, for each pixel (x,y), where y=0, 1, . . . 87, the brightness distribution value of that pixel D(x,y) is estimated by using bilinear fitting method as:

$$D(x,y)=(1-\eta_y)\cdot[(1-\eta_x)\cdot I_{B(m,n)}+\eta_x\cdot I_{B(m+1,n)}]+\eta_y\cdot[(1-\eta_x)\cdot I_{B(m,n+1)}+\eta_x\cdot I_{B(m+1,n+1)}]$$

where $I_{B(m,n)}=G_{90th}(m, n)$, s is the size of a block (in the illustrated example, s=16), $$m = \min\left(\max\left[int\left(\frac{x-s/2}{s}\right), 0\right], 6\right),$$

$$n = \min\left(\max\left[int\left(\frac{y-s/2}{s}\right), 0\right], 4\right),$$

$$x_1 = ms + \frac{s}{2},$$

$$x_2 = (m+1)s + \frac{s}{2},$$

$$y_1 = ns + \frac{s}{2},$$

$$y_2 = (n+1)s + \frac{s}{2},$$

$$\eta_x = \frac{x-x_1}{x_2-x_1},$$

and $$\eta_y = \frac{y-y_1}{y_2-y_1}.$$

It should be noted that int(x) is a function that returns the largest integer less than or equal to x. For example, int(1.8)=1, int(−1.8)=−2.

Figure 17:
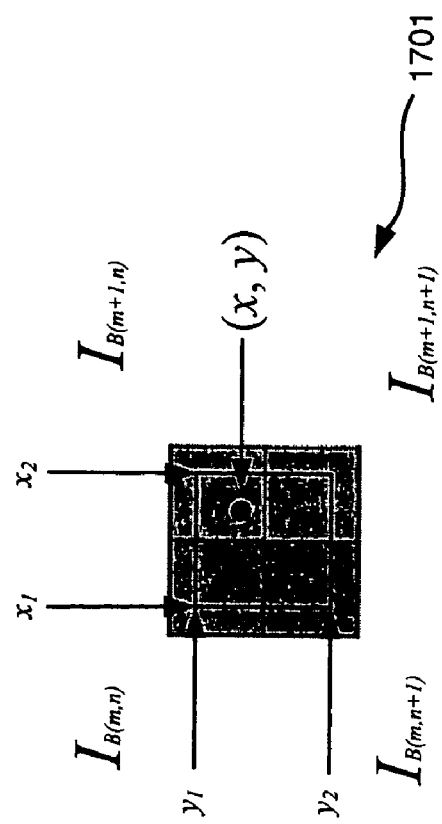
FIG. 17 illustrates the gray level information obtained using the operation described in FIGS. 12A and 12B.

The brightness value information employed to determine the brightness distribution value of a pixel using this process is graphically illustrated in FIG. 17. As will be appreciated from this image, some pixels will fall outside of any region 1701 that can be equally distributed among four adjacent blocks 1401. For example, in the illustrated example, pixels having an x coordinate value of 0-7 or 120-127 and pixels having a y coordinate value of 0-7 will fall outside of any region 1701 that can be equally distributed among four adjacent blocks 1401. For these pixels in border regions, the above equations may still be applied to determine their brightness distribution values, except that extrapolation will be used instead of interpolation. The different regions are graphically illustrated in FIG. 18.

Similarly, for each pixel (x,y), where y=88, 89, . . . 99, the brightness distribution value of that pixel D(x,y) is estimated as:

$$D(x,y)=(1-\eta_y)\cdot[(1-\eta_x)\cdot I_{B(m_1,n_1)}+\eta_x\cdot I_{B(m_1+1,n_1)}]+\eta_y\cdot[(1-\eta_x)\cdot I_{B(m_1,n_1+1)}+\eta_x\cdot I_{B(m_1+1,n_1+1)}]$$

where $I_{B(m_1,n_1)}=G_{90th}(m_1,n_1)$ s is the size of a block (in our implementation, s=16), $$m_1 = \min\left(\max\left[int\left(\frac{x-s/2}{s}\right), 0\right], 6\right),$$

$$n_1 = 0,$$

$$x_1 = m_1 s + \frac{s}{2},$$

$$x_2 = (m_1+1)s + \frac{s}{2},$$

-continued $$y_1 = \text{height} - s - \frac{s}{2} - 1,$$

$$y_2 = \text{height} - \frac{s}{2} - 1,$$

$$\eta_x = \frac{x - x_1}{x_2 - x_1},$$

and $$\eta_y = \frac{y - y_1}{y_2 - y_1}.$$

height is the height of the image sensor. In the illustrated example, height=100.

Again, some pixels will fall along the image border outside of any region that can be equally distributed among four adjacent blocks 1501. For these pixels in border regions, the above equations may still be applied to determine their brightness distribution values, except that extrapolation will be used instead of interpolation. The different regions are graphically illustrated in FIG. 19. The brightness distribution values 2001 for the entire image 1301 are then shown in FIG. 20.

Once the area brightness distribution determination module 1105 has determined the brightness distribution value for each area, the area brightness normalization module 1107 determines the normalized gray level value for each area in step 1209. More particularly, the area brightness normalization module 1107 determines the normalized gray level value for each area by dividing the area's original gray level value for the brightness distribution value for that area. Next, in step 1211, the area brightness normalization module 1107 obtains an adjusted normalized gray level value for each area by multiplying the normalized gray level value for each area by a uniform brightness level $G_0$. In the illustrated example, the value of uniform brightness level $G_0$ is 200, but alternate embodiments of the invention may employ different values for the uniform brightness level $G_0$. The uniform brightness level $G_0$ represents the supposed gray level of the captured image in a blank area for an ideal situation (i.e., a uniform illumination with an ideal image sensor). Thus, in an ideal case, the gray level of all pixels of a captured image from a blank area should be equal to the uniform brightness level $G_0$.

Figure 21:
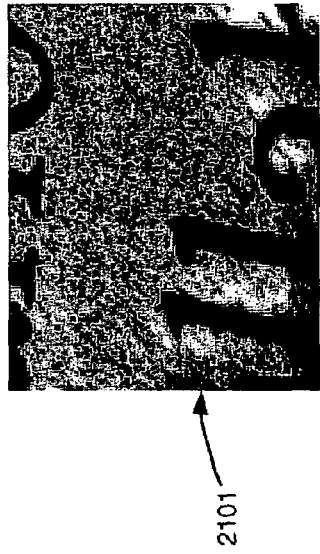
FIG. 21 illustrates how the image shown in FIG. 13 appears after being processed using the operation described in FIGS. 12A and 12B.

Lastly in step 1213, the area brightness normalization module 1107 selects a final normalized gray level value for each pixel by assigning each pixel a new gray level value that is the lesser of its adjusted normalized gray level value and the maximum gray level value. Thus, with the illustrated example, the final normalized gray level value for each pixel is determined as a gray level G(x,y) where:

$$G(x, y) = \min\left(G_0 \cdot \frac{G(x, y)}{D(x, y)}, 255\right)$$

where $G_0$=200 and 255 is the maximum gray level (i.e., white). Then, in step 1215, area brightness normalization module 407 outputs a normalized image using the final normalized gray level value for each pixel. FIG. 21 illustrates how the image 1301 appears as image 2101 after being processed in the manner described in detail above.

Pattern Determination

Figure 22:
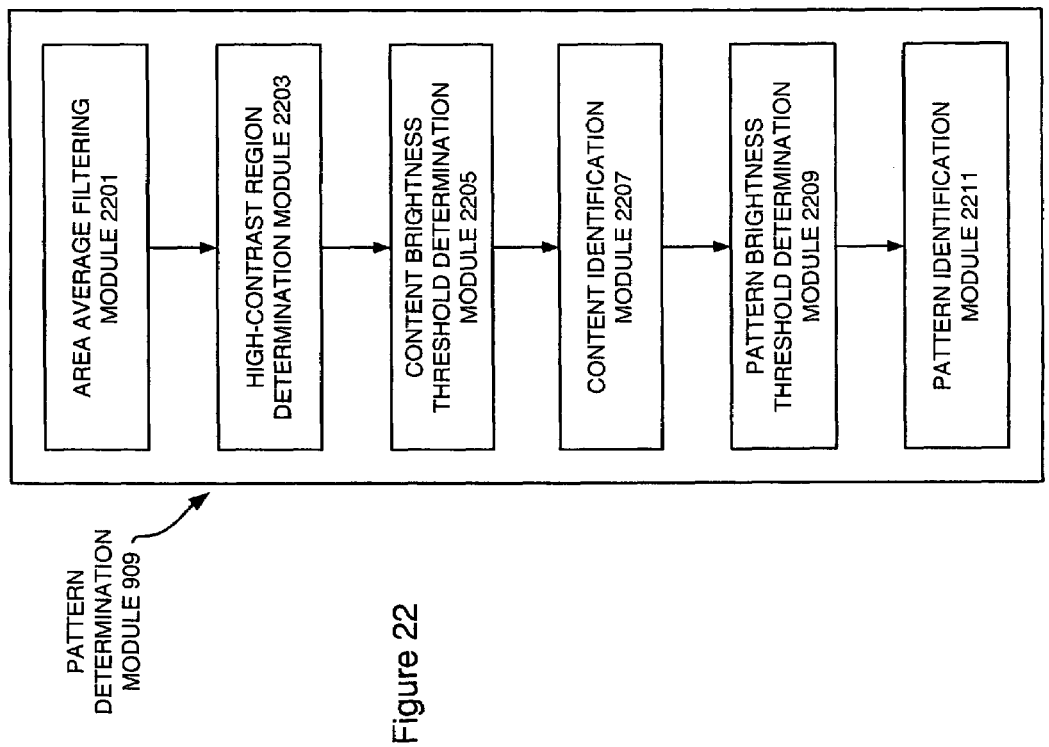
FIG. 22 illustrates a pattern determination system for distinguishing an information pattern from content in a document image according to various embodiments of the invention.
Figure 23A:
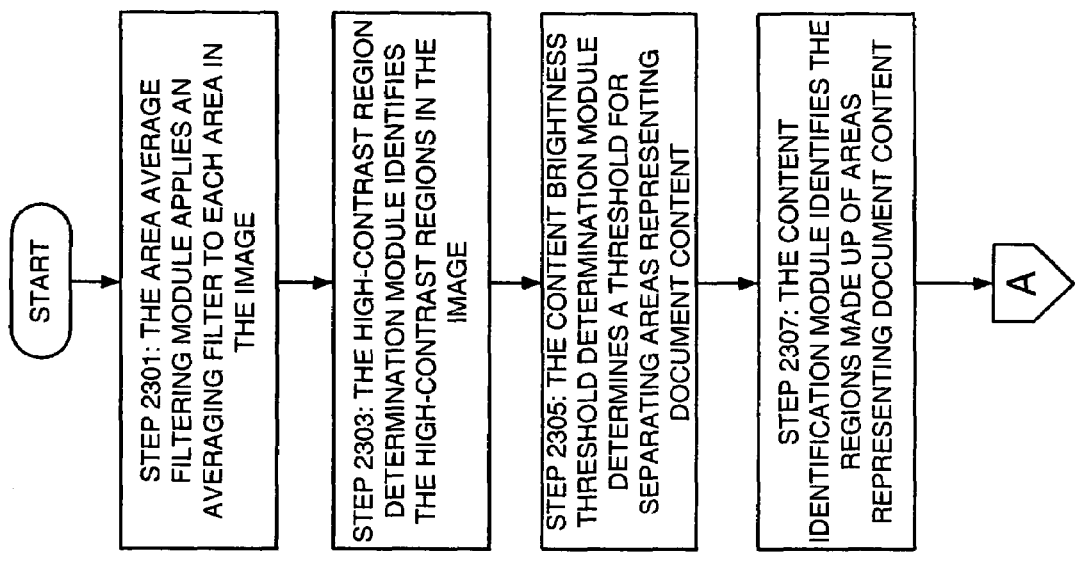
FIGS. 23A and 23B illustrate a flowchart describing the operation of the pattern determination system illustrated in FIG. 22.
Figure 23B:
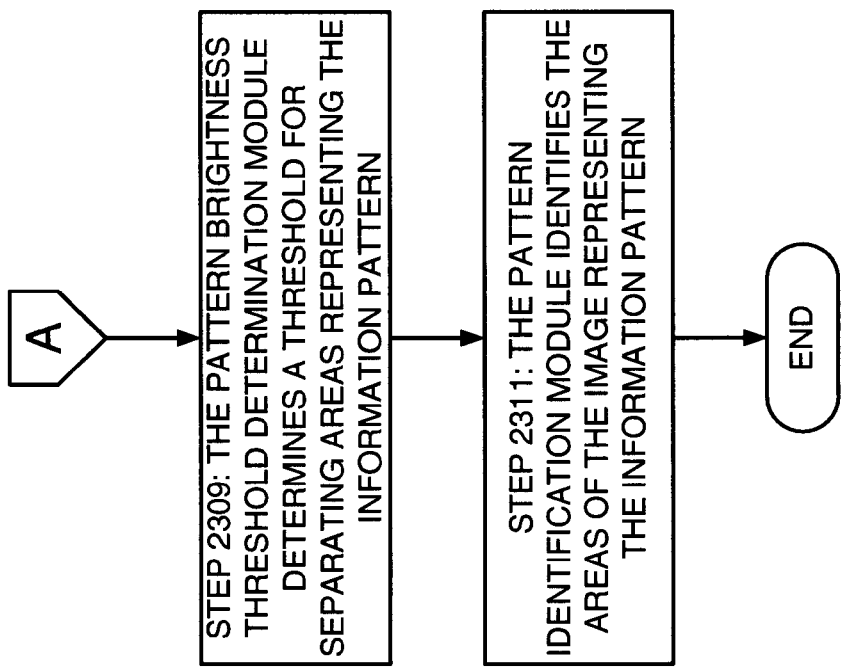

After the image brightness normalization module 905 normalizes the image captured by the pen/camera device 901, the pattern determination module 909 distinguishes the areas of the normalized image that represent content in a document from the areas of the normalized image that represent the information pattern. FIG. 22 illustrates a pattern determination system for distinguishing an information pattern from content in a document image. As seen in this figure, the pattern determination module 909 includes an area average filtering module 2201 and a high-contrast region determination module 2203. As will be discussed in greater detail below, the area average filtering module 2201 applies an averaging filter to the brightness value of each area in the image. The high-contrast region determination module 2203 then identifies high-contrast regions in the image.

The pattern determination module 909 also includes a content brightness threshold determination module 2205, a content identification module 2207, a pattern brightness threshold determination module 2209, and a pattern identification module 2211. As will be discussed in greater detail below, for a black-and-white image, the content brightness threshold determination module 2205 determines a first gray level value threshold that the content identification module 2207 then uses to identify areas of the image representing content. Similarly, for a black-and-white image, the pattern brightness threshold determination module 2209 determines a second gray level value threshold that the pattern identification module 2211 uses to identify areas of the image that represent an information pattern.

The pattern determination module 909 takes advantage of the fact that, in an image of a document containing both content (e.g., printed text, pictures, etc.) and an information pattern, the information pattern, document content and document background tend to have different brightness levels. Thus, with a black-and-white image, the areas representing the information pattern, document content and document background will typically have different gray levels, with the areas representing the document content being the darkest, the areas representing the information pattern being the second darkest, and the areas representing the document background being the least dark. Thus, the pattern determination module 109 can distinguish the three different areas by thresholding.

In order to more efficiently determine the appropriate thresholds to separate the three brightness levels, the pattern determination module 909 first identifies high-contrast regions. For black-and-white images, these are regions that have a relatively large difference in gray levels between adjacent image areas (e.g., such as pixels). Thus, the threshold for segmenting the areas representing document content from other areas in the image can be more effectively identified in the high-contrast areas. Once the threshold is found, regions that are darker than the threshold are identified as representing document content. These regions can then be marked as being made up of areas representing content. For example, the areas in a content region may be assigned a value of 1 in a document content mask.

After the regions representing document content have been identified, the brightness values of the remaining areas can then be analyzed. Those regions having an gray level value above a second threshold are then identified as representing the information pattern. These regions can then be marked as being made up of areas representing the information pattern. For example, the areas in a pattern region may be assigned a value of 1 in an information pattern mask. Thus distinguished from the rest of the image, the areas representing the information pattern can be more accurately analyzed by the pattern analysis module 911.

The operation of the pattern determination module 909 will now be described with reference to FIGS. 23A-27. More particularly, the operation of the pattern determination module 909 will be discussed as applied to the normalized image 2101. Thus, in this example, the image is a black-and-white image. It should be appreciated, however, that various embodiments of the invention may be employed to process color images. As previously noted with respect to the image brightness normalization module 905, if the image is a color image, then the pattern determination module 905 will operate using color brightness levels rather than gray levels. Also, the illustrated example of the pattern determination module 909 uses pixels as the area unit on which it performs operations. It should be noted, however, that other examples of the invention may operate on other areas, such as groups of multiple pixels, as previously described with respect to the image brightness normalization module 905.

Initially, high contrast areas are identified to more efficiently locate regions that represent content, as previously noted. Because the regions representing the information pattern may also have a large difference in brightness levels, however, the image areas are first filtered to reduce the brightness level value difference in the regions surrounding the information pattern. More particularly, in step 2301, the area average filtering module 2201 applies an averaging filter to each area in the image. For black-and-white images, this filtering operation replaces the gray level of each pixel by an average of the gray levels of the surrounding eight pixels and the gray level of the pixel itself. That is, for every pixel (x,y)

$$G_{average}(x, y) = \frac{1}{9}\sum_{i=-1}^{1}\sum_{j=-1}^{1} G(x+i, y+j)$$

where G(x,y) is the gray level of pixel (x,y). It should be note that G(x,y) is the brightness-normalized gray level.

Figure 24:
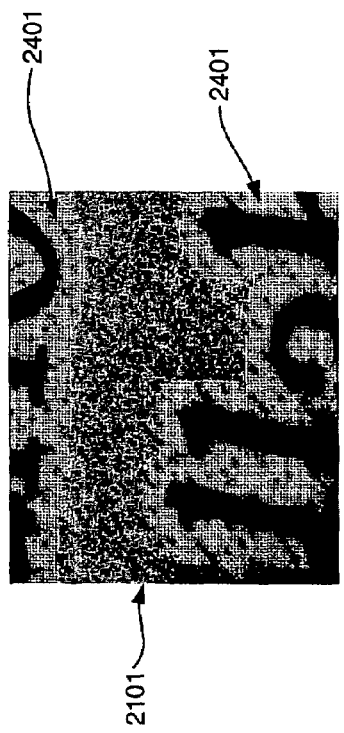
FIG. 24 illustrates the high-contrast areas identified using the operation described in FIGS. 23A and 23B.

Next, in step 2303, the high-contrast region determination module 2203 identifies the high-contrast regions in the image using the averaged gray level of each pixel. In particular, for each pixel, the high-contrast region determination module 2203 identifies the maximum and the minimum averaged gray level values in the 17×17 pixel neighborhood surrounding the pixel. That is, for every pixel (x,y), $G_{max}(x,y)=\max(G_{average}(p,q)|\max(x-8, 0)\leq p\leq\min(x+8, 127), \max(y-8, 0)\leq q\leq\min(y+8, 127))$ $G_{min}(x,y)=\min(G_{average}(p,q)|\max(x-8, 0)\leq p\leq\min(x+8, 127), \max(y-8, 0)\leq q\leq\min(y+8, 127))$ It should be appreciated that the determination described above is based upon the specific number of pixels of the image used in the illustrated example. A similar determination, using different pixels coordinate values, would be employed for embodiments of the invention used to process images of different sizes. Next, the high-contrast region determination module 2203 defines a high-contrast region as High Contrast Region=$\{(x,y)|[G_{max}(x,y)-G_{min}(x,y)]>D_0\}$ where $D_0$ is a predetermined threshold. The value of $D_0$ is determined empirically. In the illustrated example, $D_0=140$, but it should be appreciated, however, that other embodiments of the invention may employ different threshold values depending, e.g., upon the contrast quality provided by the camera/pen device 101. FIG. 24 illustrates the high-contrast areas 2401 identified in image 2101 using the above-described technique.

Figure 25:
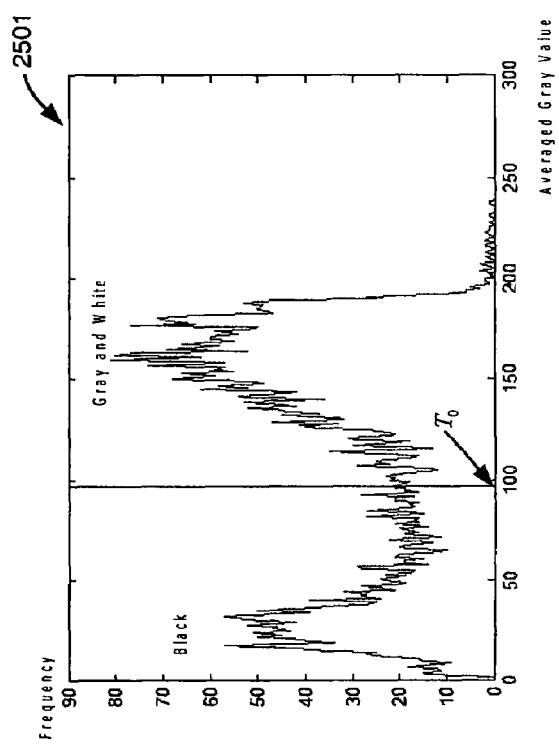
FIG. 25 illustrate an example of a gray-level histogram used to determine a content brightness threshold according to various examples of the invention.

Next, in step 2305, the content brightness threshold determination module 2205 determines a threshold for separating areas representing document content from the other areas of the image. To determine the threshold, the content brightness threshold determination module 2205 creates a gray-level histogram for the high-contrast regions. An example of such a histogram 2501 is illustrated in FIG. 25. As seen in this figure, the X-axis of this histogram 2501 corresponds to the averaged gray levels of the pixels in the high-contrast regions. The Y-axis then corresponds to the number of pixels at that gray level. From the histogram, a threshold $T_0$ for separating the darker pixels from gray and white pixels can be identified. Any suitable technique for selecting a threshold to distinguish darker pixels from gray and white pixels may be employed. One such technique for obtaining the threshold $T_0$ is described, for example, in N. Otsu, "A Threshold Selection Method from Gray-Level Histogram," *IEEE Transactions on Systems, Man, and Cybernetics*, 9(1), (1979), pp. 62-66, which is incorporated entirely herein by reference.

Once the threshold value $T_0$ has been determined, the content identification module 2207 uses the threshold $T_0$ to identify the areas of the image representing content in step 2307. First, given $T_0$, pixels in the image that are darker than $T_0$ are identified as images representing the document content and are assigned a value of 1 in a document content mask. Thus, for every pixel (x,y), if $G_{average}(x,y)\leq T_0$, then Document Content Mask (x,y)=1, else Document Content Mask (x,y)=0.

After the document content mask has been created, those regions $R_t$, are identified, where t=1, 2, . . . T, of pixels $(x_i,y_i)$ as follows:

$R_t=\{(x_i,y_i)$ Document Content Mask $(x_i,y_i)=1, (x_i,y_i)$ are neighbors$\}$.

Figure 26:
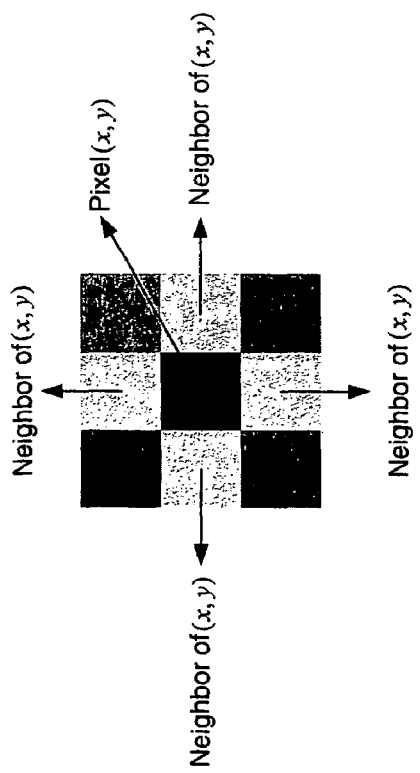
FIG. 26 illustrates a relationship between neighboring pixels in accordance with aspects of the present invention.
Figure 27:
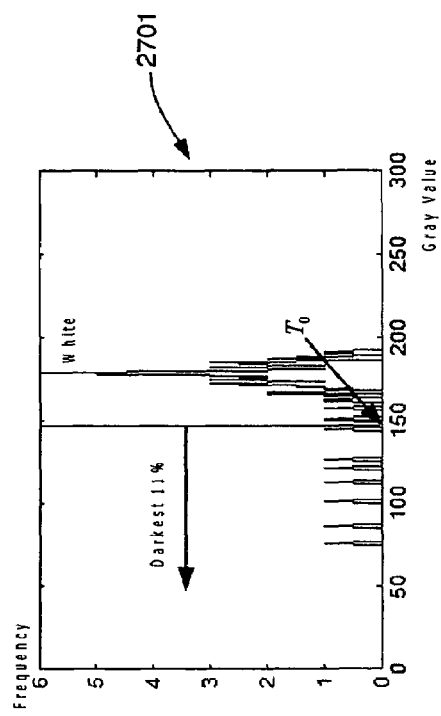
FIG. 27 illustrates an image that has been processed using the operation described in FIGS. 12A, 12B, 23A and 23B.

Two pixels are neighbors if they are directly below, above or next to each other, as shown in FIG. 26. Thus, the mask identifies regions $R_t$ of neighboring areas that represent content. In the illustrated example, if a region $R_t$ contains fewer than 20 pixels, it is removed from the document content mask. That is, for each pixel $(x_i,y_i)\in R_t$, Document Content Mask $(x_i,y_i)=0$. This eliminates regions that are too small to actually represent document content.

Next, in step 2309, the pattern brightness threshold determination module 2209 determines a second threshold for separating the areas representing the information pattern from the remaining areas of the image (i.e., the non-content areas). Initially, the pattern brightness threshold determination module 2209 segments the image into 8×8 pixel blocks. For black-and-white images, the pattern brightness threshold determination module 2209 then creates a gray-level value histogram for each 8×8 pixel block, such as the histogram 2701 in FIG. 27. As seen in this figure, the X-axis corresponds to the brightness-normalized gray levels of non-document content pixels in the block, i.e. pixels for which Document Content Mask (x,y)=0. The Y-axis then corresponds to the number of non-document content pixels at that gray level.

From the histogram, a second threshold $T_0$ is identified to distinguish information pattern areas from the remaining background areas. The second threshold $T_0$ is empirically chosen, based on the size of the camera sensor in the pen/camera device 901 and the size of code symbol, to be approximately equal to the ratio of black dots in the code symbol. In the illustrated example, the code symbol is the 8-a-16 code symbol illustrated in FIG. 10. Thus, the second threshold $T_0$ is selected such that 11% of the pixels are darker than $T_0$.

Once the second threshold $T_0$ is determined, the pattern identification module 1511 identifies the areas of the image representing the information pattern in step 1611. More particularly, for every pixel (x,y) in a block, if Document Content Mask (x,y)=0 and $G(x,y) \leq T_0$, then the pattern identification module 1511 assigns Pattern Mask (x,y)=1, else, Pattern Mask (x,y)=0.

For the bottom pixels (i.e., the 4×128 pixel region along the bottom border of the image), the 4×128 pixel area directly above may be used to form 8×8 pixel blocks. Within each of these bottom blocks, the second threshold is determined using the same method described in detail above. Only those pixels in the bottom region are compared against the threshold, however, as the pixels "borrowed" from the region directly above will already have been analyzed using the second threshold established for their original blocks. Those bottom pixels that are darker than the threshold are identified as representing the information pattern.

After all of the pixels having a gray level below their respective second threshold values have been identified, those identified pixels that are adjacent to pixels representing document content are removed from the information pattern mask. That is, for every pixel (x,y), if Pattern Mask (x,y)=1 and a pixel among 8 neighbors of (x,y) has been identified as representing document content (i.e., there exists i, j, where i=−1, 0, 1, j=−1, 0, 1, such that Document Content Mask (x+i,y+j)=1), then Pattern Mask (x,y)=0. In this manner, the pixels making up the information pattern can be accurately distinguished from the other pixels in the image. Further, the image preprocessing system 903 according to various examples of the invention can output a new image that clearly distinguishes an information pattern from the remainder of the image.

Pattern Analysis

Figure 28:
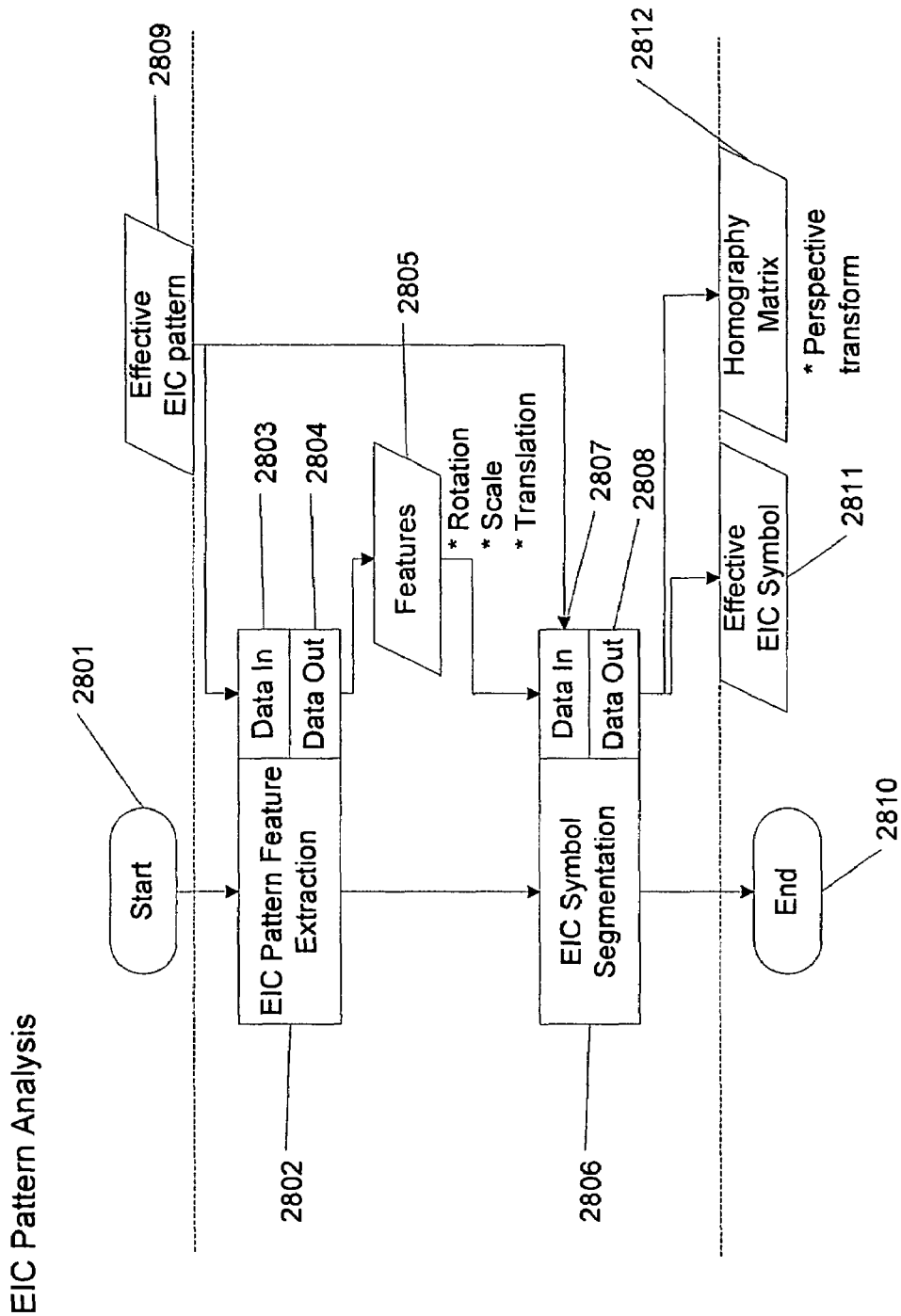
FIG. 28 shows a process for performing pattern analysis in accordance with aspects of the present invention.

FIG. 28 relates to the pattern analysis step 708 of FIG. 7. The pattern analysis step 708 segments effective EIC symbols and obtains a homography matrix describing the perspective transform from grid to image.

The EIC pattern analysis step 708 includes an EIC pattern feature extraction step 902 from start 2801 with data in 2803 and data out 2804, receiving an effective EIC pattern 2809. It also includes an EIC symbol segmentation step 2806 with data in 2807 and 2808.

The EIC pattern feature extraction step 2802 rotates, scales (distance between parallel lines), and translates (distance between the origins) the effective EIC pattern 2809 so as to obtain an assumed affine transform from grid to image by analyzing all directions formed by pairs of connected effective EIC pattern regions and projecting the effective EIC pattern to two main directions. This results in features 2805 having possibly rotation, scale, and translation information.

The EIC symbol segmentation step 2806 obtains a perspective transform from grid to image by fitting the effective EIC pattern to affine transformed grid lines. The perspective transform is described by a homography matrix $H_{Grid \rightarrow Image}$ 2812, with which, grid lines in image are obtained. The grid lines in the image are associated with expected grid lines through the perspective transform of the homography matrix 2812. Grid cells thus obtained can be referred to as effective EIC symbols 2811. The effective EIC symbol 2811 and homography matrix 2812 are sent to the EIC symbol recognition process as described with respect to FIG. 51 described below.

The above process is referred to as an EIC pattern analysis. FIG. 28 shows the workflow of EIC pattern analysis. In step 2801, the process starts. In step 2802, EIC pattern feature extraction is performed using data from an effective EIC pattern 2809. The effective EIC pattern is shown in FIG. 29 with image 2901, existing image data (if relevant) 2902, blank space 2903 and EIC elements 2904. Data output 2804 from the EIC pattern feature extraction provides features 2805 with information relating to rotation, scale, and translation information.

Next, in step 2806, input data 2807 (namely features 2805) is processed by EIC symbol segmentation. Data output 2808 from EIC symbol segmentation 2806 results in an effective EIC symbol 2811 and homography matrix (having a perspective transformation) 2812 as shown in FIG. 30 with EIC symbols 3001, first grid lines 3002 and second grid lines 3003. The two primary steps 2802 and 2806 are described below.

Feature Extraction

EIC pattern feature extraction obtains an affine transform to convert a grid to an image by analyzing an effective EIC pattern in a captured image. An affine transform keeps evenly spaced parallel lines evenly spaced and parallel, but perpendicular lines may not be perpendicular anymore. This step obtains the rotation, scale (distance between parallel lines) and translation (distance between the origins) of the affine transform. Output of this step is a homography matrix that describes the affine transform.

First, the system finds two main directions of EIC symbols. This step looks at all the directions formed by pairs of connected effective EIC pattern regions and finds two directions that occur the most often.

First, given effective EIC pattern mask, regions $R_t$, where t=1, 2, . . . , T, of pixels $(x_i, y_i)$ are identified:

$R_t = \{(x_i, y_i) | \text{EIC Pattern Mask } (x_i, y_i) = 1, (x_i, y_i) \text{ are neighbors}\}$.

Two pixels are neighbors if they are directly below, above or next to each other. FIG. 31 shows neighboring pixels in accordance with aspects of the present invention. Pixel 3101 is a given pixel (x,y). Pixels 3103, 3105, 3107, and 3109 are neighboring pixels of (x,y). Here, these are shown in the cardinal directions (up, down, left, right) of pixel 3101. Pixels 3104, 3106, 3108, and 3102 are on the diagonals from pixel 3101.

Figure 32:
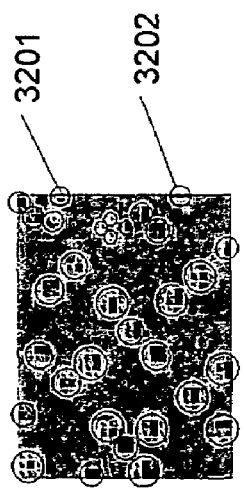
FIG. 32 shows regions of neighboring effective EIC pattern pixels in accordance with aspects of the present invention.

FIG. 32 shows examples of these regions with pixel 3201 and surrounding regions 3202, for instance.

Next, gray-level centroids of the regions are identified. For each region $R_t$, where t=1, 2, . . . , T, gray-level centroid $(\bar{x}_t, \bar{y}_t)$ is:

$$\bar{x}_t = \frac{1}{\sum_{i=0}^{N_t} G(x_i, y_i)} \sum_{i=0}^{N_t} (x_i \cdot G(x_i, y_i)),$$

$$\bar{y}_t = \frac{1}{\sum_{i=0}^{N_t} G(x_i, y_i)} \sum_{i=0}^{N_t} (y_i \cdot G(x_i, y_i))$$

where $(x_i, y_i)$ is a pixel in region $R_t$, $G(x_i, y_i)$ is the gray-level of the pixel, and $N_t$ is the total number of pixels in region $R_t$.

Figure 33:
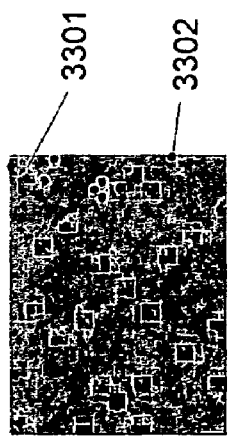
FIG. 33 shows centroids of the regions of FIG. 32 in accordance with aspects of the present invention.

FIG. 33 shows centroids 3302 of the regions 3301.

Figure 34:
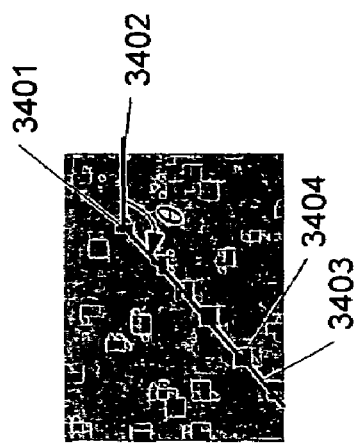
FIG. 34 shows directions formed by a pair of regions in accordance with aspects of the present invention.

Third, for each pair of regions, $R_u$ and $R_v$, a direction of the pair is obtained:

$$\theta_{u,v} = \arctan\left(\frac{\bar{y}_u - \bar{y}_v}{\bar{x}_u - \bar{x}_v}\right),$$

where $0 \leq \theta_{u,v} < 180$. FIG. 34 shows the definition of θ. Here, θ is defined as a rotation about point 3401 from horizontal line 3402 to a line 3403 connecting centroids 3401 with another centroid 3404. The determination of angle θ may be performed for all centroids from all centroids in the capture image.

Figure 35:
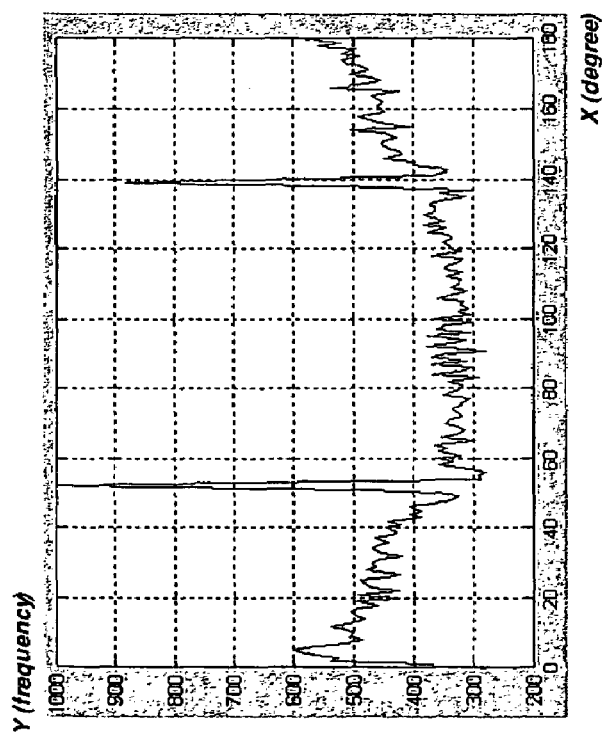
FIG. 35 shows a histogram of directions in accordance with aspects of the present invention.

Once all the directions are obtained, a histogram of directions can be created. The X axis is θ. The Y axis is the frequency count of θ. FIG. 35 shows the histogram where the number of times a centroid was on line 3403 for a specific angle θ.

Figure 36:
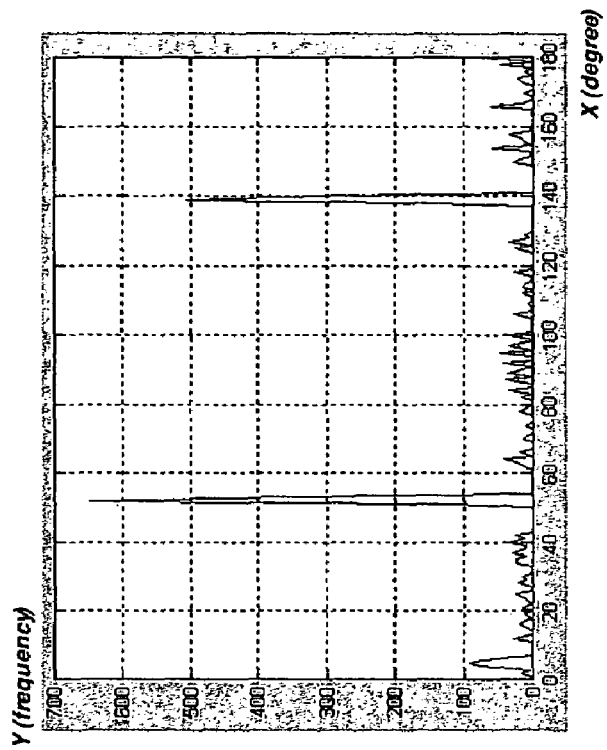
FIG. 36 shows a normalized histogram of directions in accordance with aspects of the present invention.

Next, as shown in FIG. 36, the histogram is first normalized using template [−0.1, −0.1, −0.1, −0.1, −0.1, 0, 0, 0, 1, 0, 0, 0, −0.1, −0.1, −0.1, −0.1, −0.1]. That is, for every x, where x=0, 1, . . . , 179, $$Y(x) = \sum_{i=0}^{16} (\text{template }[i] \cdot Y(\text{mod}(x+i-8, 180))).$$

mod(x,y) is a function that returns the positive remainder of x divided by y. For example, mod(3,2)=1, mod(−3,2)=1.

Figure 37:
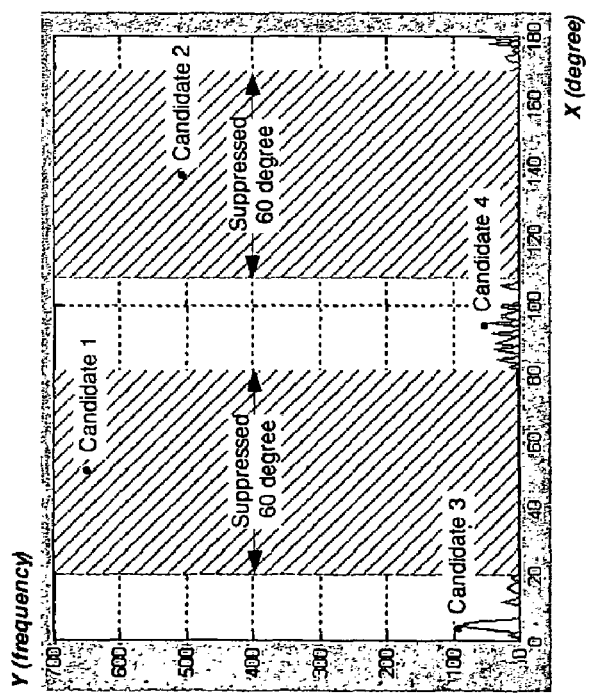
FIG. 37 shows selection of four candidate directions in accordance with aspects of the present invention.

Next, as shown in FIG. 37, four candidates of the main directions are identified. The X value that has the highest Y value is set as Candidate 1. Y values of adjacent X are suppressed to 0, i.e. Y(x)=0, where x is in the range of mod (Candidate 1±30, 180) Find the next X value with the highest Y value and set as Candidate 2. Y values of adjacent X are suppressed to 0, i.e. Y(x)=0, where x is in the range of mod (Candidate 2±30, 180) Repeat the process to find Candidate 3 and Candidate 4. The reason for the suppression of the regions is that these angles are where EIC symbols are not expected to lie.

From the four candidates, 2 pairs of near perpendicular directions are identified. That is, for a candidate $x_i$, select another candidate $x_j$, such that abs(90−abs($x_i$−$x_j$)) is minimized. abs(x) is a function that returns the absolute value of x. For example, abs(1.8)=1.8, abs(−1.8)=1.8.

Now, one can select ($x_i$,$x_j$) such that Y($x_i$)+Y($x_j$) is maximized.

Given the pair selected, ($x_i$,$x_j$), centroid of a small area near $x_i$ and $x_j$ is calculated:

$$\bar{x}_i = \frac{\sum_{k=-5}^{5}(\text{mod}(x_i+k, 180) \cdot Y(\text{mod}(x_i+k, 180)))}{\sum_{k=-5}^{5} Y(\text{mod}(x_i+k, 180))}$$

$$\bar{x}_j = \frac{\sum_{k=-5}^{5}(\text{mod}(x_j+k, 180) \cdot Y(\text{mod}(x_j+k, 180)))}{\sum_{k=-5}^{5} Y(\text{mod}(x_j+k, 180))}.$$

The two centroids are the two main directions. That is, suppose $\bar{x}_i < \bar{x}_j$, $\theta_h = \bar{x}_i$, and $\theta_v = \bar{x}_j$.

Figure 38:
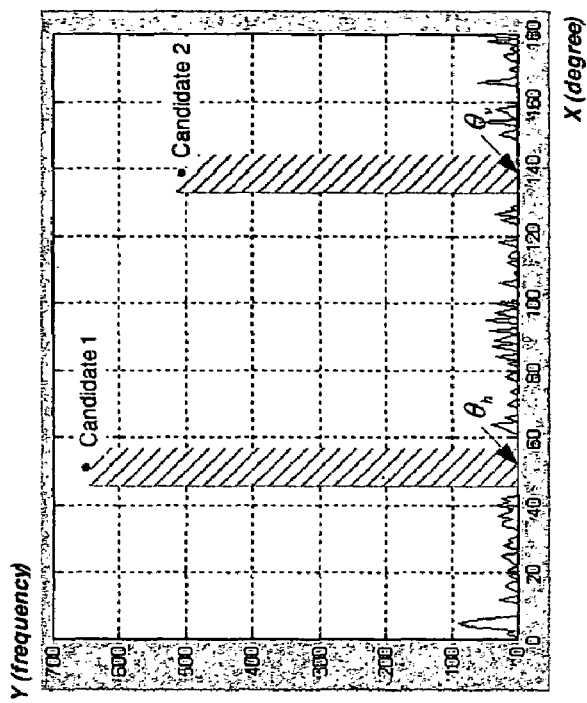
FIG. 38 shows the selection of two main directions in accordance with aspects of the present invention.

FIG. 38 shows the final output of this step, the two main directions $\theta_h$ and $\theta_v$.

Next, the system determines the scale and translation for the EIC symbols.

In the step, one looks for the scale and translation of the affine transform. Scale is the distance between two adjacent parallel lines. Translation is the distance between the image center and the origin of the coordinate system formed by the grid lines. Both scale and translation are measured in pixels.

Figure 39:
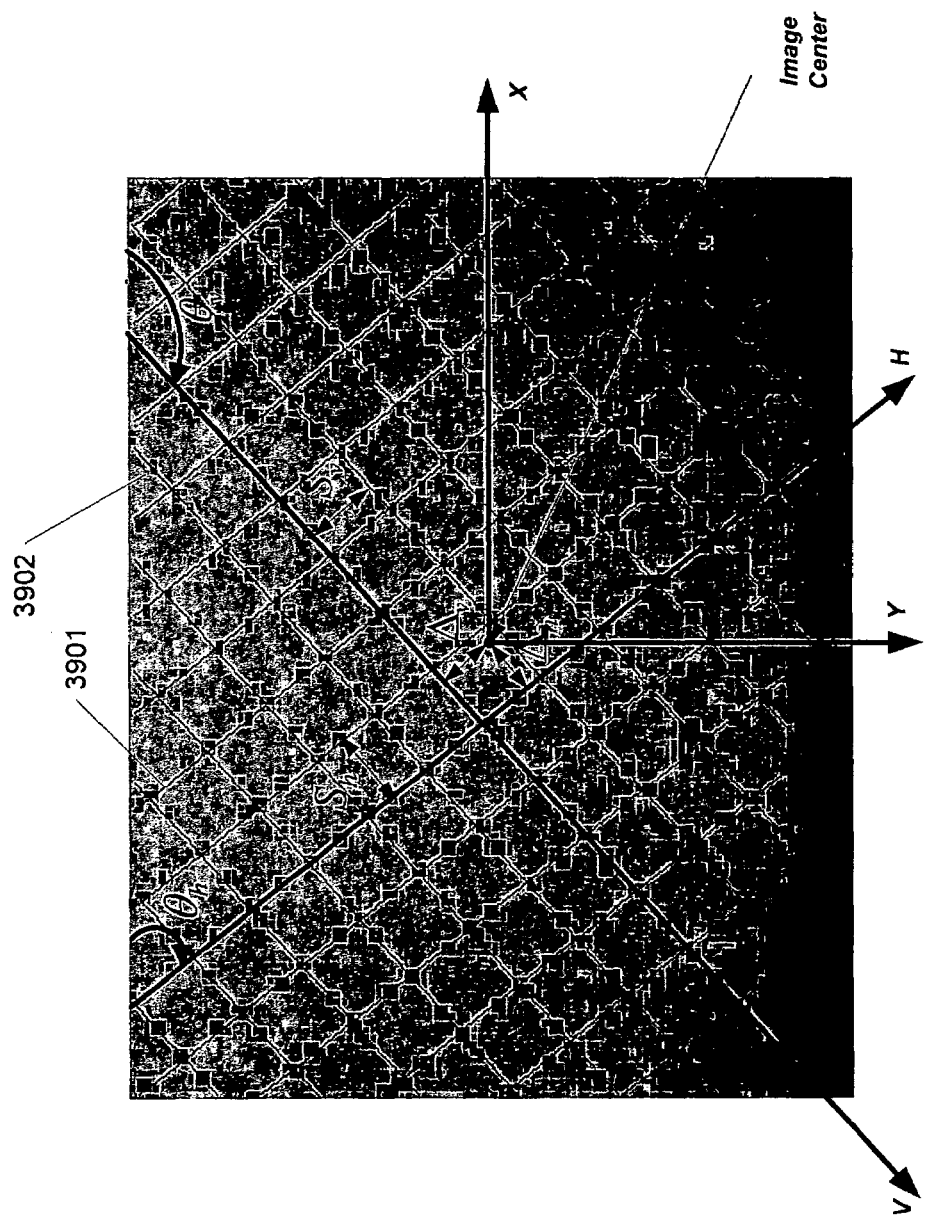
FIG. 39 shows two coordinate systems in accordance with aspects of the present invention.

FIG. 39 shows the affine transformed grid lines. The two main directions are: $\theta_h, \theta_v$. The two scales along the two directions are: $S_h, S_v$. The two translations are: $\Delta_h, \Delta_v$.

Note that the H, V coordinate system shown in FIG. 39 is the coordinate system of the grid. Grid lines are not seen in image. But as explained before, if one assumes an affine transform from paper plane to image plane, EIC pattern in image may appear to lie on grid lines that are an affine transform of the grid lines in EIC symbol array. Therefore, one can draw grid lines in image (the gridlines parallel to lines 3901 and 3902) and the H, V coordinate system based on an affine transform of the grid lines in EIC symbol array.

The X, Y coordinate system shown in FIG. 39 is the coordinate system of the image. Facing the image, X is always left to right and Y is always top to bottom. The image center is the origin of the X, Y coordinate system.

To obtain the two scales $S_h$, $S_v$, the image may be rotated counterclockwise with $\theta_h$, $\theta_v$ respectively.

Figure 40:
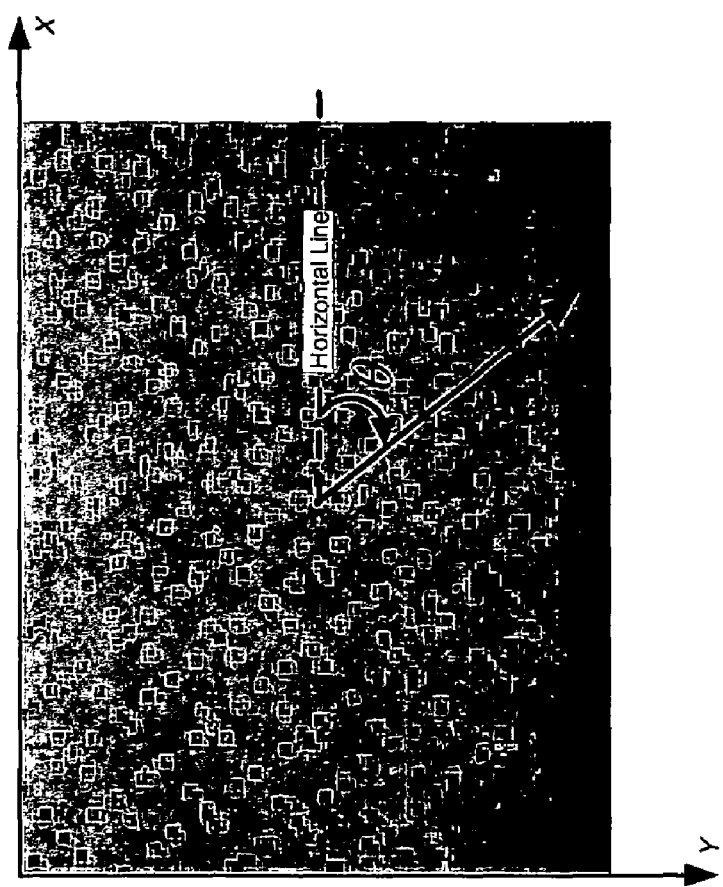
FIG. 40 shows effective embedded interaction coding pixels in accordance with aspects of the present invention.

FIG. 40 shows the image before rotation. FIG. 39 shows the image after being rotated counterclockwise with θ.

Figure 41:
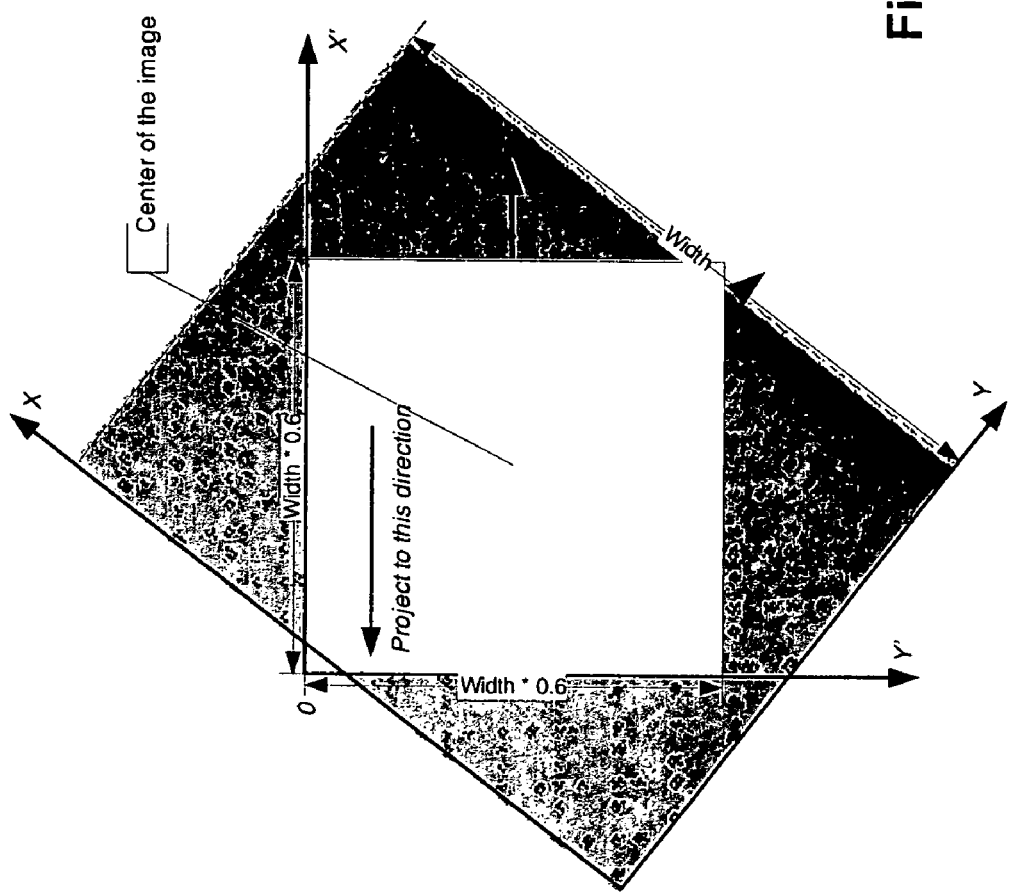
FIG. 41 shows rotated effective embedded interaction coding pixels in accordance with aspects of the present invention.

In the middle region of the rotated image (shown as the shadowed area in FIG. 41), a coordinate system X', Y' is defined. In one implementation, the height and width of the middle region is 60% of the width of the image sensor. Therefore, distance from the origin of X', Y' to the image center is 30% of the width of the image sensor in both directions.

Figure 42:
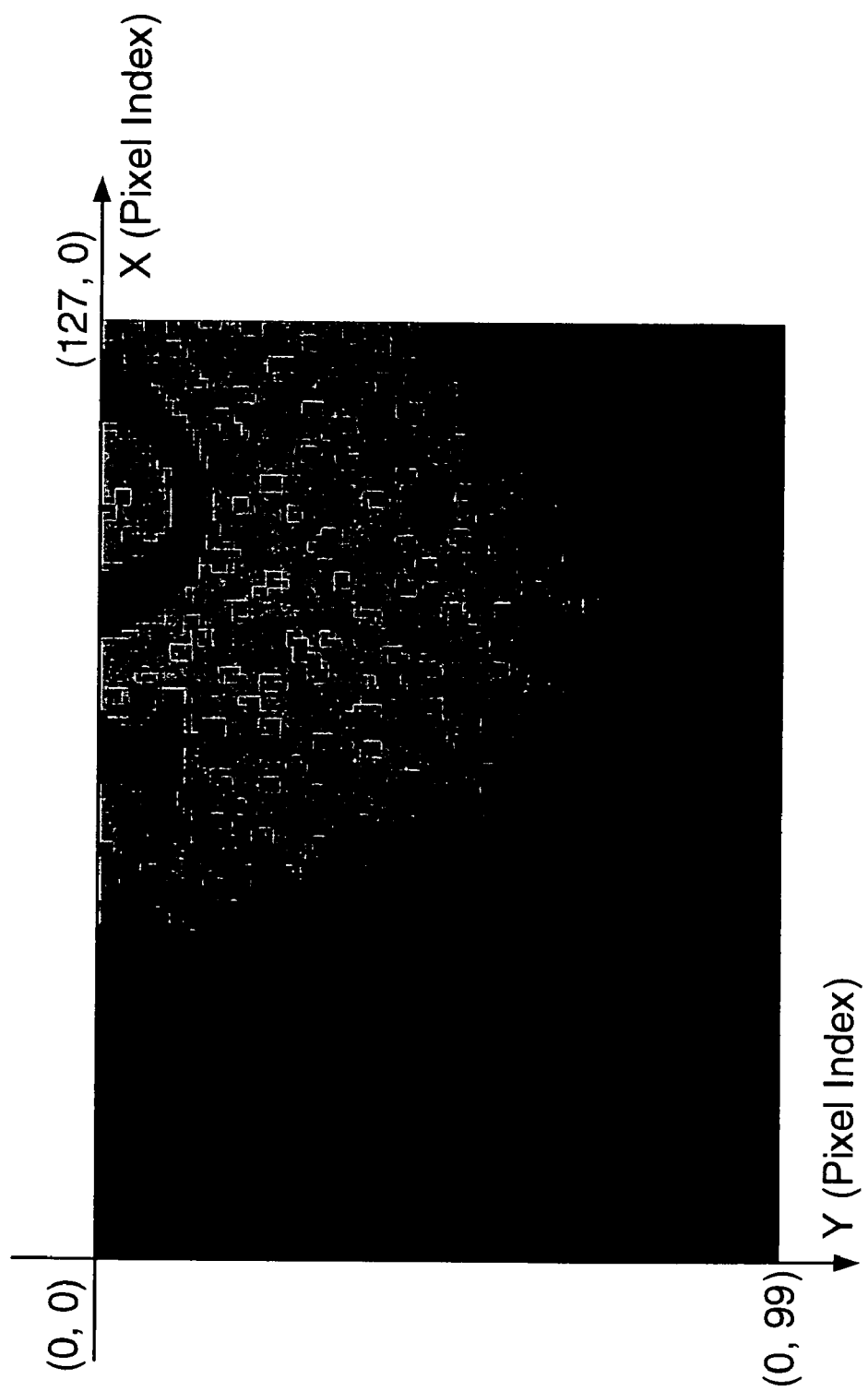
FIG. 42 shows a pixel index applied to an image from a camera in accordance with aspects of the present invention.

For every pixel (x,y), where x=0, 1, . . . , 127, y=0, 1, . . . , 99, coordinates of the pixel in the new coordinate system X', Y' are:

$$x'=\text{int}((x-x_C)\cdot\cos\theta+(y-y_C)\cdot\sin\theta+\text{width}\cdot 0.3),$$

$$y'=\text{int}(-(x-x_C)\cdot\sin\theta+(y-y_C)\cdot\cos\theta+\text{width}\cdot 0.3),$$

where ($x_C$,$y_C$) are coordinates of the image center in the pixel index coordinate system depicted in FIG. 42. width is the width of the image sensor. Note that $$x_C = \frac{\text{width}-1}{2},$$

$$y_C = \frac{\text{height}-1}{2},$$

where width is the width of the image sensor, height is the height of the image sensor. This is because in the pixel index coordinate system depicted in FIG. 42, a pixel can be actually indexed by the coordinates of its center.

In one implementation, width=128, height=100, $x_C$=63.5, $y_C$=49.5. Of course, other values may be used as well.

Let Rotate Mask (x',y')=EIC Pattern Mask (x,y).

Figure 43:
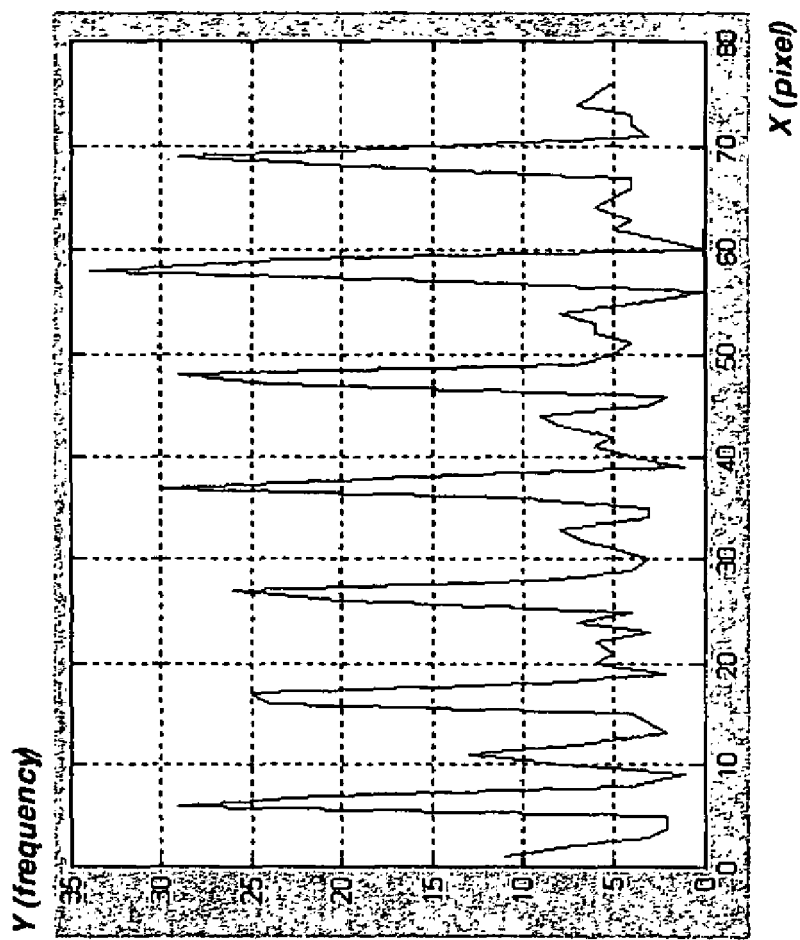
FIG. 43 shows effective EIC pattern pixel projection histogram in accordance with aspects of the present invention.

Now, effective EIC pattern in the middle region are projected to the Y' axis to create a histogram. See FIG. 43. The X axis of the histogram is the value of y'. Since the size of the middle region is width·0.6=76.8, y' is in the range of [0, 75]. The Y axis of the histogram is the count of all x', where x'=0, 1, 2, . . . , 75, and Rotate Mask (x',y')=1.

Next, one attempts to obtain scale and translation information from the histogram.

First, one finds all the Y values that are local maximums. That is, find all the Y values that satisfy Y(x)>Y(x−1) and Y(x)>Y(x+1), where x=1, 2, . . . , 74. The Y values are kept and other Y values are set to 0. Next, the process then sets Y(0)=0 and Y(75)=0. If two local maximums are too close, for example, if both Y($x_1$) and Y($x_2$) are local maximums, and abs($x_1$−$x_2$)<5, then the system keeps the larger Y value, i.e. if Y($x_1$)>Y($x_2$), then the system keeps the value of Y($x_1$) and set Y($x_2$)=0.

Figure 44:
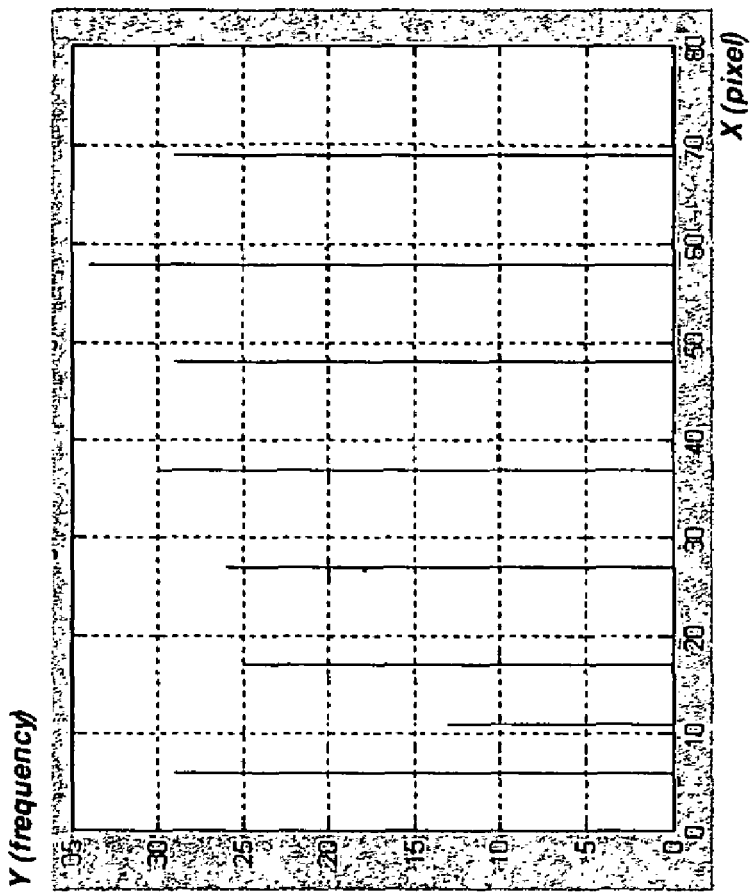
FIG. 44 shows local maximums of the histogram from FIG. 43 in accordance with aspects of the present invention.

Next, the system finds the global maximum $(x_{max}, y_{max})$ in the histogram. If $y_{max}=0$, EIC pattern analysis fails for this image. If $y_{max} \neq 0$, the local maximums are compared with the global maximum. If the local maximum is less than ⅓ of the global maximum, the local maximum is set to 0. FIG. 44 shows the resulting histogram.

Suppose the system has found a total of n local maximums, and $x_i$, where i=0, 1, . . . , n−1, are the X values of the local maximums. Let $d_i$, where i=0, 1, . . . , n−2, be the distance between $x_i$ and $x_{i+1}$, i.e. $d_i = x_{i+1} - x_i$. The system obtains the first estimate of scale S by averaging all the distances, i.e.

$$S = \frac{\sum_{i=0}^{n-2} d_i}{n-1}.$$

Next, the system finds the distance $d_i$, where $d_i \neq 0$, i=0, 1, . . . , n−2, that differs from S the most, i.e.

$$j = \underset{i=0}{\overset{n-2}{\mathrm{ArgMax}}}(\mathrm{abs}(d_i - S)) \mid d_i \neq 0.$$

If $d_j$ is not that different from S, i.e. if $$\mathrm{abs}(d_j - S) \leq \frac{1}{3}S,$$

then S is the best scale. If $d_j$ is too much bigger than S, for example, if $$(d_j - S) > \frac{1}{3}S,$$

then $d_j$ may be multiples of the actual scale and will affect calculating the average of the distances. Therefore the system sets $d_j=0$. If $d_j$ is too much smaller than S, for example, if $$(S - d_j) > \frac{1}{3}S,$$

the system combines $d_j$ with the next distance $d_{j+1}$, if $d_{j+1}>0$; if $d_{j+1}=0$, the system sets $d_j=0$. The system calculates S again by averaging the non-zero $d_i$'s, and goes back to the beginning (where distance $d_i$ is found). The output is a best scale S.

With the best scale S obtained, the system finds the X value, which is an integer multiples of S away from $x_{max}$, i.e. $X_{start} = \mathrm{mod}(x_{max}, S)$. Translation $\Delta$ is: $\Delta = S - \mathrm{mod}((x_{center} - x_{start}), S)$. Here, since the size of the middle region is width·0.6=76.8, $$x_{center} = \frac{width \cdot 0.6}{2} = 38.4,$$

in this example.

Figure 45:
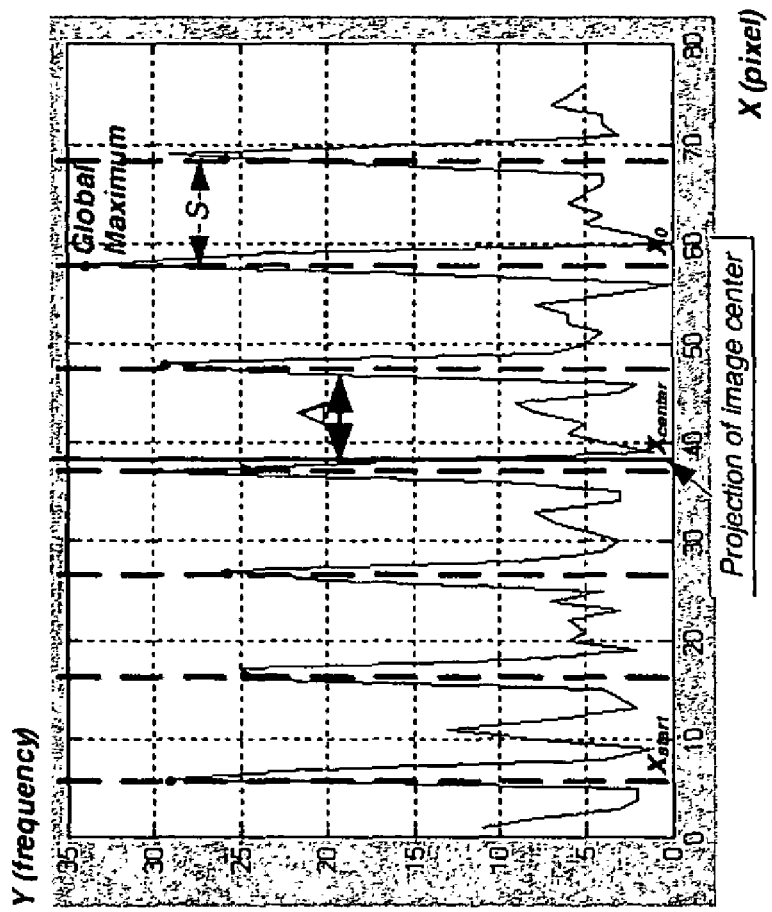
FIG. 45 shows scale and translation in accordance with aspects of the present invention.
Figure 46:
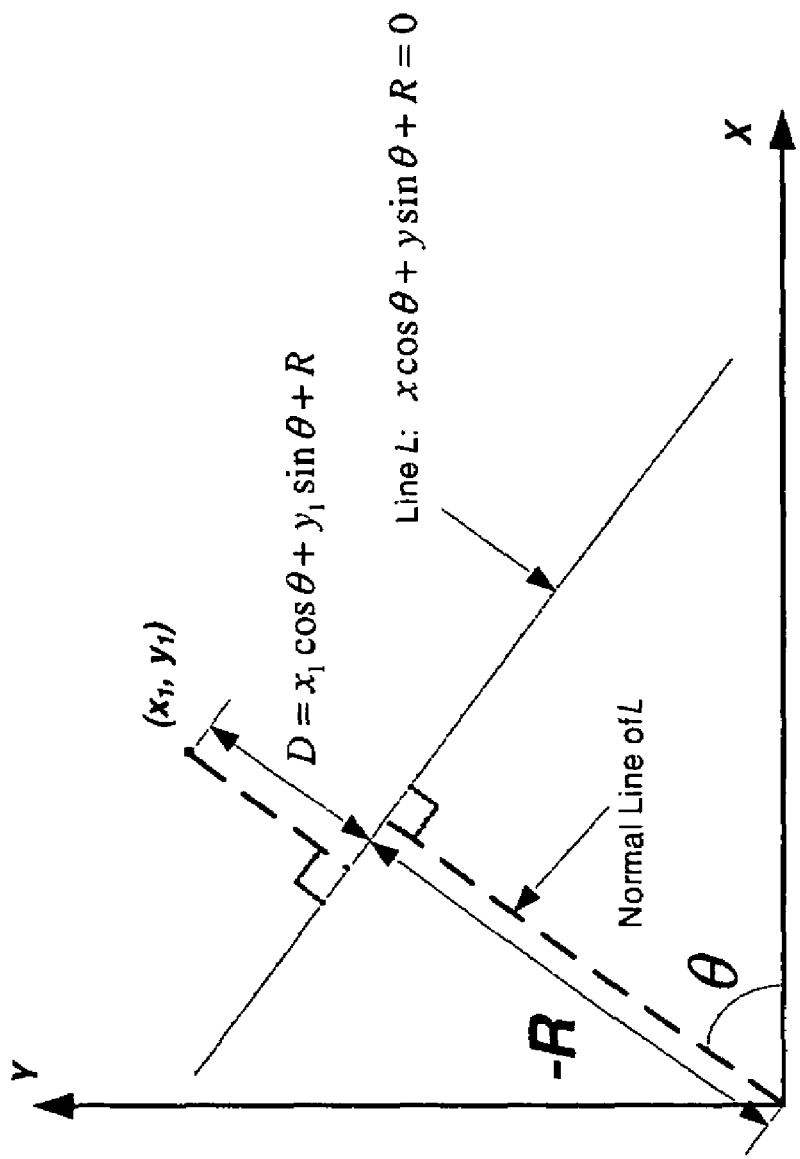
FIG. 46 shows geometrical calculations in accordance with aspects of the present invention.

FIG. 45 shows the scale and translation obtained. Note that the scale and translation are shown in the original histogram. With the above process, scale and translation for each direction is obtained.

Next, the system obtains an initial homography matrix. This step obtains a homography matrix, H, that describes the affine transform. The homography matrix transforms a point in the coordinate system of the grid, i.e. the H, V coordinate system, to a point in the coordinate system of the image, i.e. the X, Y coordinate system (see FIG. 39). That is, $$\begin{bmatrix} x \\ y \\ 1 \end{bmatrix} = H \cdot \begin{bmatrix} h \\ v \\ 1 \end{bmatrix},$$

and $$\begin{bmatrix} h \\ v \\ 1 \end{bmatrix} = H^{-1} \cdot \begin{bmatrix} x \\ y \\ 1 \end{bmatrix}.$$

Given the rotation, scale and translation obtained, the homography matrix describing the affine transform is:

$$H = \begin{bmatrix} \frac{s_v \cos\theta_h}{\sin(\theta_v - \theta_h)} & \frac{s_h \cos\theta_v}{\sin(\theta_v - \theta_h)} & \frac{\Delta_h \cos\theta_v - \Delta_v \cos\theta_h}{\sin(\theta_v - \theta_h)} \\ \frac{s_v \sin\theta_h}{\sin(\theta_v - \theta_h)} & \frac{s_h \sin\theta_v}{\sin(\theta_v - \theta_h)} & \frac{\Delta_h \sin\theta_v - \Delta_v \sin\theta_h}{\sin(\theta_v - \theta_h)} \\ 0 & 0 & 1 \end{bmatrix}.$$

In the next step, the system uses H as an initial value to obtain a homography matrix that describes a perspective transform from grid to image. That is, grid lines drawn in image may not be evenly spaced or parallel anymore. Instead, they may appear to converge to a vanishing point.

Symbol Segmentation

The next step refines the initial homography matrix by fitting effective EIC pattern to the affine transformed grid lines. The output is a homography matrix H that transforms lines from H, V to X, Y.

First, one can find the relationship between the homograph matrix H that transforms lines from H, V to X, Y and the one H that transforms points from H, V to X, Y.

In X, Y coordinate system, a line L can be represented as:

$x \cos \theta + y \sin \theta + R = 0,$ where θ is the angle between the normal line of L and the X axis, −R is the distance from the origin to line L. See FIG. 23.

Given this representation, the distance from any point ($x_1$, $y_1$) to line L is:

$D = x_1 \cos \theta + y_1 \sin \theta + R.$

In other words, a line can be represented as:

$$\begin{bmatrix} c & s & R \end{bmatrix} \cdot \begin{bmatrix} x \\ y \\ 1 \end{bmatrix} = 0.$$

When $c^2+s^2=1$, distance of any point $(x_1,y_1)$ to the line is:

$$[c \quad s \quad R] \cdot \begin{bmatrix} x_1 \\ y_1 \\ 1 \end{bmatrix}.$$

The system uses these representations to represent grid lines in image. Suppose a grid line in the H, V coordinate system is $$[c_{hv} \quad s_{hv} \quad R_{hv}] \cdot \begin{bmatrix} h \\ v \\ 1 \end{bmatrix} = 0.$$

In X, Y coordinate system, the same line is $$[c_{xy} \quad s_{xy} \quad R_{xy}] \cdot \begin{bmatrix} x \\ y \\ 1 \end{bmatrix} = 0.$$

Since $$\begin{bmatrix} h \\ v \\ 1 \end{bmatrix} = H^{-1} \cdot \begin{bmatrix} x \\ y \\ 1 \end{bmatrix},$$

this leaves, $$[c_{hv} \quad s_{hv} \quad R_{hv}] \cdot H^{-1} \cdot \begin{bmatrix} x \\ y \\ 1 \end{bmatrix} = 0 = [c_{xy} \quad s_{xy} \quad R_{xy}] \cdot \begin{bmatrix} x \\ y \\ 1 \end{bmatrix}.$$

Therefore, $$[c_{hv} \quad s_{hv} \quad R_{hv}] \cdot H^{-1} = [c_{xy} \quad s_{xy} \quad R_{xy}],$$

i.e.

$$\begin{bmatrix} c_{xy} \\ s_{xy} \\ R_{xy} \end{bmatrix} = (H^{-1})^t \cdot \begin{bmatrix} c_{hv} \\ s_{hv} \\ R_{hv} \end{bmatrix}.$$

Hence $(H^{-1})^t$ transforms a line from H, V to X, Y and therefore $H=(H^{-1})^t$.

The homography matrix obtained from EIC pattern feature extraction gives an initial value of H, i.e.

$$H_0 = (H^{-1})^t = \left( \begin{bmatrix} \frac{s_v \cos\theta_h}{\sin(\theta_v - \theta_h)} & \frac{s_h \cos\theta_v}{\sin(\theta_v - \theta_h)} & \frac{\Delta_h \cos\theta_v - \Delta_v \cos\theta_h}{\sin(\theta_v - \theta_h)} \\ \frac{s_v \sin\theta_h}{\sin(\theta_v - \theta_h)} & \frac{s_h \sin\theta_v}{\sin(\theta_v - \theta_h)} & \frac{\Delta_h \sin\theta_v - \Delta_v \sin\theta_h}{\sin(\theta_v - \theta_h)} \\ 0 & 0 & 1 \end{bmatrix}^{-1} \right)^t.$$

The system may refine H by the least squares regression. In H, V coordinate system, the grid lines can be represented as:

$$h \cdot 0 + v \cdot 1 + k_i^h = 0$$

$$h \cdot 1 + v \cdot 0 + k_i^v = 0$$

where $k_i^h$ and $k_i^v$ are indexes of the grid lines along the H and V directions respectively (one can refer to these as H and V lines, respectively), and are positive or negative integers.

Suppose $$H = \begin{bmatrix} h_{11} & h_{12} & h_{13} \\ h_{21} & h_{22} & h_{23} \\ h_{31} & h_{32} & h_{33} \end{bmatrix}.$$

Then in X, Y coordinate system, the H and V lines are:

$$c_i^h \cdot x + s_i^h \cdot y + R_i^h = 0,$$

$$c_i^v \cdot x + s_i^v \cdot y + R_i^v = 0,$$

where $$\begin{pmatrix} c_i^h \\ s_i^h \\ R_i^h \end{pmatrix} = \lambda_i^h \begin{pmatrix} h_{11} & h_{12} & h_{13} \\ h_{21} & h_{22} & h_{23} \\ h_{31} & h_{32} & h_{33} \end{pmatrix} \cdot \begin{pmatrix} 0 \\ 1 \\ k_i^h \end{pmatrix}$$

$$= \frac{1}{\sqrt{(h_{12}+h_{13}k_i^h)^2 + (h_{22}+h_{23}k_i^h)^2}} \begin{pmatrix} h_{12}+h_{13}k_i^h \\ h_{22}+h_{23}k_i^h \\ h_{32}+h_{33}k_i^h \end{pmatrix}$$

$$\begin{pmatrix} c_i^v \\ s_i^v \\ R_i^v \end{pmatrix} = \lambda_i^v \begin{pmatrix} h_{11} & h_{12} & h_{13} \\ h_{21} & h_{22} & h_{23} \\ h_{31} & h_{32} & h_{33} \end{pmatrix} \cdot \begin{pmatrix} 1 \\ 0 \\ k_i^v \end{pmatrix}$$

$$= \frac{1}{\sqrt{(h_{11}+h_{13}k_i^v)^2 + (h_{21}+h_{23}k_i^v)^2}} \begin{pmatrix} h_{11}+h_{13}k_i^v \\ h_{21}+h_{23}k_i^v \\ h_{31}+h_{33}k_i^v \end{pmatrix}$$

where $$\lambda_i^h = \frac{1}{\sqrt{(h_{12}+h_{13}k_i^h)^2 + (h_{22}+h_{23}k_i^h)^2}}$$

and $$\lambda_i^v = \frac{1}{\sqrt{(h_{11}+h_{13}k_i^v)^2 + (h_{21}+h_{23}k_i^v)^2}}$$

are scalars that make $(c_i^h)^2+(s_i^h)^2=1$ and $(c_i^v)^2+(s_i^v)^2=1$.

Now, given the grid lines represented in the X, Y coordinate system, the system looks for all effective EIC pattern pixels close enough to each line. These effective EIC pattern pixels can be used to refine the lines.

Figure 47:
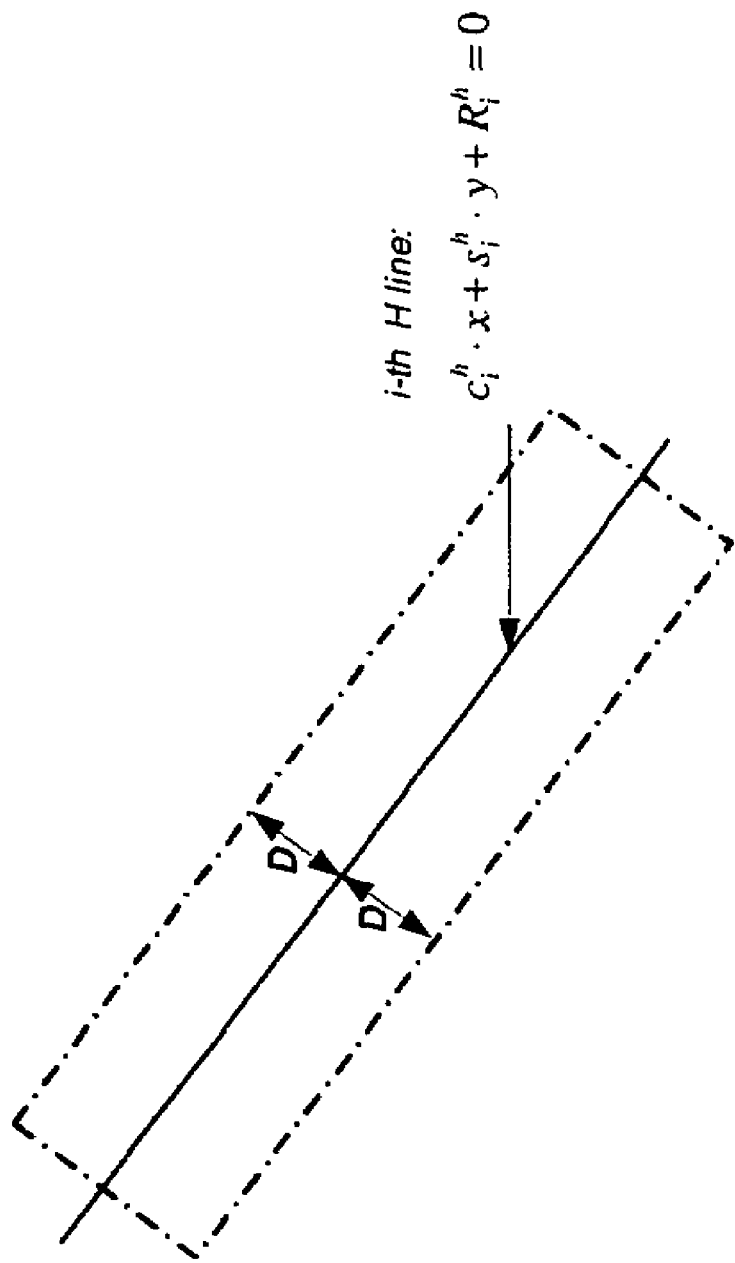
FIG. 47 shows a technique for finding all effective EIC pattern pixels associated with a line in accordance with aspects of the present invention.

If an effective EIC pattern pixel is within a distance of D to a line, it is considered associated with the line. See FIG. 47. In one implementation, D=1.5 pixels.

That is, for every pixel $(x,y)$, where $x=0, 1, 2, \ldots, 127$, $y=0, 1, 2, \ldots, 99$, If EIC Pattern Mask $(x,y)=1$ $$\text{abs}((c_i^h \cdot (x-x_C) + s_i^h \cdot (y-y_C) + R_i^h) < D,$$

then, (x,y) is considered associated with the i-th H line. If

EIC Pattern Mask $(x,y)=1$ $$\text{abs}((c_i^v \cdot (x-x_C) + s_i^v \cdot (y-y_C) + R_i^v) < D,$$

then, (x,y) is considered associated with the i-th V line.

Again, $(x_C, y_C)$ are coordinates of the image center in the pixel index coordinate system, and $x_C=63.5, y_C=49.5$.

Figure 48:
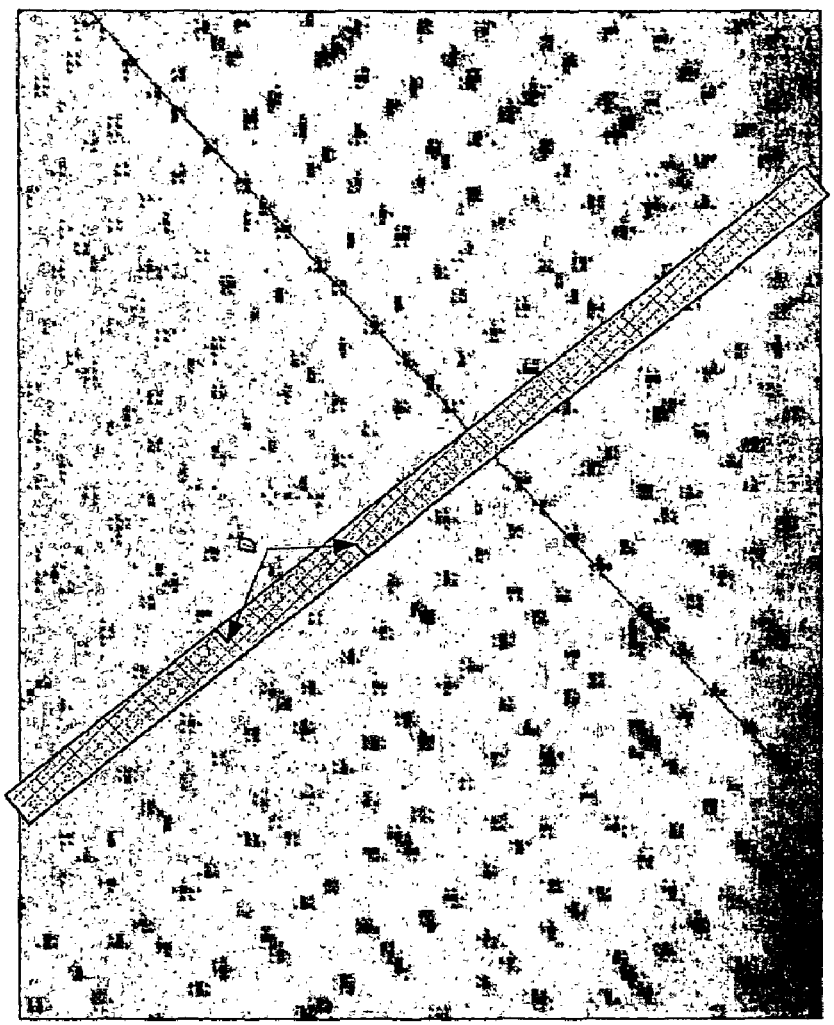
FIG. 48 shows effective EIC pattern pixels associated with a line in accordance with aspects of the present invention.

FIG. 48 shows the effective EIC pattern pixels identified as associated with the line running from top left to bottom right.

Suppose one has identified that effective EIC pattern pixels $(x_{ij}^h, y_{ij}^h)$ are associated with the i-th H line, where $i=1, 2, \ldots, m^h, j=1, 2, \ldots, m_i^h$. $m^h$ is the total number of H lines in the image and $m_i^h$ is the total number of effective EIC pattern pixels associated with the i-th H line. Effective EIC pattern pixels $(x_{ij}^v, y_{ij}^v)$ are associated with the i-th V line, where $i=1, 2, \ldots, m^v, j=1, 2, \ldots, m_i^v$. $m^v$ is the total number of V lines in the image and $m_i^v$ is the total number of effective EIC pattern pixels associated with the i-th V line.

Next, one wants to find the optimal homography matrix H, such that it minimizes the distance between the effective EIC pattern pixels and their associated lines, i.e. one wants to minimize $$g(H) = \frac{1}{2N} \sum_{i=1}^{m^h} \sum_{j=1}^{m_i^h} \gamma_{ij}^h (x_{ij}^h c_i^h + y_{ij}^h s_i^h + R_i^h)^2 + \frac{1}{2N} \sum_{i=1}^{m^v} \sum_{j=1}^{m_i^v} \gamma_{ij}^v (x_{ij}^v c_i^v + y_{ij}^v s_i^v + R_i^v)^2,$$

where $$N = \sum_{i=1}^{m^h} m_i^h + \sum_{i=1}^{m^v} m_i^v,$$

i.e. N is the total number of effective EIC pattern pixels associated with all the lines, $\gamma_{ij}^h$ and $\gamma_{ij}^v$ are weights. In one implementation, $\gamma_{ij}^h=1$ and $\gamma_{ij}^v=1$.

Define:

$$g_{ij}^h(H) = \frac{x_{ij}^h(h_{12} + h_{13}k_i^h) + y_{ij}^h(h_{22} + h_{23}k_i^h) + (h_{32} + h_{33}k_i^h)}{\sqrt{(h_{12} + h_{13}k_i^h)^2 + (h_{22} + h_{23}k_i^h)^2}},$$

and $$g_{ij}^v(H) = \frac{x_{ij}^v(h_{11} + h_{13}k_i^v) + y_{ij}^v(h_{21} + h_{23}k_i^v) + (h_{31} + h_{33}k_i^v)}{\sqrt{(h_{11} + h_{13}k_i^v)^2 + (h_{21} + h_{23}k_i^v)^2}},$$

one may re-write g(H) as:

$$g(H) = \frac{1}{2N} \sum_{i=1}^{m^h} \sum_{j=1}^{m_i^h} \gamma_{ij}^h [g_{ij}^h(H)]^2 + \frac{1}{2N} \sum_{i=1}^{m^v} \sum_{j=1}^{m_i^v} \gamma_{ij}^v [g_{ij}^v(H)]^2.$$

After H is initialized, to get more accurate estimates of H, suppose one wants to update the current H by $\delta H$, then the increment $\delta H$ should minimize $g(H+\delta H)$.

Since $$g_{ij}^h(H+\delta H) \approx g_{ij}^h(H) + (\nabla g_{ij}^h)^t \delta H, \quad g_{ij}^v(H+\delta H) \approx g_{ij}^v(H) + (\nabla g_{ij}^v)^t \delta H,$$

one has, $$g(H + \delta H) \approx \frac{1}{2N} \sum_{i=1}^{m^h} \sum_{j=1}^{m_i^h} \gamma_{ij}^h [g_{ij}^h(H) + (\nabla g_{ij}^h)^t \delta H]^2 +$$

$$\frac{1}{2N} \sum_{i=1}^{m^v} \sum_{j=1}^{m_i^v} \gamma_{ij}^v [g_{ij}^v(H) + (\nabla g_{ij}^v)^t \delta H]^2 =$$

$$\frac{1}{2N} \left\{ \sum_{i=1}^{m^h} \sum_{j=1}^{m_i^h} \gamma_{ij}^h [g_{ij}^h(H)]^2 + \sum_{i=1}^{m^v} \sum_{j=1}^{m_i^v} \gamma_{ij}^v [g_{ij}^v(H)]^2 \right\} +$$

$$\frac{1}{N} \left[ \sum_{i=1}^{m^h} \sum_{j=1}^{m_i^h} \gamma_{ij}^h g_{ij}^h(H)(\nabla g_{ij}^h)^t + \sum_{i=1}^{m^v} \sum_{j=1}^{m_i^v} \gamma_{ij}^v g_{ij}^v(H)(\nabla g_{ij}^v)^t \right] \delta H +$$

$$\frac{1}{2N} (\delta H)^t \left[ \sum_{i=1}^{m^h} \sum_{j=1}^{m_i^h} \gamma_{ij}^h \nabla g_{ij}^h (\nabla g_{ij}^h)^t + \sum_{i=1}^{m^v} \sum_{j=1}^{m_i^v} \gamma_{ij}^v \nabla g_{ij}^v (\nabla g_{ij}^v)^t \right] \delta H$$

Therefore, $$\frac{\partial [g(H + \delta H)]}{\partial (\delta H)} = \frac{1}{N} \left[ \sum_{i=1}^{m^h} \sum_{j=1}^{m_i^h} \gamma_{ij}^h g_{ij}^h(H) \nabla g_{ij}^h + \sum_{i=1}^{m^v} \sum_{j=1}^{m_i^v} \gamma_{ij}^v g_{ij}^v(H) \nabla g_{ij}^v \right] +$$

$$\frac{1}{N} \left[ \sum_{i=1}^{m^h} \sum_{j=1}^{m_i^h} \gamma_{ij}^h \nabla g_{ij}^h (\nabla g_{ij}^h)^t + \sum_{i=1}^{m^v} \sum_{j=1}^{m_i^v} \gamma_{ij}^v \nabla g_{ij}^v (\nabla g_{ij}^v)^t \right] \delta H$$

By making the above variation 0 in order to minimize $g(H+\delta H)$, one has:

$$\delta H = - \left[ \sum_{i=1}^{m^h} \sum_{j=1}^{m_i^h} \gamma_{ij}^h \nabla g_{ij}^h (\nabla g_{ij}^h)^t + \sum_{i=1}^{m^v} \sum_{j=1}^{m_i^v} \gamma_{ij}^v \nabla g_{ij}^v (\nabla g_{ij}^v)^t \right]^{-1} \left[ \sum_{i=1}^{m^h} \sum_{j=1}^{m_i^h} \gamma_{ij}^h g_{ij}^h(H) \nabla g_{ij}^h + \sum_{i=1}^{m^v} \sum_{j=1}^{m_i^v} \gamma_{ij}^v g_{ij}^v(H) \nabla g_{ij}^v \right]$$

After solving for $\delta H$, if $g(H+\delta H) < g(H)$, one may update H, i.e. $H=H+\delta H$. If $g(H+\delta H) \geq g(H)$, the systems stops and the last H is the final H.

Given the new H, one can repeat the process outlined in this section, by updating the points that are associated to the updated grid lines. This process can converge or stop until a number of iterations have been performed. For instance, the process may end at 30 times.

Figure 49:
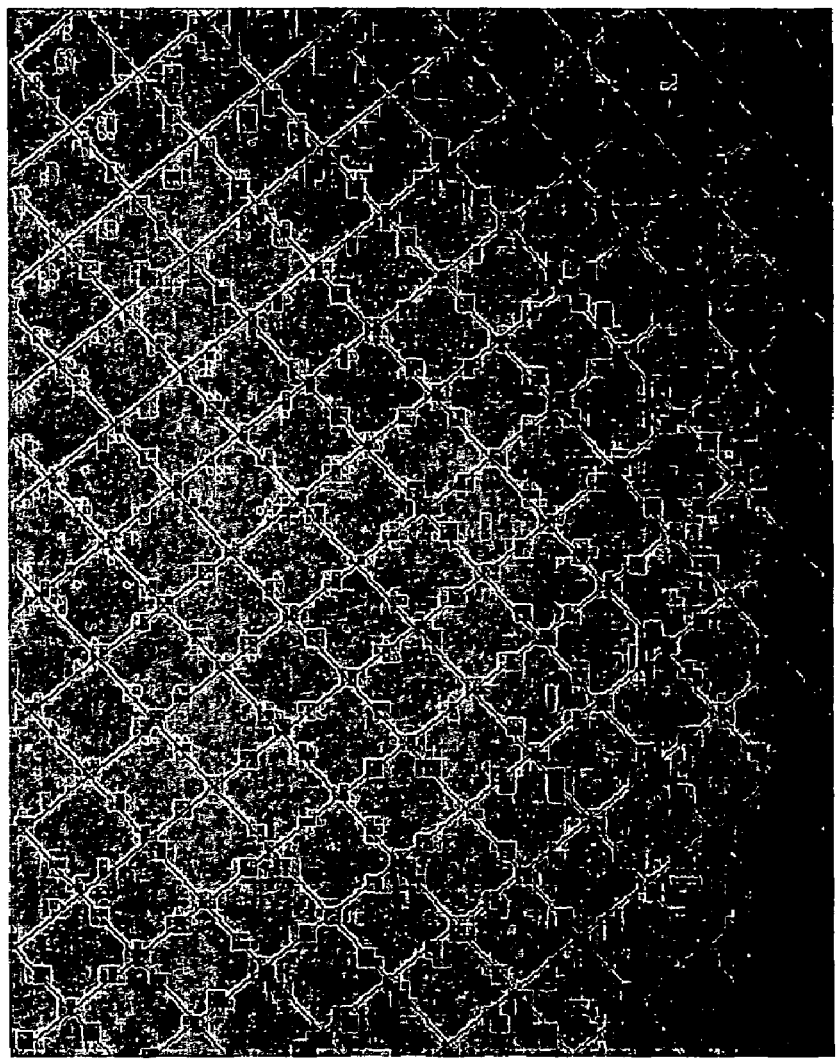
FIG. 49 shows grid lines before regression in accordance with aspects of the present invention.
Figure 50:
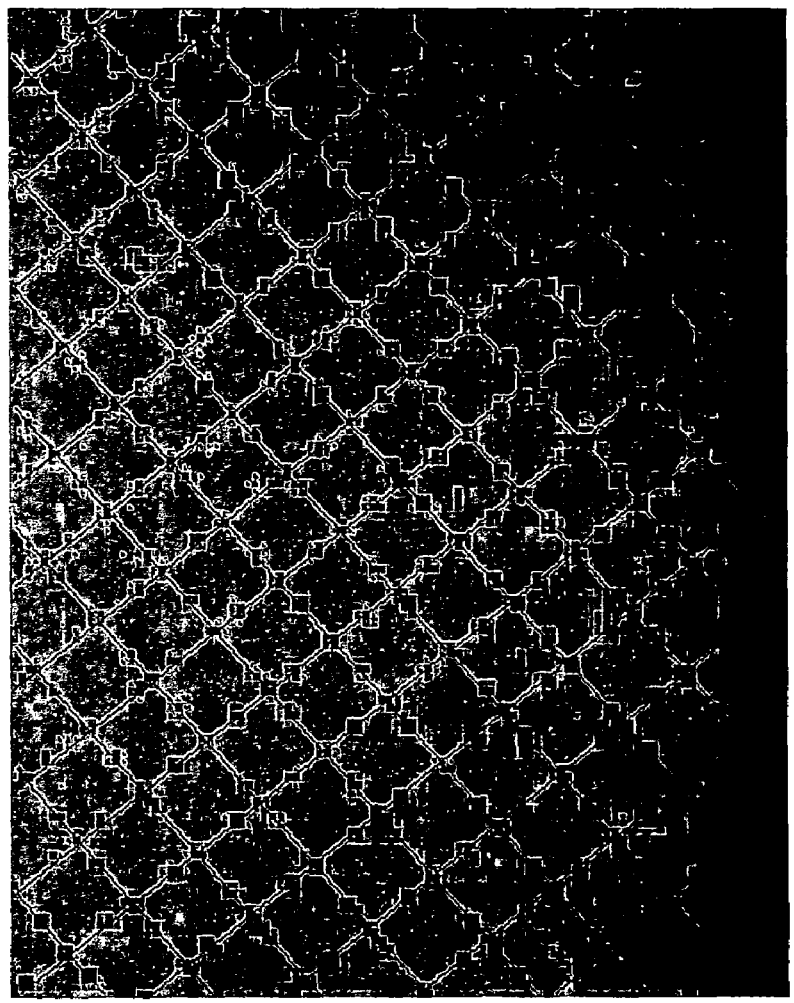
FIG. 50 shows grid lines after regression in accordance with aspects of the present invention.

FIG. 49 shows grid lines obtained before regression, i.e. obtained from an affine transform of the grid lines in EIC symbol array. FIG. 50 shows grid lines obtained after regression, i.e. obtained from a perspective transform of the grid lines in EIC symbol array.

Finally, convert homography matrix for line transform (H) to homography matrix for point transform (H):

$$H=(H^t)^{-1}.$$

This is referred to as the homography matrix $H_{Grid \to Image}$, which is the final output of EIC pattern analysis.

Further Details for Homography Computation

The following provides further details for fast homography computation by reusing the intermediate computation results. Computing summations directly as written above may be used. Alternatively, one can reduce repeated computation by reformulating the summations in the following manner.

Let (1)

$$\phi^v_{p13,i} = h_{p1} + h_{p1} + h_{p3}k^v_i \phi^h_{p23,i} = h_{p2} + h_{p3}k^h_i,$$
$$p = 1, 2, 3,$$
$$\rho^v_i = ([(\phi^v_{113,i})^2 + (\phi^v_{213,i})^2])^{-1},$$
$$\rho^h_i = ([(\phi^h_{123,i})^2 + (\phi^h_{223,i})^2])^{-1},$$
$$\psi^v_{xx,i} = \sum_{j=1}^{m^v_i} \gamma^v_{ij}(x^v_{ij})^2,$$
$$\psi^v_{xy,i} = \sum_{j=1}^{m^v_i} \gamma^v_{ij} x^v_{ij} y^v_{ij},$$
$$\psi^v_{yy,i} = \sum_{j=1}^{m^v_i} \gamma^v_{ij}(y^v_{ij})^2,$$
$$\psi^v_{x,i} = \sum_{j=1}^{m^v_i} \gamma^v_{ij} x^v_{ij},$$
$$\psi^v_{y,i} = \sum_{j=1}^{m^v_i} \gamma^v_{ij} y^v_{ij},$$
$$\psi^v_{1,i} = \sum_{j=1}^{m^v_i} \gamma^v_{ij},$$
$$\psi^h_{xx,i} = \sum_{j=1}^{m^h_i} \gamma^h_{ij}(x^h_{ij})^2,$$
$$\psi^h_{xy,i} = \sum_{j=1}^{m^h_i} \gamma^h_{ij} x^h_{ij} y^h_{ij},$$
$$\psi^h_{yy,i} = \sum_{j=1}^{m^h_i} \gamma^h_{ij}(y^h_{ij})^2,$$
$$\psi^h_{x,i} = \sum_{j=1}^{m^h_i} \gamma^h_{ij} x^h_{ij},$$
$$\psi^h_{y,i} = \sum_{j=1}^{m^h_i} \gamma^h_{ij} y^h_{ij},$$
$$\psi^h_{1,i} = \sum_{j=1}^{m^h_i} \gamma^h_{ij},$$

$$\Gamma^v_{1,i} = \rho^v_i(\phi^v_{113,i}\psi^v_{x,i} + \phi^v_{213,i}\psi^v_{y,i} + \phi^v_{313,i}\psi^v_{1,i}), \quad (2)$$
$$\Gamma^v_{x,i} = \rho^v_i(\phi^v_{113,i}\psi^v_{xx,i} + \phi^v_{213,i}\psi^v_{xy,i} + \phi^v_{313,i}\psi^v_{x,i}),$$
$$\Gamma^v_{y,i} = \rho^v_i(\phi^v_{113,i}\psi^v_{xy,i} + \phi^v_{213,i}\psi^v_{yy,i} + \phi^v_{313,i}\psi^v_{y,i}),$$
$$\Gamma^h_{1,i} = \rho^h_i(\phi^h_{123,i}\psi^h_{x,i} + \phi^h_{223,i}\psi^h_{y,i} + \phi^h_{323,i}\psi^h_{1,i}),$$
$$\Gamma^h_{x,i} = \rho^h_i(\phi^h_{123,i}\psi^h_{xx,i} + \phi^h_{223,i}\psi^h_{xy,i} + \phi^h_{323,i}\psi^h_{x,i}),$$
$$\Gamma^h_{y,i} = \rho^h_i(\phi^h_{123,i}\psi^h_{xy,i} + \phi^h_{223,i}\psi^h_{yy,i} + \phi^h_{323,i}\psi^h_{y,i}),$$

-continued $$\Omega^v_i = \rho^v_i(\phi^v_{113,i}\Gamma^v_{x,i} + \phi^v_{213,i}\Gamma^v_{y,i} + \phi^v_{313,i}\Gamma^v_{1,i}), \quad (3)$$
$$\Psi^v_i = \phi^v_{113,i}\Omega^v_i,$$
$$\Phi^v_i = \phi^v_{213,i}\Omega^v_i,$$
$$\Omega^h_i = \rho^h_i(\phi^h_{123,i}\Gamma^h_{x,i} + \phi^h_{223,i}\Gamma^h_{y,i} + \phi^h_{323,i}\Gamma^h_{1,i}),$$
$$\Psi^h_i = \phi^h_{123,i}\Omega^h_i,$$
$$\Phi^h_i = \phi^h_{223,i}\Omega^h_i,$$

$$\Delta^v_{x,i} = \Gamma^v_{x,i} - \Psi^v_i, \quad (4)$$
$$\Delta^v_{y,i} = \Gamma^v_{y,i} - \Phi^v_i,$$
$$\Delta^h_{x,i} = \Gamma^h_{x,i} - \Psi^h_i,$$
$$\Delta^h_{y,i} = \Gamma^h_{y,i} - \Phi^h_i,$$

The above variables can be computed and stored so that they can be reused. Some of the variables are computed from previously defined ones. This makes the computation efficient.

Further define:

$$\omega_{ij}^h = x_{ij}^h \phi_{123,i}^h + y_{ij}^h \phi_{223,i}^h + \phi_{323,i}^h, \ \omega_{ij}^v = x_{ij}^v \phi_{113,i}^v + y_{ij}^v \phi_{213,i}^v + \phi_{313,i}^v,$$

then $$g_{ij}^h(H) = \sqrt{\rho_i^h}\, \omega_{ij}^h, \ g_{ij}^v(H) = \sqrt{\rho_i^v}\, \omega_{ij}^v.$$

Here, one may want to express the gradients in (*) with the variables defined in (1)~(4) so that repeated computation can be minimized.

First, the components of $\nabla g_{ij}^h$ and $\nabla g_{ij}^v$ can be represented explicitly:

$$\frac{\partial g_{ij}^h}{\partial h_{11}} = 0,$$

$$\frac{\partial g_{ij}^h}{\partial h_{12}} = \sqrt{\rho_i^h}\, (x_{ij}^h - \rho_i^h \phi_{123,i}^h \omega_{ij}^h),$$

$$\frac{\partial g_{ij}^h}{\partial h_{13}} = k_i^h \sqrt{\rho_i^h}\, (x_{ij}^h - \rho_i^h \phi_{123,i}^h \omega_{ij}^h) = k_i^h \frac{\partial g_{ij}^h}{\partial h_{12}},$$

$$\frac{\partial g_{ij}^h}{\partial h_{21}} = 0,$$

$$\frac{\partial g_{ij}^h}{\partial h_{22}} = \sqrt{\rho_i^h}\, (y_{ij}^h - \rho_i^h \phi_{223,i}^h \omega_{ij}^h),$$

$$\frac{\partial g_{ij}^h}{\partial h_{23}} = k_i^h \sqrt{\rho_i^h}\, (y_{ij}^h - \rho_i^h \phi_{223,i}^h \omega_{ij}^h) = k_i^h \frac{\partial g_{ij}^h}{\partial h_{22}},$$

$$\frac{\partial g_{ij}^h}{\partial h_{31}} = 0,$$

-continued $$\frac{\partial g_{ij}^h}{\partial h_{32}} = \sqrt{\rho_i^h},$$

$$\frac{\partial g_{ij}^h}{\partial h_{33}} = k_i^h \sqrt{\rho_i^h} = k_i^h \frac{\partial g_{ij}^h}{\partial h_{32}},$$

$$\frac{\partial g_{ij}^v}{\partial h_{11}} = \sqrt{\rho_i^v}(x_{ij}^v - \rho_i^v \phi_{113,i}^v \omega_{ij}^v),$$

$$\frac{\partial g_{ij}^v}{\partial h_{12}} = 0,$$

$$\frac{\partial g_{ij}^v}{\partial h_{13}} = k_i^v \sqrt{\rho_i^v}(x_{ij}^v - \rho_i^v \phi_{113,i}^v \omega_{ij}^v) = k_i^v \frac{\partial g_{ij}^v}{\partial h_{11}},$$

$$\frac{\partial g_{ij}^v}{\partial h_{21}} = \sqrt{\rho_i^v}(y_{ij}^v - \rho_i^v \phi_{213,i}^v \omega_{ij}^v),$$

$$\frac{\partial g_{ij}^v}{\partial h_{22}} = 0,$$

$$\frac{\partial g_{ij}^v}{\partial h_{23}} = k_i^v \sqrt{\rho_i^v}(y_{ij}^v - \rho_i^v \phi_{213,i}^v \omega_{ij}^v) = k_i^v \frac{\partial g_{ij}^v}{\partial h_{21}},$$

$$\frac{\partial g_{ij}^v}{\partial h_{31}} = \sqrt{\rho_i^v},$$

$$\frac{\partial g_{ij}^v}{\partial h_{32}} = 0,$$

$$\frac{\partial g_{ij}^v}{\partial h_{33}} = k_i^v \sqrt{\rho_i^v} = k_i^v \frac{\partial g_{ij}^v}{\partial h_{31}},$$

Therefore, at this point, two observations are made:

a. Those terms related to $$\frac{\partial g_{ij}^h}{\partial h_{p1}}$$

or $$\frac{\partial g_{ij}^v}{\partial h_{p2}},$$

$p = 1, 2, 3,$ need not be computed when computing $$\sum_{j=1}^{m_i^h} \gamma_{ij}^h \nabla g_{ij}^h (\nabla g_{ij}^h)^t$$

and $$\sum_{j=1}^{m_i^v} \gamma_{ij}^v \nabla g_{ij}^v (\nabla g_{ij}^v)^t$$

because they are zeros, and b. When a term related to $$\frac{\partial g_{ij}^h}{\partial h_{p2}} \text{ or } \frac{\partial g_{ij}^v}{\partial h_{p1}}, \quad p = 1, 2, 3,$$

is computed, the term related to $$\frac{\partial g_{ij}^h}{\partial h_{p3}} \text{ or } \frac{\partial g_{ij}^v}{\partial h_{p3}}, \quad p = 1, 2, 3,$$

need not be recomputed from the beginning because they only differ by $k_i^h$ or $k_i^v$.

Further, one can reduce the computation by additional efforts.

To compute $\sum_{j=1}^{m_i^h} \gamma_{ij}^h g_{ij}^h(H) \nabla g_{ij}^h$ and $\sum_{j=1}^{m_i^v} \gamma_{ij}^v \nabla g_{ij}^v (\nabla g_{ij}^v)^t$:

$$\sum_{j=1}^{m_i^h} \gamma_{ij}^h g_{ij}^h(H) \frac{\partial g_{ij}^h}{\partial h_{12}} = \Delta_{x,i}^h, \quad \sum_{j=1}^{m_i^h} \gamma_{ij}^h g_{ij}^h(H) \frac{\partial g_{ij}^h}{\partial h_{22}} = \Delta_{y,i}^h, \quad \sum_{j=1}^{m_i^h} \gamma_{ij}^h g_{ij}^h(H) \frac{\partial g_{ij}^h}{\partial h_{32}} = \Gamma_{1,i}^h,$$

$$\sum_{j=1}^{m_i^v} \gamma_{ij}^v g_{ij}^v(H) \frac{\partial g_{ij}^v}{\partial h_{11}} = \Delta_{x,i}^v, \quad \sum_{j=1}^{m_i^v} \gamma_{ij}^v g_{ij}^v(H) \frac{\partial g_{ij}^v}{\partial h_{21}} = \Delta_{y,i}^v, \quad \sum_{j=1}^{m_i^v} \gamma_{ij}^v g_{ij}^v(H) \frac{\partial g_{ij}^v}{\partial h_{31}} = \Gamma_{1,i}^v,$$

the rest terms, $$\sum_{j=1}^{m_i^h} \gamma_{ij}^h g_{ij}^h(H) \frac{\partial g_{ij}^h}{\partial h_{p1}}$$

and $$\sum_{j=1}^{m_i^v} \gamma_{ij}^v g_{ij}^v(H) \frac{\partial g_{ij}^v}{\partial h_{p2}},$$

$p = 1, 2, 3,$ are not described herein because they are zeros. Moreover, $$\sum_{j=1}^{m_i^h} \gamma_{ij}^h g_{ij}^h(H) \frac{\partial g_{ij}^h}{\partial h_{p3}}$$

and $$\sum_{j=1}^{m_i^v} \gamma_{ij}^v g_{ij}^v(H) \frac{\partial g_{ij}^v}{\partial h_{p3}},$$

$p = 1, 2, 3,$ are not described either because they can be obtained by multiplying $k_i^h$ or $k_i^v$ to $$\sum_{j=1}^{m_i^h} \gamma_{ij}^h g_{ij}^h(H) \frac{\partial g_{ij}^h}{\partial h_{p2}}$$

or $$\sum_{j=1}^{m_i^v} \gamma_{ij}^v g_{ij}^v(H) \frac{\partial g_{ij}^v}{\partial h_{p1}},$$

according to previous observations.

Next, to compute $\sum_{j=1}^{m_i^h} \gamma_{ij}^h \nabla g_{ij}^h (\nabla g_{ij}^h)^t$ and $\sum_{j=1}^{m_i^v} \gamma_{ij}^v \nabla g_{ij}^v (\nabla g_{ij}^v)^t$:

$$\sum_{j=1}^{m_i^h} \gamma_{ij}^h \frac{\partial g_{ij}^h}{\partial h_{12}} \frac{\partial g_{ij}^h}{\partial h_{12}} = \rho_i^h [\psi_{xx,i}^h - \phi_{123,i}^h (\Gamma_{x,i}^h, \Delta_{x,i}^h)],$$

$$\sum_{j=1}^{m_i^h} \gamma_{ij}^h \frac{\partial g_{ij}^h}{\partial h_{12}} \frac{\partial g_{ij}^h}{\partial h_{22}} = \rho_i^h (\psi_{xy,i}^h - \phi_{223,i}^h \Gamma_{x,i}^h - \phi_{123,i}^h \Delta_{y,i}^h),$$

$$\sum_{j=1}^{m_i^h} \gamma_{ij}^h \frac{\partial g_{ij}^h}{\partial h_{12}} \frac{\partial g_{ij}^h}{\partial h_{32}} = \rho_i^h (\psi_{x,i}^h - \phi_{123,i}^h \Gamma_{1,i}^h),$$

-continued $$\sum_{j=1}^{m_i^h} \gamma_{ij}^h \frac{\partial g_{ij}^h}{\partial h_{22}} \frac{\partial g_{ij}^h}{\partial h_{22}} = \rho_i^h [\psi_{yy,i}^h - \phi_{223,i}^h (\Gamma_{y,i}^h + \Delta_{y,i}^h)],$$

$$\sum_{j=1}^{m_i^h} \gamma_{ij}^h \frac{\partial g_{ij}^h}{\partial h_{22}} \frac{\partial g_{ij}^h}{\partial h_{32}} = \rho_i^h (\psi_{y,i}^h - \phi_{223,i}^h \Gamma_{1,i}^h),$$

$$\sum_{j=1}^{m_i^h} \gamma_{ij}^h \frac{\partial g_{ij}^h}{\partial h_{32}} \frac{\partial g_{ij}^h}{\partial h_{32}} = \rho_i^h \psi_{1,i}^h,$$

$$\sum_{j=1}^{m_i^v} \gamma_{ij}^v \frac{\partial g_{ij}^v}{\partial h_{11}} \frac{\partial g_{ij}^v}{\partial h_{11}} = \rho_i^v [\psi_{xx,i}^v - \phi_{113,i}^v (\Gamma_{x,i}^v, \Delta_{x,i}^v)],$$

$$\sum_{j=1}^{m_i^v} \gamma_{ij}^v \frac{\partial g_{ij}^v}{\partial h_{11}} \frac{\partial g_{ij}^v}{\partial h_{21}} = \rho_i^v (\psi_{xy,i}^v - \phi_{213,i}^v \Gamma_{x,i}^v - \phi_{113,i}^v \Delta_{y,i}^v),$$

$$\sum_{j=1}^{m_i^v} \gamma_{ij}^v \frac{\partial g_{ij}^v}{\partial h_{11}} \frac{\partial g_{ij}^v}{\partial h_{31}} = \rho_i^v (\psi_{x,i}^v - \phi_{113,i}^v \Gamma_{1,i}^v),$$

$$\sum_{j=1}^{m_i^v} \gamma_{ij}^v \frac{\partial g_{ij}^v}{\partial h_{21}} \frac{\partial g_{ij}^v}{\partial h_{21}} = \rho_i^v [\psi_{yy,i}^v - \phi_{213,i}^v (\Gamma_{y,i}^v + \Delta_{y,i}^v)],$$

$$\sum_{j=1}^{m_i^v} \gamma_{ij}^v \frac{\partial g_{ij}^v}{\partial h_{21}} \frac{\partial g_{ij}^v}{\partial h_{31}} = \rho_i^v (\psi_{y,i}^v - \phi_{213,i}^v \Gamma_{1,i}^v),$$

$$\sum_{j=1}^{m_i^v} \gamma_{ij}^v \frac{\partial g_{ij}^v}{\partial h_{31}} \frac{\partial g_{ij}^v}{\partial h_{31}} = \rho_i^v \psi_{1,i}^v.$$

The other entries of $$\sum_{j=1}^{m_i^h} \gamma_{ij}^h \frac{\partial g_{ij}^h}{\partial h_{pq}} \frac{\partial g_{ij}^h}{\partial h_{rs}}$$

and $$\sum_{j=1}^{m_i^v} \gamma_{ij}^v \frac{\partial g_{ij}^v}{\partial h_{pq}} \frac{\partial g_{ij}^v}{\partial h_{rs}}$$

are not shown as they are either 0 or differ from one of the above entries by $k_i^h$ or $k_i^v$.

One observation of the long list of variables from equations (1) to (4) is that the complexity of update only depends on the number of lines. This reduces the complexity of the processes that are performed to determine the actual mapping of the image on an objective plane to the captured image.

Aspects of the present invention may be applied to environments as well. For example, one may capture images with a camera having different levels of magnification. With each new level of magnification (or range of levels as determined by a developer), a homography between a captured image and an expected image may be performed. Here, the camera may photograph or otherwise obtain an image having roughly two sets of parallel lines. The sets of parallel lines may be used to determine a homography for a given level of magnification. For instance, the homography matrix may be stored in a memory of the camera and/or memory in a lens (if the lens has a memory) to be used to adjust a received image. As a user then changes the magnification for the camera, for example, a different homography matrix may be applied to the received image to transform it into a better image, reducing distortion present in the lens system and/or imaging system of the camera.

Symbol Recognition

Figure 51:
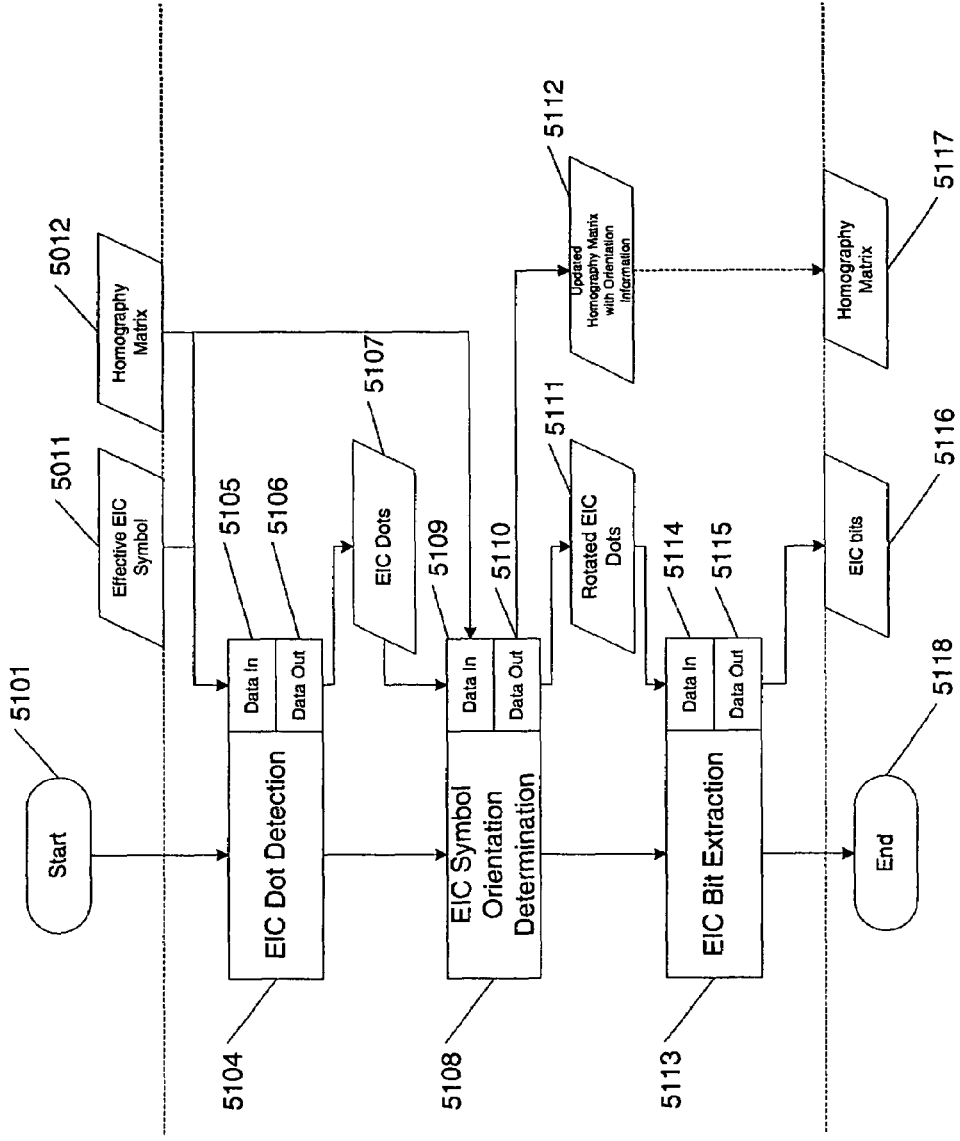
FIG. 51 shows a flow diagram of a system for performing EIC symbol recognition in accordance with embodiments of the invention.

Next, the symbol recognition process of step 713 of FIG. 7 is described. Here, the EIC symbol recognition process is shown with respect to FIG. 51. FIG. 51 shows a flow diagram of a system for performing EIC symbol recognition in accordance with embodiments of the invention. FIG. 51 shows the effective EIC symbol 5011 and homography matrix 5012 being used by EIC dot detection 5104, through data in 5105. The EIC dot detection step 5104 outputs through data out 5106 the EIC dots 5107. The EIC dots 5107 and the homography matrix 2812 are used by the EIC symbol orientation determination 5108 from data in 5109. The EIC symbol orientation 5108 outputs the rotated EIC dots 5111 and the updated homography matrix with orientation information 5112.

Next, the EIC bit extraction step 5113 extracts bits from the rotated EIC dots 5111 as received through data in 5114. EIC bits 5116 are output through data out 5115. Optionally, the updated homography matrix 5112 may be output as homography matrix 5117 as now containing orientation information.

One objective of EIC symbol recognition is to obtain EIC bits encoded in EIC symbols and obtain a homography matrix $H_{Symbol \rightarrow Image}$, which transforms every point in the section of EIC symbol array encompassing the image to a point in the image plane.

EIC symbol recognition includes the following components.

The EIC dot detection 5104 is used to detect black dots at EIC data dot positions and the orientation of the dot positions on each edge of the grid cells in image. Dot detection depends on relative (instead of absolute) gray levels of positions on each edge. This increases the robustness of dot detection.

EIC symbol orientation determination step 5108 is used to determine which grid cells correspond to EIC symbols and the correct orientation of the symbols by counting the number of detected black dots at orientation dot positions given different assumptions. The assumption under which the total count is the smallest is accepted of course other values may be used. The section of EIC symbol array encompassing the image is determined. A homography matrix $H_{Symbol \rightarrow Image}$, that describes the transformation of every point in the section to a point in the image plane, is obtained.

The EIC bit extraction step 5113 is used to extract bits based on the position of the black dots in EIC symbols.

Bit representation on each edge is a gray code, i.e. only one bit changes from one position to the next, for example, 00, 01, 11, 10. Here, gray code minimizes the number of error bits.

Figure 52A:
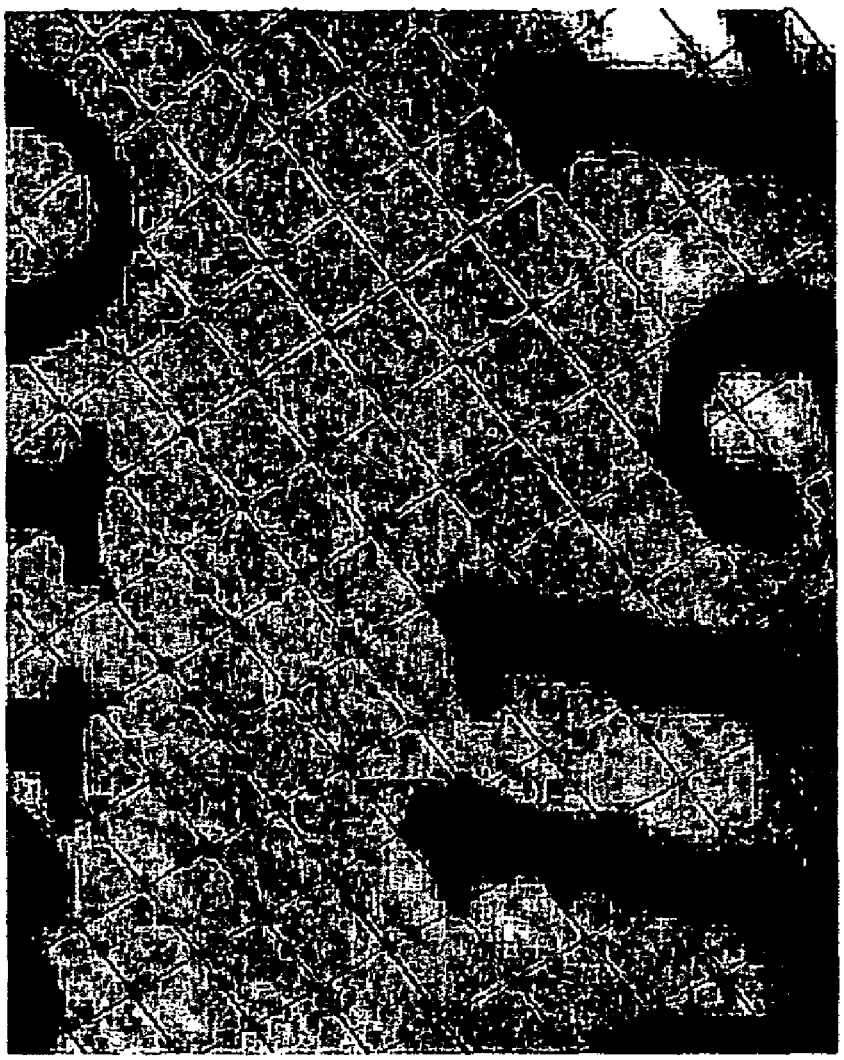
FIG. 52A shows effective EIC symbols in accordance with embodiments of the invention.
Figure 52B:
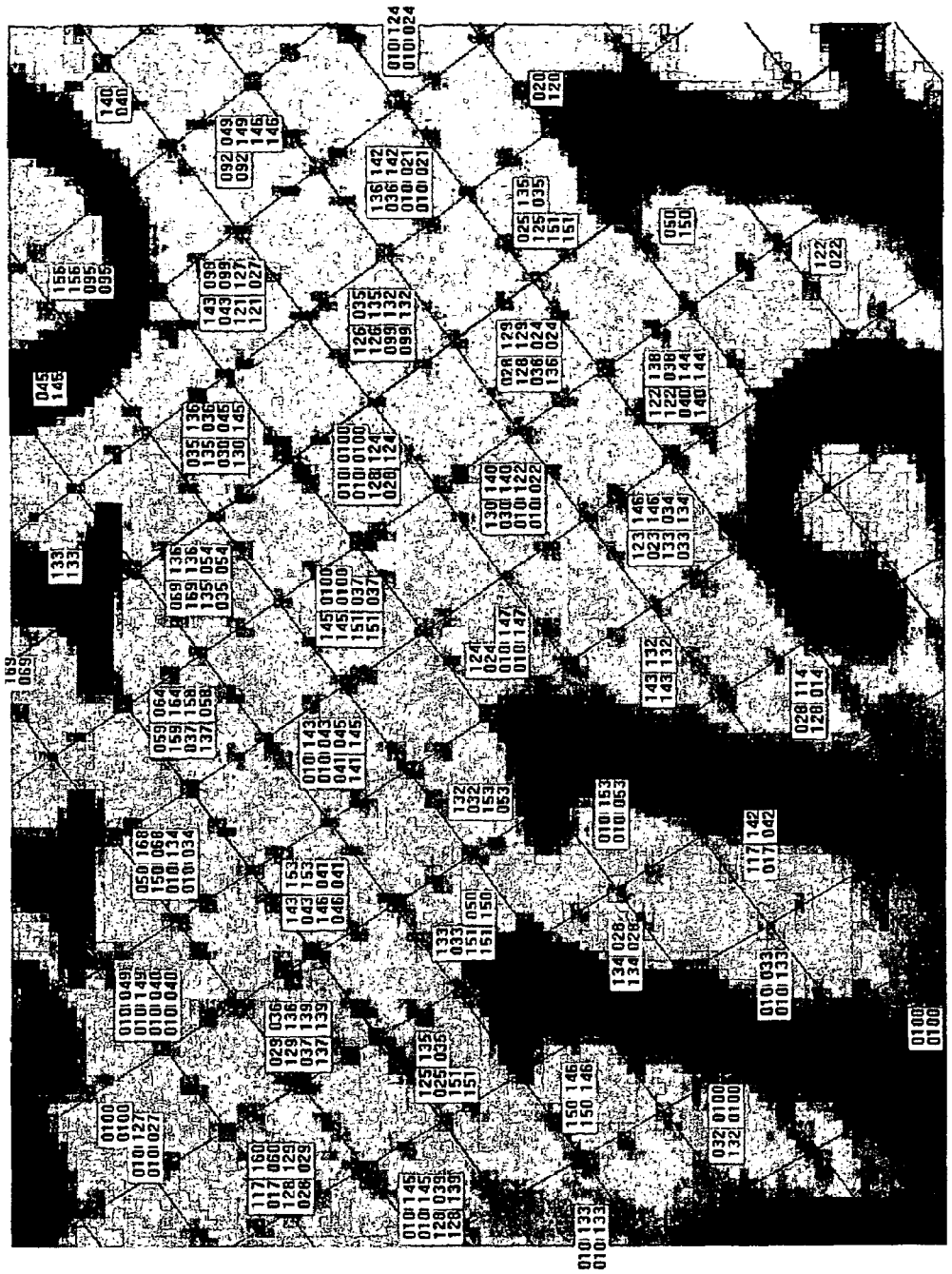
FIG. 52B shows EIC bits in accordance with embodiments of the invention.

From EIC pattern analysis, $H_{Grid \rightarrow Image}$ is obtained, with which grid lines in image are obtained. Grid cells thus obtained are effective EIC symbols. Given effective EIC symbols, the next step is to recognize the symbols. The goal of EIC symbol recognition is to obtain bits encoded in EIC symbols and obtain a homography matrix $H_{Symbol \rightarrow Image}$, which describes the transformation from the section of EIC symbol array encompassing the image to image. Input of EIC symbol recognition is homography matrix obtained from EIC pattern analysis $H_{Grid \rightarrow Image}$, normalized image, and document content mask. Example input to EIC symbol recognition is shown in FIG. 52A. The output of EIC symbol recognition is extracted bits (and confidence values of the bits) and homography matrix $H_{Symbol \rightarrow Image}$. FIG. 52B shows example recognized EIC bits and corresponding confidence values for the recognized EIC bits.

The EIC symbol recognition system shown in FIG. 51 includes an EIC-dot-detection module 5104, an EIC-symbol-orientation-determination module 5112, and an EIC-bit-extraction module 5116, each of which is described in more detail below.

EIC Dot Detection

Figure 53:
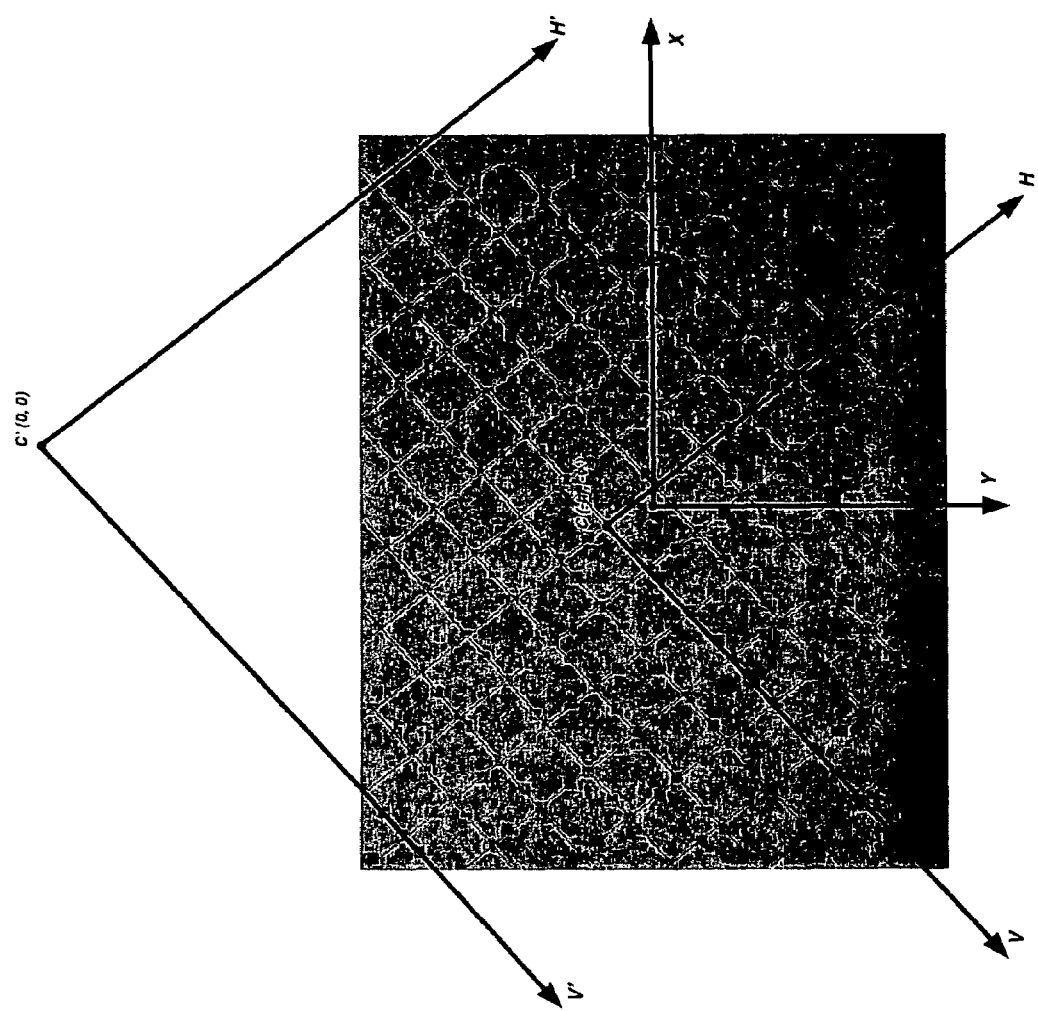
FIG. 53 shows a shifted coordinate system in which grid intersections in an image have non-negative coordinates in accordance with embodiments of the invention.

The EIC-dot-detection module 5104 detects black dots on each edge. First, the origin of H, V is moved to get the H', V' coordinate system. By moving the origin of H, V, all grid intersections in the image have non-negative coordinates. The new coordinate system is called H', V', as shown in FIG. 53.

Suppose C' has coordinates (h',v') in H, V coordinate system. After moving, its coordinates are (0, 0).

Suppose the homography matrix obtained from EIC pattern analysis is:

$$H = \begin{bmatrix} h_{11} & h_{12} & h_{13} \\ h_{21} & h_{22} & h_{23} \\ h_{31} & h_{32} & h_{33} \end{bmatrix},$$

the homography matrix that transforms a point in the H', V' coordinate system to a point in the X, Y coordinate system is:

$$H = \begin{bmatrix} h_{11} & h_{12} & h_{13} + h_{11} \cdot h' + h_{12} \cdot v' \\ h_{21} & h_{22} & h_{23} + h_{21} \cdot h' + h_{22} \cdot v' \\ h_{31} & h_{32} & h_{33} + h_{31} \cdot h' + h_{32} \cdot v' \end{bmatrix}$$

This homography matrix is referred to herein as the final $H_{Grid \rightarrow Image}$.

Figure 54:
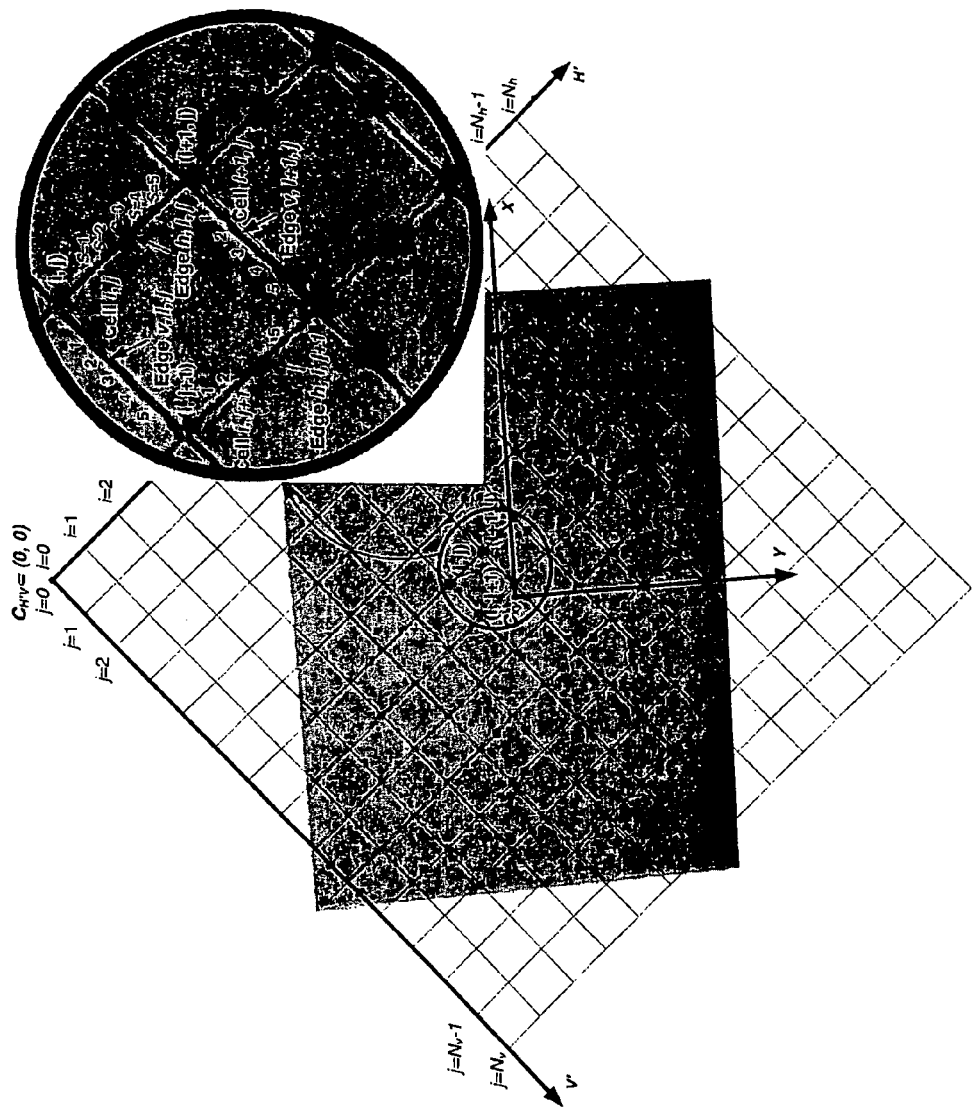
FIG. 54 shows positions on each edge of an EIC symbol in accordance with embodiments of the invention.

With homography matrix $H_{Grid \rightarrow Image}$, all the grid lines in image are obtained (by transforming the grid lines in EIC symbol array using the homography matrix) and form the H', V' coordinate system, as shown in FIG. 54.

These grid lines are referred to as H lines and V lines. Grid cells are indexed by the H', V' coordinates of the top corner of the cell. Edges of the cells are identified as either on the H lines or on the V lines. For example, in FIG. 54, the cell (i,j) has two edges: edge h, i, j and edge v, i, j.

Figure 55:
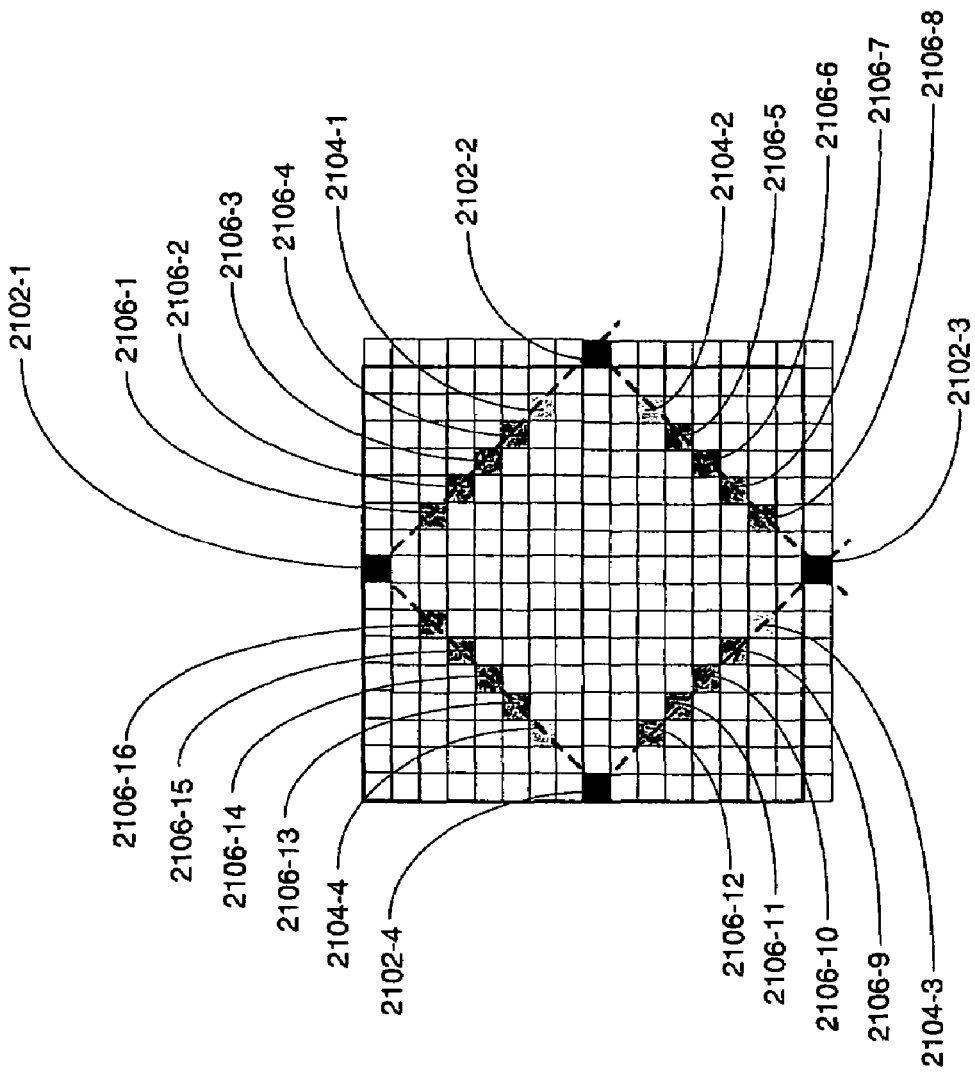
FIG. 55 shows an example of an EIC symbol in accordance with embodiments of the invention.

Next, gray levels are obtained of selected positions on each edge. For EIC symbol 8-a-16, for example, there are 5 EIC dot positions on each edge, as shown in FIG. 55. The EIC symbol in FIG. 55 occupies all of the rows and columns of grid spaces shown in FIG. 55 except for the bottom row and the rightmost column. That row and that column belong to adjacent EIC symbols. Accordingly, while black dots 5502-1 and 5502-4 belong to the EIC symbol shown in FIG. 5, black dots 5502-2 and 5502-3 are not part of that EIC symbol. There are EIC data dot positions and EIC orientation dot positions. Data dots 5506-1 through 5506-16 may be black or white for representing bits of information. Of the 4 data dot positions on each edge, there may be only one black dot. Orientation dots 5504-1 through 5504-4 are always white to facilitate properly orienting camera-captured EIC-symbol images.

Gray levels of the 5 positions on each edge, as shown in FIG. 54, are obtained. First, coordinates of the positions in the H', V' coordinate system are obtained. Suppose the total number of H lines is $N_h+1$, and the total number of V lines is $N_v+1$. For each position s on each edge (i,j) on the H line, where s=1, 2, . . . , 5, i=0, 1, . . . , $N_h$–1, j=0, 1, . . . , $N_v$, the H', V' coordinates are:

$$\left(i+\frac{s+1}{8}, j, 1\right)^t.$$

For each position s on each edge (i,j) on the V line, where s=1, 2, . . . , 5, i=0, 1, . . . , $N_h$, j=0, 1, . . . , $N_v$–1, the H', V' coordinates are:

$$\left(i, j+\frac{s+1}{8}, 1\right)^t.$$

Next, with the homography matrix $H_{Grid \to Image}$, coordinates of the positions in the X, Y coordinate system are obtained. For each position s on each edge (i,j) on the H line, where s=1, 2, . . . , 5, i=0, 1, . . . , $N_h$–1, j=0, 1, . . . , $N_v$, the X, Y coordinates are: $(x_s^{h,i,j}, y_s^{h,i,j}, 1)^t = H_{Grid \to Image}$ $$(x_s^{h,i,j}, y_s^{h,i,j}, 1)^t = H_{Grid \to Image} \cdot \left(i+\frac{s+1}{8}, j, 1\right)^t.$$

For each position s on each edge (i,j) on the V line, where s=1, 2, . . . , 5, i=0, 1, . . . , $N_h$, j=0, 1, . . . , $N_v$–1, the X, Y coordinates are: $(x_s^{v,i,j}, y_s^{v,i,j}, 1)^t = H_{Grid \to Image}$ $$(x_s^{v,i,j}, y_s^{v,i,j}, 1)^t = H_{Grid \to Image} \cdot \left(i, j+\frac{s+1}{8}, 1\right)^t.$$

Gray levels of the positions are calculated using bilinear sampling of the pixels surrounding the positions. Other sampling approaches may be used. For each position s on edge (i,j) on the H line, where s=1, 2, . . . , 5, i=0, 1, . . . , $N_h$–1, j=0, 1, . . . , $N_v$, get the index of the first pixel for bilinear sampling: $x_1$=int($x_s^{h,i,j}$+63.5), $y_1$=int($y_s^{h,i,j}$+49.5).
If $0 \leq x_1 \leq 126$ $0 \leq y_1 \leq 98$ Document Content Mask $(x_1, y_1)$=0

Document Content Mask $(x_1+1, y_1)$=0

Document Content Mask $(x_1, y_1+1)$=0

Document Content Mask $(x_1+1, y_1+1)$=0 then,
The position is valid.

$\eta_x$=decimal($x_s^{h,i,j}$+63.5)

$\eta_y$=decimally($y_s^{h,i,j}$+49.5)

$G_s^{h,i,j} = (1-\eta_y) \cdot [(1-\eta_x) \cdot G_{(x_1,y_1)} + \eta_x \cdot G_{(x_1+1,y_1)}] + \eta_y \cdot [(1-\eta_x) \cdot G_{(x_1,y_1+1)} + \eta_x \cdot G_{(x_1+1,y_1+1)}]$ else,
The position is not valid.

$G_s^{h,i,j}$=null.

Figure 57:
FIG. 57 shows pixels for bilinear sampling in accordance with embodiments of the invention.
Figure 56:
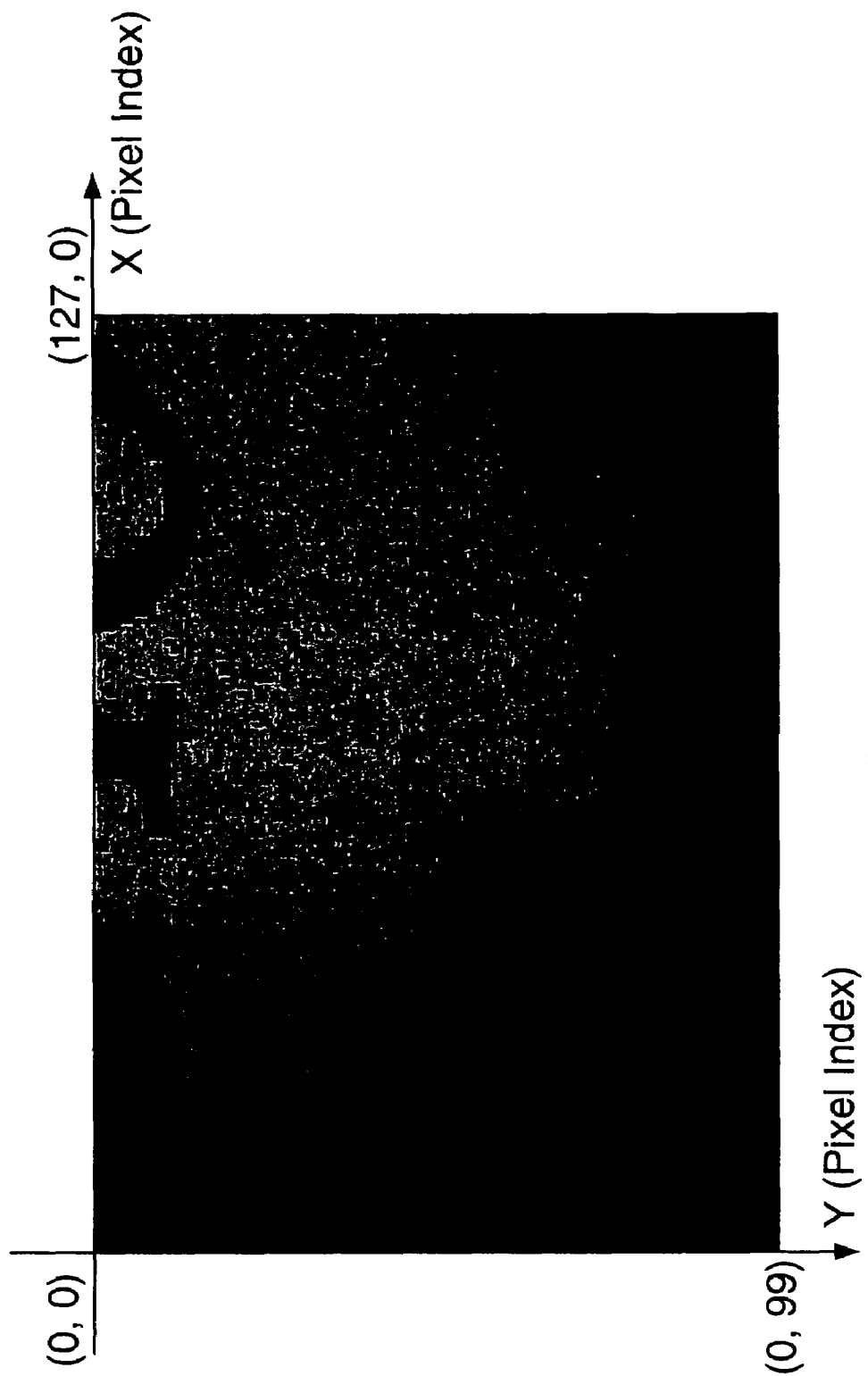
FIG. 56 shows a pixel index in accordance with embodiments of the invention.

The function decimal(x) returns the decimal fraction part of x, where $x \geq 0$. For example, decimal(1.8)=0.8. $(x_1, y_1)$, $(x_1+1, y_1)$, $(x_1, y_1+1)$ and $(x_1+1, y_1+1)$ are indexes of the pixels used for bilinear sampling, defined by the coordinate system shown in FIG. 56. FIG. 57 shows an illustration of the pixels used for bilinear sampling.

Similarly, for each position s on edge (i,j) on the V line, where s=1, 2, . . . , 5, i=0, 1, . . . , $N_h$, j=0, 1, . . . , $N_v$–1, get the index of the first pixel for bilinear sampling:

$x_1$=int($x_s^{v,i,j}$+63.5)

$y_1$=int($y_s^{v,i,j}$+49.5)

If $0 \leq x_1 \leq 126$ $0 \leq y_1 \leq 98$

Document Content Mask $(x_1, y_1)$=0

Document Content Mask $(x_1+1, y_1)$=0

Document Content Mask $(x_1, y_1+1)$=0

Document Content Mask $(x_1+1, y_1+1)$=0 then,
The position is valid.

$\eta_x$=decimal($x_s^{v,i,j}$+63.5)

$\eta_y$=decimally($y_s^{v,i,j}$+49.5)

$G_s^{v,i,j} = (1-\eta_y) \cdot [(1-\eta_x) \cdot G_{(x_1,y_1)} + \eta_x \cdot G_{(x_1+1,y_1)}] + \eta_y \cdot [(1-\eta_x) \cdot G_{(x_1,y_1+1)} + \eta_x \cdot G_{(x_1+1,y_1+1)}]$ else,
The position is not valid.

$G_s^{v,i,j}$=null

Next, black dots are detected.

Based on the relative gray levels of the positions, black dots are determined. First, the five positions on each edge are named as follows (see FIG. 58):

$he_s^{i,j}|s$=1, 2, . . . , 5 when the edge is on an H line and mod(i+j,2)=0;

$ho_s^{i,j}|s$=1, 2, . . . , 5 when the edge is on an H line and mod(i+j,2)=1;

$ve_s^{i,j}|s$=1, 2, . . . , 5 when the edge is on a V line and mod(i+j,2)=0;

$vo_s^{i,j}|s$=1, 2, . . . , 5 when the edge is on a V line and mod(i+j,2)=1.

For each edge, let the count of valid positions be $VD^{k,i,j}$, where k=h, v. If there are at least two valid positions on an edge, i.e. $VD^{k,i,j} \geq 2$, let $$u_1 = \underset{1 \leq s \leq 5}{\text{ArgMin}} G_s^{k,i,j}$$

and $$u_2 = \underset{1 \leq s \leq 5, s \neq u_1}{\text{ArgMin}} G_s^{k,i,j},$$

i.e., $u_1$ is the darkest position and $u_2$ is the second darkest position. If the gray level difference between the darkest and the second darkest position is large enough, i.e. exceeds a threshold (e.g., $T_0=20$), the darkest position is considered a black dot.

For each edge (i,j) on the H line, where $i=0, 1, \ldots, N_h-1$, $j=0, 1, \ldots, N_v$ and $\mod(i+j,2)=0$, If $(G_{u_2}^{h,i,j} - G_{u_1}^{h,i,j}) > T_0$, then, $he_{u_1}^{i,j}=1$, where $1 \leq u_1 \leq 5$ $he_s^{i,j}=0$, where $s=1, 2, \ldots, 5$ and $s \neq u_1$ $D_s^{h,i,j}=he_s^{i,j}$ $\text{Diff}^{h,i,j}=G_{u_2}^{h,i,j}-G_{u_1}^{h,i,j}$ else, $he_s^{i,j}=0$, where $s=1, 2, \ldots, 5$ $D_s^{h,i,j}=\text{null}$ $\text{Diff}^{h,i,j}=\text{null}$ For each edge (i,j) on the H line, where $i=0, 1, \ldots, N_h-1$, $j=0, 1, \ldots, N_v$ and $\mod(i+j,2)=1$, If $(G_{u_2}^{h,i,j} - G_{u_1}^{h,i,j}) > T_0$, then, $ho_{u_1}^{i,j}=1$, where $1 \leq u_1 \leq 5$ $ho_s^{i,j}=0$, where $s=1, 2, \ldots, 5$ and $s \neq u_1$ $D_s^{h,i,j}=ho_s^{i,j}$ $\text{Diff}^{h,i,j}=G_{u_2}^{h,i,j}-G_{u_2}^{h,i,j}$ else, $ho_s^{i,j}=0$, where $s=1, 2, \ldots, 5$ $D_s^{h,i,j}=\text{null}$ $\text{Diff}^{h,i,j}=\text{null}$ For each edge (i,j) on the V line, where $i=0, 1, \ldots, N_h$, $j=0, 1, \ldots, N_v-1$ and $\mod(i+j,2)=0$, If $(G_{u_2}^{v,i,j} - G_{u_1}^{v,i,j}) > T_0$, then, $ve_{u_1}^{i,j}=1$, where $1 \leq u_1 \leq 5$ $ve_s^{i,j}=0$, where $s=1, 2, \ldots, 5$ and $s \neq u_1$ $D_s^{v,i,j}=ve_s^{i,j}$ $\text{Diff}^{v,i,j}=G_{u_2}^{v,i,j}-G_{u_1}^{v,i,j}$ else, $ve_s^{i,j}=0$, where $s=1, 2, \ldots, 5$ $D_s^{v,i,j}=\text{null}$ $\text{Diff}^{v,i,j}=\text{null}$ For each edge (i,j) on the V line, where $i=0, 1, \ldots, N_h$, $j=0, 1, \ldots, N_v-1$ and $\mod(i+j,2)=1$, If $(G_{u_2}^{v,i,j} - G_{u_1}^{v,i,j}) > T_0$, then, $vo_{u_1}^{i,j}1$, where $1 \leq u_1 \leq 5$ $vo_s^{i,j}=0$, where $s=1, 2, \ldots, 5$ and $s \neq u_1$ $D_s^{v,i,j}=vo_s^{i,j}$ $\text{Diff}^{v,i,j}=G_{u_2}^{v,i,j}-G_{u_1}^{v,i,j}$ else, $vo_s^{i,j}=0$, where $s=1, 2, \ldots, 5$ $D_s^{v,i,j}=\text{null}$ $\text{Diff}^{v,i,j}=\text{null}$ By now, substantially all of the black dots are detected. $he_s^{i,j}$, $ho_s^{i,j}$, $ve_s^{i,j}$ and $vo_s^{i,j}$ will be used to determine which grid cells correspond to EIC symbols and the correct orientation of the symbols. $D_s^{h,i,j}$ and $D_s^{v,i,j}$ will be used for bit extraction.

EIC Symbol Orientation Determination

Figure 59:
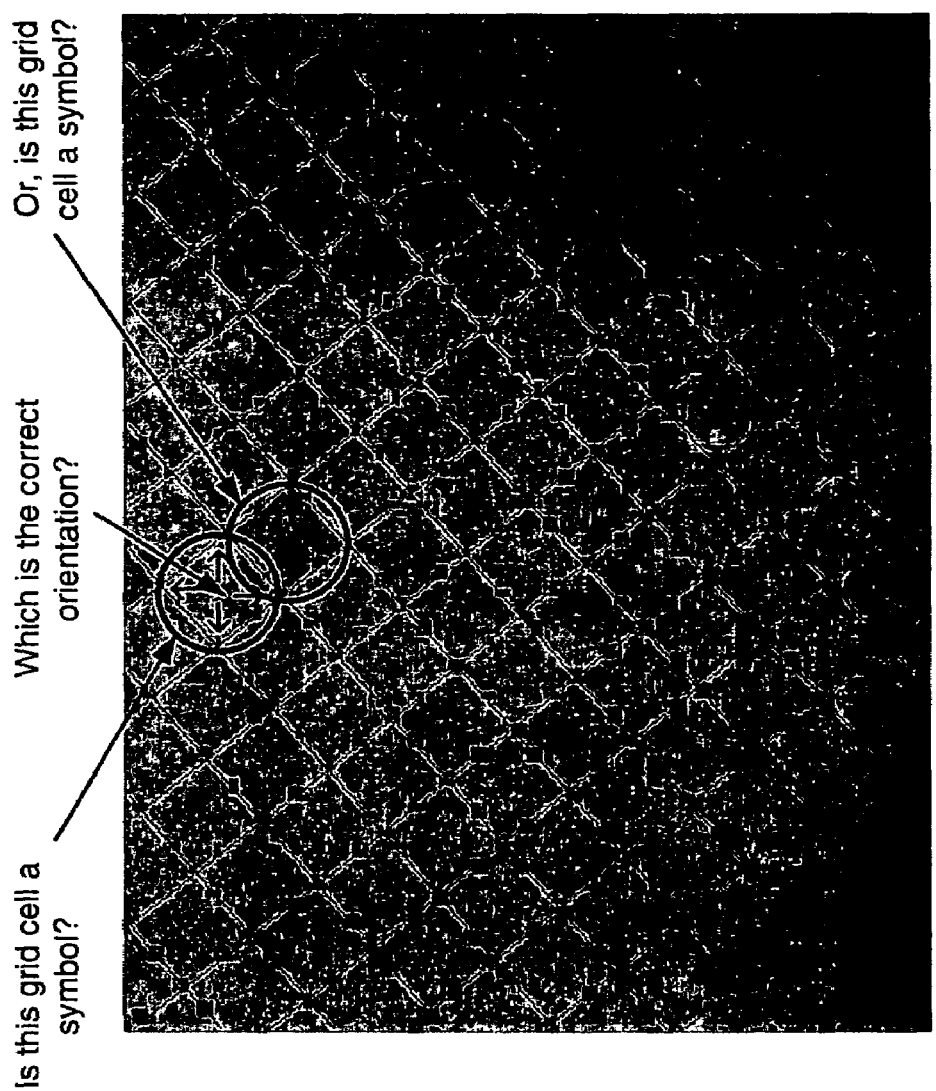
FIG. 59 shows grid cells and various symbol orientations in accordance with embodiments of the invention.

Now that the black dots are detected, the EIC-symbol-orientation-determination module 5108, which accepts EIC dots 5107 as input, determines which grid cells correspond to EIC symbols and which direction is the correct orientation of the symbols, as illustrated in FIG. 59.

Figure 60B:
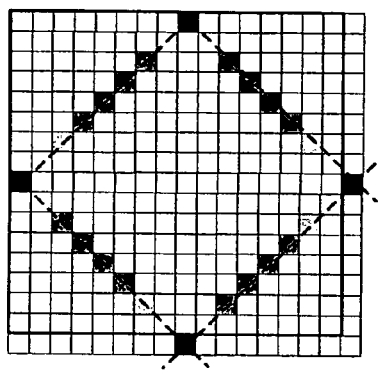
FIGS. 60A-60D shows EIC symbol rotation in accordance with embodiments of the invention.
Figure 60D:
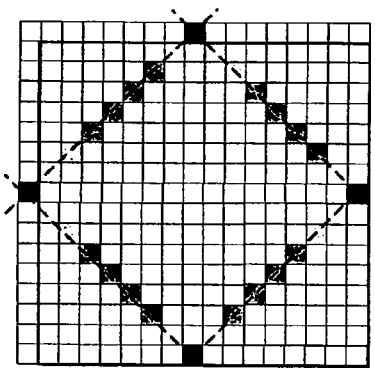
Figure 60A:
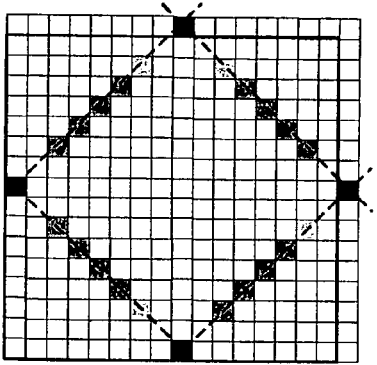
Figure 60C:
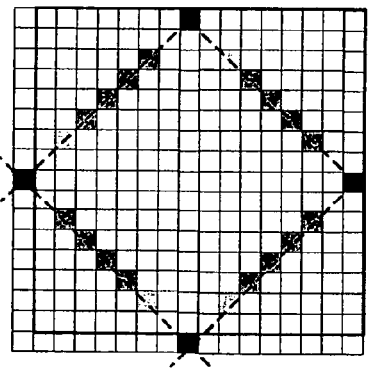

The orientation dot positions are designed to help to determine the correct orientation of a symbol. When EIC symbols are rotated, the location of the orientation dot positions are different, as illustrated in FIGS. 60A-D. FIG. 60A shows the symbol shown in FIG. 55. FIG. 60B shows the symbol rotated 90 degrees clockwise. FIG. 60C shows the symbol rotated 180 degrees clockwise. FIG. 60D shows the symbol rotated 270 degrees clockwise.

Since there should be no black dots at orientation dot positions, the total number of detected black dots at orientation dot positions assuming no rotation, rotated 90 degrees clockwise, rotated 180 degrees clockwise, and rotated 270 degrees clockwise, can be obtained. The assumption (of a correct orientation) is accepted if the total count under the assumption is the smallest.

Therefore, the EIC-symbol-orientation-determination module first obtains the total number of black dots at orientation dot positions under different assumptions about which grid cells correspond to EIC symbols and the correct orientation of the symbols. Then, based on the smallest count, which grid cells correspond to EIC symbols and the correct orientation of the symbols are determined.

The section of EIC symbol array encompassing the image, i.e. the X', Y' coordinate system discussed above in connection with FIG. 15, is then determined. A homography matrix $H_{Symbol \rightarrow Grid}$, which describes the transformation from the section of EIC symbol array encompassing the image to grid, i.e. from the X', Y' coordinate system, to the H', V' coordinate system, can be obtained.

Finally, given $H_{Symbol \rightarrow Grid}$ and $H_{Grid \rightarrow Image}$ obtained from EIC pattern analysis, a homography matrix $H_{Symbol \rightarrow Image}$, which describes the transformation from the section of EIC symbol array encompassing the image to image, i.e. from the X', Y' coordinate system to the X, Y coordinate system, is obtained.

The total number of black dots at orientation dot positions is determined as follows.

Let $$Q_0 = \sum_{i=0}^{N_h} \sum_{j=0}^{N_v} he_5^{i,j} + \sum_{i=0}^{N_h} \sum_{j=0}^{N_v} ho_5^{i,j} + \sum_{i=0}^{N_h} \sum_{j=0}^{N_v} ve_5^{i,j} + \sum_{i=0}^{N_h} \sum_{j=0}^{N_v} vo_1^{i,j}$$

-continued $$Q_1 = \sum_{i=0}^{N_h} \sum_{j=0}^{N_v} he_1^{i,j} + \sum_{i=0}^{N_h} \sum_{j=0}^{N_v} ho_5^{i,j} + \sum_{i=0}^{N_h} \sum_{j=0}^{N_v} ve_5^{i,j} + \sum_{i=0}^{N_h} \sum_{j=0}^{N_v} vo_5^{i,j}$$

$$Q_2 = \sum_{i=0}^{N_h} \sum_{j=0}^{N_v} he_1^{i,j} + \sum_{i=0}^{N_h} \sum_{j=0}^{N_v} ho_1^{i,j} + \sum_{i=0}^{N_h} \sum_{j=0}^{N_v} ve_5^{i,j} + \sum_{i=0}^{N_h} \sum_{j=0}^{N_v} vo_1^{i,j}$$

$$Q_3 = \sum_{i=0}^{N_h} \sum_{j=0}^{N_v} he_1^{i,j} + \sum_{i=0}^{N_h} \sum_{j=0}^{N_v} ho_5^{i,j} + \sum_{i=0}^{N_h} \sum_{j=0}^{N_v} ve_1^{i,j} + \sum_{i=0}^{N_h} \sum_{j=0}^{N_v} vo_1^{i,j}$$

$$Q_4 = \sum_{i=0}^{N_h} \sum_{j=0}^{N_v} he_5^{i,j} + \sum_{i=0}^{N_h} \sum_{j=0}^{N_v} ho_5^{i,j} + \sum_{i=0}^{N_h} \sum_{j=0}^{N_v} ve_1^{i,j} + \sum_{i=0}^{N_h} \sum_{j=0}^{N_v} vo_5^{i,j}$$

$$Q_5 = \sum_{i=0}^{N_h} \sum_{j=0}^{N_v} he_5^{i,j} + \sum_{i=0}^{N_h} \sum_{j=0}^{N_v} ho_1^{i,j} + \sum_{i=0}^{N_h} \sum_{j=0}^{N_v} ve_5^{i,j} + \sum_{i=0}^{N_h} \sum_{j=0}^{N_v} vo_5^{i,j}$$

$$Q_6 = \sum_{i=0}^{N_h} \sum_{j=0}^{N_v} he_1^{i,j} + \sum_{i=0}^{N_h} \sum_{j=0}^{N_v} ho_1^{i,j} + \sum_{i=0}^{N_h} \sum_{j=0}^{N_v} ve_1^{i,j} + \sum_{i=0}^{N_h} \sum_{j=0}^{N_v} vo_5^{i,j}$$

$$Q_7 = \sum_{i=0}^{N_h} \sum_{j=0}^{N_v} he_5^{i,j} + \sum_{i=0}^{N_h} \sum_{j=0}^{N_v} ho_1^{i,j} + \sum_{i=0}^{N_h} \sum_{j=0}^{N_v} ve_1^{i,j} + \sum_{i=0}^{N_h} \sum_{j=0}^{N_v} vo_1^{i,j}$$

Here $Q_i$, where i=1, 2, ..., 7, represent the total number of detected black dots at orientation dot positions, given different assumptions about which grid cells correspond to EIC symbols and the correct orientation of the symbols.

Figure 58:
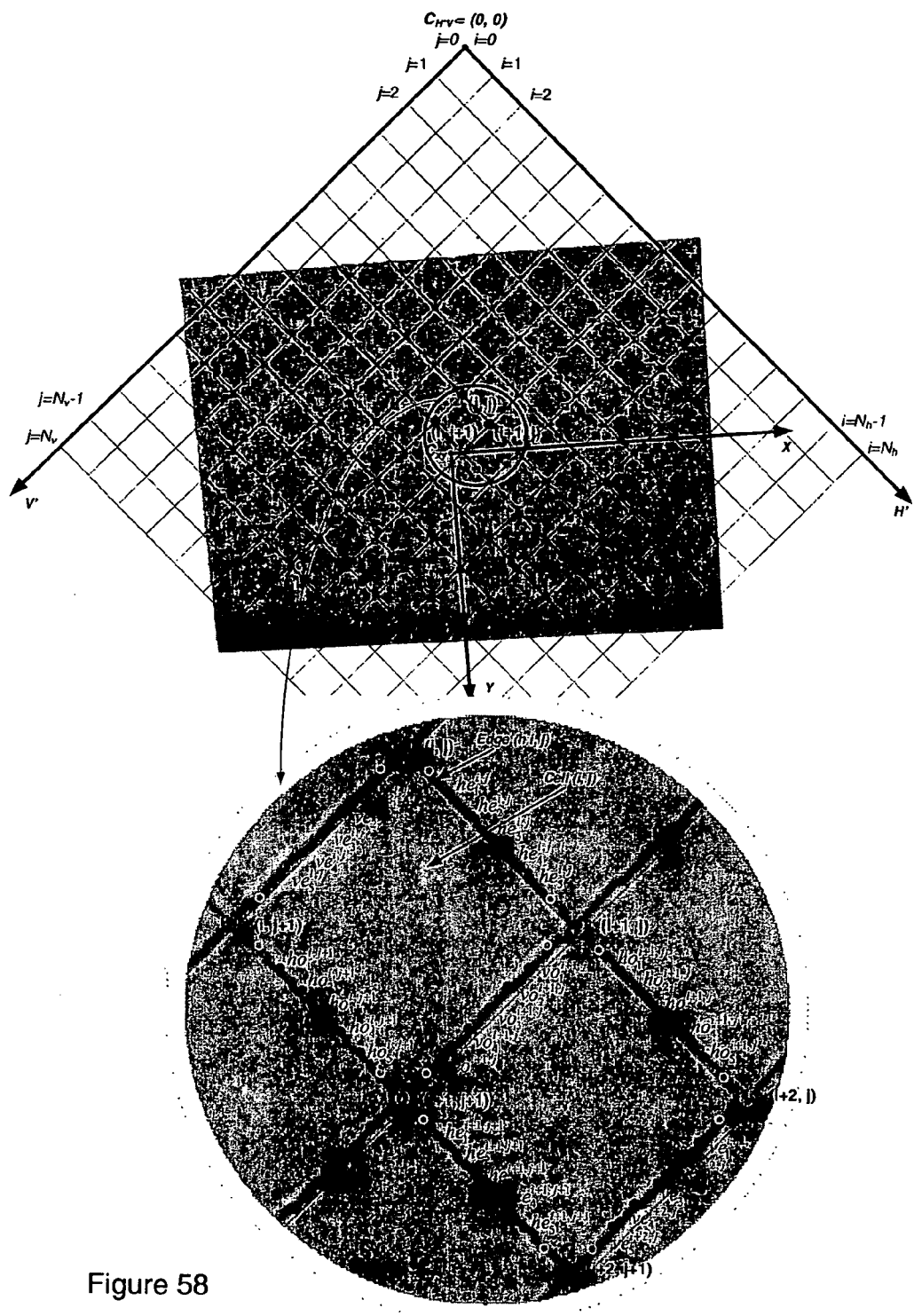
FIG. 58 shows position naming on each edge in accordance with embodiments of the invention.

$Q_0$ is the total number of detected black dots at orientation dot positions if grid cell (i,j) is a symbol and (i,j) is the top corner of the symbol (assuming mod(i+j,2)=0, see FIG. 58). $Q_1$ is the total number of detected black dots at orientation dot positions if grid cell (i,j) is a symbol, and (i+1,j) is the top corner of the symbol. $Q_2$ is the total number of detected black dots at orientation dot positions if grid cell (i,j) is a symbol, and (i+1, j+1) is the top corner of the symbol. $Q_3$ is the total number of detected black dots at orientation dot positions if grid cell (i,j) is a symbol, and (i,j+1) is the top corner of the symbol.

$Q_4$ is the total number of detected black dots at orientation dot positions if grid cell (i+1,j) is a symbol, and (i+1,j) is the top corner of the symbol. $Q_5$ is the total number of detected black dots at orientation dot positions if grid cell (i+1,j) is a symbol, and (i+2,j) is the top corner of the symbol. $Q_6$ is the total number of detected black dots at orientation dot positions if grid cell (i+1,j) is a symbol, and (i+2,j+1) is the top corner of the symbol. $Q_7$ is the total number of detected black dots at orientation dot positions if grid cell (i+1,j) is a symbol, and (i+1,j+1) is the top corner of the symbol.

Next, determinations are made with respect to which grid cells correspond to EIC symbols and what the correct orientation is for the symbols.

Let $j = \underset{0 \le i \le 7}{\mathrm{ArgMin}}(Q_i)$.

Figure 61:
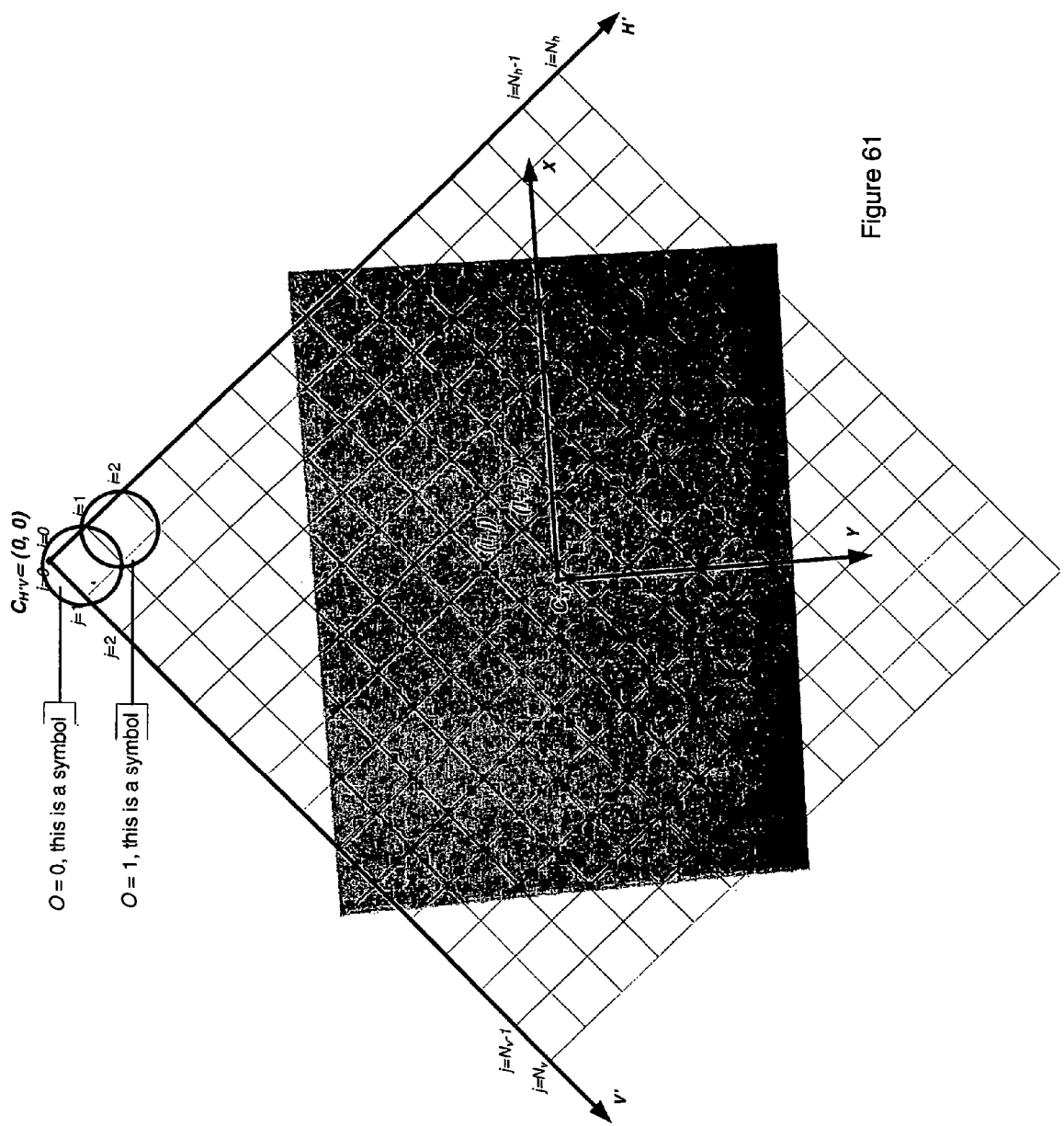
FIG. 61 shows EIC symbol offset in accordance with embodiments of the invention.

Let O=int(j/4). O represents which grid cells correspond to EIC symbols. If O=0, grid cell (0, 0) is a symbol. If O=1, grid cell (1, 0) is a symbol. See FIG. 61. Here, O may be referred to as an offset.

Let Q=mod(j,4). Q represents the correct orientation of the symbols. EIC symbols in image are rotated $$Q \cdot \frac{\pi}{2}$$

clockwise.

Next, the homography matrix, which transforms symbol to image, is obtained.

Now in that which grid cells correspond to EIC symbols and the correct orientation of the symbols are known, the section of EIC symbol array encompassing the image, i.e. the X', Y' coordinate system 1408, can be determined. Next, the homography matrix $H_{Symbol \to Grid}$, which describes the transformation from X', Y' to H', V', is obtained.

First, the H", V" coordinate system may now be used. H", V" is H', V' rotated, with the origin moved to the corner of the grid lines that correspond to the top corner of a symbol.

Figure 62:
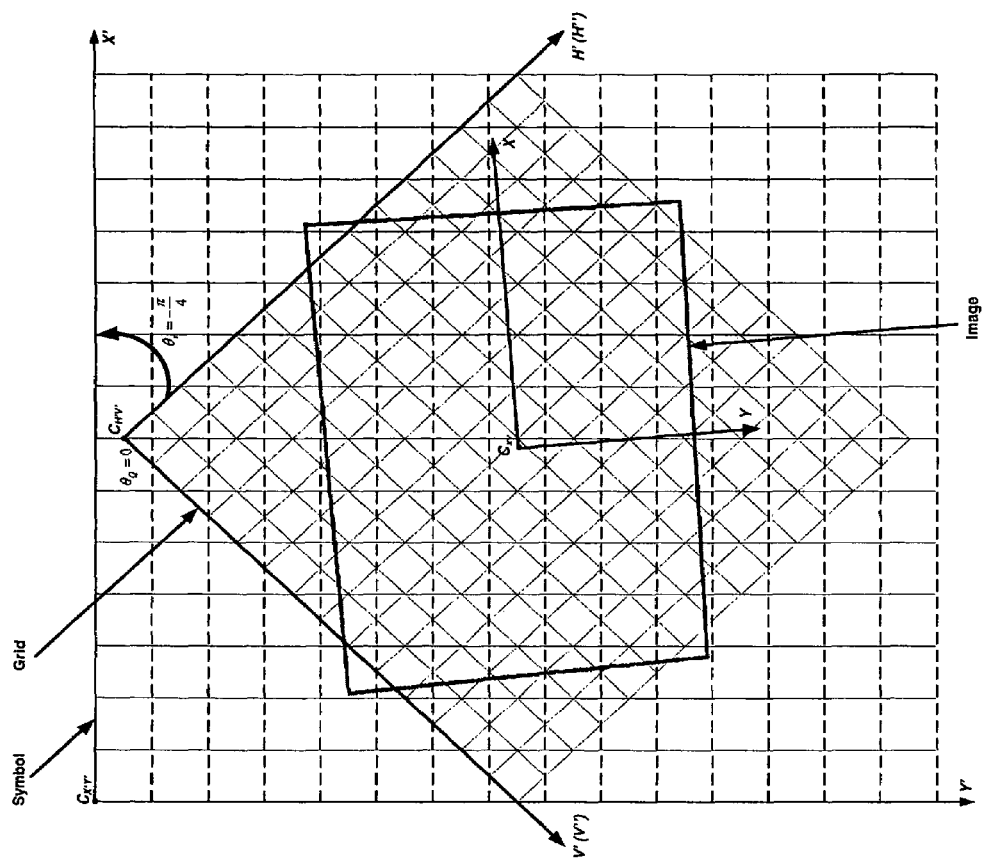
FIG. 62 shows coordinate systems of symbol, grid, and image when Q=0 in accordance with embodiments of the invention.

When Q=0, the top corner of the H', V' grid lines corresponds to the top corner of a symbol. H", V" is the same as H', V'. X', Y' is the section of EIC symbol array encompassing the image. See FIG. 62, which assumes O=1 and which shows symbol, grid, and image coordinate systems when Q=0.

Figure 63:
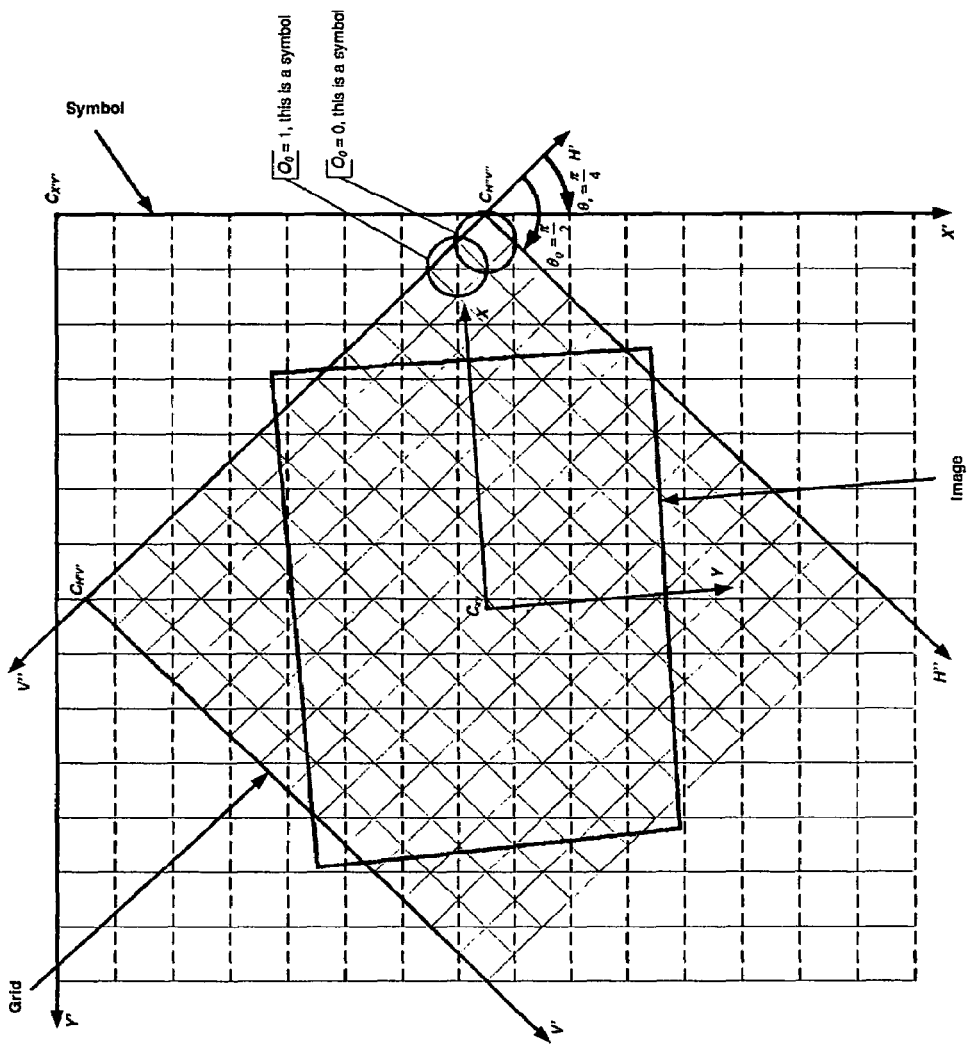
FIG. 63 shows coordinate systems of symbol, grid, and image when Q=1 in accordance with embodiments of the invention.

When Q=1, the far right corner of the H', V' grid lines corresponds to the top corner of a symbol. H", V" is H', V' rotated 90 degrees clockwise, with the origin moved to the far right corner of the H', V' grid lines. X', Y' is the section of EIC symbol array encompassing the image. See FIG. 63, which shows symbol, grid, and image coordinate systems when Q=1.

Figure 64:
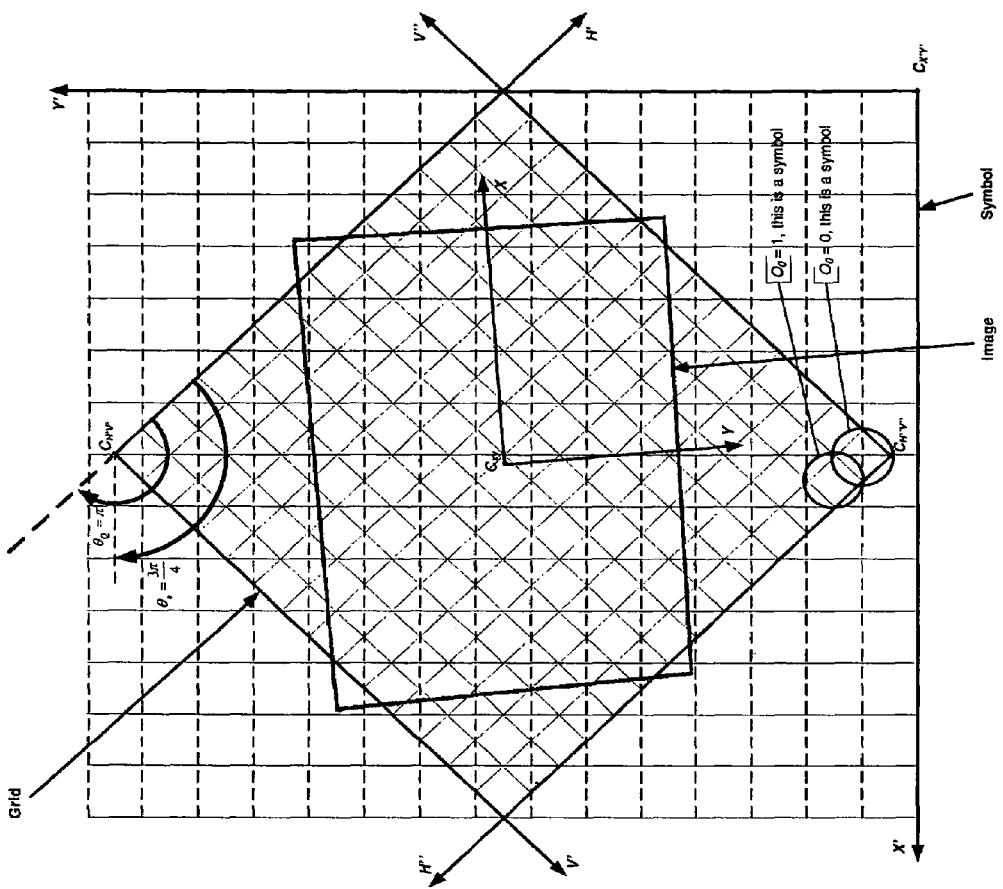
FIG. 64 shows coordinate systems of symbol, grid, and image when Q=2 in accordance with embodiments of the invention.

When Q=2, the bottom corner of the H', V' grid lines corresponds to the top corner of a symbol. H", V" is H', V' rotated 180 degrees clockwise, with the origin moved to the bottom corner of the H', V' grid lines. X', Y' is the section of EIC symbol array encompassing the image. See FIG. 64, which shows symbol, grid, and image coordinate systems when Q=2.

Figure 65:
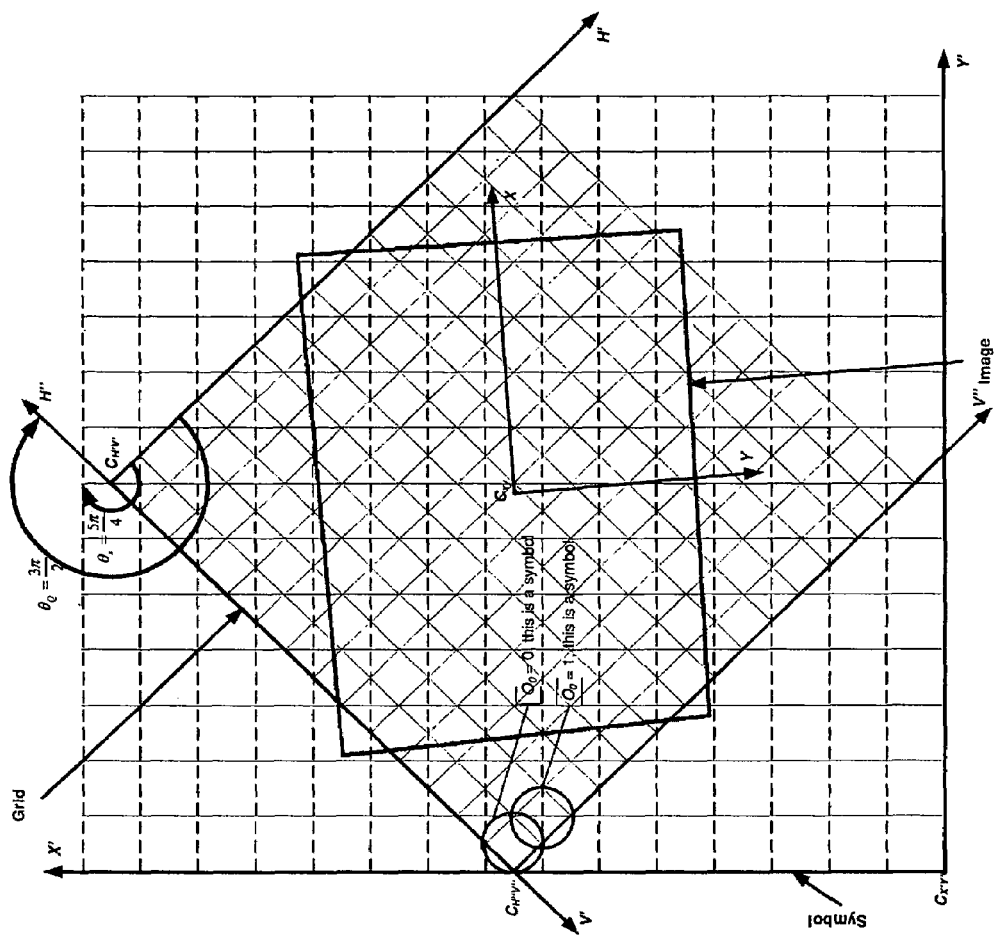
FIG. 65 shows coordinate systems of symbol, grid, and image when Q=3 in accordance with embodiments of the invention.

When Q=3, the far left corner of the H', V' grids corresponds to the top corner of a symbol. H", V" is H', V' rotated 270 degrees clockwise, with the origin moved to the far left corner of the H', V' grid lines. X', Y' is the section of EIC symbol array encompassing the image. See FIG. 65, which shows symbol, grid, and image coordinate systems when Q=3.

Let the rotation angle from H', V' to H", V" be $\theta_Q$:

$$\theta_Q = Q \cdot \frac{\pi}{2},$$

i.e. $\theta_Q \in \left\{0, \frac{\pi}{2}, \pi, \frac{3\pi}{2}\right\}$.

Let $\theta_s$ be the angle from H', V' to X', Y':

$$\theta_s = Q \cdot \frac{\pi}{2} - \frac{\pi}{4},$$

i.e. $\theta_s \in \left\{-\frac{\pi}{4}, \frac{\pi}{4}, \frac{3\pi}{4}, \frac{5\pi}{4}\right\}$.

Let the origin of the H", V" coordinate system, $C_{H''V''}$, have the coordinates ($h'_{C_{H''V''}}, v'_{C_{H''V''}}$) in H', V' coordinates. The result then is $$h'_{C_{H''V''}} = int\left(\frac{\mathrm{mod}(Q+1, 4)}{2}\right) \cdot N_h,$$

$$v'_{C_{H''V''}} = int\left(\frac{\mathrm{mod}(Q, 4)}{2}\right) \cdot N_v.$$

Let the transform from H", V" to H', V' be $\Delta H_Q$, i.e.

$$\begin{bmatrix} h' \\ v' \\ 1 \end{bmatrix} = \Delta H_Q \cdot \begin{bmatrix} h'' \\ v'' \\ 1 \end{bmatrix}.$$

This results with $$\Delta H_Q = \begin{pmatrix} \cos\theta_Q & -\sin\theta_Q & h'_{C_{H''V''}} \\ \sin\theta_Q & \cos\theta_Q & v'_{C_{H''V''}} \\ 0 & 0 & 1 \end{pmatrix}.$$

Now, $\Delta H_0$ is obtained. $\Delta H_0$ is the transform from X', Y' to H", V", i.e.

$$\begin{bmatrix} h'' \\ v'' \\ 1 \end{bmatrix} = \Delta H_0 \cdot \begin{bmatrix} x' \\ y' \\ 1 \end{bmatrix}.$$

Let $O_0$ be the offset in H", V" coordinate system. The result is $$O_0 = \begin{cases} O, & \text{if } Q = 0 \\ \mathrm{mod}(N_h + O + 1, 2), & \text{if } Q = 1 \\ \mathrm{mod}(N_h + N_v + O, 2), & \text{if } Q = 2 \\ \mathrm{mod}(N_h + O + 1, 2), & \text{if } Q = 3 \end{cases}.$$

Let $N_h^0+1$ and $N_v^0+1$ be the total number of H and V lines in H", V" coordinate system. The next result is $$N_h^0 = \begin{cases} N_h, & \text{if } Q = 0 \\ N_v, & \text{if } Q = 1 \\ N_h, & \text{if } Q = 2 \\ N_v, & \text{if } Q = 3 \end{cases},$$

$$N_v^0 = \begin{cases} N_v, & \text{if } Q = 0 \\ N_h, & \text{if } Q = 1 \\ N_v, & \text{if } Q = 2 \\ N_h, & \text{if } Q = 3 \end{cases}.$$

Let the origin of the X', Y' coordinate system, $C_{X'Y'}$, have the coordinates ($h''_{C_{X'Y'}}, v''_{C_{X'Y'}}$) in the H", V" coordinate system:

$$h''_{C_{X'Y'}} = -\mathrm{int}\left(\frac{N_v^0 + O_0}{2}\right) - \frac{1}{2},$$

$$v''_{C_{X'Y'}} = \mathrm{int}\left(\frac{N_v^0 + O_0}{2}\right) + \frac{1}{2} - O_0.$$

Since the rotation from H", V" to X', Y' is $-\pi/4$, and the scale is $\sqrt{2}$ from the unit of measure in H", V" to X', Y', the result is $$\Delta H_0 = \begin{pmatrix} \sqrt{2}\cos-\frac{\pi}{4} & -\sqrt{2}\sin-\frac{\pi}{4} & h''_{C_{H'Y'}} \\ \sqrt{2}\cos-\frac{\pi}{4} & \sqrt{2}\cos-\frac{\pi}{4} & v''_{C_{H'Y'}} \\ 0 & 0 & 1 \end{pmatrix} = \begin{pmatrix} 1 & 1 & h''_{C_{H'Y'}} \\ -1 & 1 & v''_{C_{H'Y'}} \\ 0 & 0 & 1 \end{pmatrix}.$$

Therefore, the transform from X', Y' to H', V' is:

$$H_{Symbol \rightarrow Grid} = \Delta H_Q \cdot \Delta H_0.$$

From EIC pattern analysis, $H_{Grid \rightarrow Image}$ is obtained, i.e.

$$\begin{bmatrix} x \\ y \\ 1 \end{bmatrix} = H_{Grid \rightarrow Image} \cdot \begin{bmatrix} h' \\ v' \\ 1 \end{bmatrix}.$$

Therefore, a transform from the coordinate system of the section of EIC symbol array encompassing the image (X', Y' coordinate system) to the coordinate system of the image (the X, Y coordinate system), $H_{Symbol \rightarrow Image}$, can be obtained:

$$\begin{bmatrix} x \\ y \\ 1 \end{bmatrix} = H_{Grid \rightarrow Image} \cdot \begin{bmatrix} h' \\ v' \\ 1 \end{bmatrix} = H_{Grid \rightarrow Image} \cdot H_{Symbol \rightarrow Grid} \cdot \begin{bmatrix} x' \\ y' \\ 1 \end{bmatrix},$$

i.e., $$H_{Symbol \rightarrow Image} = H_{Grid \rightarrow Image} \cdot H_{Symbol \rightarrow Grid}.$$

An output of this step is $H_{Symbol \rightarrow Image}$, i.e. the updated homography matrix with orientation information 5112 in FIG. 51. As explained above, one can estimate the orientation and offset of actual EIC symbols. Rotated EIC Dots 5111 and updated homography matrix with orientation information 5112 are the two aspects of the estimation. Based on the homography matrix 5012 without orientation information obtained in previous step and orientation & offset estimation, 5112 is obtained. Based on the orientation & offset estimation, one can rotate the EIC dots 5107 and associate them with EIC symbols. Thus, based on this result one can recognize the information embedded in each EIC symbol respectively.

Rotated EIC Dots 5111 (i.e., $D_0$ and $\mathrm{Diff}_0$) are also output of 5108 in FIG. 16. First, one can obtain positions of black dots on each edge in H", V" coordinate system, based on the positions of black dots in H', V' coordinate system. One can also obtain the gray level difference of the darkest and the second darkest positions on each edge. Note that the edges are now named based on coordinates of intersection points in H", V" coordinate system.

For each position s on edge (i,j) on the H line in H", V" coordinate system, where s=1, 2, . . . , 5, i=0, 1, . . . , $N_h^0-1$, j=0, 1, . . . , $N_v^0$, $$D_{0,s}^{h,i,j} = \begin{cases} D_s^{h,i,j}, & \text{if } Q = 0 \\ D_s^{v,N_v^0-j,i}, & \text{if } Q = 1 \\ D_{6-s}^{h,N_h^0-i-1,N_v^0-j}, & \text{if } Q = 2 \\ D_{6-s}^{v,j,N_h^0-i-1}, & \text{if } Q = 3 \end{cases},$$

-continued $$Diff_0^{h,i,j} = \begin{cases} Diff^{h,i,j}, & \text{if } Q = 0 \\ Diff^{v,N_v^0-j,i}, & \text{if } Q = 1 \\ Diff^{h,N_h^0-i-1,N_v^0-j}, & \text{if } Q = 2 \\ Diff^{v,j,N_h^0-i-1}, & \text{if } Q = 3 \end{cases}.$$

For each position s on edge (i,j) on the V line in H", V" coordinate system, where s=1, 2, . . . , 5, i=0, 1, . . . , $N_h^0$, j=0, 1, . . . , $N_v^0$−1, $$D_{0,s}^{v,i,j} = \begin{cases} D_s^{v,i,j}, & \text{if } Q = 0 \\ D_{6-s}^{h,N_v^0-j-1,i}, & \text{if } Q = 1 \\ D_{6-s}^{v,N_h^0-i,N_v^0-j-1}, & \text{if } Q = 2 \\ D_s^{h,j,N_h^0-i}, & \text{if } Q = 3 \end{cases},$$

$$Diff_0^{v,i,j} = \begin{cases} Diff^{v,i,j}, & \text{if } Q = 0 \\ Diff^{h,N_v^0-j-1,i}, & \text{if } Q = 1 \\ Diff^{v,N_h^0-i,N_v^0-j-1}, & \text{if } Q = 2 \\ Diff^{h,j,N_h^0-i}, & \text{if } Q = 3 \end{cases}.$$

Here, 2 bits are encoded on each edge of an EIC symbol. Let $B_l^{h,i,j}$ and $B_l^{v,i,j}$ be the two bits, where l=0, 1.

EIC Bit Extraction

Now that it is known which grid cells correspond to EIC symbols and the correct orientation of the symbols, bits can be extracted based on the positions of black dots on each edge of a symbol. The EIC-bit-extraction module 5113 takes as input the rotated EIC dots 5111 and produces EIC bits 5116.

Bit extraction is done in H", V" coordinate system, i.e. EIC symbols are oriented at the correct orientation.

For each edge, if there is a black dot detected, and all 5 positions on the edge are valid, bits are extracted. Otherwise, bits are not extracted.

For each edge (i,j) on the H line in H", V" coordinate system, where i=0, 1, . . . , $N_h^0$−1, j=0, 1, . . . , $N_v^0$, If there exists w and $D_{0,w}^{h,i,j}=1$, where w∈{1,2,3,4}, and $VD^{h,i,j}=5$, then, $$B_0^{h,i,j} = int\left(\frac{mod(w, 4)}{2}\right),$$

$$B_1^{h,i,j} = int\left(\frac{w-1}{2}\right),$$

else, $B_0^{h,i,j} = B_1^{h,i,j} = $ null.

Similarly, for each edge (i,j) on the V line in H", V" coordinate system, where i=0, 1, . . . , $N_h^0$, j=0, 1, . . . , $N_v^0$−1, let q=mod(i+j+$O_0$,2), If there exists w and $D_{0,w+q}^{v,i,j}=1$, where w∈{1,2,3,4}, and $VD^{v,i,j}=5$, then, $$B_0^{v,i,j} = int\left(\frac{mod(w, 4)}{2}\right),$$

$$B_1^{v,i,j} = int\left(\frac{w-1}{2}\right),$$

else, $B_0^{v,i,j} = B_1^{v,i,j} = $ null.

The bits extracted are $B_1^{h,i,j} B_0^{h,i,j}$, i.e. if the 1st position on the edge is a black dot, the bits are 00; if the 2nd position on the edge is a black dot, the bits are 01; if the 3rd position on the edge is a black dot, the bits are 11; if the 4th position on the edge is a black dot, the bits are 10. Note that 00, 01, 11; 10 is a Gray code, which ensures that the number of error bits is at most 1 if the position of black dot is incorrect. See FIG. 54, which is based on H", V" being the same as H', V' for an illustration.

Here, a total of 8 bits are encoded in an EIC symbol. Each bit is a bit from an m-array (one dimension). Bits are now obtained from each dimension.

Figure 66:
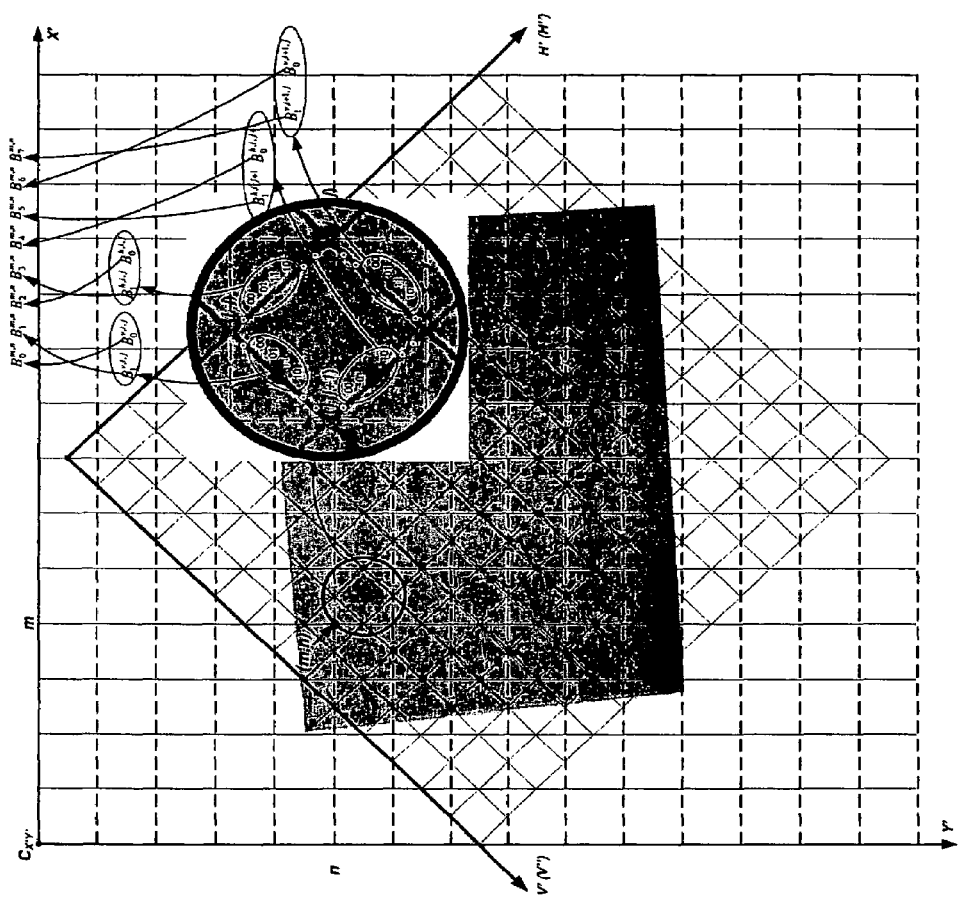
FIG. 66 shows assignment of bit values in accordance with embodiments of the invention.

Let $B_b^{m,n}$ be the bit of dimension b, where b=0, 1, . . . , 7, encoded in EIC symbol (m,n), where (m,n) are the coordinates of the symbol in X', Y' coordinate system. Let $C_b^{m,n}$ be the confidence of bit $B_b^{m,n}$ as shown in FIG. 66.

Note that $B_b^{m,n}$ is a matrix in which substantially all the bits encoded in all the EIC symbols in the section of EIC symbol array encompassing the image, are stored. Each element (m,n) in matrix $B_b^{m,n}$ corresponds to a square (formed by the horizontal and vertical dashed lines in FIG. 66) whose top-left corner has the coordinates of (m,n) in X', Y' coordinate system.

For EIC symbols not captured in image, values of the corresponding elements in $B_b^{m,n}$ will be null. Even if EIC symbols are captured in image, if one is unable to extract the bits encoded in the symbols, values of the corresponding elements in $B_b^{m,n}$ will also be null. Only when bits are extracted, the corresponding elements in $B_b^{m,n}$ will have the value of the bits.

One can now store all the extracted bits in $B_b^{m,n}$, and their confidence values in $C_b^{m,n}$.

For each dimension b, where b=0, 1, . . . , 7, initialize $B_b^{m,n}$ and $C_b^{m,n}$ as:

$B_b^{m,n}=$null, $C_b^{m,n}=$null.

For each bit l on edge (i,j) on H line, where i=0, 1, . . . , $N_h^0$−1, j=0,1, . . . , $N_v^0$, l=0, 1, find the corresponding b, m and n, and assign values to $B_b^{m,n}$ and $C_b^{m,n}$:

$$b = 2 + l + 2 \cdot mod(i + j + O_0, 2),$$

$$m = int\left(int\left(\frac{N_v^0 + O_0}{2}\right) + \frac{i - j + O_0}{2}\right),$$

$$n = int\left(\frac{i + j + O_0}{2}\right),$$

$$B_b^{m,n} = B_l^{h,i,j},$$

$$C_b^{m,n} = Diff_0^{h,i,j}.$$

For each bit l on edge (i,j) on V line, where i=0,1, . . . , $N_h^0$, j=0,1, . . . , $N_v^0$−1, l=0, 1, find the corresponding b, m and n, and assign values to $B_b^{m,n}$ and $C_b^{m,n}$:

$$b = l + 6 \cdot mod(i + j + O_0, 2),$$

$$m = int\left(int\left(\frac{N_v^0 + O_0}{2}\right) + \frac{i - j + O_0}{2}\right) - mod(i + j + O_0, 2),$$

$$n = int\left(\frac{i + j + O_0}{2}\right),$$

$$B_b^{m,n} = B_l^{v,i,j},$$

$$C_b^{m,n} = Diff_0^{v,i,j}.$$

One can now normalize the confidence values. Let $C_{max}=\max(C_b^{m,n})$, where $B_b^{m,n} \neq$ null. The normalized confidence values are:

$$C_b^{m,n} = int\left(100 \cdot \frac{C_b^{m,n}}{C_{max}}\right).$$

This completes EIC symbol recognition in accordance with embodiments of the invention. Output of EIC symbol recognition is homography matrix $H_{Symbol \to Image}$, which is shown as homography matrix 5117 in FIG. 51, matrix $B_b^{m,n}$ containing the extracted bits, and matrix $C_b^{m,n}$ containing the confidence values of the bits. Matrix $B_b^{m,n}$ and matrix $C_b^{m,n}$ are shown as EIC bits 5116 in FIG. 51.

Decoder and Decoding

The following describes EIC decoding in step 718 of FIG. 7 and an associated decoder. The decoder may be applied to one-dimensional and multi-dimensional arrays.

Multidimensional Arrays

Some codes relate to one-dimensional arrays, where each bit corresponds to a single position in the array. Various examples of the invention, however, may employ multi-dimensional arrays. With multi-dimensional arrays, each position in the array includes a group of bits. For example, in the multi-dimensional array 6900 shown in FIG. 69A, each of the bit elements in the bit group 6900 will have a different array value. More particularly, the first bit in the group, with the value "0," will have the array value (7, 4, 1) (represented $E_{7,4,1}$). The second bit in the group, also with the value "0," will have the array value (6, 4, 1) (represented $E_{6,4,1}$). The last bit in the group, with the value "1," will have the array value (0,4,1) (represented $E_{0,4,1}$).

FIG. 69B then illustrates one example of a code symbol 6901 that can be used to represent a multidimensional value in an array forming a location pattern. As seen in this figure, the code symbol has four black dark dots 6903 that represent the border of the symbol 6905. It also includes data dots 6907 that can be either marked black or left white (or blank) to represent data bits. Still further, the illustrated code symbol includes orientation dots 6907 that are always left white (or blank) to allow the decoding process to determine an orientation of the symbol.

As discussed herein, a code symbol is the smallest unit of visual representation of a location pattern. Generally, a code symbol will include the pattern data represented by the symbol. As shown in the illustrated example, one or more bits may be encoded in one code symbol. Thus, for a code symbol with 1 bit represented, the represented data may be "0" or "1", for a code symbol representing 2 bits, the represented data may be "00", "01", "10" or "11." Thus, a code symbol can represent any desired amount of data for the location pattern. The code symbol also will have a physical size. When the location pattern is, for example, printed on paper, the size of a code symbol can be measured by printed dots. For example, the illustrated code symbol is 16×16 printed dots. With a 600 dpi printer, the diameter of a printed dot will be about 0.04233 mm.

Still further, a code symbol will have a visual representation. For example, if a code symbol represents 2 bits, the visual representation refers to the number and position distribution of the black dots used to represent the data values "00", "01", "10" or "11". Thus, the code symbol illustrated in FIG. 69B may be referred to as a "8-a-16" symbol, since it represents 8 data bits using a 16×16 array of discrete areas. Of course, symbols having a variety of different represented pattern data values, sizes, and visual representation configurations will be apparent to those of ordinary skill in the art upon consideration of this description.

The bit values for the additional dimensions in a multidimensional array may conveniently be generated by cyclically shifting an original m-sequence to create a multidimensional m-array. More particularly, multiplying $Q(x)/P_n(x)$ by $x^k$ will result in an m-sequence that is the k-th cyclical shift of m. That is, letting $Q'(x)=x^k Q(x)$, if the order of $Q'(x)$ is still less than n, then the m-sequence m' generated by $Q'(x)/P_n(x)$ is the k-th cyclic shift of m, i.e. $m'=\sigma^k(m)$. Here $\sigma^k(m)$ means cyclically-shifting m to the right by k times. For example, referring to the generation of the m-sequence described in detail above, if $Q_2(x)=x+x^2+x^3=xQ_1(x)$, the division $Q_2(x)/P_n(x)$ will generate an m-sequence $m_2$=010110010001111, which is the first cyclical shift of m, i.e. $m_2=\sigma^1(m_1)$.

Accordingly, cyclically shifted m-sequences may be formed into a multidimensional m-array. That is, the first bit in each group of bits may belong to a first m-sequence. The second bit in each group may then belong to a second m-sequence that is cyclically shifted by a value $k_1$ from the first m-sequence. The third bit in each group may then belong to a third m-sequence that is cyclically shifted by a value $k_2$ from the first m-sequence, and so on to form a multidimensional m-array.

As shown in FIG. 69B, the physical positions of the bits of different m-sequences of a multidimensional m-array on the page are slightly different. Among the m-arrays, one dimension of the m-array (i.e., one cyclic shift of an m-sequence) is used for determining the pen position. The remaining m-arrays can then advantageously be used to embed some information, called metadata. For example, a document may have an identification number d. The second m-sequence used in a multidimensional m-array may then be a cyclic shift from the first m-array used for position determination, with the number of shifts being exactly d. Thus, when the values of the first and second m-sequences in the multidimensional m-array are decoded, the shift difference between can be determined to obtain the identification number d of the document. Of course, as will be appreciated by those of ordinary skill in the art, any desired information can be embedded as metadata in a multidimensional m-array as described above.

Decoding an M-Array

In order to determine the position of an image relative to a document using an m-array, it is important to determine the position of a bit captured in the bit relative to the m-array. That is, it is necessary to determine if the bit is the first bit, second bit, etc. in the m-sequence to determine the position of the bit in the m-array.

For any number s, where $0 \leq s < 2^n-1$, there exists a unique polynomial r(x), where $$r(x) = \sum_{i=0}^{n-1} r_i x^i$$

whose order is less than n, such that $x^s \equiv r(x) \pmod{P_n(x)}$, and vice versa. In other words, there is a one-to-one relationship between s and r(x). Thus, $x^s/P_n(x)$ and $r(x)/P_n(x)$ will generate the same m-sequence. For convenience, setting $Q(x)=1$, m can be assumed to be the m-sequence generated by $1/P_n(x)$. If a bit is the s'-th bit of m, where $0 \leq s' < 2^n-1$, the m-sequence that starts from that bit is $R=\sigma^{-s'}(m)=\sigma^{2^n-1-s'}(m)=\sigma^s(m)$, where $s=2^n-1-s'$. R corresponds to division $x^s/P_n(x)$.

As previously noted, there exists $$r(x) = \sum_{i=0}^{n-1} r_i x^i,$$

that satisfies $r(x) \equiv x^s \pmod{P_n(x)}$. R also corresponds to division $r(x)/P_n(x)$. Letting $m=(m_0\ m_1\ \ldots\ m_i\ \ldots\ m_{2^n-3}\ m_{2^n-2})^t$ (where the superscript t stands for vector or matrix transpose), and $\sigma^i(m^t)=(m_{2^n-1-i}\ m_{2^n-i}\ \ldots\ m_0\ \ldots\ m_{2^n-3-i}\ m_{2^n-2-i})$, $r(x)/P_n(x)$ and $1/P_n(x)$ will have the following relationship:

$$r(x)/P_n(x) = \left(\sum_{i=0}^{n-1} r_i x^i\right) / P_n(x)$$

$$= \sum_{i=0}^{n-1} [r_i x^i / P_n(x)]$$

$$= \sum_{i=0}^{n-1} r_i [x^i \cdot 1 / P_n(x)].$$

With R corresponding to the division $r(x)/P_n(x)$, and $\sigma^i(m)$ corresponding to $x^i \cdot 1/P_n(x)$, then, $$R^t = r^t \hat{M}$$

where R is the m-sequence that starts from the s'-th bit of m, $r=(r_0\ r_1\ r_2\ \ldots\ r_{n-1})^t$ are the coefficients of $r(x)$, and $$\hat{M} = \begin{pmatrix} m^t \\ \sigma(m^t) \\ \vdots \\ \sigma^{n-1}(m^t) \end{pmatrix}.$$

Again, the addition and multiplication operations are binary operations, i.e. addition is XOR and multiplication is AND.

If an image captures K bits $b=(b_0\ b_1\ b_2\ \ldots\ b_{K-1})^t$ of m ($K \geq n$), and the relative distances between the positions of the bits in the m-sequence are: $s_i=d(b_i, b_0)$, where $i=0, 1, \ldots, K-1$ and $s_0=0$, selecting the $s_i+1$-th bits of R and the $s_i+1$-th columns of $\hat{M}$ will result in:

$$b^t = r^t M$$

where $b^t$ is the transpose of b, M is a sub-matrix of $\hat{M}$ and consists of the $s_i+1$-th columns of $\hat{M}$, where $i=0, 1, 2, \ldots, K-1$.

If M is a non-degenerate matrix and b does not contain error bits, then r can be solved by selecting n bits from b by solving for:

$$r^t = \tilde{b}^t \tilde{M}^{-1}$$

where $\tilde{M}$ is any non-degenerate n×n sub-matrix of M, and $\tilde{b}$ is the corresponding sub-vector of b consisting of the selected n bits.

Stochastic Decoding of an M-Array

In most cases, however, an image cannot capture a set of bits b that does not contain error bits. For example, improper illumination, document content, dust and creases can all obscure the visual representation of bits in an image, preventing these bits from being recognized or causing the value of these bits to be improperly recognized. The solution of r becomes difficult when there are error bits in b. Further, decoding becomes even more difficult because the coefficient matrix M is not fixed when the pen moves, changing the image from frame to frame. Moreover, the structure of M is irregular. Therefore, traditional decoding algorithms cannot effectively be applied to solve r under practical circumstances.

To address these difficulties, various embodiments of invention provide stochastic solution techniques that provide a high decoding accuracy under practical conditions. As will be described in more detail, these techniques solve the equation $b^t = r^t M$ incrementally so that many solution candidates are readily available without having to solve this equation exactly.

According to various examples of the invention, independent n bits (i.e., the sub-matrix consisting of the corresponding columns of M is non-degenerate) are randomly selected from the group of b that are captured in an image of a document. Supposing that $b^{(0)}$ are the n bits chosen, a solution for r can then be obtained as:

$$[r^{(0)}]^t = [b^{(0)}]^t [M^{(0)}]^{-1}$$

where $M^{(0)}$ contains the corresponding columns of the array M for the chosen bits.

For simplicity, the n bits chosen from b to make up $b^{(0)}$ can be moved to the beginning of b, with the remaining bits making up b moved to the end of b. This leads to the relationship $$([b^{(0)}]^t, [\overline{b}^{(0)}]^t) = [r^{(0)}]^t (M^{(0)}, \overline{M}^{(0)}) + (0_n{}^t, [e^{(0)}]^t)$$

where $b^{(0)}$ are the chosen n bits, $\overline{b}^{(0)}$ are the remaining bits from the set b, $M^{(0)}$ is the corresponding columns of M for the chosen bits, $\overline{M}^{(0)}$ is the corresponding columns of M for the remaining bits, $0_n{}^t = (0\ 0\ \ldots\ 0)_{1 \times n}$, $[r^{(0)}]^t = [b^{(0)}]^t [M^{(0)}]^{-1}$, and $[e^{(0)}]^t = [\overline{b}^{(0)}]^t + [r^{(0)}]^t \overline{M}^{(0)}$.

The value $(0_n{}^t, [e^{(0)}]^t)$ refers to the "difference vector" between $([b^{(0)}]^t, [\overline{b}^{(0)}]^t)$ and $[r^{(0)}]^t (M^{(0)}, \overline{M}^{(0)})$, or simply the different vector of $r^{(0)}$, and the number of 1's in $(0_n{}^t, [e^{(0)}]^t)$ is called the number of different bits. The vector containing different bits between $([b^{(0)}]^t, [\overline{b}^{(0)}]^t)$ and $[r^{(0)}]^t (M^{(0)}, \overline{M}^{(0)})$ alternately can be identified as $D^{(0)}$. If $D^{(0)} = (0_n{}^t, [e^{(0)}]^t)$, then the number $d^{(0)}$ of 1's in $D^{(0)}$ is $d^{(0)} = \text{HammingWeight}(D^{(0)}) = \text{HammingWeight}(e^{(0)})$. That is, $d^{(0)}$ is the number of different bits between $([b^{(0)}]^t, [\overline{b}^{(0)}]^t)$ and $[r^{(0)}]^t (M^{(0)}, \overline{M}^{(0)})$.

Next, some of the chosen bits n from the set b are switched with some of the remaining bits from the set b. In particular, J bit pairs $(k_j, l_j)$ are switched between the original chosen bits n and the remaining bits from the set of bits b, where $k_1 \neq k_2 \neq \ldots \neq k_J \leq n$, $n < l_1 \neq l_2 \neq \ldots \neq l_J \leq K$. It should be noted that the bit order is redefined in $([b^{(0)}]^t, [\overline{b}^{(0)}]^t)$, and these bits are not maintained in their original order. The relationship between the bits before and after switching is:

$$[e^{(1)}]^t = [e^{(0)}]^t + [e^{(0)}]^t E_{l-n} [P_{R_J}^{(0)}]^{-1} (E_k{}^t P^{(0)} + E_{l-n}{}^t),$$

$$[r^{(1)}]^t = [r^{(0)}]^t + [e^{(0)}]^t E_{l-n} [P_{R_J}^{(0)}]^{-1} E_k{}^t [M^{(0)}]^{-1},$$

$$P^{(1)} = P^{(0)} + (E_k + P^{(0)} E_{l-n}) [P_{R_J}^{(0)}]^{-1} (E_k{}^t P^{(0)} + E_{l-n}{}^t),$$

$$[M^{(1)}]^{-1} = [M^{(0)}]^{-1} + (E_k + P^{(0)} E_{l-n}) [P_{R_J}^{(0)}]^{-1} E_k{}^t [M^{(0)}]^{-1},$$

where $$E_k = (e_{k_1}\ e_{k_2}\ \ldots\ e_{k_J})_{n \times J},$$

$$E_{l-n} = (e_{l_1-n}\ e_{l_2-n}\ \cdots\ e_{l_J-n})_{(K-n) \times J},$$

$$P_{R_J}^{(0)} = E_k{}^t P^{(0)} E_{l-n}$$

$$e_i{}^t = \begin{pmatrix} 0 & \cdots & 0 & \overset{i}{1} & 0 & \cdots & 0 \end{pmatrix}_{1 \times n \text{ or } 1 \times (K-n)}, \text{ and}$$

$$P^{(i)} = [M^{(i)}]^{-1} \overline{M}^{(i)}, \quad i = 0, 1.$$

If the choice of $(k_j,l_j)$ is to make:

$$[e^{(0)}]^t E_{l-n}[P_{R_J}^{(0)}]^{-1} = 1_J^t,$$

where $1_J^t = (1\ 1\ \ldots\ 1)_{1 \times J}$, then $$[e^{(1)}]^t = [e^{(0)}]^t + 1_J^t(E_k^t P^{(0)} + E_{l-n}^t)$$

$$[r^{(1)}]^t = [r^{(0)}]^t + 1_J^t E_k^t [M^{(0)}]^{-1}.$$

In view of $[e^{(0)}]^t E_{l-n}[P_{R_J}^{(0)}]^{-1} = 1_J^t$ given $k_1 \neq k_2 \neq \ldots \neq k_J \leq n$, the choice of $n < l_1 \neq l_2 \neq \ldots \neq l_J \leq K$ is as follows: $\{l_1, l_2, \ldots, l_J\} \subset \{p_1, \ldots, p_m\}$, where $\{p_1, \ldots, p_m\}$ are the indices of the 0-bits of $[e^{(0)}]^t + 1_J^t E_k^t P^{(0)}$, and $P_{R_J}^{(0)}$ is invertible. Therefore, if the rank of $E_k^t P^{(0)} E_{p-n}$ is less than J, then such $l_1, l_2, \ldots, l_J$ cannot be chosen, where $E_{p-n} = (e_{p_1-n}\ e_{p_2-n}\ \ldots\ e_{p_m-n})_{(K-n) \times m}$. Choosing other $l_1, l_2, \ldots, l_J$ is equivalent to switching a smaller number of bit pairs, and therefore does not conform to the goal of switching J bits. It should be noted that, as long as the rank of $E_k^t P^{(0)} E_{p-n}$ is J, the choice of $l_1, l_2, \ldots, l_J$ will result in the identical location vector. Therefore, choosing one combination is sufficient. Moreover, as long as $P_{R_J}^{(0)}$ is invertible, the newly selected n bits are also independent.

With the above choice of $l_1, l_2, \ldots, l_J$, the number of different bits in $e^{(i+1)}$ is:

The number of 1's in $([e^{(0)}]^t + 1_J^t E_k^t P^{(0)}) + J$

It should be noted that $E_k^t P^{(0)} E_{l-n}$ actually means choosing the $k_1, \ldots, k_J$-th rows and $l_1-n, \ldots, l_J-n$-th columns of $P^{(0)}$, while $1_J^t E_{kk}^t P^{(0)}$ actually means summing the $k_1, \ldots, k_J$-th rows of $P^{(0)}$. No matrix computation is needed.

Thus, the decoding steps can be summarized as follows. First, an independent n-bit combination is generated from the group of bits b captured in an image. It should be noted that, with various embodiments of the invention, the selection of the n-bits can be combined with bit recognition confidence techniques, to help ensure that the most accurately recognized bits are selected for the n-bit combination.

Next, the relationship $([b^{(0)}]^t, [\bar{b}^{(0)}]^t) = [r^{(0)}]^t(M^{(0)}, \overline{M}^{(0)}) + (0_n^t, [e^{(0)}]^t)$ is solved to determine $d^{(0)} =$ HammingWeight$(D^{(0)})=$HammingWeight$(e^{(0)})$. If the number of different bits $d^{(0)}$ is 0, then the process is stopped and the solution $r^{(0)}$ is output. Otherwise, all J (=1 and 2) bit pairs are switched, and the number of different bits d is again determined using the relationship $([e^{(0)}]^t + 1_J^t E_k^t P^{(0)}) + J$. It should be noted, however, that this relationship can only be evaluated when the rank of $E_k^t P^{(0)} E_{p-n}$ is J. In this case there is no need to specify $l_1, l_2, \ldots, l_J$. Next, the minimal number d of different bits is determined.

The above process has to be repeated for several times in order to ensure a high enough probability of successful decoding. To estimate the times of selecting the n-bit $b^{(0)}$ from b, the number r of the error bits in b is first predicted to be d. If r is changed, then $$p_s = \frac{C_r^s C_{K-r}^{n-s}}{C_K^n},$$

is computed, which is the probability of the chosen n bits contain s error bits, where $$C_a^b = \frac{a!}{b!(a-b)!}$$

is the combinatory number, $$\text{and } P_s = \sum_{i=0}^{s} p_i,$$

is the probability if the chosen n bits contain less than s+1 error bits. In practice, s=2 in order to minimize the computation load. Next, $s_2$ is computed, such that $1-(1-P_2)^{s_2} \geq P_e$, where $P_e$ is the expected probability of successful decoding. If the times S of chosen $b^{(0)}$ is equal to or larger than $s_2$, then the process is stopped and the results are output. Otherwise, the process is repeated with a new independent n-bit combination $b^{(0)}$ generated from the group of bits b captured in an image. Using this process, as long as the chosen n bits contain less than J+1 error bits, the correct solution is found.

Decoding Using "Bit-Flipping"

While the above-described technique can be used to determine the number of a bit in an m-sequence, this technique can be further simplified using "bit-flipping." As used herein, the term "bit flipping" refers to changing a bit with a value of "1" to a new value of "0," changing a bit with a value of "0" to a new value of "1."

Supposing $[b^{(1)}]^t$ is $[b^{(0)}]^t$ with J bits flipped, and the J bits are the $k_i$-th bits of $[b^{(0)}]^t$, where $i=1,2,\ldots,J$, $1 \leq k_1 \leq k_2 \leq \ldots < k_J \leq n$, then the relationship.

$$[r^{(1)}]^t = [b^{(1)}]^t [M^{(0)}]^{-1}$$

can be used to solve for a new r. It can be proven that:

$$([b^{(1)}]^t, [\bar{b}^{(0)}]^t) = [r^{(1)}]^t (M^{(0)}, \overline{M}^{(0)}) + (E_J, [e^{(0)}]^t + E_J P^{(0)})$$

and $$[r^{(1)}]^t = [r^{(0)}]^t + E_J [M^{(0)}]^{-1}$$

where $$E_J = \sum_{j=1}^{J} e_{k_j}^t, \quad e_i^t = \begin{pmatrix} 0 & \ldots & 0 & \overset{i}{1} & 0 & \ldots & 0 \end{pmatrix}_{1 \times n},$$

$$P^{(0)} = [M^{(0)}]^{-1} \overline{M}^{(0)}.$$

Now, $D^{(1)} = (E_J, [e^{(0)}]^t + E_J P^{(0)})$, and the number of different bits $d^{(1)}$ is: $d^{(1)} =$ HammingWeight$(D^{(1)})=$HammingWeight$([e^{(0)}]^t + E_J P^{(0)}) + J$.

If $d^{(1)} < d^{(0)}$, then $r^{(1)}$ is a better solution of r than $r^{(0)}$.

The vector r is referred to as a location vector. Since division $x^s/P_n(x)$ and division $r(x)/P_n(x)$ generates the same m-sequence R, once r, i.e. the coefficients of r(x), is solved, s can be obtained by using a discrete logarithm. Therefore, s', the location of R in the original m-sequence m, can be obtained. Methods for solving a discrete logarithm are well known in the art. For example, one technique for solving a discrete logarithm is described in "Maximal and Near-Maximal Shift Register Sequences: Efficient Event Counters and Easy Discrete Logarithms," Clark, D. W. and Weng, L-J., *IEEE Transactions on Computers*, 43(5), (1994), pp. 560-568, which is incorporated entirely herein by reference.

Thus, this simplified decoding process can be summarized by the following steps. First, n independent bits $b^{(0)}$ are randomly selected from the total set of bits b captured in an image of a document. The bits n may be randomly selected using, for example, Gaussian elimination. Once the bits n are selected, then the relationship $([b^{(0)}]^t,[\overline{b}^{(0)}]^t)=[r^{(0)}]^t(M^{(0)}, \overline{M}^{(0)})+(0_n{}^t,[e^{(0)}]^t)$ is solved to determine r. If the Hamming-Weight value $d^{(0)}$ is 0, then the value of r is output and used to determine s' as described above, giving the position of this bit in the document.

If the value $d^{(0)}$ is not 0, then J bits of the chosen n bits are flipped, where $1 \leq J < n$, and the number of different bits using the equation $d^{(1)}=\text{HammingWeight}([e^{(0)}]^t+E_J P^{(0)})+J$ is computed. Next, another set of n independent bits is selected, and the process is repeated. The new $b^{(0)}$ is different from all previous sets. Finally, the value of r is output that corresponds to the smallest d, i.e. the least number of different bits. In various implementations of the invention, up to two bits are flipped, and $b^{(0)}$ is only selected once.

Tool for Decoding an M-Array

Figure 67:
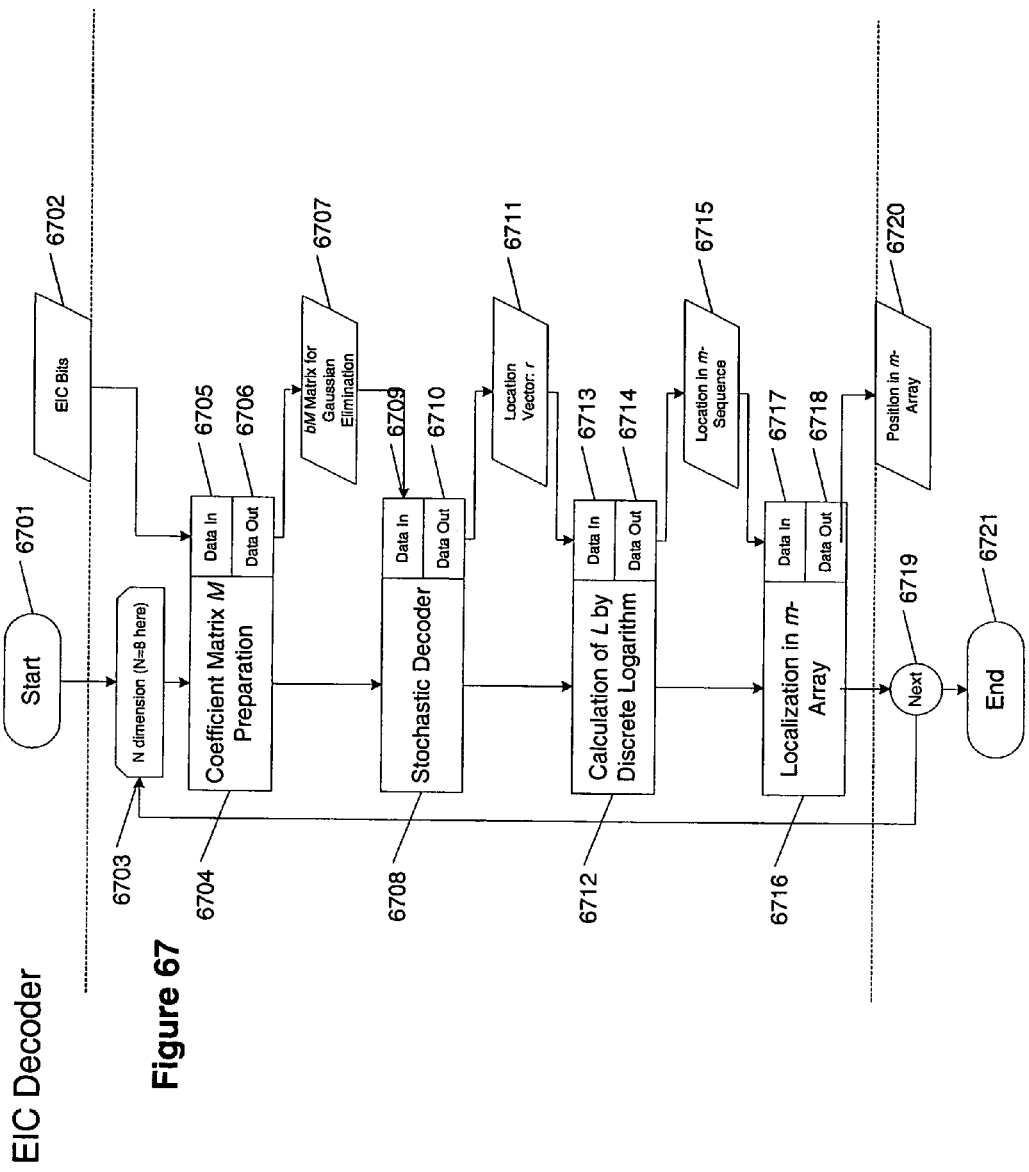
FIG. 67 shows a process for performing EIC decoding in accordance with aspects of the present invention.

FIG. 67 shows a process for decoding an m-array. Here, the process starts in step 6701 and EIC bits 6702 are received in the data in 6705 of coefficient matrix M preparation step 6704. Data out 6706 outputs a bM matrix for Gaussian Elimination in step 6707. This is input to data in 6709 of stochastic decoder 6708, that later outputs from data out 6710 a location vector r 6711. The location vector r 6711 is then received at data in 6713 of step 6712 that calculates L by discrete logarithm and outputs from data out 6714 the location 6715 of the EIC bits 6702 in the m-sequence. Finally, the location is localized in step 6716 (as received from data in 6717) and outputs through data out 6718 the position 6720 in the m-array.

This process is performed N times where N is the number of dimensions (for instance, N=8 here) as shown by steps 6719 and 6703 then ends in step 6721.

Figure 68:
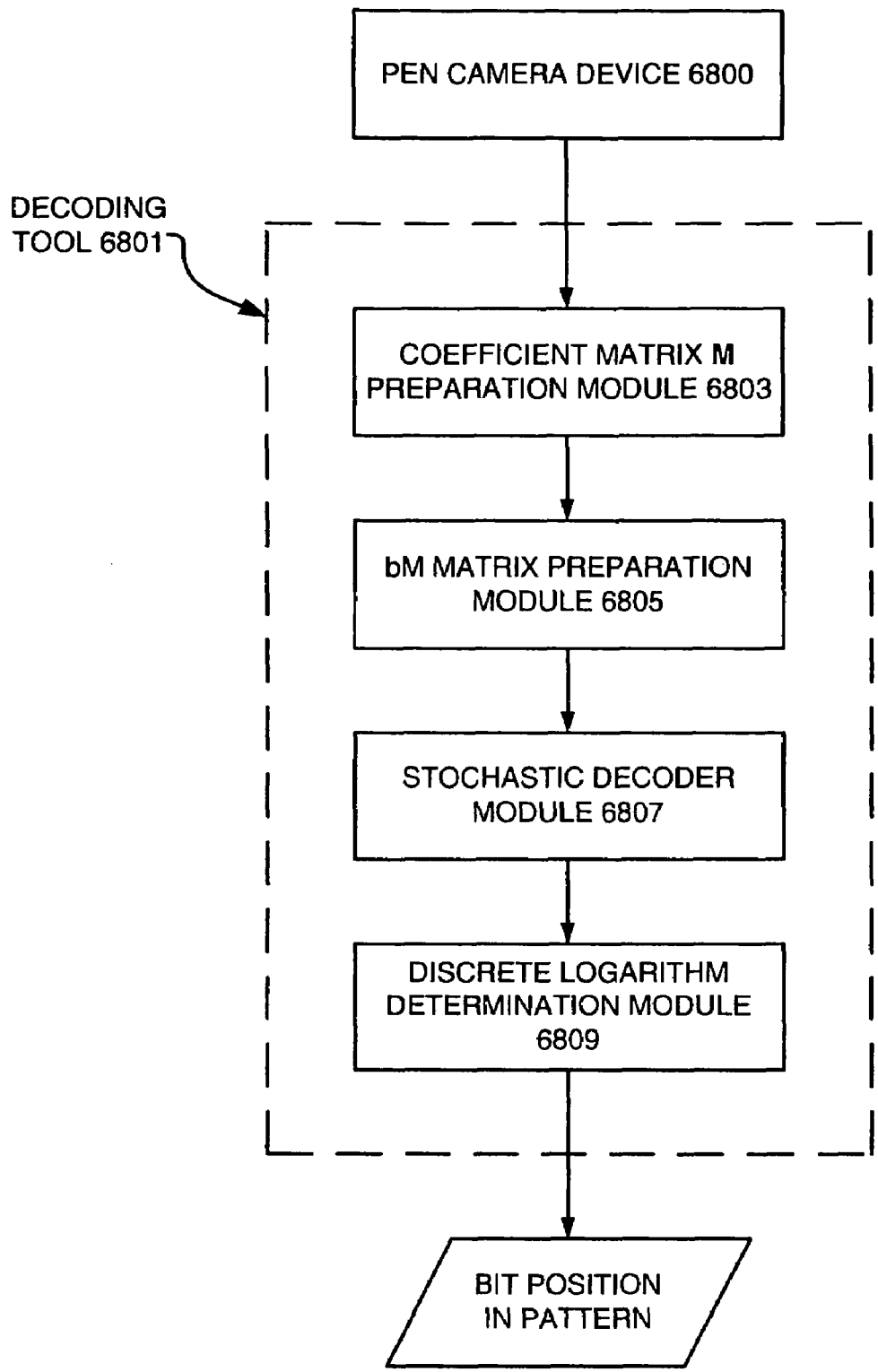
FIG. 68 illustrates an example of a decoding tool that may be implemented according to various examples of the invention.

Also, FIG. 68 illustrates another example of a decoding tool 701 that may be implemented according to various examples of the invention. As seen in this figure, the tool 6801 receives image information from a pen camera device 6800, and provides a bit position in a pattern. The decoding tool 6801 includes a coefficient matrix M preparation module 6803 and a bM matrix preparation module 6805. It also includes a stochastic decoder module 6807 and a discrete logarithm determination module 6809. With various examples of the invention, one or more of these modules may be implemented using analog circuitry. More typically, however, one or more of these modules will be implemented by software instruction executing on a programmable computer, such as the programmable computer shown in FIG. 1. Each of these modules 6803-6809 will be discussed in more detail below.

Coefficient Matrix M Preparation

Figure 69C:
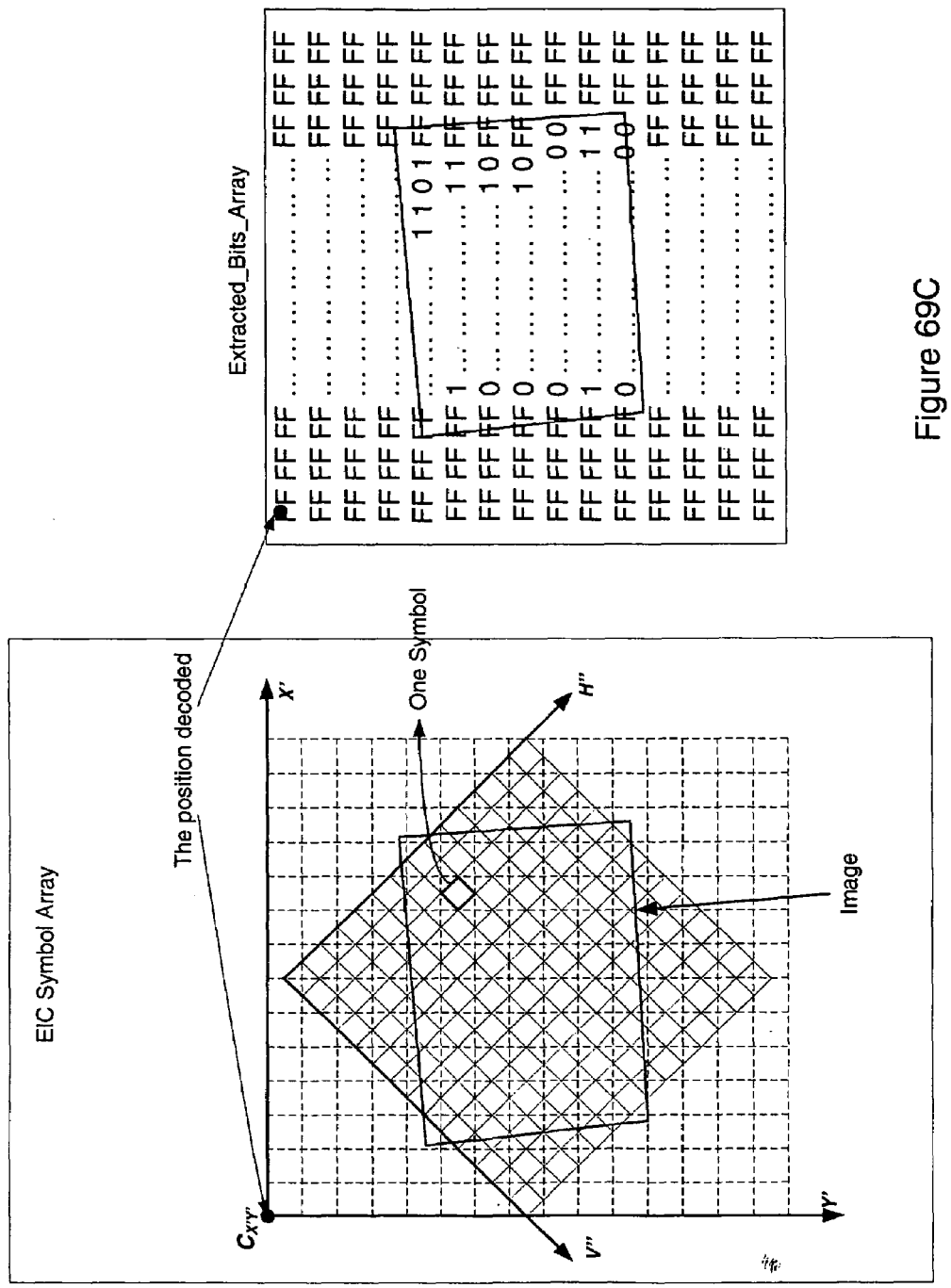
FIGS. 69A-75 illustrate the creation of various arrays that may be employed during pattern decoding according to various examples of the invention.

In order to solve for r as discussed above, the arrays b and M are configured. First, all of the bits extracted for one dimension are stored in a matrix called Extracted_Bits_Array. For dimension b, where b=0, 1, . . . , 7, the Extracted_Bits_Array $(m,n)=B_b{}^{m,n}$. As illustrated in FIG. 69C, the bits extracted for one dimension are stored in Extracted_Bits_Array. In this figure, the null values are shown as "FF". FIG. 69C also indicates the position that will be determined by the decoding process. The decoded position is the position of the first element of the m-array stored in the Extracted_Bits_Array. In the case of the m-array representing positions using (x,y) Cartesian coordinates, the decoded position will be the coordinates of point $C_{X,Y}$ in the pattern array.

Once an Extracted_Bits_Array is created for a dimension, the total number of non-FF bits is counted. If the number is fewer than n, where n is the order of the m-array (in the illustrated example, n=28), then too few bits have been obtained to decode the array, and the decoding fails for this dimension. If the number is more than 2n, up to the 2n bits that have the highest recognition confidence values are kept, and "FF" is assigned to all other elements in the Extracted_Bits_Array.

In the illustrated example, it should be noted that the size of Extracted_Bits_Array is 20×20. This size is considered large enough to account for all possible positions of the extracted bits for a pattern encoded using an 8-a-16 symbol. That is, given the 128×100 pixel image sensor and the size of the symbol 8-a-16, a size 20×20 matrix is considered large enough to hold the bits in the image, regardless of how the image is rotated.

Figure 70:
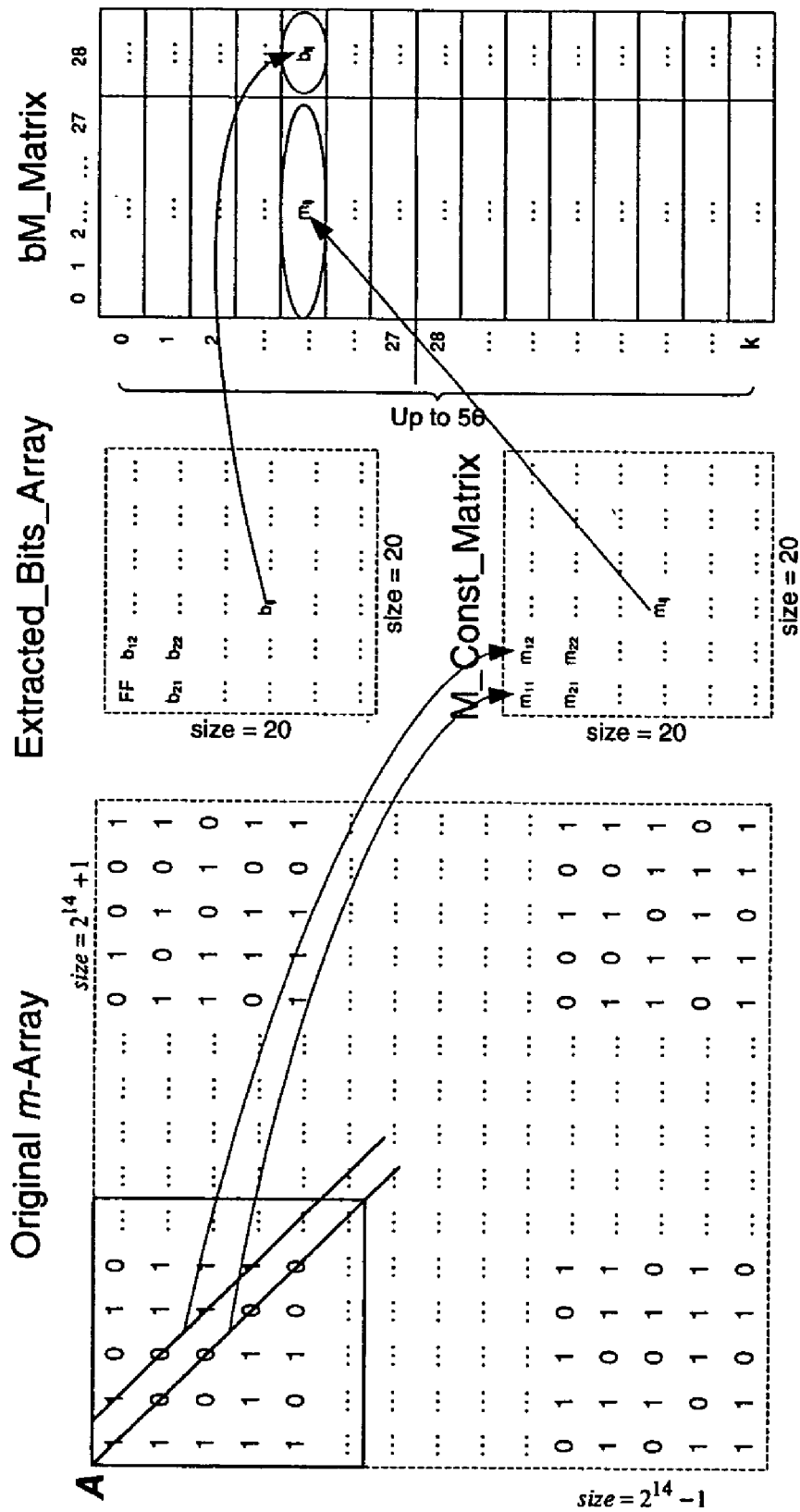

To obtain M, the coefficient matrix M preparation module 703 creates a matrix called M_Const_Matrix as a constant table. The size of M_Const_Matrix is the same as the size of Extracted_Bits_Array, i.e. 20×20 in the illustrated implementation. The M_Const_Matrix table is constructed in the following manner. For every i and j, where $1 \leq i \leq 20$, $1 \leq j \leq 20$, $$M(i,j)^T=(A(i,j),A(i+1,j+1),\ldots,A(i+26,j+26),A(i+27,j+27))^T$$

where A(i,j) is element (i,j) of the m-array based on the m-sequence m. FIG. 70 shows an illustration of how M_Const_Matrix is constructed.

Next, the bM matrix preparation module 6805 constructs matrix bm_Matrix to contain b and M. For every non-FF bit in the Extracted_Bits_Array, the bM matrix preparation module 6805 places the bit in the last column of bM_Matrix. Next, the corresponding element in M_Const_Matrix is retrieved (which is a vector), and that element is placed in the first n columns of the same row of bM_Matrix. With various examples of the invention, the bM matrix preparation module 6805 may reorder the rows of bM_Matrix according to the recognition confidence of the corresponding bits, from highest to lowest. FIG. 70 for an illustration of how bM_Matrix is constructed. As a result, the first n columns of bM_Matrix are M (transposed). The last column of bM_Matrix is b. bM_Matrix has n+1 columns and up to 2n rows. For calculation purposes, another matrix, bM_Copy may be created, which is exactly the same as bM_Matrix.

Stochastic Decoding

Next, the stochastic decoder module 6807 obtains a solution for r. More particularly, a first solution for r may be obtained with Gaussian elimination. In the bM_Matrix, through Gaussian elimination, n linearly independent bits are selected to solve for r. The process proceeds as follows. In bM_Matrix, starting from the first row down, a row is located that has a "1" in the first column. If it is not the first row of bM_Matrix, the row is switched with the first row of bM_Matrix. Next, in the bM_Matrix, the new first row (with a "1" in the first column) is used to perform a XOR operation with all the remaining rows that have a "1" in the first column and the result of the operation replaces the value of the original row. Now, all of the rows in bM_Matrix have a "0" in the first column except the first row, which has a "1" in the first column.

Figure 71:
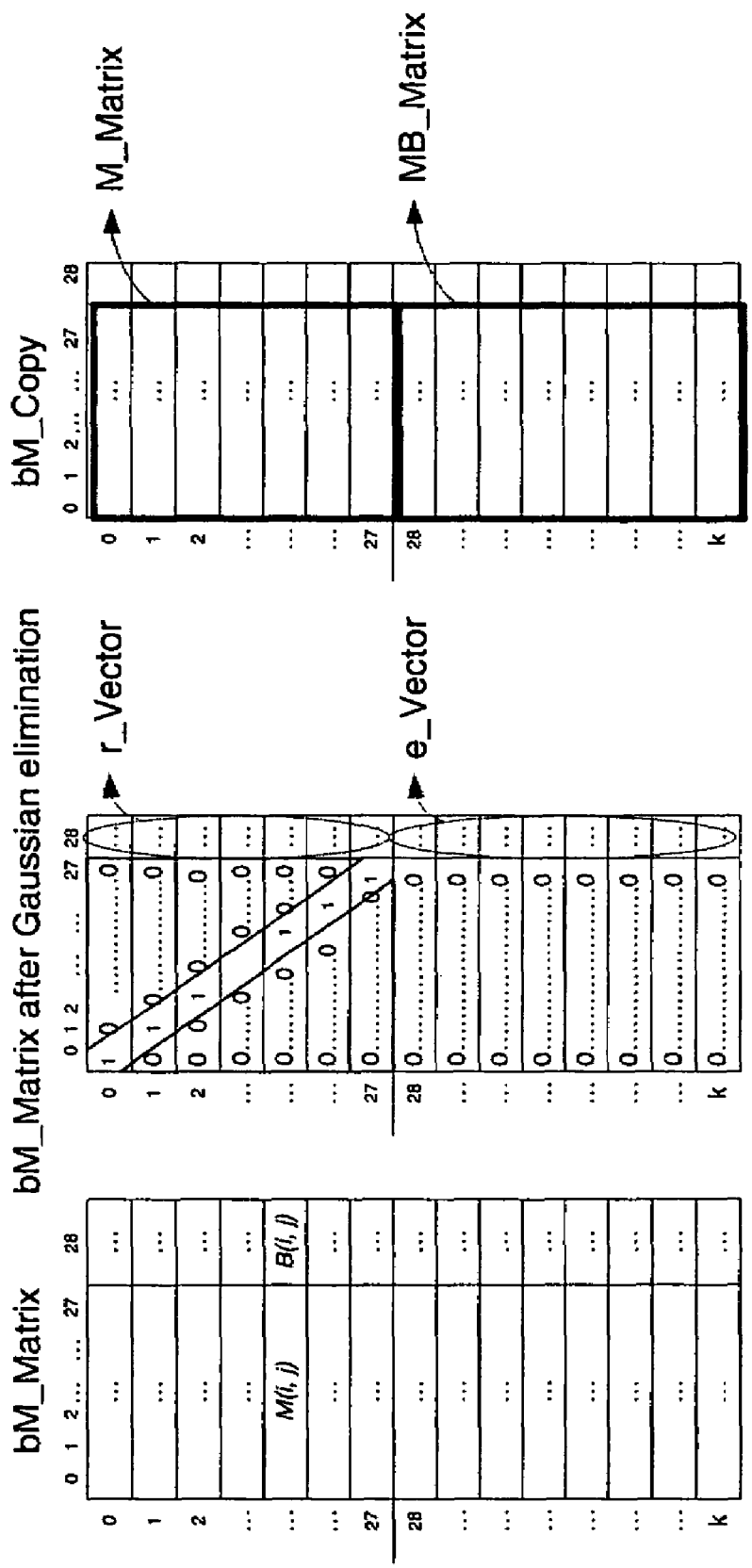

Next, starting from the second row down in the bM_Matrix, a row is identified that has a "1" in the second column. If it is not the second row of the bM_Matrix, this row is switched with the second row of bM_Matrix. In bM_Matrix, the new second row (with a "1" in the second column) to perform an XOR operation with all the remaining rows (including the first row of bM_Matrix) that have a "1" in the second column, letting the result replace the original value for the row. Now, all the rows in bM_Matrix have a "0" in the second column except the second row which has a "1" in the second column. This process continues until there is a "1" along the diagonal of the first n rows of bM_Matrix, as shown in FIG. 71.

The first n rows of bM_Matrix correspond to the n bits selected for solving r, i.e. $b^{(0)}$ as described above. The rest of the rows of bM_Matrix correspond to the rest of the bits, i.e. $\bar{b}^{(0)}$ also described above. Further, the last column of the first n rows of the bM_Matrix is the solution for $r^{(0)}$ noted above, which will be referred to as r_Vector here. The last column of the rest of the rows is $e^{(0)}$ noted above, which will be referred to as e_Vector here. Letting d be the number of 1's in e_Vector, d is the number of different bits, $d^{(0)}$, described above. If d=0, it means there are no error bits. The process is stopped, and r_Vector is output as the as the solution of r. If d>0, however, then there are error bits, and the process is continued.

In bM_Copy, the same row switching is done as in bM_Matrix, but no XOR operation is performed. The first n rows and n columns of bM_Copy is $M^{(0)}$ (transposed) as described above, which will be referred to as M_Matrix here. The rest of the rows and the first n columns of bM_Copy is the $\bar{M}^{(0)}$ (transposed) described above, which will be referred to as MB_Matrix here. From M_Matrix and MB_Matrix, MR_Matrix is obtained, which is $[M^{(0)}]^{-1}$ (transposed), and P_Matrix, which is $P^{(0)}$ described above:

$$MR\_Matrix = M\_Matrix^{-1}$$

$$P\_Matrix = MB\_Matrix \cdot MR\_Matrix$$

Because there may be error bits in b, it can be assumed that each of the n bits selected for solving r may be wrong, and its value "flipped" (i.e., the value changed from 0 to 1 or from 1 to 0) to solve for r again. If the new r results in a smaller d, the new r is a better solution for r, and $d_{min}$ is initialized as d.

For every flipped bit, to calculate the new d, it is not necessary to repeat the process of Gaussian elimination. As previously discussed, $d^{(1)}$=HammingWeight($[e^{(0)}]^t+E_JP^{(0)}$)+J, therefore if $[e^{(0)}]^t+E_JP^{(0)}$ can be obtained, then a new d is obtained.

Figure 72:
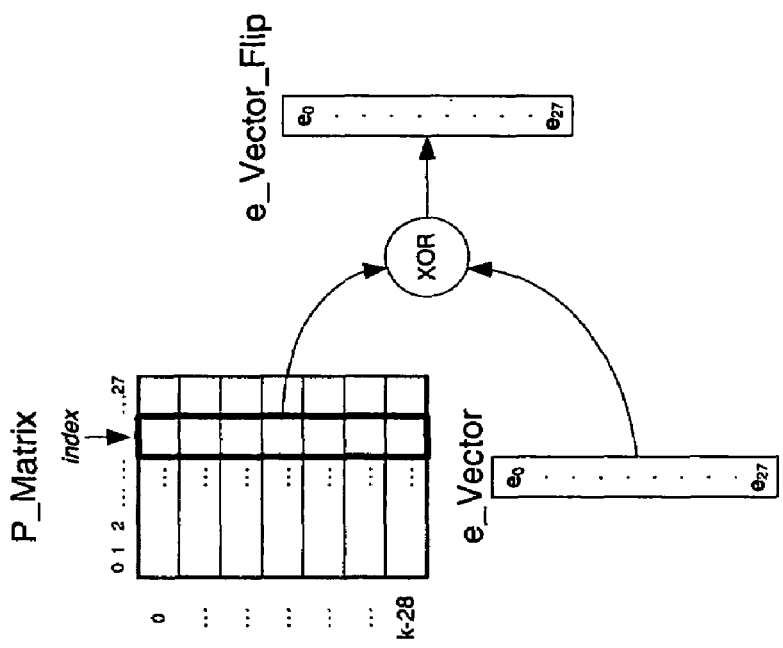

Accordingly, each of the n bits selected is flipped. For every column of P_Matrix, the column, the XOR operating is performed with e_Vector. The result is e_Vector_Flip. As illustrated in FIG. 72, e_Vector_Flip=$[e^{(0)}]^t+E_JP^{(0)}$, where J=1.

Figure 73:
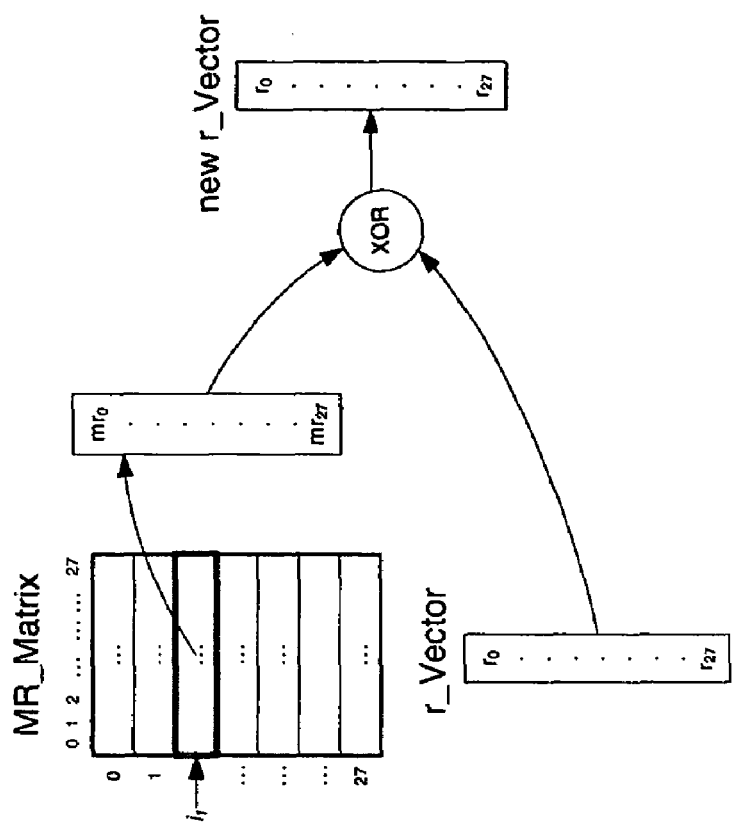

Letting d=HammingWeight(e_Vector_Flip)+1, where d is the new count of different bits. If d<$d_{min}$, then let $d_{min}$=d, and $i_1$=index of the corresponding column in P_Matrix. This process continues until all columns in P_Matrix have been processed. If $d_{min}$=1, the process is stopped, as the error bit has been located. As discussed in detail above, $[r^{(1)}]^t=[r^{(0)}]^t+E_J[M^{(0)}]^{-1}$, where J=1. Therefore, the new r_Vector is calculated by performing the XOR operation on the $i_1$-th row of MR_Matrix and the original r_Vector (the one from Gaussian elimination), as shown in FIG. 73.

Figure 74:
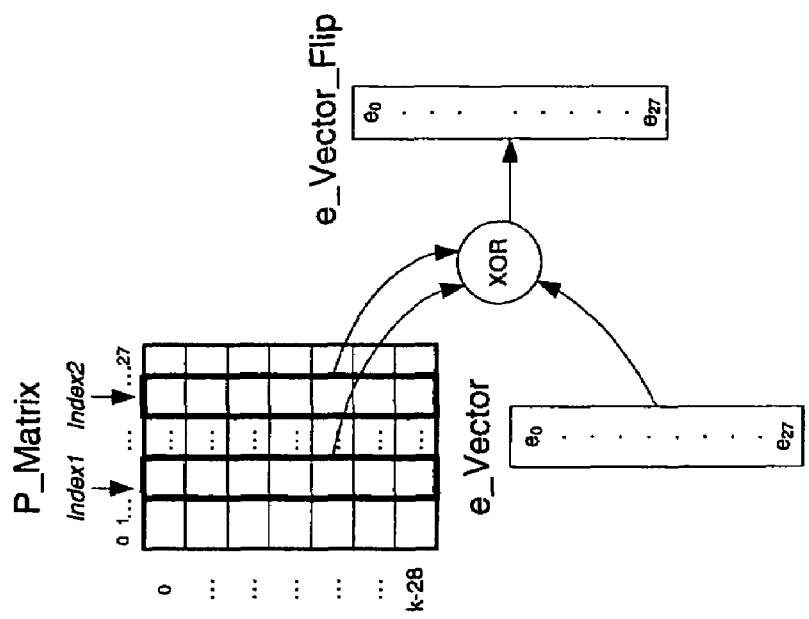

If $d_{min}\neq 1$, it means that there are more than 1 error bits. Accordingly, two of the n selected bits are flipped to determine if a smaller d can be obtained. For every pair of columns of P_Matrix, the two columns are obtained and the XOR operation is performed with e_Vector. As shown in FIG. 74, the result is e_Vector_Flip. Letting d=HammingWeight (e_Vector_Flip)+2, d is the new count of different bits. If d<$d_{min}$, then $d_{min}$=d, and $i_1$=index of the first corresponding column, and $i_2$=index of the second corresponding column in P_Matrix. This process continues for all pairs of columns in P_Matrix.

Figure 75:
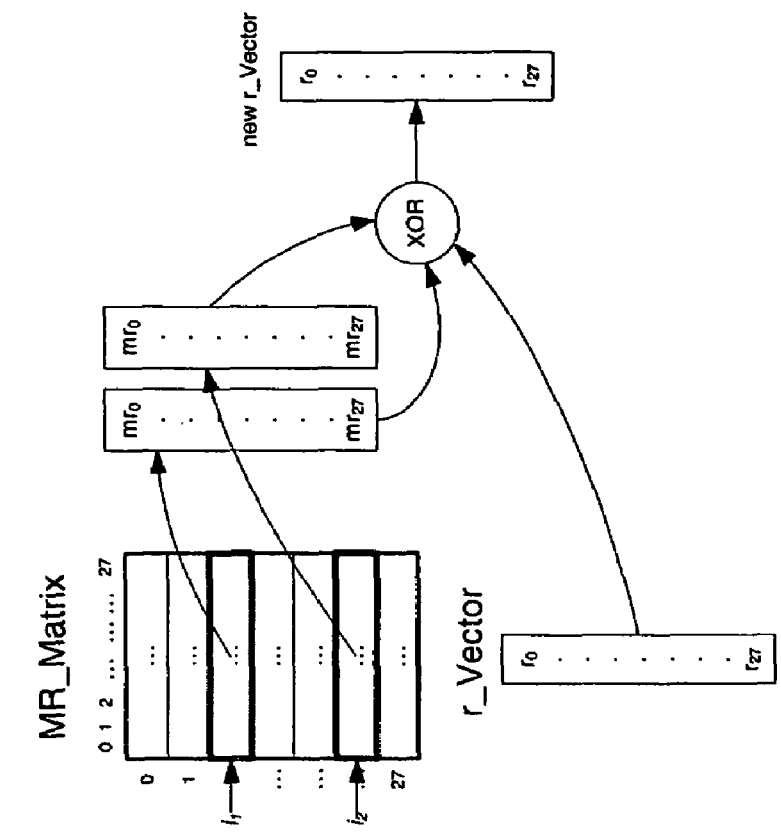

If $d_{min}$=2, then the process is stopped, as it indicates that the two error bits have been identified. As discussed above, $[r^{(1)}]^t=[r^{(0)}]^t+E_J[M^{(0)}]^{-1}$, where J=2. Therefore, the new r_Vector is calculated by performing the XOR operation on the $i_1$-th and $i_2$-th row of MR_Matrix and the original r_Vector (the one from Gaussian elimination). As shown in FIG. 75, the new r_Vector is output as the solution of r. If $d_{min}\neq 2$, the process continues to the next step.

Thus, if $d_{min}$ is the d obtained with no bit flipping, the original r_Vector (the one from Gaussian elimination) is output as the solution to r. If $d_{min}$ is the d obtained with one bit flipping, the new r_Vector is calculated by performing the XOR operation on the $i_1$-th row of MR_Matrix and the original r_Vector. The new r_Vector is output as the solution to r. If $d_{min}$ is the d obtained with two bit flipping, the new r_Vector by is calculated by performing the XOR operating with the $i_1$-th and $i_2$-th row of MR_Matrix and the original r_Vector. The new r_Vector is output as the solution to r. Thus, the output of the stochastic decoding process is the location vector r.

Calculation of L by Discrete Logarithm

Given location vector r, the discrete logarithm determination module 6809 can obtain L (referred to as the bit "s" above in paragraphs 42 and 43) by a discrete logarithm determination technique. L is the location of the first element in the Extracted_Bits_Array of the m-sequence, and L∈{0, 1, . . . , $2^n$-2}, where n is the order of the m-sequence. r can be viewed as an element of the finite field $F_{2^n}$. It can be proven that:

$$r = \alpha^L$$

where $\alpha$ is a primitive element of the finite field $F_{2^n}$ and is known from the division of polynomials that generates the m-sequence. Therefore, given r, L can be solved from the above equation.

Letting n be the order of the m-sequence, m be the period of the m-sequence, i.e. m=$2^n$-1, $m_i$ be the prime factors of m=$2^n$-1, and w be the number of $m_i$'s. For each $m_i$, $v_i$ is chosen such that $$\mod\left(\frac{m}{m_i} \cdot v_i, m_i\right) \equiv 1,$$

where i=1, . . . , w.

In the illustrated implementation, n=28, so $\alpha$=(1,0,0,1,0,0, 0,0,0,0,0,0,0,0,0,0,0,0,0,0,0,0,0,0,0,0,0,1)$^t$ (correspondingly, the primitive polynomial in division $$\frac{1}{P_n(x)}$$

that generates the m-sequence is $P_n(x)=1+x^3+x^{28}$), m=$2^{28}$-1. There are 6 prime factors of m, i.e., w=6, and the prime factors are: 3, 43, 127, 5, 29, 113. Correspondingly, $v_i$ are: 2, 25, 32, 1, 1, 30. All these are stored in constant tables.

For each $m_i$, q∈{0, 1, 2 . . . , $m_i$-1} is found such that $$(\alpha^{\frac{m}{m_i}})^q = r^{\frac{m}{m_i}}.$$

Note that again, these are multiplications over the finite field $F_{2^n}$. Letting $p_i = q$, then, $$L = \mod\left(\sum_{i=1}^{w}\left(p_i \cdot \frac{m}{m_i} \cdot v_i\right), m\right)$$

Localization in the M-Array

Based on the method used in generating the m-array from the m-sequence, the position of the first element in Extracted_Bits_Array in m-array can be obtained:

$x = \mod(L, m_1)$ $y = \mod(L, m_2)$ where $m_1$ is the width of the m-array, and $m_2$ is the height of the m-array. When the order of the m-sequence is $$n, m_1 = 2^{\frac{n}{2}} + 1, \text{ and } m_2 = 2^{\frac{n}{2}} - 1.$$

For each dimension, the decoding process described above outputs position (x,y). Letting $(x_p, y_p)$ be the output of the dimension representing the X, Y position in Cartesian coordinates, as illustrated above, $(x_p, y_p)$ are the coordinates of point $C_{X',Y'}$ in the symbol pattern array.

Solving Multiple Dimensions of m-Arrays Simultaneously

As discussed in detail above, a document may have multiple (e.g., 8) dimensions of m-arrays. Supposing that the dimensions are $b_i$, $i=1,2,\ldots,C$, and the metadata are encoded by the relative shift $d_j$ between $b_j$ and $b_1$, where $b_1$ is the position dimension and $j=2,3,\ldots,C$. The metadata are the same no matter where the image is obtained. Therefore, the metadata can be extracted sometime before the error-correcting decoding starts. When $d_j$, $j=2,3,\ldots,C$, are known, $b_i$, $i=1,2,\ldots,C$, can be jointly used for the decoding of position. The process is as follows.

Supposing $b_i^t = [r_{b_i}]^t M_{b_i}$, $i=1,2,\ldots,C$, then the relationship between $r_{b_j}$ and $r_{b_1}$ is $[r_{b_j}]^t = [r_{b_1}]^t Q_{-d_j}$, where $Q_{-d_j} = \hat{M}_{0\sim(n-1)} A_{d_j} [\hat{M}_{0\sim(n-1)}]^{-1}$, $\hat{M}_{0\sim(n-1)}$ are the sub-matrices of $\hat{M}$, consisting of the first n columns of $\hat{M}$, and $A_{d_j} = (a_{d_j}, a_{d_j+1} \ldots a_{d_j+n-1})$, where $a_{d_j+k}$ is the coefficients when $\alpha^{d_j+k}$ is expressed as the linear combination of $1, \alpha, \ldots, \alpha^{n-1}$, where at is $\alpha$ primitive element of $F_{2^n}$ and the root of $x^n P_n(x^{-1})$. Therefore the location of vector $r_{b_1}$ may be solved via:

$(b_1^t b_2^t \ldots b_C^t) = [r_{b_1}]^t (M_{b_1} M_{b_2} \ldots M_{b_C})$,

The procedure to solve this equation is the same as solving $b_i^t = [r_{b_i}]^t M_{b_i}$, $i=1,2,\ldots,C$, separately. However, solving them jointly is more efficient in two ways. First, the speed can be nearly C times faster because only one linear system is solved instead (but with some overhead to compute $Q_{-d_j}$ and more XOR operations to solve a larger system). Second, the probability of obtaining the correct solution is also greatly increased, especially when none of the dimensions has enough bits for computing the solution.

The goal of EIC decoding is to obtain position of the extracted bits in m-array.

For each dimension, EIC decoding may include one or more of the following:

a. Coefficient matrix M preparation: to obtain location of extracted bits in m-sequence, location vector r is calculated such that $b^t = r^t M$, where b is the vector of extracted bits, and M is the coefficient matrix. This step prepares b and the corresponding M.

b. Stochastic decoder: given b and M, location vector r is solved by Gaussian elimination. Since there might be error bits in extracted bits, the decoder uses a stochastic process to choose from the extracted bits to solve for r.

c. Calculation of L by discrete logarithm: once r is solved, location of the extracted bits in m-sequence, L, can be obtained by discrete logarithm.

d. Localization in m-array: location in m-sequence is converted to position in m-array. Conversion is based on how m-array is generated from m-sequence.

Figure 76A:
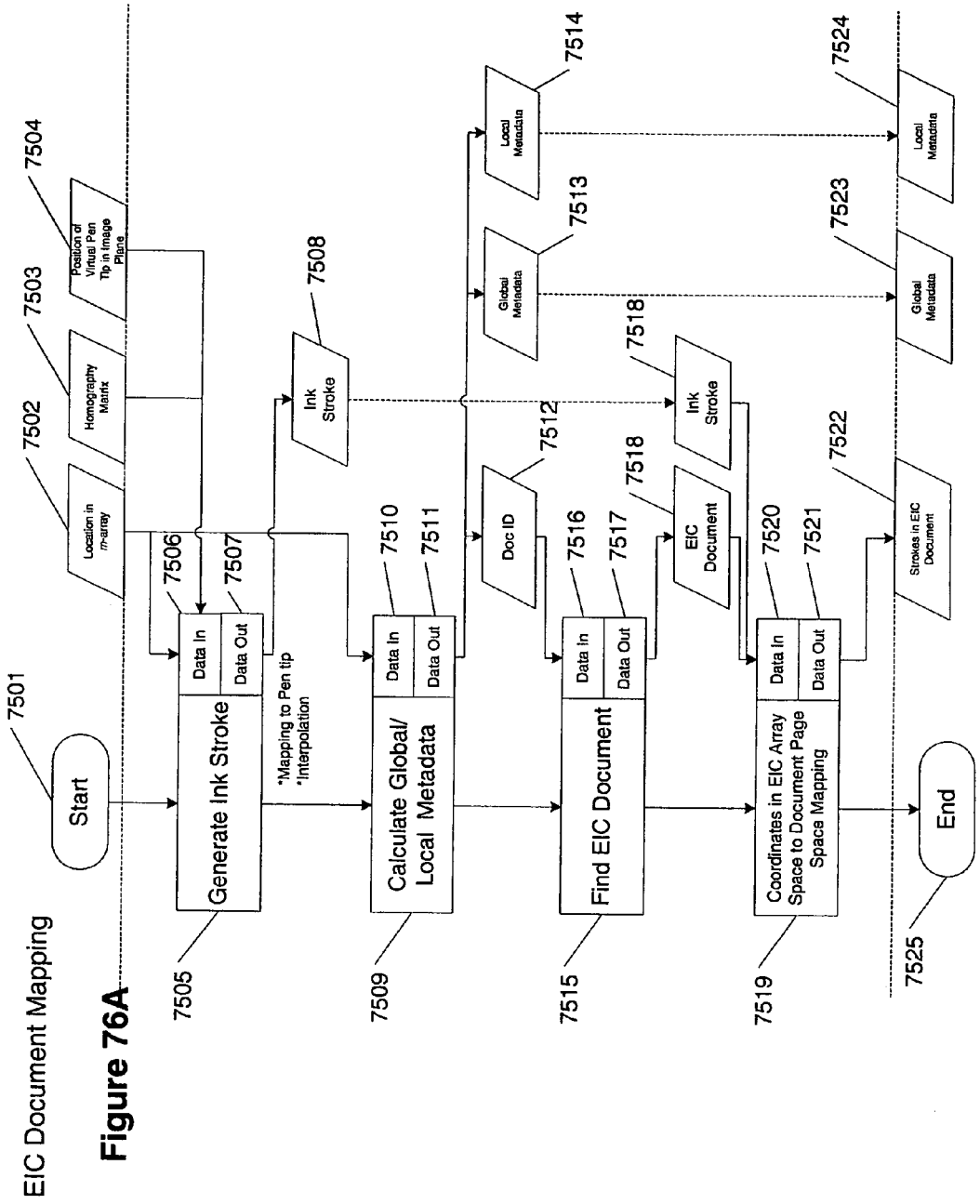
FIGS. 76A and 76B show illustrative examples of processes determining stroke location and information in a document in accordance with aspects of the present invention.

After all the images of a stroke are processed, EIC document mapping starts. FIG. 76A illustrates the workflow of EIC document mapping.

Document Mapping

FIG. 76A shows document mapping where a stroke is mapped to a document. Here, the process starts 7501 with a location in m-array 7502, a homography matrix 7503, and a position of a virtual pen tip in an image plane 7504.

An ink stroke is generated in step 7505 using the above information, and outputting ink stroke 7508. The location in the m-array 7502 is also used to calculate global/local metadata. The output includes a document id 7512, global meta data 7513 and local meta data 7514.

The document ID 7512 may then be used in step 7515 to find an EIC document. The EIC document 7518 is made available and combined with ink stroke 7518 in step 7519 to provide a mapping of the coordinates in the EIC array space to the document page space, which results in the strokes being located within the document 7522. Global meta data 7513 and local meta data 7514 may be also made available.

It is appreciated that the strokes may be added into the document. Alternatively, the strokes may be associated with the document but added to another document (for instance filling out a form) where the strokes may be maintained separately from the first document (here the form).

The following describes how global meta data and local meta data may be encoded into and obtained from a document. Global meta data may or may not include a document ID. Local meta data may include specific information of a location where the ink stroke is located (for example, a field in a form—a telephone number field or a social security number field among other fields). Other information may be encoded as meta data (global or local or both) as well.

Figure 76B:
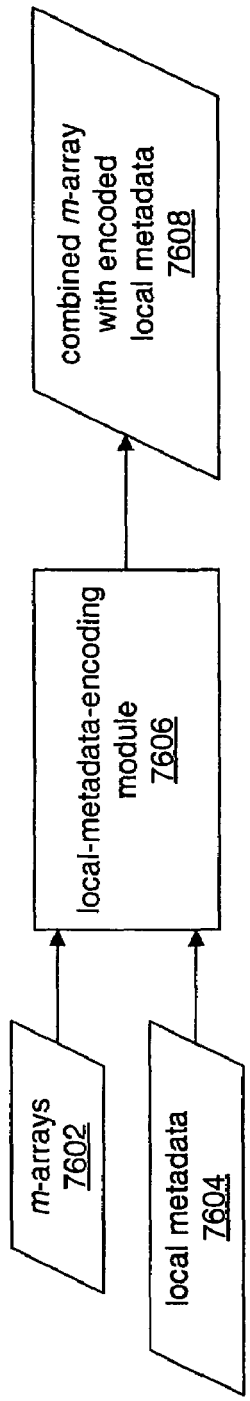

FIG. 76B shows a flow diagram of a system for encoding local metadata in accordance with embodiments of the invention. One or more m-arrays, as depicted by m-arrays 7602 and local metadata 7604, are input to a local-metadata-encoding module 7606, which outputs a combined array with encoded local metadata 7608. The one or more input m-arrays may be m-arrays such as position m-array 9302 and local metadata m-array 9304, which are both depicted in FIG. 93.

Figure 78:
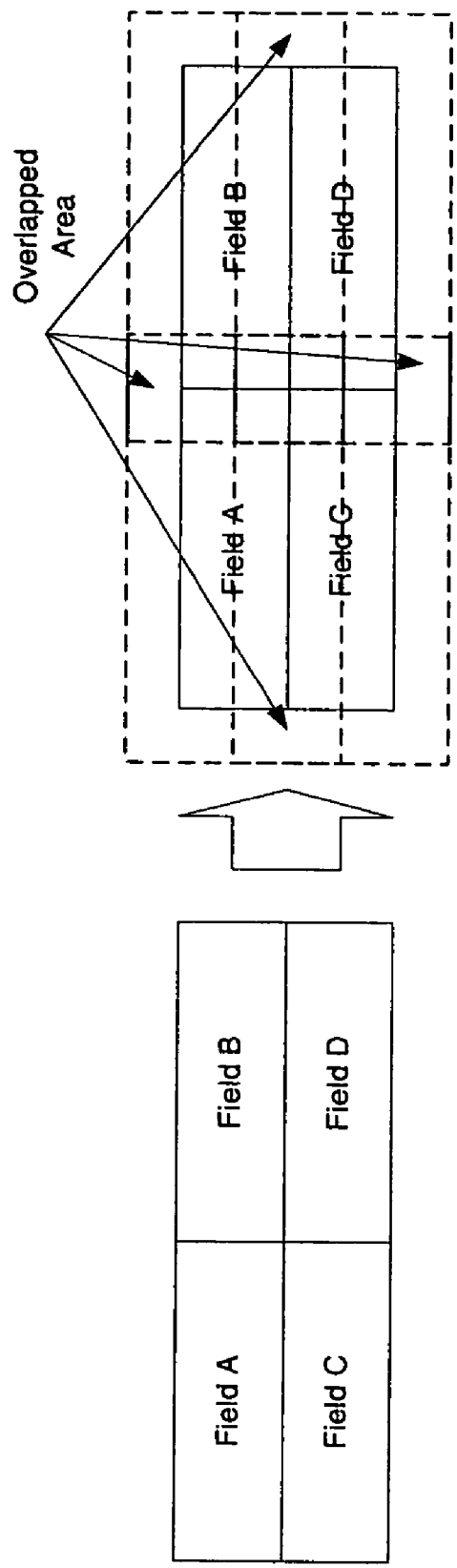

FIG. 77 shows one approach to allow for easy reading of meta data using a enlarged region around local metadata to prevent interference of metadata. FIG. 78 shows overlapping regions of metadata. FIG. 79 shows four fields being mapped with an enlarged region around each.

In accordance with embodiments of the invention, regardless of whether a region is embedded with local metadata, the regions may be encoded using a combined m-array, where the local-metadata m-array may be the same as the m-array that represents X, Y position information, and the metadata m-array may be shifted according to the value of the metadata. If a region is not embedded with local metadata, 0 may be chosen as the value of its local metadata, i.e., the metadata m-array is not shifted. Therefore, 0 is not used as the value of local metadata in regions that are selected to embed local metadata.

Figure 93:
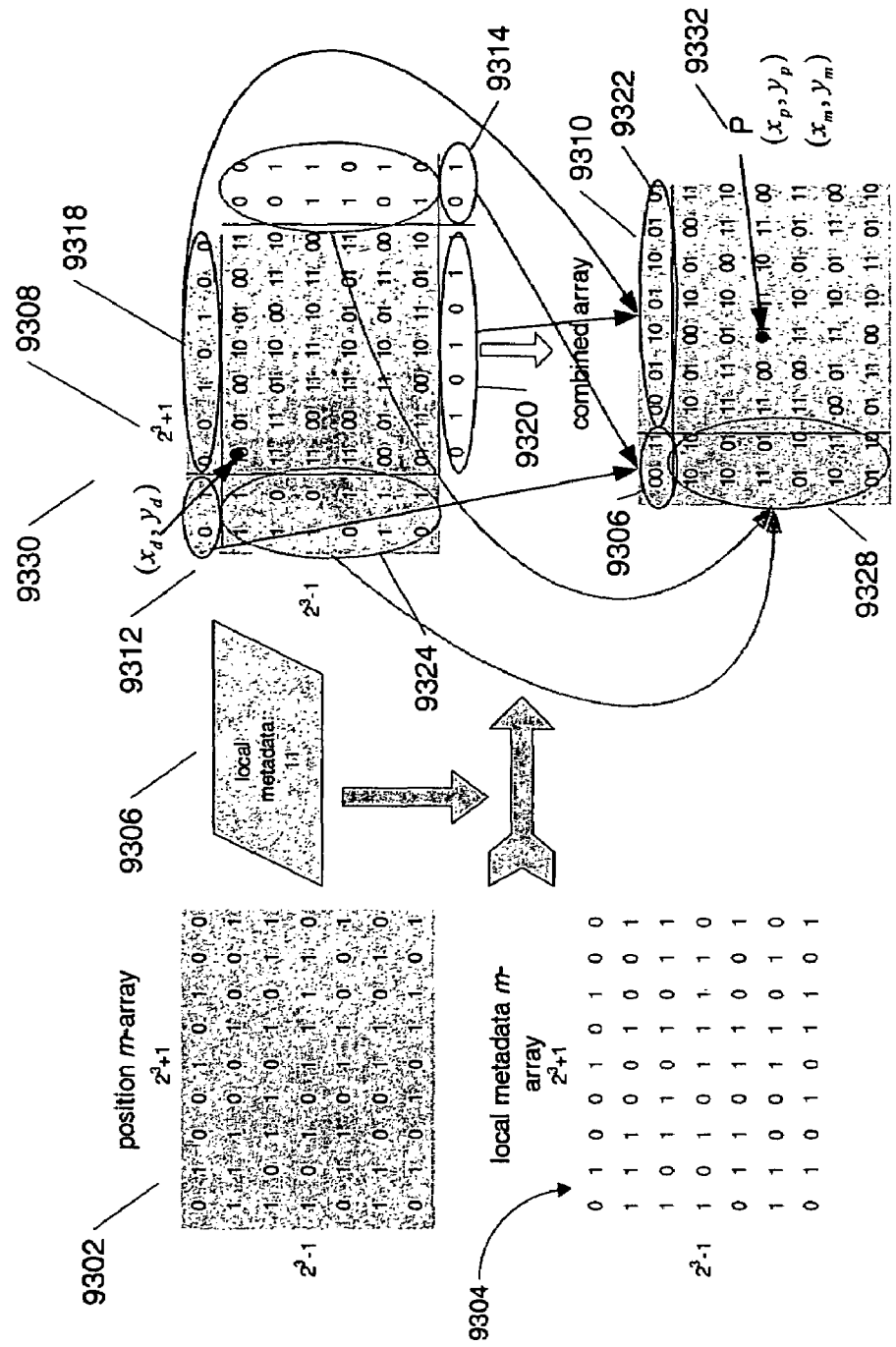
FIG. 93 shows a local-metadata-encoding example in accordance with embodiments of the invention.

FIG. 93 shows a local-metadata-encoding example in accordance with embodiments of the invention. Two identical m-arrays, a position m-array 9302 and a local metadata m-array 9304, are shown on the left side of FIG. 93. Both m-arrays are order 6 m-arrays. Therefore, the width of each m-array is $2^3+1$, and the height of each m-array is $2^3-1$. The position m-array and the local metadata m-array may contain repeating bit sequences that are the same length but that have different bit sequences than each other. Stated differently, different primitive polynomials of order n may be used to generate different m-arrays containing different repeating bit sequences.

Figure 90:
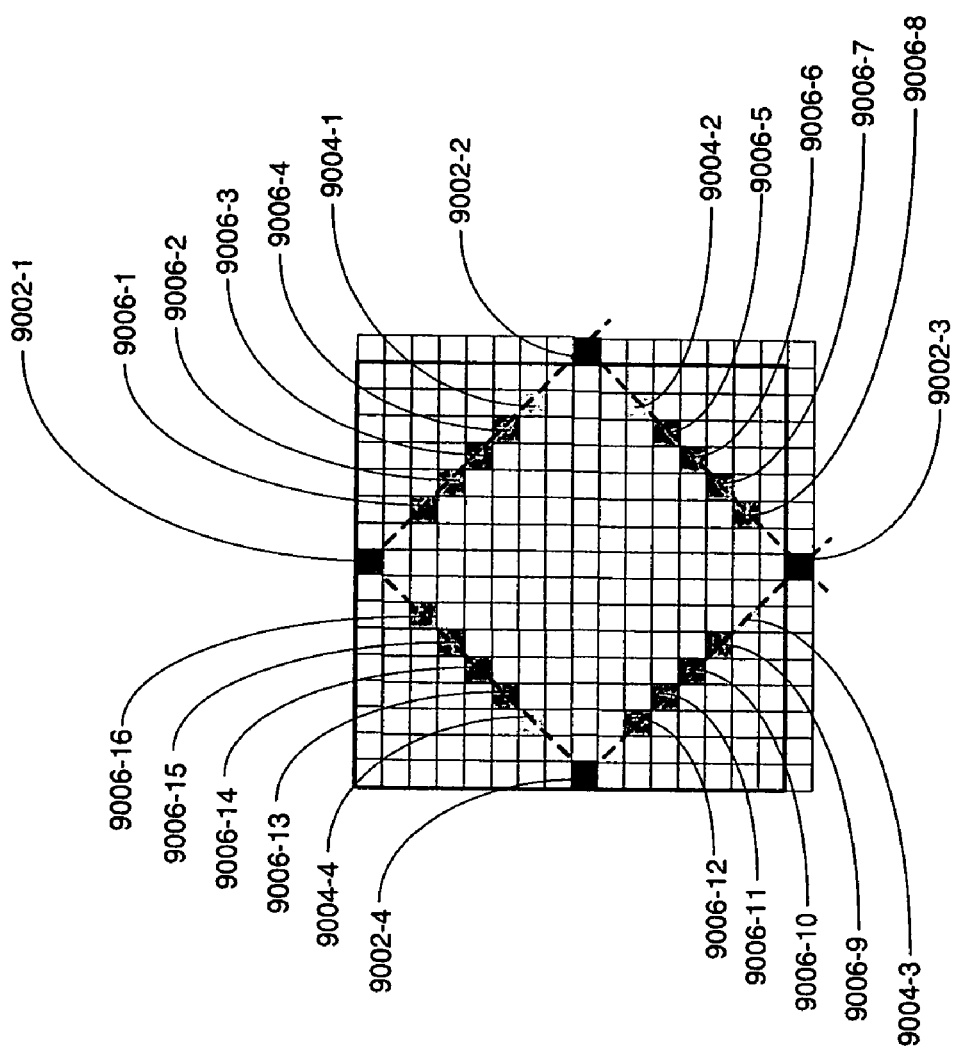
FIG. 90 shows an example embedded interaction code (EIC) symbol in accordance with embodiments of the invention.

The two m-arrays may be combined, in accordance with embodiments of the invention, to encode two bits in one EIC symbol. An example of an EIC symbol is depicted in FIG. 90. The EIC symbol in FIG. 90 occupies all of the rows and columns of grid spaces shown in FIG. 90 except for the bottom row and the right-most column. That row and that column belong to adjacent EIC symbols. Accordingly, while black dots 9002-1 and 9002-4 belong to the EIC symbol shown in FIG. 90, black dots 9002-2 and 9002-3 are not part of that EIC symbol. Data dots 9006-1 through 9006-16 may be black or white for representing bits of information. Orientation dots 9004-1 through 9004-4 are always white to facilitate properly orienting camera-captured EIC-symbol images.

When the position m-array 9302 and the local metadata m-array 9304 are combined, based on the value of the local metadata (e.g., 11), the start of the local metadata m-array 9304 is shifted to position $(x_d,y_d)$, as depicted at 9330 in FIG. 93, of the position m-array 9302. The x,y coordinates may be calculated as follows:

1. $x_d = \mathrm{mod}(\text{local } \textit{metadata}, 2^{\frac{n}{2}} + 1)$,

2. $y_d = \mathrm{int}\left(\dfrac{\text{local } \textit{metadata}}{2^{\frac{n}{2}} + 1}\right)$, where n is the order of the m-array and $0 \leq \text{local } \textit{metadata} \leq 2^n - 2$.

In FIG. 93, the value of the local metadata 9306 being encoded is 11 and the order of the m-arrays is 6 (i.e., n=6). Therefore, 3. $x_d = \mathrm{mod}\left(11, 2^{\frac{6}{2}} + 1\right) = 2$, 4. $y_d = \mathrm{int}\left(\dfrac{11}{2^{\frac{6}{2}} + 1}\right) = 1$.

As shown in the partially combined m-array 9308, the local metadata m-array 9304 starts at position (2,1) of the position m-array 9302. Since the position m-array 9302 and the local metadata m-array 9304 repeat themselves, a combined m-array with encoded local metadata 9310, which is shown in the lower right corner of FIG. 93, may be generated. As a result of starting the local metadata m-array 9304 at (2,1), portions 9320, 9314, and 9326 of the local metadata m-array 9304 are left over after combining the overlapping rows and columns of the position m-array 9302 and the local metadata m-array 9304. Portion 9326 of the local metadata m-array 9304 and portion 9324 of the position m-array 9302 are combined in the combined array 9310, as depicted at 9328. Similarly, portion 9314 of the local metadata m-array 9304 and portion 9312 of the position m-array 9302 are combined in the combined array 9310 as depicted at 9316. And portion 9320 of the local metadata m-array 9304 and portion 9318 of the position m-array 9302 are combined in the combined array 9310 as depicted at 9322.

The value of the metadata is the distance in the combined array between the position m-array 9302 and the local metadata m-array 9304. The distance is kept the same in every pair of bits in the combined array 9310. Therefore, if the position of each bit in its corresponding m-array is obtained, the distance in the combined array 9310 can be determined.

Local Metadata Decoding

Figure 92:
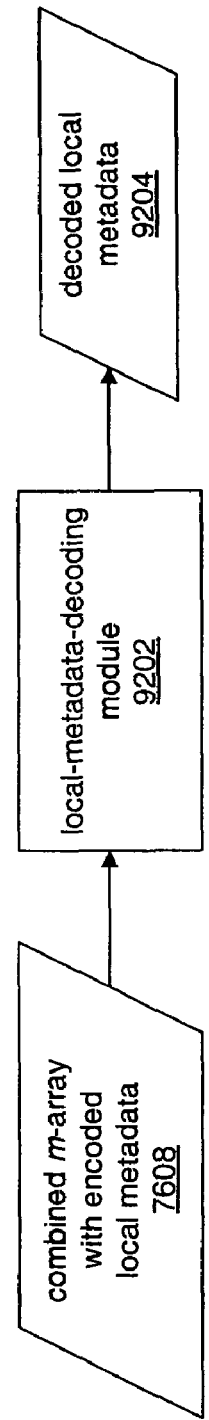
FIG. 92 shows a flow diagram of another system for decoding local metadata in accordance with embodiments of the invention.

FIG. 92 shows a flow diagram of a system for decoding local metadata in accordance with embodiments of the invention. A combined array with encoded local metadata 7608 is input to a local-metadata-decoding module 9202, which outputs decoded local metadata 9204.

To decode local metadata, the m-arrays that have been combined to form the combined array 1008 are each separately decoded. For example, referring to the example shown in FIG. 93, the position m-array 9302 and the local metadata m-array 9304 are separately decoded. Then, for a particular point P 9332, two positions are obtained: $(x_p,y_p)$, the position of the point in the position m-array 9302, and $(x_m,y_m)$, the position of the point in the local metadata m-array 9304.

The value of the local metadata may then be calculated as follows:

5. $\text{local } \textit{metadata} = \mathrm{mod}(y_p - y_m, 2^{\frac{n}{2}} - 1) \cdot (2^{\frac{n}{2}} + 1) + \mathrm{mod}(x_p - x_m, 2^{\frac{n}{2}} + 1)$, where n is the order of the combined m-array 7608.

In the example shown in FIG. 93, the position of P in the first m-array is (4,3). The position of P in the second m-array is (2,2). Therefore, the value of metadata is:

local metadata=mod(3−2,2³−1)·(2³+1)+mod(4−2,2³+1)=11.  6.

Metadata Solutions

In accordance with embodiments of the invention, local metadata may be embedded via multiple independent channels. For example, an EIC local metadata embedding solution for resolving local metadata conflicts, in accordance with embodiments of the invention may be based on 8-bit embedded interaction code (EIC) symbol (such as EF-diamond-8 bit-a-16 and EF-diamond-8 bit-i-14). As previously described, an example of an 8-bit EIC symbol is shown in FIG. 90.

A potential metadata allocation method for an 8-dimension EIC symbol is 1:6:1 (1:1:1:1:1:1:1:1)—one share is used for position, six shares are used for global metadata and one share is used for local metadata. And each of 8 shares constructs a physical data channel, which are each of order 28 respectively in the example (i.e., the width of each m-array used to encode each share is $2^{14}+1$, and the height of each m-array used to encode each share is $2^{14}-1$).

A metadata allocation method in accordance with embodiments of the invention allocates 8 local-metadata shares as follows: 1:5:0.5:0.5:0.5:0.5, in which 1 share of order 28 is used for position, five shares of order 28 for each whole share are used for global metadata, and four 0.5 shares (also referred to as half shares) of order 14 for each 0.5 share are used for four independent local metadata values. Due to this bit-proportion change, an m-array of order 14 may be used in each 0.5 share data channel to construct the EIC array.

FIGS. 80A-80E show a local-metadata encoding technique for avoiding local metadata conflicts in accordance with embodiments of the invention.

Figure 81:
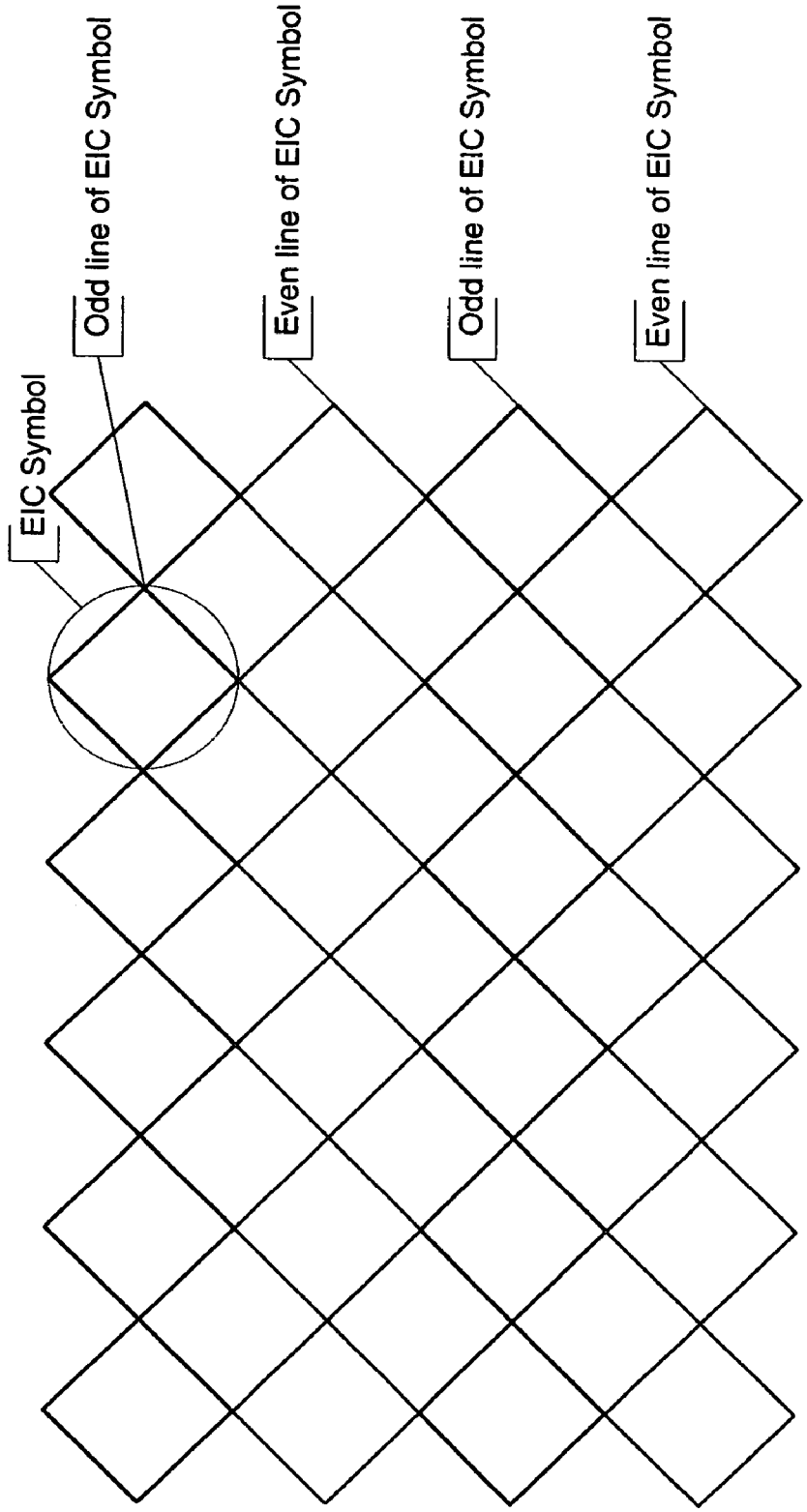

An independent local metadata channel with 0.5 shares may be implemented in accordance with embodiments of the invention as follows. FIG. 81 shows two 0.5 shares sharing one bit of an 8-bit EIC symbol, which means that odd lines of symbols are used to represent bits of one 0.5 share and even lines of symbols are used to represent the bits of the other 0.5 share. Decoding the captured image produces four independent local metadata values in accordance with embodiments of the invention.

Figure 80B:
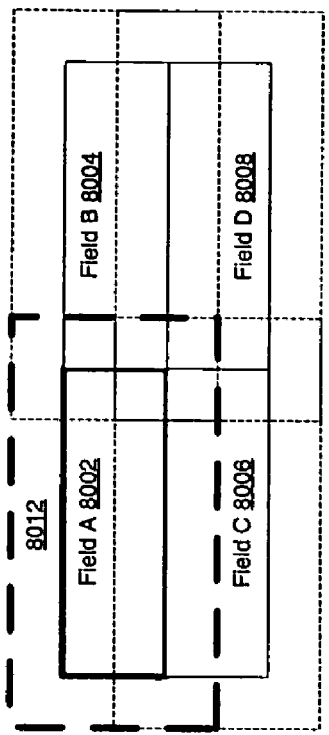
FIGS. 80A-89 show techniques for storing and decoding metadata in accordance with aspects of the present invention.
Figure 80A:
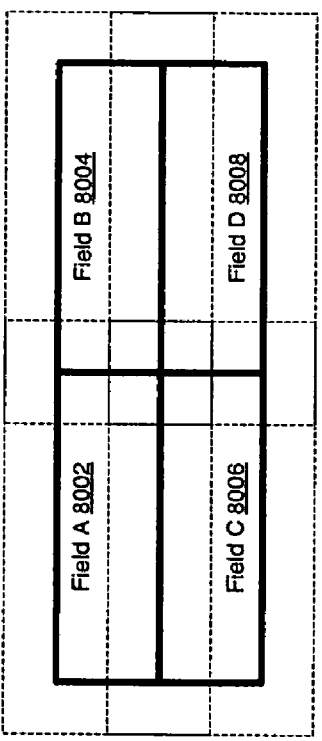
Figure 80D:
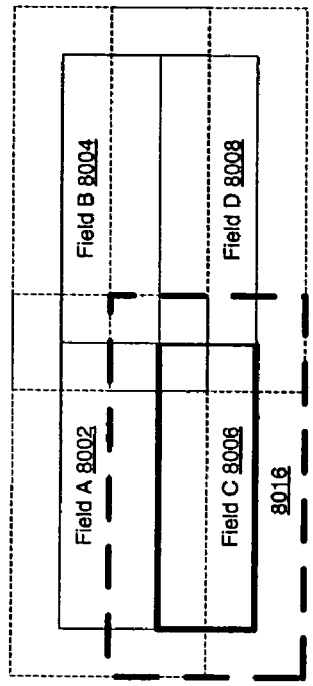
Figure 80C:
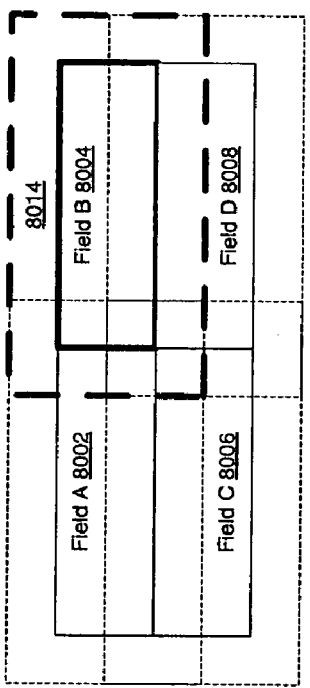
Figure 80E:
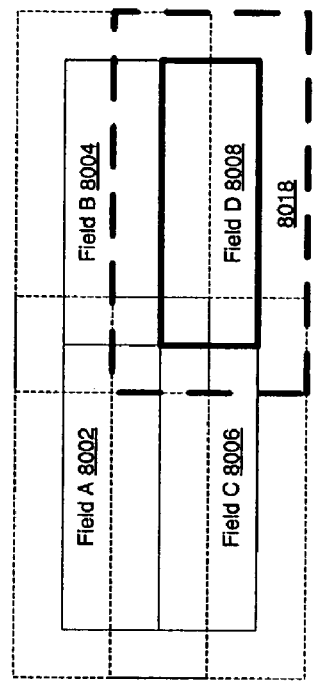

Now that four independent local metadata values are available, each of four potentially conflicting local metadata fields, namely, Field, A 8002, Field B 8004, Field C 8006, and Field D 8008, may be assigned a respective local metadata channel, as shown in FIG. 80A. The boundary lines of Fields A, B, C, and D are emphasized in FIG. 80A by being drawn with thick lines. FIGS. 80B through 80E together show potential conflict areas 8012, 8080, 8016, and 8018 associated with Fields A, B, C, and D, respectively. Field A potentially conflicts with Fields B, C, and D in the areas where Field A's potential conflict area 8012 overlaps with Field B's potential conflict area 8014, Field C's potential conflict area 8016, and Field D's potential conflict area 8018, respectively. Similarly, Field B potentially conflicts with Fields C and D in the areas where Field B's potential conflict area 8014 overlaps with Field C's potential conflict area 8016 and Field D's potential conflict area 8018, respectively. And Field C potentially conflicts with Field D in the area where Field C's potential conflict area 8016 overlaps with Field D's potential conflict area 8018.

FIG. 81 shows an example of how the bits of two 0.5 shares may share one bit of an EIC symbol for embedding local metadata in potentially conflicting regions and decoding the local metadata from such regions.

Figure 91:
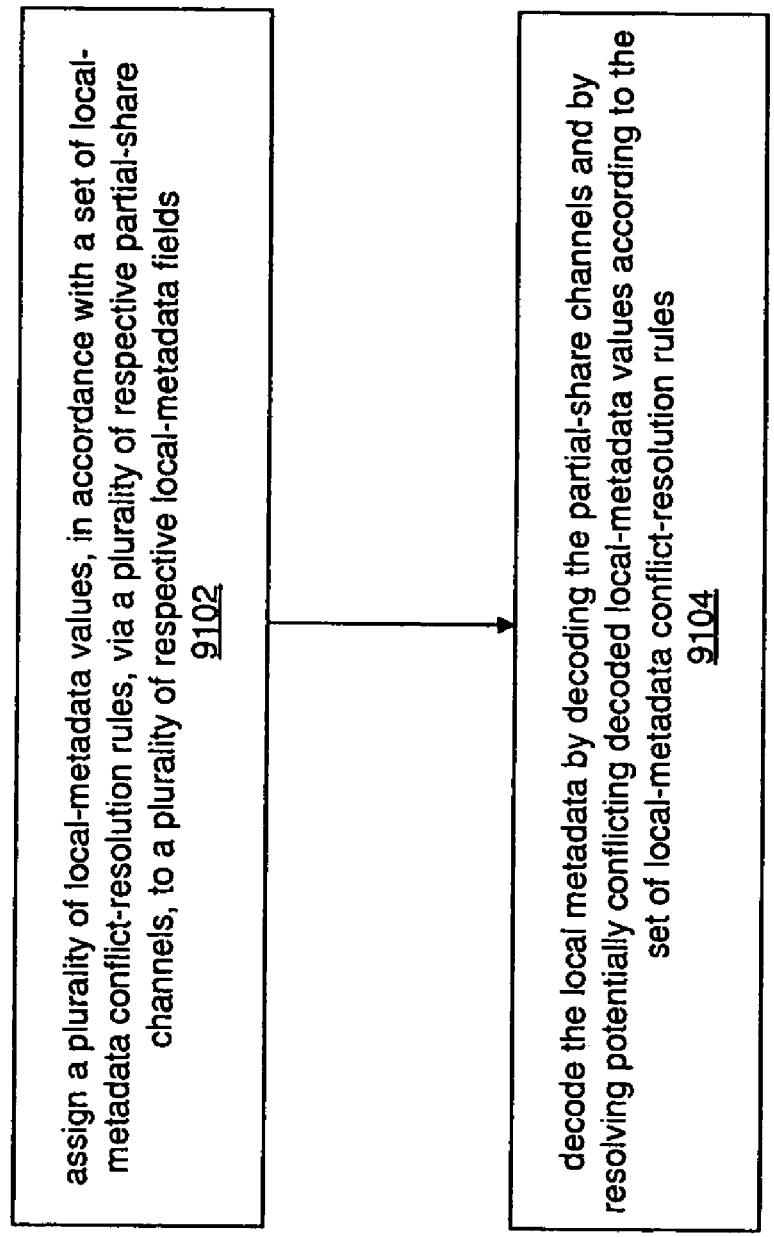
FIG. 91 shows steps in accordance with embodiments of the invention for embedding local metadata into, and extracting the local metadata from, an embedded interaction code document.

FIG. 91 shows steps in accordance with embodiments of the invention for embedding local metadata into, and extracting the local metadata from, an embedded interaction code document. A plurality of local-metadata values are assigned, in accordance with a set of local-metadata conflict-resolution rules, via a plurality of respective partial-share channels to a plurality of respective local-metadata fields, as shown at 9102. The local metadata is decoded by decoding the partial-share channels and by resolving potentially conflicting decoded local-metadata values according to the set of local-metadata conflict-resolution rules, as shown at 9104.

Various considerations and/or rules (also referred to as a set of local-metadata conflict-resolution rules) may be applied when embedding and decoding local metadata in potentially conflicting regions. For example:

Suppose that no more than 2 regions may be in conflict horizontally and that no more than 2 regions may be in conflict in vertically anywhere within a document.

When conflict regions occur, a local metadata value of a region to the left should be smaller than a local metadata value of a region to the right, and the values should not be continuous. The priority of this rule is higher than the priority of the following rule (i.e., the rules in this bullet point take precedence over the rules in the following bullet point).

When conflict regions occur, a local metadata value of an upper region should be smaller than a local metadata value of lower region, and the values should be continuous.

Figure 82:
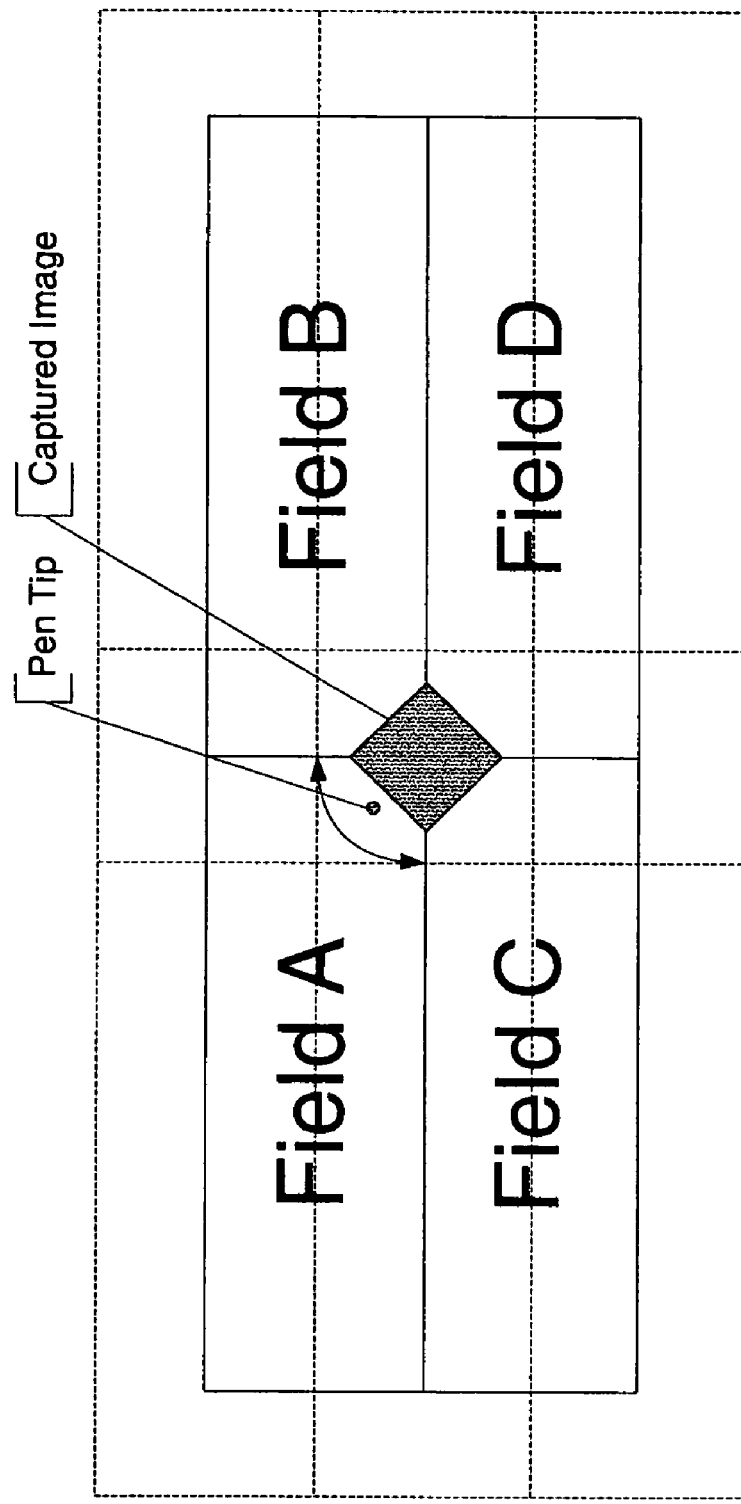
Figure 83:
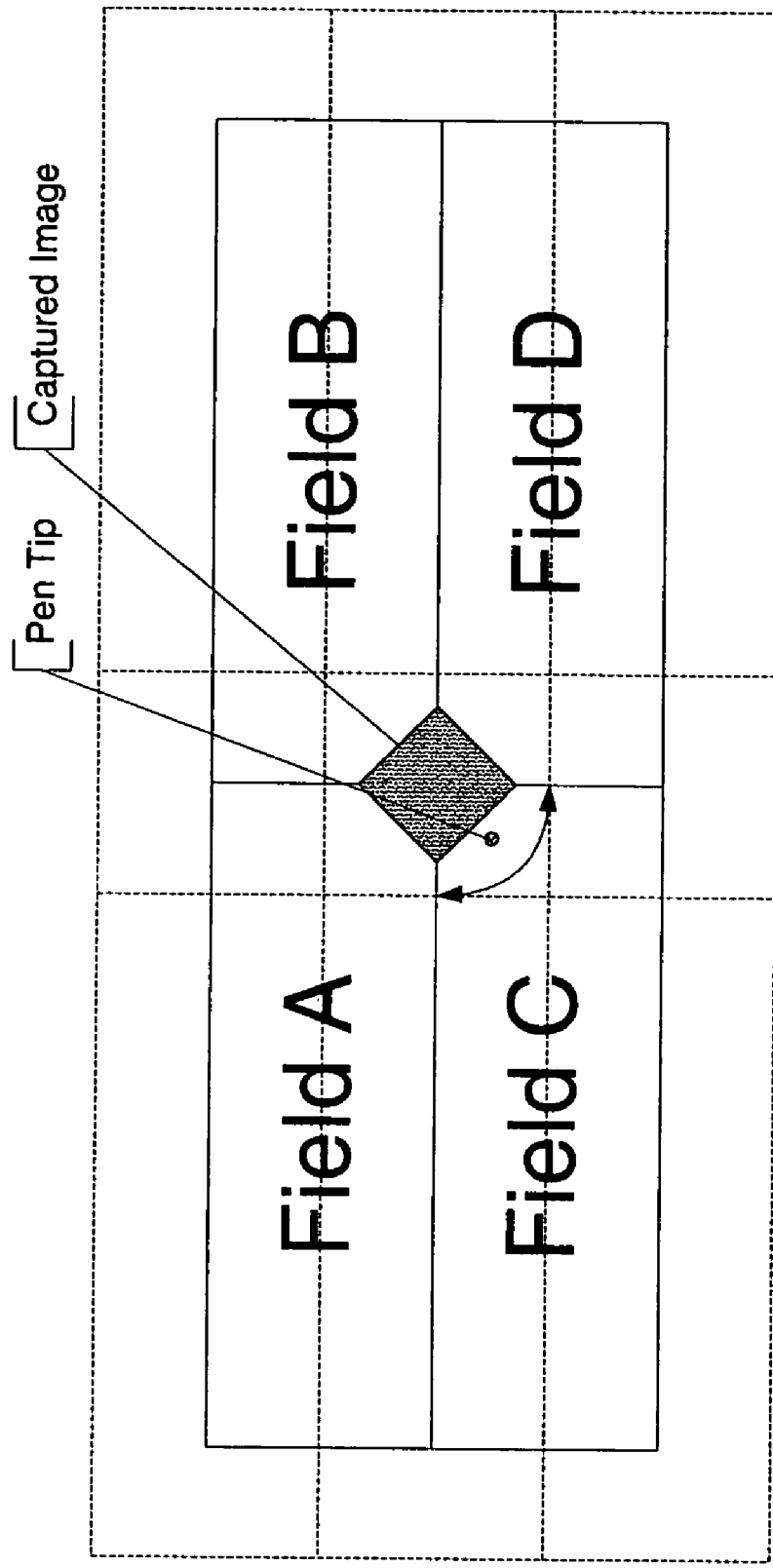
Figure 84:
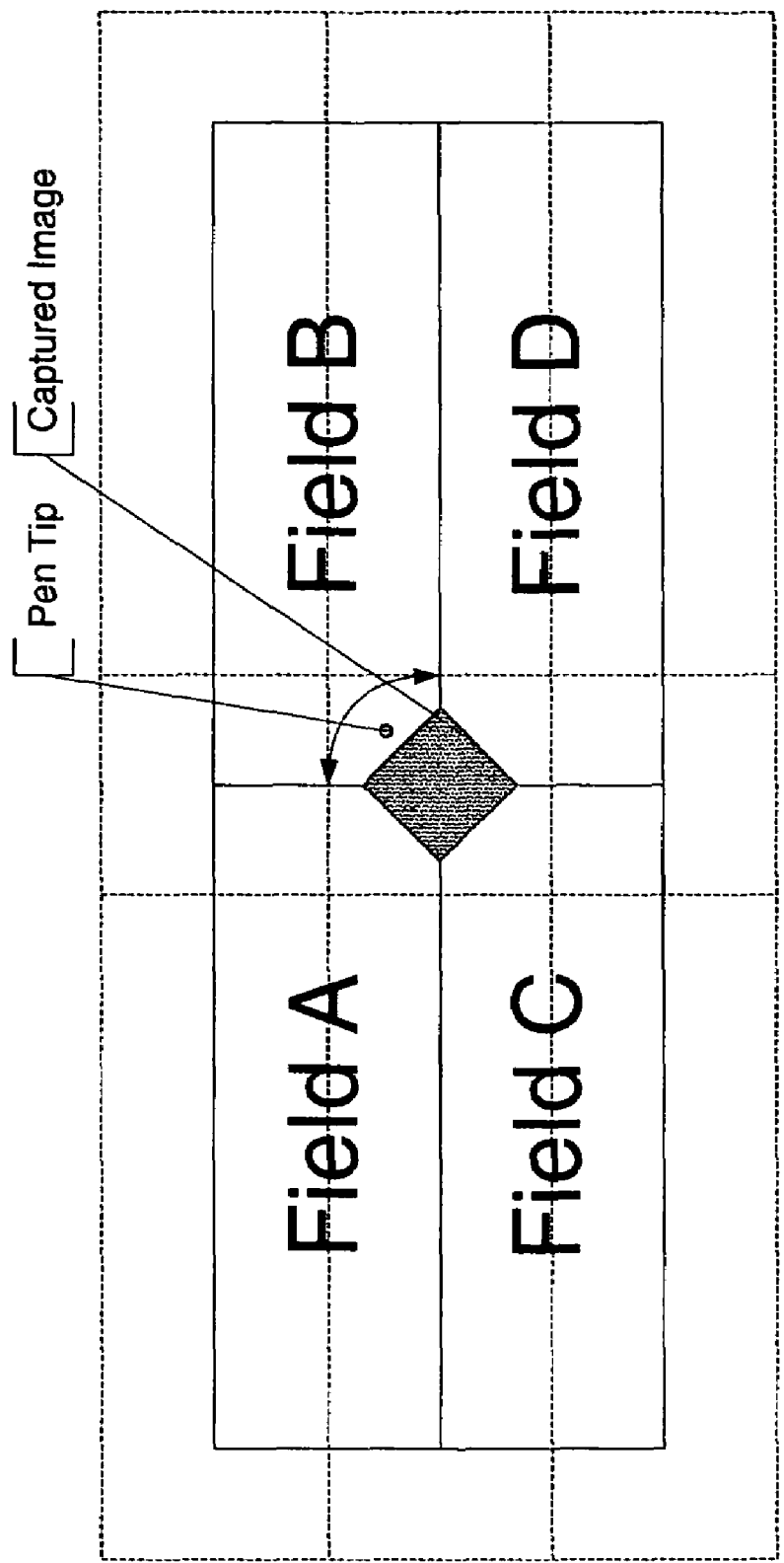
Figure 85:
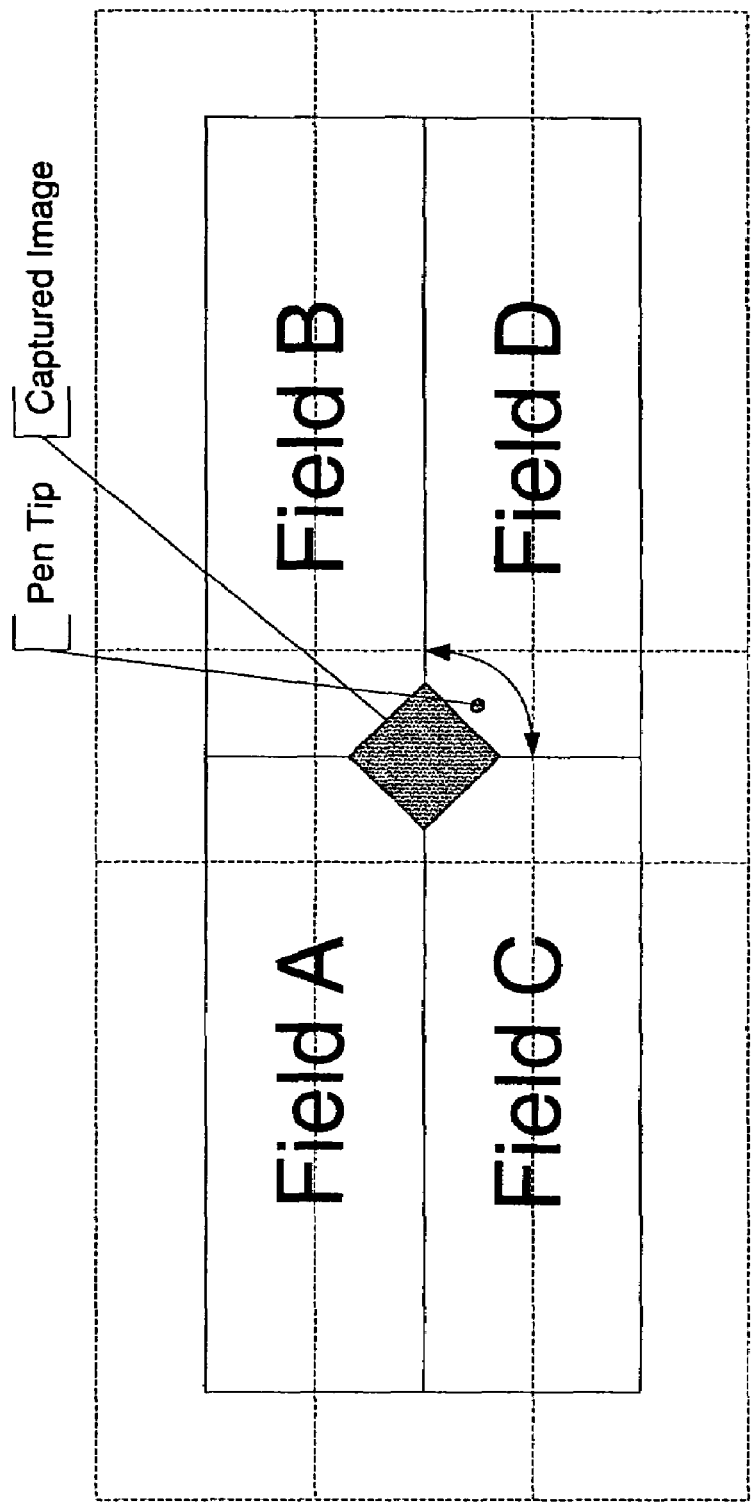

After decoding the pen-tip position and the local metadata, a local metadata conflict may occur, which means that there are multiple potential local metadata results for one captured image. Then, some considerations/rules may be applied for resolving potential conflicts regarding the local metadata decoding result. These considerations may include:

If four non-zero local metadata values are decoded at substantially the same time:
As FIG. 82 shows, if the pen-tip position is above and to the left of the center of the captured image, then the smallest decoded metadata value is the correct (also referred to as the conflict-resolved) local metadata result.
As FIG. 83 shows, if the pen-tip position is below and to the left of the center of the captured image, then the second smallest (i.e., third largest) decoded metadata value is the correct local metadata result.
As FIG. 84 shows, if the pen-tip position is above and to the right of the center of the captured image, then the second largest (i.e., third smallest) decoded metadata value is the correct local metadata result.
As FIG. 85 shows, if the pen-tip position is below and to the right of the center of the captured image, then the largest decoded metadata value is the correct local metadata result.

Figure 86:
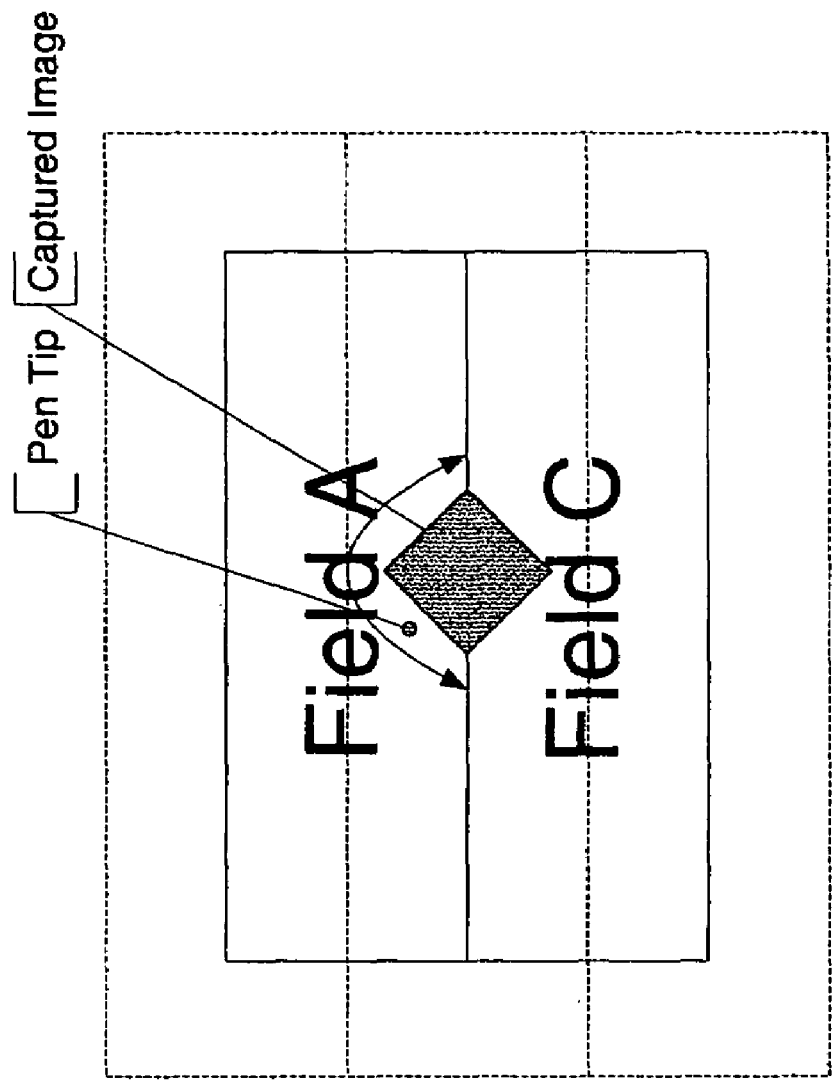
Figure 87:
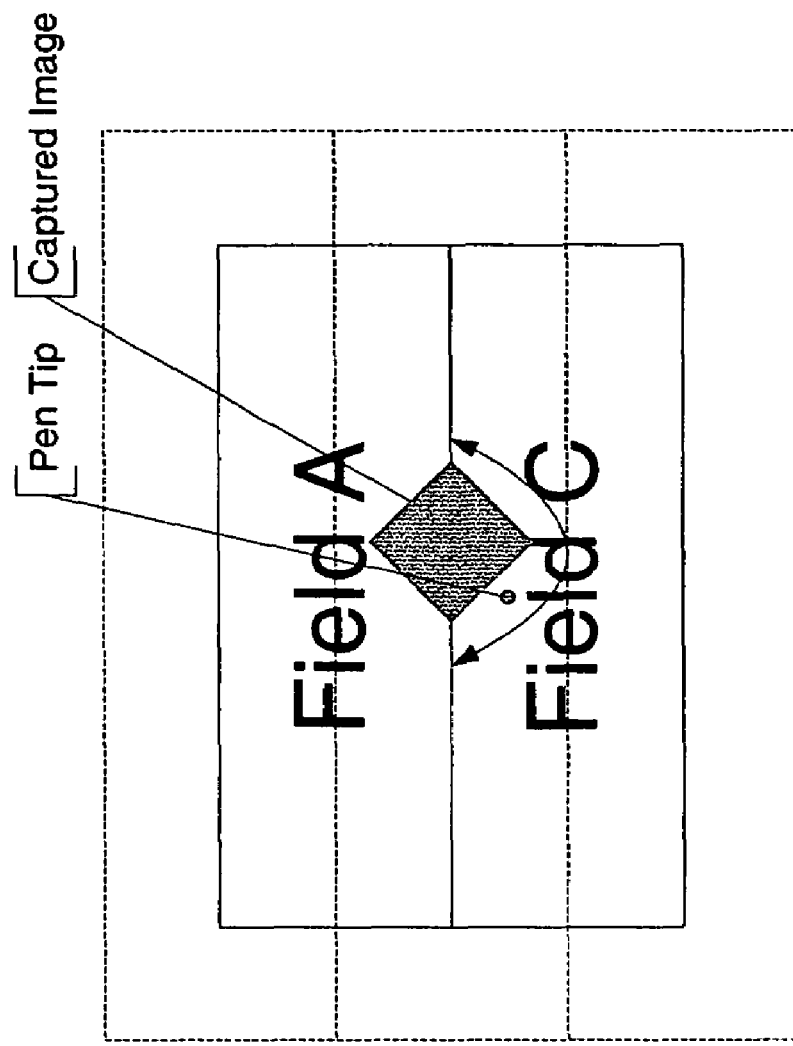

If two non-zero local metadata results with continuous values are decoded at substantially the same time:
As FIG. 86 shows, if the pen-tip position is above the center of the captured image, then the smaller decoded metadata value is the correct local metadata result.
As FIG. 87 shows, if the pen-tip position is below the center of the captured image, then the larger value is the correct local metadata result.

Figure 88:
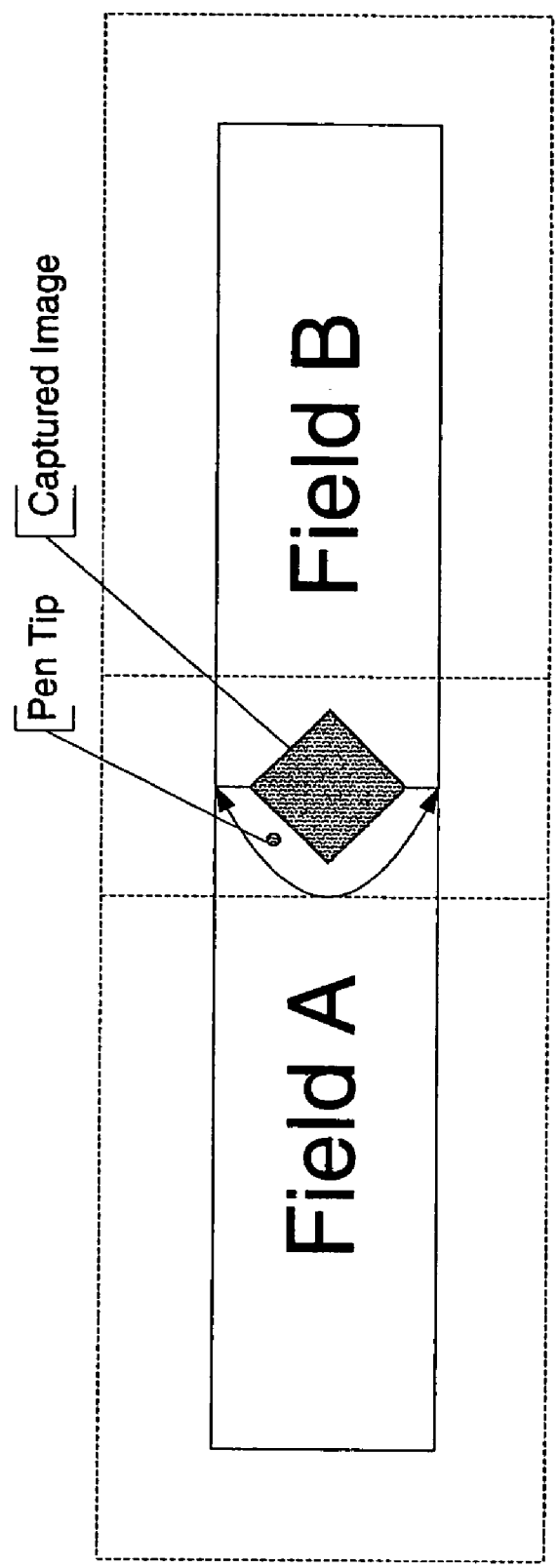
Figure 89:
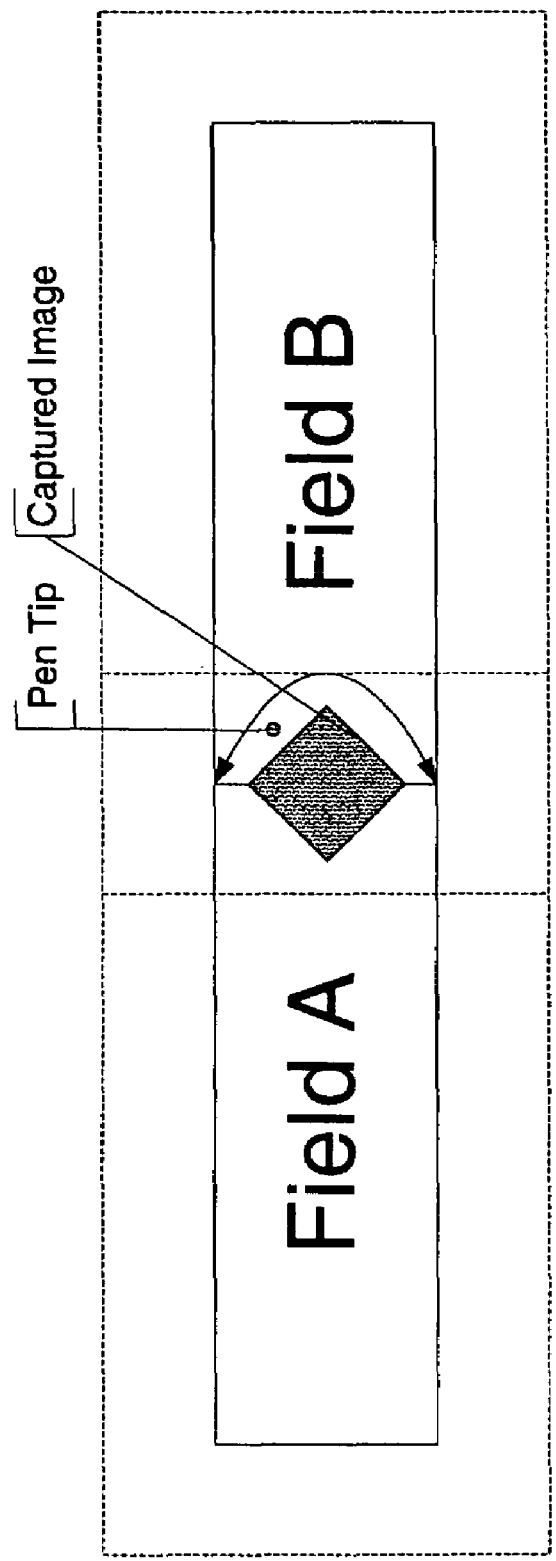

If two non-zero local metadata results with non-continuous values are decoded at substantially the same time:
As FIG. 88 shows, if the pen-tip position is to the left of the center of the captured image, then the smaller decoded metadata value is the correct local metadata result.
As FIG. 89 shows, if the pen-tip position is to the right of the center of the captured image, then the larger decoded metadata value is the correct local metadata result.

Certain regions of a document may have no local metadata conflict. For instance, suppose that c=1023 values of each independent local metadata channel are reserved for allocating local metadata values to conflict regions in a single document. Therefore, for each of four local metadata channels, there are $l=(2^{14}-1)-c$ values that can be used for conflict-free regions. These four 0.5 shares may be unified and allocated together. The number of unique local metadata values available for conflict-free regions may be expressed as $L=l^4$. Then the range of L is $c \leq L < (l^4+c)$, and local-metadata values within this range may be allocated to conflict free regions.

In the preceding example, the local metadata address space L is larger then 55 bits—approximately 55.6 bit, but less than the optimization maximum 4×14=56 bits, which means that no more than a reasonable address space is used for addressing the situation in which up to four local metadata regions have potential conflict areas that overlap.

A local metadata embedding solution in accordance with embodiments of the invention is extensible such that other types of conflicts may also be resolved. The description above relates to a single case of an EIC-array solution, and there are more extensible designs of EIC arrays behind the EIC-array solution described above. For example, to resolve potential conflicts of three overlapped enlarged regions in the horizontal and/or the vertical directions, the bits in the EIC array may be allocated in 1:5:0.33:0.33:0.33:0.33:0.33 proportion. Then, rules, which are similar to those described above, may be applied when embedding and decoding the local metadata. Accordingly, various types of partial shares, such as half shares, one-third shares, one-fourth shares, and the like, may be used in accordance with embodiments of the invention.

Universal local metadata, which is local metadata reserved by application or system, may be used in various documents and forms in accordance with embodiments of the invention. For a particular system, such as a university's files for a particular student, the student information will occur in various documents and/or forms and their various versions. Substantially all of the forms' fields that have the same information, such as student name, ID, and major, may be assigned a common local metadata value. The values assigned to information fields of this type may be synchronized with the university's student-information database.

Local-metadata embedding and decoding techniques in accordance with embodiments of the invention may support use of local metadata as described above as follows. When a local-metadata-decoding conflict occurs, a mapping table may be built from conflict-reserved local metadata to unique local metadata. The mapping table may be saved with the EIC document, and a copy of the mapping table may be saved by an image-capturing pen so that the local-metadata-decoding conflict may be efficiently resolved while the image-capturing pen is being used for interacting with the EIC document.

Global Metadata Encoding

Figure 94:
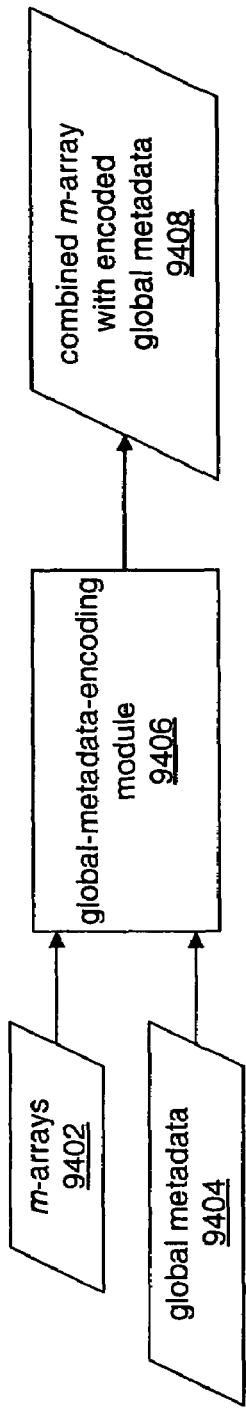
FIG. 94 shows a flow diagram of a system for encoding global metadata in accordance with embodiments of the invention.

FIG. 94 shows a flow diagram of a system for encoding global metadata in accordance with embodiments of the invention. One or more m-arrays, as depicted by m-arrays 9402 and global metadata 9404 are input to a global-metadata-encoding module 9406, which outputs a combined array with encoded global metadata 9408. The one or more input m-arrays may be m-arrays such as position m-array 9602 and global metadata m-array 9604, which are both depicted in FIG. 96.

Global metadata in a particular region of an EIC document may be encoded using the same m-array as the m-array that represents X, Y position information. The metadata m-array may be shifted, however, according to the value of the metadata.

Figure 96:
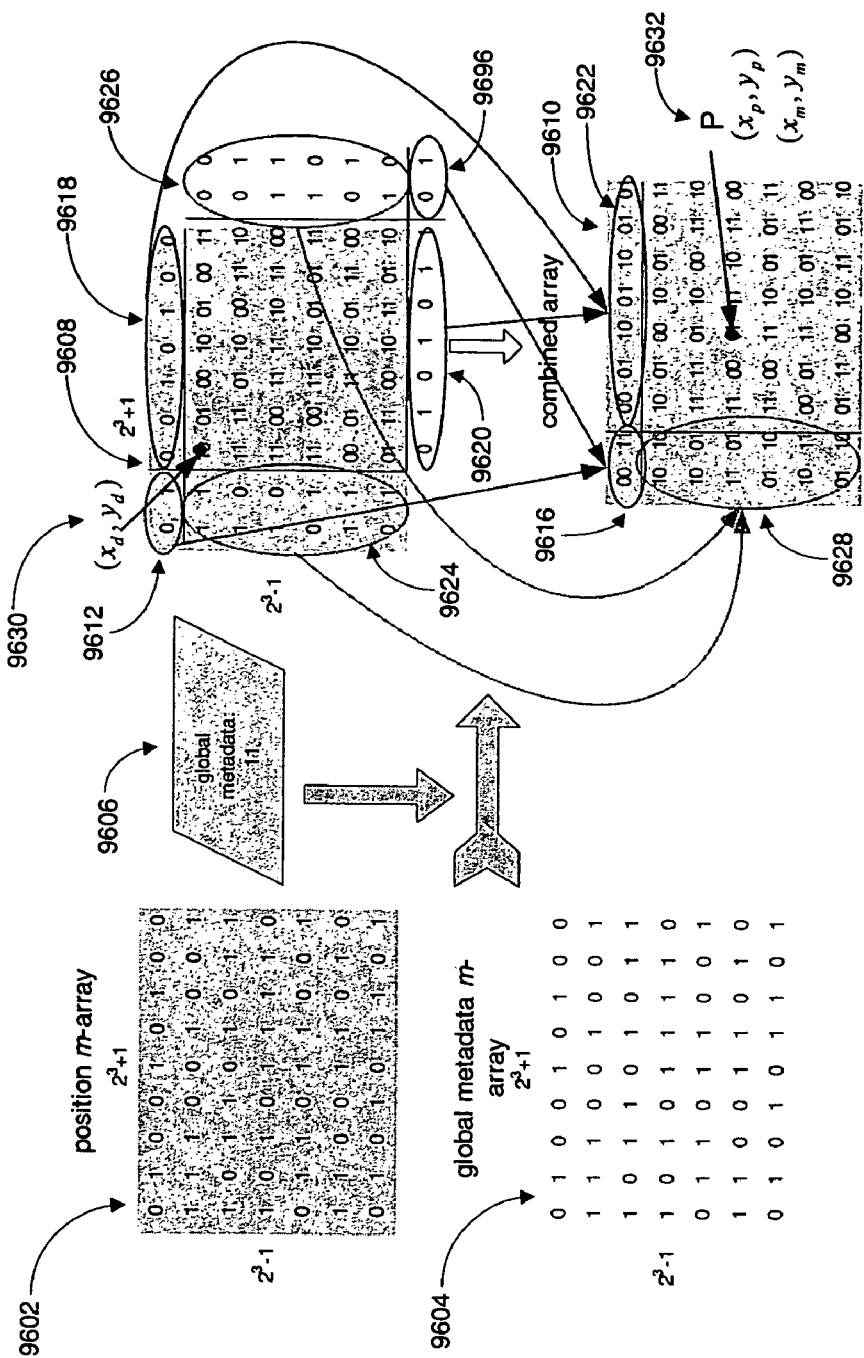
FIG. 96 shows a global-metadata-encoding example in accordance with embodiments of the invention.

FIG. 96 shows a global-metadata-encoding example in accordance with embodiments of the invention. Two identical m-arrays, a position m-array 9602 and a global metadata m-array 9604, are shown on the left side of FIG. 96. Both m-arrays are order 6 m-arrays. Therefore, the width of each m-array is $2^3+1$, and the height of each m-array is $2^3-1$.

The position m-array and the global metadata m-array may contain repeating bit sequences that are the same length but that have different bit sequences relative to each other. Stated differently, different primitive polynomials of order n may be used to generate different m-arrays, which will then contain different repeating bit sequences.

Figure 97:
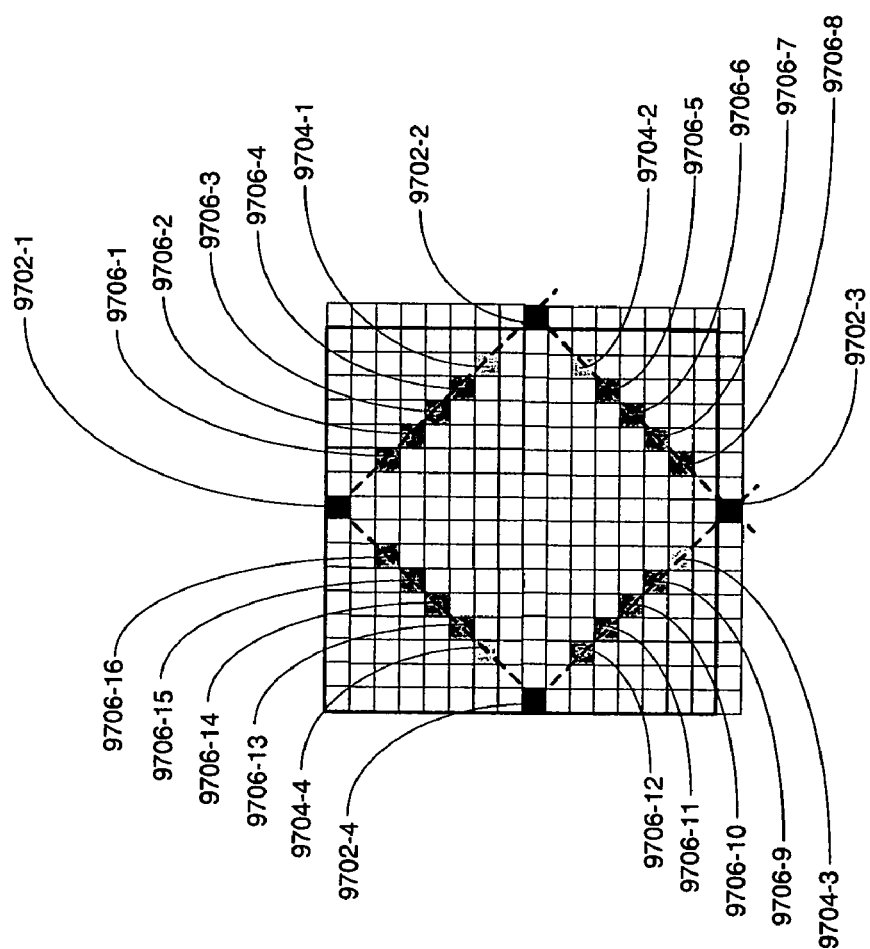
FIG. 97 shows an example of an EIC symbol in accordance with embodiments of the invention.

The two m-arrays may be combined, in accordance with embodiments of the invention, to encode two bits in one EIC symbol. An example of an EIC symbol is depicted in FIG. 97. The EIC symbol in FIG. 97 occupies all of the rows and columns of grid spaces shown in FIG. 97 except for the bottom row and the right-most column. That row and that column belong to adjacent EIC symbols. Accordingly, while black dots 9702-1 and 9702-4 belong to the EIC symbol shown in FIG. 15, black dots 9702-2 and 9702-3 are not part of that EIC symbol. Data dots 9706-1 through 9706-16 may be black or white for representing bits of information. Orientation dots 9704-1 through 9704-4 are always white to facilitate properly orienting camera-captured EIC-symbol images.

When the position m-array 9602 and the global metadata m-array 9604 are combined, based on the value of the global metadata (e.g., 11), the start of the global metadata m-array 9604 is shifted to position $(x_d, y_d)$, as depicted at 9630 in FIG. 96, of the position m-array 9602. The x,y coordinates may be calculated as follows:

7. $x_d = \mathrm{mod}(\mathrm{global}\ metadata, 2^{\frac{n}{2}} + 1)$,

8. $y_d = \mathrm{int}\left(\dfrac{\mathrm{global}\ metadata}{2^{\frac{n}{2}} + 1}\right)$, where n is the order of the m-array and $0 \leq \mathrm{local\ metadata} \leq 2^n - 2$.

In FIG. 96, the value of the global metadata 9606 being encoded is 11 and the order of the m-arrays is 6 (i.e., n=6). Therefore, 9. $x_d = \mathrm{mod}\left(11, 2^{\frac{6}{2}} + 1\right) = 2$, 10. $y_d = \mathrm{int}\left(\dfrac{11}{2^{\frac{6}{2}} + 1}\right) = 1$.

As shown in the partially combined m-array 9608, the global metadata m-array 9604 starts at position (2,1) of the position m-array 9602. Since the position m-array 9602 and the global metadata m-array 9604 repeat themselves, a combined m-array with encoded global metadata 9610, which is shown in the lower right corner of FIG. 96, may be generated. As a result of starting the global metadata m-array 9604 at (2,1), portions 9620, 9696, and 9626 of the global metadata m-array 9604 are left over after combining the overlapping rows and columns of the position m-array 9602 and the global metadata m-array 9604. Portion 9626 of the global metadata m-array 9604 and portion 9624 of the position m-array 9602 are combined in the combined array 9610, as depicted at 9628. Similarly, portion 9614 of the global metadata m-array 9604 and portion 9612 of the position m-array 9602 are combined in the combined array 9610 as depicted at 9616. And portion 9620 of the global metadata m-array 9604 and portion 9618 of the position m-array 9602 are combined in the combined array 9610 as depicted at 9622.

The value of the metadata is the distance in the combined array between the position m-array 9602 and the global metadata m-array 9604. The distance is kept the same in every pair of bits in the combined array 9610. Therefore, if the position of each bit in its corresponding m-array is obtained, the distance in the combined array 9610 can be determined.

Global Metadata Decoding

Figure 95:
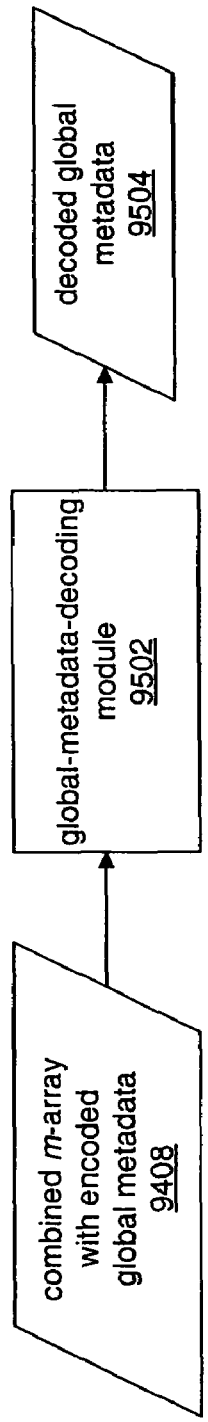
FIG. 95 shows a flow diagram of a system for decoding global metadata in accordance with embodiments of the invention.

FIG. 95 shows a flow diagram of a system for decoding global metadata in accordance with embodiments of the invention. A combined array with encoded global metadata 9408 is input to a global-metadata-decoding module 9502, which outputs decoded global metadata 9504.

To decode global metadata, the m-arrays that have been combined to form the combined array 9408 are each separately decoded. For example, referring to the example shown in FIG. 96, the position m-array 9602 and the global metadata m-array 9604 are separately decoded. Then, for a particular point P 9632, two positions are obtained: $(x_p, y_p)$, the position of the point in the position m-array 9602, and $(x_m, y_m)$, the position of the point in the global metadata m-array 9604.

The value of the global metadata may then be calculated as follows:

11.

$$\text{global } metadata = \text{mod}\left(y_p - y_m, 2^{\frac{n}{2}} - 1\right) \cdot \left(2^{\frac{n}{2}} + 1\right) + \text{mod}\left(x_p - x_m, 2^{\frac{n}{2}} + 1\right),$$

where n is the order of the combined m-array 9408.

In the example shown in FIG. 96, the position of P in the first m-array is (4,3). The position of P in the second m-array is (2,2). Therefore, the value of metadata is:

$$\text{global metadata} = \text{mod}(3-2, 2^3-1) \cdot (2^3+1) + \text{mod}(4-2, 2^3+1) = 11. \quad 12.$$

For real-world applications, there may be multi-dimensional global metadata. For example, suppose there are 1 position dimension and 7 dimensions for global metadata. Then the overall global metadata may be calculated as follows.

After decoding for each dimension, position $(x_p, y_p)$ is the output of the dimension representing X, Y position and $(x_m^i, y_m^i)$ are the output of the remaining 7 global metadata dimensions, where $i = 0, 1, 2, \ldots, 6$. Therefore, metadata encoded in each dimension can be obtained:

$$\text{global } metadata\ portion_i = \text{mod}\left(y_p - y_m^i, 2^{\frac{n}{2}} - 1\right) \cdot \left(2^{\frac{n}{2}} + 1\right) + \text{mod}\left(x_p - x_m^i, 2^{\frac{n}{2}} + 1\right),$$

where n is the order of the m-array.

For dimension i, where $i = 0, 1, 2, \ldots, 6$, a value of global metadata portion$_i$ is obtained from each image successfully decoded for that dimension. For all images, the value that occurs most often may be considered the value of that portion of the global metadata.

Now that the metadata encoded in each of the 7 dimensions representing a document ID is obtained, the document ID may be calculated as:

$$\text{global } metadata = \sum_{i=0}^{6} \text{global } metadata\ portion_i \cdot (2^n - 1)^i,$$

where n is the order of the m-array. As will be apparent, any suitable number of dimensions may be used for embedding global metadata.

Embedding global metadata in multiple dimensions allows surprisingly large global-metadata values to be encoded. For instance, suppose there are 8 dimensions available, one dimension is used for X, Y position data and 7 dimensions are used for global metadata. For the 7 dimensions of global metadata, suppose that an order 28 m-array is used (i.e., the m-array will have $2^{14}+1$ columns and $2^{14}-1$ rows. Then the number of possible values of global metadata that can be encoded in seven dimensions is $(2^{28}-2)^7$.

FIG. 98 shows relationship between the largest size factor and available m-array order.

The goal of EIC document mapping is to bind ink strokes to EIC documents.

EIC document mapping includes one or more of the following:

a. Generating ink strokes: with decoded position in m-array representing X, Y position, position of virtual pen tip in image plane and $H_{Symbol \rightarrow Image}$, position of pen tip in EIC symbol array is obtained. Ink stroke is thus generated with a series of images.

b. Calculate global/local metadata: with decoded positions in m-arrays representing X, Y position and metadata, metadata is calculated.

c. Find EIC document: with global metadata such as a document ID, EIC document is found.

d. Coordinates in EIC array space to document page space mapping: position of pen tip in EIC symbol array is mapped to position of pen tip in a document page based on how EIC symbol array is allocated to each page of a document. Alternatively, one may associate the ink strokes with the document but store the ink strokes separately. The ink strokes may stored in memory, on a fixed media, or any other related storage system or transmitted.

Aspects of the present invention have been described in terms of preferred and illustrative embodiments thereof. Numerous other embodiments, modifications and variations within the scope and spirit of the appended claims will occur to persons of ordinary skill in the art from a review of this disclosure.

We claim:

1. A process for associating an ink stroke with an electronic document comprising the steps of:

generating a first two-dimensional array of bits;

generating a second two-dimensional array of bits;

combining the first two-dimensional array and the second two-dimensional array to generate a combined array, wherein the first two-dimensional array and the second two-dimensional array at least partially overlap in the combined array and wherein a start position of the second two-dimensional array in the combined array is shifted, by an amount that is based on a document identifier associated with an electronic document, relative to a start position of the first two-dimensional array in the combined array;

printing the combined array on a paper document receiving a first captured image of the paper document from a camera associated with a pen;

receiving a second captured image of the paper document from the camera associated with the pen;

obtaining encoded information from the first captured image and the second captured image;

decoding said information from the first captured image and the second captured image, wherein the decoded information includes location information and a document identifier, wherein location information is decoded at least in part by decoding a portion of the first two-dimensional array contained within an image and wherein a document identifier is decoded at least in part by determining the shift of a portion of the second two-dimensional array contained within an image relative to a portion of the first two-dimensional array contained within the image;

forming a representation of an ink stroke based on the decoded location information from the first captured image and the second captured image;

identifying an electronic version of the paper document based on the decoded document identifier from said decoding step;

storing the formed representation of the ink stroke in association with the identified electronic version of the paper document; and displaying the electronic version of the paper document, including displaying the ink stroke based on the formed representation stored in association with the electronic version of the identified document.

2. The process according to claim 1, further comprising the step of:

pre-processing at least one captured image.

3. The process according to claim 1, further comprising the step of:

performing pattern analysis on at least one captured image.

4. The process according to claim 1, further comprising the step of:

recognizing one or more symbols from said obtaining encoded information step.

5. The process according to claim 1, wherein said forming step includes mapping said ink stroke to a document.

6. A system for associating pen movement with a document comprising:

an input that receives images of the document from a camera associated with a pen, wherein each image contains a combined array comprised of a first two-dimensional array of bits and a second two-dimensional array of bits, wherein a start position of the second two-dimensional array in the combined array is shifted, by an amount that is based on a document identifier associated with the document, relative to a start position of the first two-dimensional array in the combined array;

at least one processor that receives the images, the processor obtaining encoded information from the images, decoding the information to determine location information and a document identifier, and forming an ink stroke based on the identified location information, wherein location information is determined at least in part by decoding a portion of the first two-dimensional array contained within an image and wherein the document identifier is decoded at least in part by determining the shift of a portion of the second two-dimensional array contained within a first image relative to a portion of the first two-dimensional array contained within the first image; and a component that stores the ink stroke in association with the document so that the associated ink stroke can be output along with the document.

7. The system according to claim 6, wherein the images are of a printed document and wherein the ink stroke is stored in association with an electronic version of the printed document.

8. The system according to claim 6, said at least one processor including a decoder that decodes the information.

9. The system according to claim 6, said at least one processor including an image preprocessor that adjusts lighting of at least one captured image.

10. The system according to claim 6, said at least one processor including a pattern analyzer that analyzes a pattern found in at least one image.

11. The system according to claim 6, said at least one processor including a symbol recognizer that recognizes a pattern in at least one image as a symbol that may be decoded.

12. The system according to claim 6, said at least one processor including a decoder that decodes a symbol found in at least one image.

13. The system according to claim 6, said at least one processor including a document mapper that maps a location determined from information in the images into a stroke that may be associated with said document.

14. The system according to claim 6, wherein the encoded information includes metadata.

15. A pen that captures images, said images being processed to associate a stroke with an electronic document, the pen comprising:

a component for capturing images of a surface containing an EIC symbol array and an output of the electronic document, the EIC symbol array including encoded position information and an encoded document identifier, wherein the EIC symbol array is comprised of a first two-dimensional array of bits and a second two-dimensional array of bits, wherein a start position of the second two-dimensional array is shifted, by an amount that is based on a document identifier associated with an electronic document, relative to a start position of the first two-dimensional array;

a component for decoding an EIC symbol within captured images to determine the position of the pen at the time an image was captured, wherein the position is determined at least in part by decoding the first two-dimensional array contained within an EIC symbol;

a component for generating an ink stroke based at least in part on the determined positions of captured images;

a component for decoding an EIC symbol within captured images to determine a document identifier, wherein the document identifier is decoded at least in part by determining the shift of the second two-dimensional array contained within an EIC symbol relative to the first two-dimensional array contained within the EIC symbol;

a component for identifying the electronic document based at least in part on the decoded document identifier; and a component for binding the generated ink stroke to the electronic document so that the ink stroke can be identified when the electronic document is retrieved.

16. The pen of claim 15, wherein the document is an electronic version of a printed document and wherein the surface is the printed document.

* * * * *

UNITED STATES PATENT AND TRADEMARK OFFICE
CERTIFICATE OF CORRECTION

PATENT NO. : 7,580,576 B2
APPLICATION NO. : 11/142910
DATED : August 25, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Fourteenth Day of September, 2010

David J. Kappos
*Director of the United States Patent and Trademark Office*